(12) United States Patent
Sachdeva et al.

(10) Patent No.: US 11,201,955 B1
(45) Date of Patent: Dec. 14, 2021

(54) AGENT NETWORKING IN A CONTAINERIZED ENVIRONMENT

(71) Applicant: Lacework Inc., Mountain View, CA (US)

(72) Inventors: Rakesh Sachdeva, Santa Clara, CA (US); Vikram Kapoor, Cupertino, CA (US)

(73) Assignee: Lacework Inc., Mountain View, CA (US)

( * ) Notice: Subject to any disclaimer, the term of this patent is extended or adjusted under 35 U.S.C. 154(b) by 0 days.

(21) Appl. No.: 16/725,836

(22) Filed: Dec. 23, 2019

(51) Int. Cl.
G06F 15/16 (2006.01)
H04L 29/06 (2006.01)
G06F 9/455 (2018.01)
H04L 12/24 (2006.01)
G06F 15/173 (2006.01)

(52) U.S. Cl.
CPC .......... H04L 69/22 (2013.01); G06F 9/45558 (2013.01); H04L 41/046 (2013.01); H04L 41/142 (2013.01); H04L 67/42 (2013.01); G06F 2009/45595 (2013.01)

(58) Field of Classification Search
CPC ........... H04L 2209/805; H04L 63/0471; H04L 65/60; H04L 45/586; H04L 61/2007; H04L 61/6022; H04L 63/0272; H04L 67/02; H04L 12/1813; H04L 12/4633; H04L 12/4641; H04L 41/0803; H04L 41/0806; H04L 41/0809; H04L 41/0893; H04L 41/22; H04L 45/00; H04L 45/60; H04L 47/193; H04L 49/30; H04L 49/70; H04L 51/046; H04L 51/14; H04L 51/36; H04L 61/2038; H04L 63/0485; H04L 65/4015; H04L 65/403; H04L 67/10; H04L 67/2814; H04L 9/12; H04L 9/14; H04L 12/1822; H04L 12/4666; H04L 41/044; H04L 41/0886; H04L 41/14; H04L 41/5058; H04L 43/026; H04L 43/062; H04L 43/067; H04L 43/0876; H04L 45/38; H04L 45/54; H04L 45/64; H04L 45/70; H04L 61/2517; H04L 61/3015; H04L 65/1069; H04L 65/1089; H04L 65/80; H04L 9/0822; H04L 9/0869
USPC ........................................................ 709/224
See application file for complete search history.

(56) References Cited

U.S. PATENT DOCUMENTS

| | | |
|---|---|---|
| 5,584,024 A | 12/1996 | Shwartz |
| 5,806,062 A | 9/1998 | Chen |
| 8,103,906 B1 | 1/2012 | Alibakhsh |
| 8,122,122 B1 | 2/2012 | Clingenpeel |
| 8,443,442 B2 | 5/2013 | Wang |

(Continued)

OTHER PUBLICATIONS

Akoglu et al., "Graph-based Anomaly Detection and Description: A Survey", Apr. 28, 2014.

(Continued)

*Primary Examiner* — Karen C Tang
(74) *Attorney, Agent, or Firm* — ALG Intellectual Property, LLC

(57) ABSTRACT

A frame is received at an agent. The frame is analyzed to determine that the frame is associated with a first known pod. IP information is reported to a backend process. The backend process is configured to stitch the IP information with other IP information reported by one or more additional agents to identify a second pod.

22 Claims, 79 Drawing Sheets

(56) References Cited

U.S. PATENT DOCUMENTS

| | | | |
|---|---|---|---|
| 8,671,453 B2 | 3/2014 | Underwood | |
| 8,862,524 B2 | 10/2014 | Zheng | |
| 9,021,583 B2 | 4/2015 | Wittenstein | |
| 9,037,273 B2 | 5/2015 | Mikkelsen | |
| 9,332,020 B2 | 5/2016 | Thomas | |
| 9,515,999 B2 | 12/2016 | Ylonen | |
| 9,516,053 B1 | 12/2016 | Muddu | |
| 9,558,265 B1 | 1/2017 | Tacchi | |
| 9,596,253 B2 | 3/2017 | Chauhan | |
| 9,654,503 B1 | 5/2017 | Kowalyshyn | |
| 9,734,040 B2 | 8/2017 | Gounares | |
| 9,749,339 B2 | 8/2017 | Kadambe | |
| 9,853,968 B2 | 12/2017 | Shen | |
| 9,953,014 B1 | 4/2018 | Reshadi | |
| 10,033,611 B1 | 7/2018 | Linkous | |
| 10,115,111 B2 | 10/2018 | Miltonberger | |
| 10,127,273 B2 | 11/2018 | Dickey | |
| 10,142,357 B1 | 11/2018 | Tamersoy | |
| 10,205,736 B2 | 2/2019 | Rieke | |
| 10,339,309 B1 | 7/2019 | Kling | |
| 10,389,742 B2 | 8/2019 | Devi Reddy | |
| 10,594,718 B1 | 3/2020 | Deaguero | |
| 10,708,082 B1* | 7/2020 | Bakiaraj | H04L 45/586 |
| 10,735,329 B2* | 8/2020 | Wang | H04L 9/14 |
| 2002/0184225 A1 | 12/2002 | Ghukasyan | |
| 2003/0037136 A1 | 2/2003 | Labovitz | |
| 2003/0179227 A1 | 9/2003 | Ahmad | |
| 2004/0015470 A1 | 1/2004 | Smith | |
| 2005/0102284 A1 | 5/2005 | Srinivasan | |
| 2005/0188222 A1 | 8/2005 | Motsinger | |
| 2006/0085437 A1 | 4/2006 | Brodhun | |
| 2006/0259470 A1 | 11/2006 | Chandrasekharan | |
| 2006/0288415 A1 | 12/2006 | Wong | |
| 2007/0050497 A1 | 3/2007 | Haley | |
| 2007/0118909 A1 | 5/2007 | Hertzog | |
| 2008/0148180 A1 | 6/2008 | Liu | |
| 2008/0151893 A1* | 6/2008 | Nordmark | H04L 45/60 370/392 |
| 2009/0019160 A1 | 1/2009 | Schuler | |
| 2009/0228474 A1 | 9/2009 | Chiu | |
| 2009/0271504 A1 | 10/2009 | Ginter | |
| 2010/0094767 A1 | 4/2010 | Miltonberger | |
| 2010/0114931 A1 | 5/2010 | Xie | |
| 2010/0172261 A1 | 7/2010 | Shinbo | |
| 2010/0274785 A1 | 10/2010 | Procopiuc | |
| 2011/0055138 A1 | 3/2011 | Khanduja | |
| 2012/0005243 A1 | 1/2012 | Van Der Merwe | |
| 2012/0317151 A1 | 12/2012 | Ruf | |
| 2012/0323956 A1 | 12/2012 | Dumitru | |
| 2013/0304915 A1 | 11/2013 | Kawai | |
| 2013/0305357 A1 | 11/2013 | Ayyagari | |
| 2014/0115001 A1 | 4/2014 | Arroyo | |
| 2014/0115011 A1 | 4/2014 | Buerner | |
| 2014/0208191 A1 | 7/2014 | Zaric | |
| 2014/0245443 A1 | 8/2014 | Chakraborty | |
| 2014/0280068 A1 | 9/2014 | Dhoopar | |
| 2014/0359558 A1 | 12/2014 | Chamberlain | |
| 2015/0135312 A1 | 5/2015 | Wada | |
| 2015/0188751 A1 | 7/2015 | Vasseur | |
| 2015/0341379 A1 | 11/2015 | Lefebvre | |
| 2015/0356144 A1 | 12/2015 | Chawla | |
| 2016/0078365 A1 | 3/2016 | Baumard | |
| 2016/0080404 A1 | 3/2016 | Kohout | |
| 2016/0110434 A1 | 4/2016 | Kakaraddi | |
| 2016/0149937 A1 | 5/2016 | Katmor | |
| 2016/0205125 A1 | 7/2016 | Kim | |
| 2016/0218911 A1 | 7/2016 | Wessels | |
| 2016/0359592 A1 | 12/2016 | Kulshreshtha | |
| 2016/0359872 A1 | 12/2016 | Yadav | |
| 2017/0118240 A1 | 4/2017 | Devi Reddy | |
| 2017/0134240 A1 | 5/2017 | Hévizi | |
| 2017/0147646 A1 | 5/2017 | Lee | |
| 2017/0163666 A1 | 6/2017 | Venkatramani | |
| 2017/0251013 A1 | 8/2017 | Kirti | |
| 2017/0272344 A1 | 9/2017 | Tang | |
| 2017/0279827 A1 | 9/2017 | Savalle | |
| 2017/0288974 A1 | 10/2017 | Yoshihira | |
| 2017/0359361 A1 | 12/2017 | Modani | |
| 2017/0366492 A1* | 12/2017 | Ho | G06F 9/544 |
| 2018/0020015 A1 | 1/2018 | Munro | |
| 2018/0034840 A1 | 2/2018 | Marquardt | |
| 2018/0063178 A1 | 3/2018 | Jadhav | |
| 2018/0103052 A1 | 4/2018 | Choudhury | |
| 2018/0115578 A1 | 4/2018 | Subbarayan | |
| 2018/0137858 A1 | 5/2018 | Saxena | |
| 2018/0173789 A1 | 6/2018 | Llagostera | |
| 2018/0174062 A1 | 6/2018 | Simo | |
| 2018/0181750 A1 | 6/2018 | Lamothe-Brassard | |
| 2018/0248901 A1 | 8/2018 | Rieke | |
| 2018/0268078 A1 | 9/2018 | Gianetto | |
| 2018/0288063 A1 | 10/2018 | Koottayi | |
| 2018/0329958 A1 | 11/2018 | Choudhury | |
| 2018/0336353 A1 | 11/2018 | Manadhata | |
| 2018/0357422 A1 | 12/2018 | Telang | |
| 2018/0367548 A1 | 12/2018 | Stokes, III | |
| 2019/0028327 A1 | 1/2019 | Silva | |
| 2019/0109870 A1 | 4/2019 | Bedhapudi | |
| 2019/0132224 A1 | 5/2019 | Verma | |
| 2019/0222597 A1 | 7/2019 | Crabtree | |
| 2019/0259033 A1 | 8/2019 | Reddy | |
| 2019/0339965 A1 | 11/2019 | Garvey | |
| 2019/0349305 A1* | 11/2019 | Wang | H04L 9/0822 |
| 2019/0378050 A1 | 12/2019 | Edkin | |
| 2020/0076685 A1* | 3/2020 | Vaidya | H04L 12/4641 |
| 2020/0192690 A1* | 6/2020 | Gupta | G06F 9/45558 |
| 2020/0252376 A1* | 8/2020 | Feng | H04L 63/0464 |
| 2020/0272740 A1 | 8/2020 | Obee | |
| 2020/0278892 A1* | 9/2020 | Nainar | G06F 9/5055 |
| 2020/0280592 A1* | 9/2020 | Ithal | H04L 45/7453 |
| 2020/0311644 A1 | 10/2020 | Willard, III | |
| 2020/0403860 A1* | 12/2020 | Lewis | H04L 41/12 |

OTHER PUBLICATIONS

Alex Beutel, "User Behavior Modeling with Large-Scale Graph Analysis", Computer Science Department, Carnegie Mellon University, May 2016.

Bugiel et al., Feb. 2012, Towards Taming Privilege-Escalation Attacks on Android. In NDSS (vol. 17, p. 19).

Chang et al., "Reality bites-progressive querying and result visualization in logical and VR spaces", doi 10.1109NL.1994.363635, 1994, pp. 100-109. (Year: 1994).

Christian Vaas and Jassim Happa. "Detecting disguised processes using application-behavior profiling." In 2017 IEEE International Symposium on Technologies for Homeland Security (HST), pp. 1-6. IEEE, 2017.

Danai Koutra, "Exploring and Making Sense of Large Graphs", Computer Science Department, Carnegie Mellon University, Aug. 2015.

Hautamäki, Ville, Ismo Karkkainen, and Pasi Franti. "Outlier detection using k-nearest neighbour graph." Proceedings of the 17th International Conference on Pattern Recognition, 2004. ICPR 2004., vol. 3. IEEE, 2004.

Jai Sundar Balasubramaniyan, Jose Omar Garcia-Fernandez, David Isacoff, Eugene Spafford, and Diego Zamboni. "An architecture for intrusion detection using autonomous agents." In Proceedings 14th annual computer security applications conference (Cat. No. 98EX217), pp. 13-24. IEEE, 1998.

Leopold et al., "A visual query system for the specification and scientific analysis of continual queries", doi: 10.1109/HCC.2001. 995260,2001, pp. 203-211. (Year: 2001).

Liao, Qi, Aaron Striegel, and Nitesh Chawla. "Visualizing graph dynamics and similarity for enterprise network security and management." Proceedings of the seventh international symposium on visualization for cyber security. ACM, 2010.

Mark Crosbie and Eugene H. Spafford. "Defending a computer system using autonomous agents." (1995).

Ranshous et al., "Anomaly detection in dynamic networks: a survey", WIREs Comput Stat, May/Jun. 2015.

(56) References Cited

OTHER PUBLICATIONS

Tamassia, Roberto, Bernardo Palazzi, and Charalampos Papamanthou. "Graph drawing for security visualization." International Symposium on Graph Drawing. Springer, Berlin, Heidelberg, 2008.

Wathiq Laftah Al-Yaseen, Zulaiha Ali Othman, and Mohd Zakree Ahmad Nazri. "Real-time intrusion detection system using multi-agent system." IAENG International Journal of Computer Science 43, No. 1 (2016): 80-90.

Gregory L. Chesson, "Communication and control in a cluster network", ACM '74: Proceedings of the 1974 annual ACM conference—vol. 2, Jan. 1974, pp. 509-514 https://doi .org/10.1145/1408800.1408839 (Year 1974).

Ammar, "Query Optimization Techniques in Graph Databases", International Journal of Database Management Systems (IIDMS), vol. 8, No. 4, Aug. 2016, pp. 1-14. (Year 2016).

Hooper et al., "Medusa: a simple tool for interaction graph analysis", Bioinformatics, vol. 21 No. 24, 2005, pp. 4432-4433. (Year: 2005).

Mateescu et al., "Join-Graph Propagation Algorithm", Journal of Artificial Intelligence Research 37, 2010, pp. 279-328. (Year 2010).

Moriano et al., "Insider Threat Event Detection in User-System Interactions", MIST '17: Proceedings of the 2017 International Workshop on Managing Insider Security ThreatsOct. 2017, pp. 1-12https://doi .org/10.1145/3139923.3139928 (Year 2017).

Yu et al., "Recommending Join Queries Based on Path Frequency", IEEE, doi: 10.1109/WISA 2015.52, 2015, pp. 21-26. (Year 2015).

\* cited by examiner

300 ⤴

```
                    "event": {                    ┌─302
                      "created_time": 1501626889179,
                      "type": "ProcessData",      ┌─304
                      "data": {
306 ─┐                  "net.lacework.model.agent.ProcessData": {
308 ─┐                    "pid": 26191,
310 ─┐                    "pid_hash": 7372148259205580000,
                          "start_time": 1501515701990,
                          "uid": 0,
                          "euid": 0,
328 ─┐                    "username": {
                            "string": "root"
                          },
                          "ppid": 1336,
312 ─┐                    "ppid_hash": {
                            "long": 376175681985733950
                          },
                          "pgid": 26191,
314 ─┐                    "pgid_hash": {
                            "long": 7372148259205580000
                          },
                          "sid": 1336,
316 ─┐                    "sid_hash": {
                            "long": 376175681985733950
318 ─┐                    },
320 ─┐                    "tty": "0",
                          "cmdline_hash": "1fe756721a20ddec981aa953bce34c1a",
322 ─┐                    "exe_path": {
                            "string": "/usr/bin/containerd-shim"
                          },
324 ─┐                    "eusername": {
                            "string": "root"
326 ─┐                    },
                          "container_id": null
                        }
                      }
                    }
```

352 ⤵ "event": {
      "created_time": 1501626889179,
      "type": "ProcessStatsData",
      "data": {
354 ⤵        "net.lacework.model.agent.ProcessStatsData": {
356 ⤵        "pid_hash": 7372148259205580000,
358 ⤵        "threads": 10,
360 ⤵        "vsize": 221245440,
362 ⤵        "rsize": 1296,
364 ⤵        "utime": 839,
        "stime": 2852
        }
      }
}

FIG. 3B

```
"outgoing": {
    "net.lacework.model.agent.UniDirectionData": {
        "bytes": 7524648,
        "compress_ratio": 0,
        "compress_samples": 0,
        "packet_len_hist": {
            "net.lacework.model.agent.Histogram": {
                "count": 471,
                "sum": 7524648,
                "max": 31856,
                "std_dev": 0,
                "buckets": null
            }
        },
        "session_len_hist": {
            "net.lacework.model.agent.Histogram": {
                "count": 4,
                "sum": 7524648,
                "max": 2532151,
                "std_dev": 0,
                "buckets": null
            }
        },
        "session_time_hist": {
            "net.lacework.model.agent.Histogram": {
                "count": 4,
                "sum": 152452,
                "max": 52039,
                "std_dev": 0,
                "buckets": null
            }
        },
        "session_switch_time_hist": {
            "net.lacework.model.agent.Histogram": {
                "count": 3,
                "sum": 544171,
                "max": 223693,
                "std_dev": 0,
                "buckets": null
            }
        }
    }
},
```

FIG. 3C

```
"incoming": {
    "net.lacework.model.agent.UniDirectionData": {
        "bytes": 1041,
        "compress_ratio": 0,
        "compress_samples": 0,
        "packet_len_hist": {
            "net.lacework.model.agent.Histogram": {
                "count": 6,
                "sum": 1041,
                "max": 298,
                "std_dev": 0,
                "buckets": null
            }
        },
        "session_len_hist": {
            "net.lacework.model.agent.Histogram": {
                "count": 3,
                "sum": 1041,
                "max": 347,
                "std_dev": 0,
                "buckets": null
            }
        },
        "session_time_hist": {
            "net.lacework.model.agent.Histogram": {
                "count": 3,
                "sum": 87,
                "max": 43,
                "std_dev": 0,
                "buckets": null
            }
        },
        "session_switch_time_hist": {
            "net.lacework.model.agent.Histogram": {
                "count": 3,
                "sum": 1750190,
                "max": 1180754,
                "std_dev": 0,
                "buckets": null
            }
        }
    }
}
```

FIG. 3D

| MID | start_time | PID_hash | src_IP_addr | src_port | dst_IP_addr | dst_port | prot | dir |
|---|---|---|---|---|---|---|---|---|
| A | t1 | A1 | 1.1.1.10 | 10000 | 2.2.2.20 | 22 | TCP | Incoming |
| A | t2 | A3 | 2.2.2.20 | 10001 | 2.2.2.21 | 22 | TCP | Outgoing |
| B | t2 | B1 | 2.2.2.20 | 10001 | 2.2.2.21 | 22 | TCP | Incoming |

| src_MID | src_PID_hash | dst_MID | dst_PID_hash | dst_start_time | src_IP_addr | src_port | dst_IP_addr | dst_port |
|---|---|---|---|---|---|---|---|---|
| null | null | A | A1 | t1 | 1.1.1.10 | 10000 | 2.2.2.20 | 22 |
| A | A3 | B | B1 | t2 | 2.2.2.20 | 10001 | 2.2.2.21 | 22 |

FIG. 25B

| MID | login_time | sshd_PID_hash |
|---|---|---|
| A | t1 | A1 |
| B | t2 | B1 |

FIG. 25C

| MID | sshd_PID_hash | login_time | login_username | src_IP_addr | src_port | dst_IP_addr | dst_port |
|---|---|---|---|---|---|---|---|
| A | A1 | t1 | X | 1.1.1.10 | 10000 | 2.2.2.20 | 22 |
| B | B1 | t2 | Y | 2.2.2.20 | 10001 | 2.2.2.21 | 22 |

FIG. 25D

| MID | start_time | PID_hash | exe_path | parent_PID_hash |
|---|---|---|---|---|
| A | t1 | A1 | /usr/sbin/sshd | A0 |
| A | t1 | A2 | /bin/bash | A1 |
| A | t2 | A3 | /usr/bin/ssh | A2 |
| B | t2 | B1 | /usr/sbin/sshd | B0 |
| B | t2 | B2 | /bin/bash | B1 |
| B | t3 | B3 | /usr/bin/curl | B2 |

FIG. 25E

| MID | sshd_PID_hash | PID_hash |
|---|---|---|
| A | A1 | A1 |
| A | A1 | A2 |
| A | A1 | A3 |
| B | B1 | B1 |
| B | B1 | B2 |
| B | B1 | B3 |

FIG. 25F

| parent_MID | parent_sshd_PID_hash | child_MID | origin_sshd_PID_hash |
|---|---|---|---|
| A | A1 | B | B1 |

FIG. 25G

| MID | sshd_PID_hash | parent_MID | parent_sshd_PID_hash | origin_MID | origin_sshd_PID_hash |
|---|---|---|---|---|---|
| A | A1 | null | null | A | A1 |
| B | B1 | A | A1 | A | A1 |

```
"Card189" : {
  "props" : {
    "question": "Hostname, Binary, and Username",
    "scope" : "external"
  },
  "parameters": [
    {"name" : "StartTimeRange", "type" : "TIMESTAMP"},      ⎯3602
    {"name" : "EndTimeRange", "type" : "TIMESTAMP"}         ⎯3604
  ],
  "sources": [                                              ⎯3606
    {"name" : "MVIEW_INTERNAL.ENTITY_VIEW_T", "alias" : "P"},
    {"name" : "ProcessClusterFilters", "alias" : "Act"}
  ],
  "returns" : [
    {"field" : "P.EXE_PATH", "alias" : "EXE_PATH"},
    {"field" : "P.USERNAME", "props" : {"utype" : "USERNAME"}},
    {"field" : "P.PROPS_PROCESS:SSH_SESSION:props:username", "alias" : "ORIGIN_USER"},
    {"field" : "P.HOSTNAME", "props" : {"utype" : "HOSTNAME"}},
    {"expr" : "COUNT(DISTINCT #{P.MID}, #{P.PID_HASH})", "type" : "NUMBER", "alias" : "NUM_PROCESSES"}
  ],
  "fkeys" : [                                               ⎯3610
    {"type" : "PID_KEY",  "fieldRefs" : ["P.MID", "P.PID_HASH"]}
  ],
  "joins" : [
    {"type" : "implicit", "left": "PID_KEY", "right": "Act.P_PID_KEY"}
  ],
  "groups" : [
    {"field" : "1"}, {"field" : "2"}, {"field" : "3"}, {"field" : "4"}
  ],
  "filters" : [
    {"type" : "ge", "field" : "START_TIME", "value" : "${StartTimeRange}"},
    {"type" : "le", "field" : "END_TIME", "value" : "${EndTimeRange}"},
    {"type" : "eq", "field" : "ENTITY_TYPE", "value" : "Process"},    ⎯3608
    {"type" : "ne", "field" : "PID_HASH", "value" : "0"}
  ],
  "filterMap" : {
    "P.PROPS_PROCESS:SSH_SESSION:props:username" : ["SSH_ORIGIN_USERNAME"]
  }
}
```

FIG. 36

```
"UserTrackingMemberOfIPAddress_MV" : {
  "type": "Function",
  "sources" : [
    {"name" : "ClusterMemberOfIPAddress_MV"}
  ],
  "parameters": [
    {"name" : "ClusterType", "value" : "UserTracking"}
  ]
},
"UserTrackingMemberOfUser_MV" : {
  "type": "Function",
  "sources" : [
    {"name" : "ClusterMemberOfUsername_MV"}
  ],
  "parameters": [
    {"name" : "ClusterType", "value" : "UserTracking"}
  ]
},
"UserTrackingMemberOfDNSSep_MV" : {
  "type": "Function",
  "sources" : [
    {"name" : "ClusterMemberOfDNSSep_MV"}
  ],
  "parameters": [
    {"name" : "ClusterType", "value" : "UserTracking"}
  ]
}
```

FIG. 37

```
curl "localhost:8080/card/describe/
Card26?DCGUID=DEVTEST_CDB_DEVTEST_00_B10C8DBE1CFA89C1F274B"
{
    "ok": true,
    "schema": [
      {
        "name": "MID",
        "type": "Number",
        "props": {
          "utype": "MID",
          "title": "Machine ID"
        }
      },
      {
        "name": "MACHINE_NAME",
        "type": "String",
        "props": {
          "utype": "MACHINE_NAME",
          "title": "Machine Name"
        }
      },
      ...
    ],
    "parameters": [
      {
        "name": "JoinOption",
        "type": null,
        "default": "OR",
        "props": null
      },
      {
        "name": "StartTimeRange",
        "type": null,
        "default": null,
        "props": null
      },
      {
        "name": "EndTimeRange",
        "type": null,
        "default": null,
        "props": null
      }
    ]
}
```

FIG. 38

```
curl "localhost:8080/card/describe/Card21?DCGUID=DEVTEST_CDB_DEVTEST_00_B10C8DBE1CFA89C1F274B"
{
    "ok": true,
    "schema": {
      "nodes": [
        {"name": "ID", "type": "Number"},
        {"name": "TYPE", "type": "String"},
        {"name": "KEY", "type": "JSON"},
        {"name": "PROPS", "type": "JSON"}
      ],
      "edges": [
        {"name": "ID", "type": "Number"},
        {"name": "TYPE", "type": "String"},
        {"name": "SRC_TYPE", "type": "String"},
        {"name": "DST_TYPE", "type": "String"},
        {"name": "SRC_KEY", "type": "JSON"},
        {"name": "DST_KEY", "type": "JSON"},
        {"name": "PROPS", "type": "JSON"}
      ]
    },
    "graph": {
      "SOURCE": {
        "type": "Ptype",
        "key": [
          {"name": "cid", "filterName": "KEY_CID", "type": "Number"}
        ],
        "props": [
          {"name": "client", "filterName": "PROPS_CLIENT", "type": "Number"},
          {"name": "members", "filterName": "PROPS_MEMBERS", "type": "Number"},
          {"name": "tier", "filterName": "PROPS_TIER", "type": "Number"},
          {"name": "server", "filterName": "PROPS_SERVER", "type": "Number"},
          {"name": "ctype", "filterName": "PROPS_CTYPE", "type": "String"}
        ]
      },
      "TARGET": {
        "type": "Ptype",
        "key": [
          {"name": "cid", "filterName": "KEY_CID", "type": "Number"}
        ],
        "props": [
          {"name": "client", "filterName": "PROPS_CLIENT", "type": "Number"},
          {"name": "members", "filterName": "PROPS_MEMBERS", "type": "Number"},
          {"name": "tier", "filterName": "PROPS_TIER", "type": "Number"},
          {"name": "server", "filterName": "PROPS_SERVER", "type": "Number"},
          {"name": "ctype", "filterName": "PROPS_CTYPE", "type": "String"}
        ]
      },
      "EDGE": {
        "type": "ConnectedTo",
        "props": []
      }
    }
}
```

FIG. 39

```
curl -ss -H "Content-Type: application/json" -X POST -d ' {
    "filters": [{
        "type": "like",
        "field": "ProcessClusterFilters.P2DNS_HOSTNAME",
        "value": "*google*"
    }],
    "paramInfo": [{
        "name": "StartTimeRange",
        "value": "6/17/2017"
    }, {
        "name": "EndTimeRange",
        "value": "6/18/2017"
    }]
}
' "localhost:8080/card/query/
Card189?DCGUID=STAGING_CDB_STAGING_00_DEED95AE3C794A7FF1D0B" {
    "data": [{
        "EXE_PATH": "/usr/lib/jvm/java-8-oracle/jre/bin/java",
        "USERNAME": "root",
        "ORIGIN_USER": "root",
        "HOSTNAME": "staging_worker5.lacework.internal",
        "NUM_PROCESSES": "1"
    }],
    "ok": true
}
```

[01:06] qb.core.implicitfilter.EntityFilters: add starting edge - MVP-[Link<M2DNS_MID_KEY>]->M2DNS
[01:06] qb.core.implicitfilter.EntityFilters: add starting edge - MVP-[Link<I_MID_KEY>]->I
[01:06] qb.core.implicitfilter.EntityFilters: add starting edge - MVP-[Link<DNS_MID_KEY>]->DNS
[01:06] qb.core.implicitfilter.EntityFilters: add starting edge - MVP-[Link<Mt2CtMachine_MID_KEY>]->Mt2CtMachine
[01:06] qb.core.implicitfilter.EntityFilters: add starting edge - MVP-[Link<MtypeMachine_MID_KEY>]->MtypeMachine
[01:06] qb.core.implicitfilter.EntityFilters: add starting edge - MVP-[Link<UserLoginMachine_MID_KEY>]->UserLoginMachine
[01:06] qb.core.implicitfilter.EntityFilters: add starting edge - MVP-[Link<P2IPA_PID_KEY>]->P2IPA
[01:06] qb.core.implicitfilter.EntityFilters: add starting edge - MVP-[Link<P2DNS_PID_KEY>]->P2DNS
[01:06] qb.core.implicitfilter.EntityFilters: add starting edge - MVP-[Link<EVENT_PID_KEY>]->Event
[01:06] qb.core.implicitfilter.EntityFilters: add starting edge - MVP-[Link<UserLoginUser_KEY>]->UserLoginUser
[01:06] qb.core.implicitfilter.EntityFilters: new path - {MVP-[Link<M2DNS_MID_KEY>]->M2DNS - M2DNS-[Link<I_MID_KEY>]->I}
[01:06] qb.core.implicitfilter.EntityFilters: new path - {MVP-[Link<M2DNS_MID_KEY>]->M2DNS - M2DNS-[Link<DNS_MID_KEY>]->DNS}
[01:06] qb.core.implicitfilter.EntityFilters: new path - {MVP-[Link<M2DNS_MID_KEY>]->M2DNS - M2DNS-[Link<Mt2CtMachine_MID_KEY>]->Mt2CtMachine}
[01:06] qb.core.implicitfilter.EntityFilters: new path - {MVP-[Link<M2DNS_MID_KEY>]->M2DNS - M2DNS-[Link<MtypeMachine_MID_KEY>]->MtypeMachine}
[01:06] qb.core.implicitfilter.EntityFilters: new path - {MVP-[Link<M2DNS_MID_KEY>]->M2DNS - M2DNS-[Link<UserLoginMachine_MID_KEY>]->UserLoginMachine}
[01:06] qb.core.implicitfilter.EntityFilters: new path - {MVP-[Link<M2DNS_MID_KEY>]->M2DNS - M2DNS-[Link<MtypeDnsName_KEY>]->MtypeDnsName}
[01:06] qb.core.implicitfilter.EntityFilters: new path - {MVP-[Link<M2DNS_MID_KEY>]->M2DNS - M2DNS-[Link<CtypeDnsSep_KEY_2>]->CtypeDnsSep}
[01:06] qb.core.implicitfilter.EntityFilters: new path - {MVP-[Link<I_MID_KEY>]->I - I-[Link<DNS_MID_KEY>]->DNS}
[01:06] qb.core.implicitfilter.EntityFilters: new path - {MVP-[Link<I_MID_KEY>]->I - I-[Link<Mt2CtMachine_MID_KEY>]->Mt2CtMachine}
[01:06] qb.core.implicitfilter.EntityFilters: new path - {MVP-[Link<I_MID_KEY>]->I - I-[Link<MtypeMachine_MID_KEY>]->MtypeMachine}
[01:06] qb.core.implicitfilter.EntityFilters: new path - {MVP-[Link<I_MID_KEY>]->I - I-[Link<UserLoginMachine_MID_KEY>]->UserLoginMachine}
[01:06] qb.core.implicitfilter.EntityFilters: new path - {MVP-[Link<I_MID_KEY>]->I - I-[Link<P2IPA_IPA_KEY>]->P2IPA}
[01:06] qb.core.implicitfilter.EntityFilters: new path - {MVP-[Link<DNS_MID_KEY>]->DNS - DNS-[Link<Mt2CtMachine_MID_KEY>]->Mt2CtMachine}
[01:06] qb.core.implicitfilter.EntityFilters: new path - {MVP-[Link<DNS_MID_KEY>]->DNS - DNS-[Link<MtypeMachine_MID_KEY>]->MtypeMachine}
[01:06] qb.core.implicitfilter.EntityFilters: new path - {MVP-[Link<DNS_MID_KEY>]->DNS - DNS-[Link<UserLoginMachine_MID_KEY>]->UserLoginMachine}
[01:06] qb.core.implicitfilter.EntityFilters: new path - {MVP-[Link<DNS_MID_KEY>]->DNS - DNS-[Link<P2DNS_HOSTNAME_KEY>]->P2DNS}
[01:06] qb.core.implicitfilter.EntityFilters: new path - {MVP-[Link<Mt2CtMachine_MID_KEY>]->Mt2CtMachine - Mt2CtMachine-[Link<MtypeMachine_MID_KEY>]->MtypeMachine}
[01:06] qb.core.implicitfilter.EntityFilters: new path - {MVP-[Link<Mt2CtMachine_MID_KEY>]->Mt2CtMachine - Mt2CtMachine-[Link<UserLoginMachine_MID_KEY>]->UserLoginMachine}
[01:06] qb.core.implicitfilter.EntityFilters: new path - {MVP-[Link<MtypeMachine_MID_KEY>]->MtypeMachine - MtypeMachine-[Link<UserLoginMachine_MID_KEY>]->UserLoginMachine}
[01:06] qb.core.implicitfilter.EntityFilters: new path - {MVP-[Link<P2IPA_PID_KEY>]->P2IPA - P2IPA-[Link<EVENT_PID_KEY>]->Event}
[01:06] qb.core.implicitfilter.EntityFilters: new path - {MVP-[Link<P2IPA_PID_KEY>]->P2IPA - P2IPA-[Link<P2DNS_PID_KEY>]->P2DNS}
[01:06] qb.core.implicitfilter.EntityFilters: new path - {MVP-[Link<P2IPA_PID_KEY>]->P2IPA - P2IPA-[Link<MtypeIpAddress_KEY>]->MtypeIpAddress}
[01:06] qb.core.implicitfilter.EntityFilters: new path - {MVP-[Link<P2IPA_PID_KEY>]->P2IPA - P2IPA-[Link<MtypeIpSep_KEY>]->MtypeIpSep}
[01:06] qb.core.implicitfilter.EntityFilters: new path - {MVP-[Link<P2IPA_PID_KEY>]->P2IPA - P2IPA-[Link<PtypeIpAddress_KEY>]->PtypeIpAddress}
[01:06] qb.core.implicitfilter.EntityFilters: new path - {MVP-[Link<P2IPA_PID_KEY>]->P2IPA - P2IPA-[Link<PtypeIpSep_KEY>]->PtypeIpSep}
[01:06] qb.core.implicitfilter.EntityFilters: new path - {MVP-[Link<P2IPA_PID_KEY>]->P2IPA - P2IPA-[Link<IntPConnIpAddress_KEY>]->IntPConnIpAddress}
[01:06] qb.core.implicitfilter.EntityFilters: new path - {MVP-[Link<P2IPA_PID_KEY>]->P2IPA - P2IPA-[Link<CtypeIpAddress_KEY>]->CtypeIpAddress}
[01:06] qb.core.implicitfilter.EntityFilters: new path - {MVP-[Link<P2IPA_PID_KEY>]->P2IPA - P2IPA-[Link<CtypeIpSep_KEY>]->CtypeIpSep}
[01:06] qb.core.implicitfilter.EntityFilters: new path - {MVP-[Link<P2IPA_PID_KEY>]->P2IPA - P2IPA-[Link<UserLoginIpAddress_KEY>]->UserLoginIpAddress}
[01:06] qb.core.implicitfilter.EntityFilters: add candidate path - {MVP-[Link<EVENT_PID_KEY>]->Event - Event-[Link<P2DNS_PID_KEY>]->P2DNS} ⎯⎯4202
[01:06] qb.core.implicitfilter.EntityFilters: new path - {MVP-[Link<P2DNS_MID_KEY>]->M2DNS - M2DNS-[Link<MtypeDnsName_KEY>]->MtypeDnsName - Link<CtypeDnsSep_KEY_2>]->CtypeDnsSep}
[01:06] qb.core.implicitfilter.EntityFilters: new path - {MVP-[Link<M2DNS_MID_KEY>]->M2DNS - M2DNS-[Link<MtypeDnsName_KEY>]->MtypeDnsName - CtypeDnsSep - CtypeDnsSep-[Link<P2DNS_HOSTNAME_KEY_C>]->P2DNS}

```sql
WITH GRAPH_EDGE_VIEW AS (
  WITH GRAPH_EDGE_VIEW_8 AS (
    SELECT ID, SRC_TYPE, SRC_KEY, DST_TYPE, DST_KEY, TYPE, PROPS, START_TIME, END_TIME
    FROM GRAPH_INTERNAL.EDGE_T
    WHERE START_TIME >= TO_TIMESTAMP('6/17/2017')
    AND END_TIME <= TO_TIMESTAMP('6/18/2017')
  )
  SELECT ID, SRC_TYPE, SRC_KEY, DST_TYPE, DST_KEY, TYPE, PROPS, START_TIME, END_TIME
  FROM GRAPH_EDGE_VIEW_8
),
Card189 AS (
  WITH P AS (
    SELECT START_TIME, END_TIME, ENTITY_TYPE, MID, PID_HASH, USERNAME, EXE_PATH, HOSTNAME, PROPS_PROCESS
    FROM MVIEW_INTERNAL.ENTITY_VIEW_T
  ),
  Act_MVP AS (
    WITH ENTITY_VIEW_T_42 AS (
      SELECT START_TIME, END_TIME, ENTITY_TYPE, MID, PID_HASH, USERNAME, EXE_PATH, HOSTNAME, CONTAINER, NET_STATS,
        CLUSTER_MAP, TAGS, EVENT_MAP, PROPS_MACHINE, PROPS_PROCESS, PROPS_USER, PROPS_EXE_PATH, PROPS_CONTAINER
      FROM MVIEW_INTERNAL.ENTITY_VIEW_T
    )
    SELECT ENTITY_VIEW_T_42.MID MID, ENTITY_VIEW_T_42.PID_HASH PID_HASH, ENTITY_VIEW_T_42.HOSTNAME HOSTNAME,
      ENTITY_VIEW_T_42.USERNAME USERNAME, ENTITY_VIEW_T_42.EXE_PATH EXE_PATH, ENTITY_VIEW_T_42.CONTAINER CONTAINER,
      ENTITY_VIEW_T_42.CLUSTER_MAP "CLUSTER_MAP", ENTITY_VIEW_T_42.TAGS "TAGS",
      ENTITY_VIEW_T_42.PROPS_PROCESS "PROPS_PROCESS"
    FROM ENTITY_VIEW_T_42
    WHERE ENTITY_VIEW_T_42.ENTITY_TYPE = 'Process'
    AND ENTITY_VIEW_T_42.START_TIME >= TO_TIMESTAMP('6/17/2017')
    AND ENTITY_VIEW_T_42.END_TIME <= TO_TIMESTAMP('6/18/2017')
  ),
  Act_P2DNS AS (
    WITH ProcessToExternalDNSView_6 AS (
      SELECT DISTINCT SRC_KEY:mid::BIGINT MID,
        COALESCE(SRC_KEY:pid_hash, 0)::BIGINT PID_HASH, DST_KEY:hostname::VARCHAR HOSTNAME
      FROM  GRAPH_EDGE_VIEW
      WHERE TYPE = 'ConnectedTo'
      AND SRC_TYPE IN ('Process', 'MachineUc')
      AND DST_KEY:hostname <> ''
    )
    SELECT MID, PID_HASH, HOSTNAME
    FROM ProcessToExternalDNSView_6
  )
  SELECT P.EXE_PATH EXE_PATH, P.USERNAME USERNAME, P.PROPS_PROCESS:SSH_SESSION:props:username ORIGIN_USER,
  P.HOSTNAME HOSTNAME, COUNT(DISTINCT P.MID, P.PID_HASH) NUM_PROCESSES
  FROM P
  WHERE P.START_TIME >= TO_TIMESTAMP('6/17/2017')
  AND P.END_TIME <= TO_TIMESTAMP('6/18/2017')
  AND P.ENTITY_TYPE = 'Process'
  AND P.PID_HASH <> 0
  AND (P.MID, P.PID_HASH) IN (
    SELECT Act_MVP.MID, Act_MVP.PID_HASH FROM Act_MVP
    WHERE (Act_MVP.MID, Act_MVP.PID_HASH) IN (
      SELECT Act_P2DNS.MID, Act_P2DNS.PID_HASH
      FROM Act_P2DNS
      WHERE Act_P2DNS.HOSTNAME LIKE ?{P0} ESCAPE '\\'
    )
  )
  GROUP BY 1, 2, 3, 4
)
SELECT Card189.EXE_PATH EXE_PATH, Card189.USERNAME USERNAME, Card189.ORIGIN_USER ORIGIN_USER, Card189.HOSTNAME
HOSTNAME,
Card189.NUM_PROCESSES NUM_PROCESSES FROM Card189 LIMIT 5000
;
```

FIG. 43

```
curl -ss -H "Content-Type: application/json" -X POST -d ' {
"filters": [{
    "type": "eq",
    "value": "51",
    "field": "ProcessClusterFilters.UserTrackingDnsSep_CID"
}],
"paramInfo": [{
    "name": "StartTimeRange",
    "value": "6/17/2017"
}, {
    "name": "EndTimeRange",
    "value": "6/18/2017"
}]
}
,
"localhost:8080/card/query/Card189?DCGUID=STAGING_CDB_STAGING_00_DEED95AE3C794A7FF1D0B" {
    "data": [{
        "EXE_PATH": "/usr/bin/python2.7",
        "USERNAME": "root",
        "ORIGIN_USER": "root",
        "HOSTNAME": "staging_master0.lacework.internal",
        "NUM_PROCESSES": "5"
    }, {
        "EXE_PATH": "/bin/bash",
        "USERNAME": "vikram_prod",
        "ORIGIN_USER": "vikram_prod",
        "HOSTNAME": "staging_worker4.lacework.internal",
        "NUM_PROCESSES": "1"
    }],
    "ok": true
}
```

FIG. 44

```
[00:30] qb.core.implicitfilter.EntityFilters: add starting edge - MVP-[Link<M2DNS_MID_KEY>]->M2DNS
[00:30] qb.core.implicitfilter.EntityFilters: add starting edge - MVP-[Link<I_MID_KEY>]->I
[00:30] qb.core.implicitfilter.EntityFilters: add starting edge - MVP-[Link<DNS_MID_KEY>]->DNS
[00:30] qb.core.implicitfilter.EntityFilters: add starting edge - MVP-[Link<Mt2CtMachine_MID_KEY>]->Mt2CtMachine
[00:30] qb.core.implicitfilter.EntityFilters: add starting edge - MVP-[Link<MtypeMachine_MID_KEY>]->MtypeMachine
[00:30] qb.core.implicitfilter.EntityFilters: add starting edge - MVP-[Link<UserLoginMachine_MID_KEY>]->UserLoginMachine
[00:30] qb.core.implicitfilter.EntityFilters: add starting edge - MVP-[Link<P2IPA_PID_KEY>]->P2IPA
[00:30] qb.core.implicitfilter.EntityFilters: add starting edge - MVP-[Link<P2DNS_PID_KEY>]->P2DNS
[00:30] qb.core.implicitfilter.EntityFilters: add starting edge - MVP-[Link<EVENT_PID_KEY>]->Event
[00:30] qb.core.implicitfilter.EntityFilters: add starting edge - MVP-[Link<UserLoginUser_KEY>]->UserLoginUser
[00:30] qb.core.implicitfilter.EntityFilters: add starting edge - MVP-[Link<UserTrackingUser_KEY>]->UserTrackingUser
[00:30] qb.core.implicitfilter.EntityFilters: new path - {MVP-[Link<M2DNS_MID_KEY>]->M2DNS - M2DNS-[Link<I_MID_KEY>]->I}
[00:30] qb.core.implicitfilter.EntityFilters: new path - {MVP-[Link<M2DNS_MID_KEY>]->M2DNS - M2DNS-[Link<DNS_MID_KEY>]->DNS}
[00:30] qb.core.implicitfilter.EntityFilters: new path - {MVP-[Link<M2DNS_MID_KEY>]->M2DNS - M2DNS-[Link<Mt2CtMachine_MID_KEY>]->Mt2CtMachine}
[00:30] qb.core.implicitfilter.EntityFilters: new path - {MVP-[Link<M2DNS_MID_KEY>]->M2DNS - M2DNS-[Link<MtypeMachine_MID_KEY>]->MtypeMachine}
[00:30] qb.core.implicitfilter.EntityFilters: new path - {MVP-[Link<M2DNS_MID_KEY>]->M2DNS - M2DNS-[Link<UserLoginMachine_MID_KEY>]->UserLoginMachine}
[00:30] qb.core.implicitfilter.EntityFilters: new path - {MVP-[Link<M2DNS_MID_KEY>]->M2DNS - M2DNS-[Link<MtypeDnsName_KEY>]->UserDnsName}
[00:30] qb.core.implicitfilter.EntityFilters: new path - {MVP-[Link<M2DNS_MID_KEY>]->M2DNS - M2DNS-[Link<CtypeDnsSep_KEY_2>]->CtypeDnsSep}
[00:30] qb.core.implicitfilter.EntityFilters: new path - {MVP-[Link<I_MID_KEY>]->I - I-[Link<DNS_MID_KEY>]->I}
[00:30] qb.core.implicitfilter.EntityFilters: new path - {MVP-[Link<I_MID_KEY>]->I - I-[Link<Mt2CtMachine_MID_KEY>]->Mt2CtMachine}
[00:30] qb.core.implicitfilter.EntityFilters: new path - {MVP-[Link<I_MID_KEY>]->I - I-[Link<MtypeMachine_MID_KEY>]->MtypeMachine}
[00:30] qb.core.implicitfilter.EntityFilters: new path - {MVP-[Link<I_MID_KEY>]->I - I-[Link<UserLoginMachine_MID_KEY>]->UserLoginMachine}
[00:30] qb.core.implicitfilter.EntityFilters: new path - {MVP-[Link<I_MID_KEY>]->I - I-[Link<P2IPA_IPA_KEY_2>]->P2IPA}
[00:30] qb.core.implicitfilter.EntityFilters: new path - {MVP-[Link<DNS_MID_KEY>]->DNS - DNS-[Link<Mt2CtMachine_MID_KEY>]->Mt2CtMachine}
[00:30] qb.core.implicitfilter.EntityFilters: new path - {MVP-[Link<DNS_MID_KEY>]->DNS - DNS-[Link<MtypeMachine_MID_KEY>]->MtypeMachine}
[00:30] qb.core.implicitfilter.EntityFilters: new path - {MVP-[Link<DNS_MID_KEY>]->DNS - DNS-[Link<UserLoginMachine_MID_KEY>]->UserLoginMachine}
[00:30] qb.core.implicitfilter.EntityFilters: new path - {MVP-[Link<DNS_MID_KEY>]->DNS - DNS-[Link<P2DNS_HOSTNAME_KEY>]->P2DNS}
[00:30] qb.core.implicitfilter.EntityFilters: new path - {MVP-[Link<Mt2CtMachine_MID_KEY>]->Mt2CtMachine - Mt2CtMachine-[Link<MtypeMachine_MID_KEY>]->MtypeMachine}
[00:30] qb.core.implicitfilter.EntityFilters: new path - {MVP-[Link<Mt2CtMachine_MID_KEY>]->Mt2CtMachine - Mt2CtMachine-[Link<UserLoginMachine_MID_KEY>]->UserLoginMachine}
[00:30] qb.core.implicitfilter.EntityFilters: new path - {MVP-[Link<MtypeMachine_MID_KEY>]->MtypeMachine - MtypeMachine-[Link<UserLoginMachine_MID_KEY>]->UserLoginMachine}
[00:30] qb.core.implicitfilter.EntityFilters: new path - {MVP-[Link<P2IPA_PID_KEY>]->P2IPA - P2IPA-[Link<EVENT_PID_KEY>]->Event}
[00:30] qb.core.implicitfilter.EntityFilters: new path - {MVP-[Link<P2IPA_PID_KEY>]->P2IPA - P2IPA-[Link<MtypeIpAddress_KEY>]->MtypeIpAddress}
[00:30] qb.core.implicitfilter.EntityFilters: new path - {MVP-[Link<P2IPA_PID_KEY>]->P2IPA - P2IPA-[Link<MtypeIpSep_KEY>]->MtypeIpSep}
[00:30] qb.core.implicitfilter.EntityFilters: new path - {MVP-[Link<P2IPA_PID_KEY>]->P2IPA - P2IPA-[Link<PtypeIpAddress_KEY>]->PtypeIpAddress}
[00:30] qb.core.implicitfilter.EntityFilters: new path - {MVP-[Link<P2IPA_PID_KEY>]->P2IPA - P2IPA-[Link<PtypeIpSep_KEY>]->PtypeIpSep}
[00:30] qb.core.implicitfilter.EntityFilters: new path - {MVP-[Link<P2IPA_PID_KEY>]->P2IPA - P2IPA-[Link<IntPConnIpAddress_KEY>]->IntPConnIpAddress}
[00:30] qb.core.implicitfilter.EntityFilters: new path - {MVP-[Link<P2IPA_PID_KEY>]->P2IPA - P2IPA-[Link<CtypeIpAddress_KEY>]->CtypeIpAddress}
[00:30] qb.core.implicitfilter.EntityFilters: new path - {MVP-[Link<P2IPA_PID_KEY>]->P2IPA - P2IPA-[Link<CtypeIpSep_KEY>]->CtypeIpSep}
[00:30] qb.core.implicitfilter.EntityFilters: new path - {MVP-[Link<P2IPA_PID_KEY>]->P2IPA - P2IPA-[Link<UserTrackingIpAddress_KEY>]->UserLoginIpAddress}
[00:30] qb.core.implicitfilter.EntityFilters: new path - {MVP-[Link<P2DNS_PID_KEY>]->P2DNS - P2DNS-[Link<EVENT_PID_KEY>]->Event}
[00:30] qb.core.implicitfilter.EntityFilters: new path - {MVP-[Link<P2DNS_PID_KEY>]->P2DNS - P2DNS-[Link<PtypeDnsSep_KEY>]->PtypeDnsSep}
[00:30] qb.core.implicitfilter.EntityFilters: new path - {MVP-[Link<P2DNS_PID_KEY>]->P2DNS - P2DNS-[Link<CtypeDnsSep_KEY>]->CtypeDnsSep}
[00:30] qb.core.implicitfilter.EntityFilters: new path - {MVP-[Link<P2DNS_PID_KEY>]->P2DNS - P2DNS-[Link<UserTrackingDnsSep_KEY>]->UserTrackingDnsSep}
[00:30] qb.core.implicitfilter.EntityFilters: new path - {MVP-[Link<P2DNS_PID_KEY>]->P2DNS - P2DNS-[Link<UserLoginUser-UserLoginUser_KEY>]->UserTrackingUser}
[00:30] qb.core.implicitfilter.EntityFilters: new path - {MVP-[Link<P2DNS_PID_KEY>]->P2DNS - P2DNS-[Link<MtypeDnsName_KEY>]->MtypeDnsName}
[00:30] qb.core.implicitfilter.EntityFilters: new path - {MVP-[Link<M2DNS_MID_KEY>]->M2DNS - M2DNS-[Link<MtypeDnsName_KEY>]->MtypeDnsName - MtypeDnsName-
[Link<CtypeDnsSep_KEY_2>]->CtypeDnsSep}
[00:30,240] qb.core.implicitfilter.EntityFilters: add candidate path - {MVP-[Link<P2DNS_PID_KEY>]->P2DNS - P2DNS-[Link<UserTrackingDnsSep_KEY>]->UserTrackingDnsSep}
```

FIG. 45

```
WITH GRAPH_EDGE_VIEW AS (
  WITH GRAPH_EDGE_VIEW_8 AS (
    SELECT ID, SRC_TYPE, SRC_KEY, DST_TYPE, DST_KEY, TYPE, PROPS, START_TIME, END_TIME
    FROM GRAPH_INTERNAL.EDGE_T
    WHERE START_TIME >= TO_TIMESTAMP('6/17/2017')
    AND END_TIME <= TO_TIMESTAMP('6/18/2017')
  )
  SELECT ID, SRC_TYPE, SRC_KEY, DST_TYPE, DST_KEY, TYPE, PROPS, START_TIME, END_TIME
  FROM GRAPH_EDGE_VIEW_8
),
MViewKeyClusterMap AS (
  WITH MViewKeyClusterMap_72 AS (
    SELECT DISTINCT ENTITY_TYPE, MID, PID_HASH, USERNAME, EXE_PATH, IP_ADDR, INTERNAL, HOSTNAME, CONTAINER,
      PORT, PROTOCOL, CLUSTER_MAP
    FROM MVIEW_INTERNAL.ENTITY_VIEW_T
    WHERE START_TIME >= TO_TIMESTAMP('6/17/2017')
    AND END_TIME <= TO_TIMESTAMP('6/18/2017')
  )
  SELECT ENTITY_TYPE, MID, PID_HASH, USERNAME, EXE_PATH, IP_ADDR, INTERNAL, HOSTNAME, CONTAINER, PORT, PROTOCOL, CLUSTER_MAP
  FROM MViewKeyClusterMap_72
),
Card189 AS (
  WITH P AS (
    SELECT START_TIME, END_TIME, ENTITY_TYPE, MID, PID_HASH, USERNAME, EXE_PATH, HOSTNAME, PROPS_PROCESS
    FROM MVIEW_INTERNAL.ENTITY_VIEW_T
  ),
  Act_MVP AS (
    WITH ENTITY_VIEW_T_42 AS (
      SELECT START_TIME, END_TIME, ENTITY_TYPE, MID, PID_HASH, USERNAME, EXE_PATH, HOSTNAME, CONTAINER, NET_STATS,
        CLUSTER_MAP, TAGS, EVENT_MAP, PROPS_MACHINE, PROPS_PROCESS, PROPS_USER, PROPS_EXE_PATH, PROPS_CONTAINER
      FROM MVIEW_INTERNAL.ENTITY_VIEW_T
    )
    SELECT ENTITY_VIEW_T_42.MID MID, ENTITY_VIEW_T_42.PID_HASH PID_HASH, ENTITY_VIEW_T_42.HOSTNAME HOSTNAME,
      ENTITY_VIEW_T_42.USERNAME USERNAME, ENTITY_VIEW_T_42.EXE_PATH EXE_PATH, ENTITY_VIEW_T_42.CONTAINER CONTAINER,
      ENTITY_VIEW_T_42.CLUSTER_MAP "CLUSTER_MAP", ENTITY_VIEW_T_42.TAGS "TAGS",
      ENTITY_VIEW_T_42.PROPS_PROCESS "PROPS_PROCESS"
    FROM ENTITY_VIEW_T_42
    WHERE ENTITY_VIEW_T_42.ENTITY_TYPE = 'Process'
    AND ENTITY_VIEW_T_42.START_TIME >= TO_TIMESTAMP('6/17/2017')
    AND ENTITY_VIEW_T_42.END_TIME <= TO_TIMESTAMP('6/18/2017')
  ),
  Act_P2DNS AS (
    WITH ProcessToExternalDNSView_6 AS (
      SELECT DISTINCT SRC_KEY::mid::BIGINT MID,
        COALESCE(SRC_KEY:pid_hash, 0)::BIGINT PID_HASH, DST_KEY:hostname::VARCHAR HOSTNAME
      FROM GRAPH_EDGE_VIEW
      WHERE TYPE = 'ConnectedTo'
      AND SRC_TYPE IN ('Process', 'MachineUc') AND DST_KEY:hostname <> ''
    )
    SELECT MID, PID_HASH, HOSTNAME
    FROM ProcessToExternalDNSView_6
  ),
  Act_UserTrackingDnsSep AS (
    WITH UserTrackingMemberOfDnsSep_MV_70 AS (
      SELECT DISTINCT CLUSTER_MAP:UserTracking::VARCHAR CID, HOSTNAME, PORT, PROTOCOL
      FROM MViewKeyClusterMap
      WHERE ENTITY_TYPE = 'DnsSep'
      AND CLUSTER_MAP:UserTracking IS NOT NULL
    )
    SELECT CID, HOSTNAME
    FROM UserTrackingMemberOfDnsSep_MV_70
  )
  SELECT
    P.EXE_PATH EXE_PATH, P.USERNAME USERNAME, P.PROPS_PROCESS:SSH_SESSION:props:username ORIGIN_USER,
    P.HOSTNAME HOSTNAME, COUNT(DISTINCT P.MID, P.PID_HASH) NUM_PROCESSES
  FROM P
  WHERE P.START_TIME >= TO_TIMESTAMP('6/17/2017')
  AND P.END_TIME <= TO_TIMESTAMP('6/18/2017')
  AND P.ENTITY_TYPE = 'Process'
  AND P.PID_HASH <> 0
  AND (P.MID, P.PID_HASH) IN (
    SELECT Act_MVP.MID, Act_MVP.PID_HASH
    FROM Act_MVP
    WHERE (Act_MVP.MID, Act_MVP.PID_HASH) IN (
      SELECT Act_P2DNS.MID, Act_P2DNS.PID_HASH
      FROM Act_P2DNS
      WHERE (Act_P2DNS.HOSTNAME) IN (
        SELECT Act_UserTrackingDnsSep.HOSTNAME
        FROM Act_UserTrackingDnsSep
        WHERE Act_UserTrackingDnsSep.CID = ?{P0}
      )
    )
  )
  GROUP BY 1, 2, 3, 4
)
SELECT Card189.EXE_PATH EXE_PATH, Card189.USERNAME USERNAME, Card189.ORIGIN_USER ORIGIN_USER,
  Card189.HOSTNAME HOSTNAME, Card189.NUM_PROCESSES NUM_PROCESSES
FROM Card189 LIMIT 5000
```

FIG. 46

```
/query/PROCESS_DETAILS_T?
F.1.N=PPID&
F.1.V=.gt.1&
F.2.N=PPID&
F.2.V=.lt.10&
F.3.N=UID&
F.3.V=3&
F.3.V=4&
F.3.V=5&
ReturnAttr.1=UID
```

FIG. 47A

```
SELECT UID
FROM
PROCESS_DETAILS_T
WHERE
        (UID IN (3, 4, 5))
AND
        (PPID > 1 AND PPID < 10)
```

FIG. 47B

```
/join/MACHINE_T/PROCESS_DETAILS_T?
Action=Describe&Version=123
JF.1.Type=semi
JF.1.Key=MID
E1.ReturnAttr.1=MID
E1.ReturnAttr.2=UTC_US
E1.Limit=10
E2.F.1.N=PPID
E2.F.1.V=.gt.1
E2.F.1.V=.lt.10
E2.F.2.N=UID
E2.F.2.V=3
E2.F.2.V=4
E2.F.2.V=5
E2.F.2.V=.gt.10
```

FIG. 47C

```
SELECT MID, UTC_US
FROM lacework.MACHINE_T
WHERE MID IN (
        SELECT MID
        FROM PROCESS_DETAILS_T
        WHERE
                (UID IN (3, 4, 5) OR UID > 10)
        AND
                (PPID > 1 OR PPID < 10)
)
LIMIT 10
```

FIG. 47D

```java
public String sqlGen(QueryContext context) {
    preSQLGen();
    this.pullUpCachable(context);
    StringBuilder sb = new StringBuilder();
    String with = sqlWith(context);
    String from = sqlFrom(context);
    String where = sqlWhere(context);
    String projections = sqlProjection(context);
    String gb = sqlGroupBy(context);
    String ob = sqlOrderby(context);
    // stitch everything together
    if (!with.isEmpty()) {
        sb.append("WITH ");
        if (this.parentRef.isRoot()) {
            int cnt = context.sqlgenCachable(sb);
            if (cnt > 0)
                sb.append(", ");
        }
        sb.append(with).append(" ");
    }
    sb.append(projections).append(" ").append(from);
    if (!where.isEmpty())
        sb.append(" ").append(where);
    if (!gb.isEmpty())
        sb.append(" ").append(gb);
    if (!ob.isEmpty())
        sb.append(" ").append(ob);
    sb.append(sqlLimitOffset(context));
    return sb.toString();
}
```

FIG. 49A

```
"SQL1" : {
    "type" : "SQL",
    "sql" : [
        "SELECT MID, PID_HASH FROM PROCESS_DETAILS_T"
    ],
    "returns" : [
        {"field" : "MID", "type" : "NUMBER"},
        {"field" : "PID_HASH", "type" : "NUMBER"}
    ]
},
"SQL2" : {
    "type" : "SQL",
    "sql" : [
        "WITH S1 AS (#{SQL1}) ",
        "SELECT MID, COUNT(DISTINCT PID_HASH) CNT FROM S1 ",
        "GROUP BY MID"
    ],
    "returns" : [
        {"field" : "MID", "type" : "NUMBER"},
        {"field" : "CNT", "type" : "NUMBER"}
    ]
},
"Entity1" : {
    "sources" : [
        {"name" : "SQL2", "alias" : "S2"}
    ]
    "returns" : [
        {"field" : "CNT"}
    ],
    "Filters" : [
        {"type" ; "eq", "field" : "S2.MID", "value" : "1"}
    ]
}
```

FIG. 49B

```
"ProcessClusterFilters" : {
  "props": {"scope": "external"},
  "type": "Filters",
  "parameters" : [
    {"name": "JoinOption", "default" : "AND"}
  ],
  "sources": [
    {"name" : "DummyClusterMember_MV",            "alias" : "Proxy"},
    {"name" : "ActiveProcessDetailsNoDistinct",   "alias" : "MVP"},
    {"name" : "InterfaceFilterView",              "alias" : "I"},
    {"name" : "ProcessToExternalDNSView",         "alias" : "P2DNS"},
    {"name" : "MachineToExternalDNSView",         "alias" : "M2DNS"},
    ...
  ]
  "returns" : [
    {
      "field" : "MVP.MID",
      "alias" : "P_MID",
      "props": {
        "title" : "Process Machine ID", "utype" : "MID",
        "filterGroup" : "Machine",
        "format" : "singleValue",
        "functions": {
          "timeSeries" : "MachineIDTimeSeries"
        }
      }
    },
    {
      "field" : "MVP.MID",
      "alias" : "MID",
      "props": {
        "title" : "Process Machine ID", "utype" : "MID",
        "filterGroup" : "Machine",
        "format" : "singleValue",
        "functions": {
          "timeSeries" : "MachineIDTimeSeries"
        }
      }
    },
    {
      "field" : "MVP.PID_HASH",
      "alias" : "PID_HASH",
      "props": {
        "title" : "Process Hash",
        "filterGroup" : "Process",
        "format" : "singleValue",
        "utype" : "PID_HASH"
      }
    },
    ...
```

FIG. 50A

```
{
    "field": "P2IPA.IP_ADDR",
    "alias": "P2IPA_IP_ADDR",
    "props": {
      "title": "Process connected to IP Addr",
      "format": "singleValue",
      "filterGroup": "P2IntIP",
      "utype" : "IP_ADDR"
    }
  },
  {
    "field": "P2DNS.HOSTNAME",
    "alias": "P2DNS_HOSTNAME",
    "props": {
      "title": "Process connected to external external hostname",
      "format": "singleValue",
      "filterGroup": "P2DNS",
      "utype" : "EXTERNAL_DNS"
    }
  }
], "fkeys" : [
  {"type": "PID_KEY", "fieldRefs":  ["Proxy.MID", "Proxy.PID_HASH"], "alias" : "PID_KEY", "proxy" : true},
  {"type": "PID_KEY", "fieldRefs" : ["MVP.MID", "MVP.PID_HASH"],                 "alias" : "P_PID_KEY"},
  {"type": "PID_KEY", "fieldRefs" : ["Event.ENTITY_MID", "Event.ENTITY_PID_HASH"], "alias" : "EVENT_PID_KEY"},
  {"type": "PID_KEY", "fieldRefs" : ["P2DNS.MID", "P2DNS.PID_HASH"],              "alias" : "P2DNS_PID_KEY"},
  {"type": "PID_KEY", "fieldRefs" : ["P2IPA.MID", "P2IPA.PID_HASH"],              "alias" : "P2IPA_PID_KEY"}, {"type": "MID_KEY", "fieldRefs" : ["MVP.MID"],    "alias" : "M_MID_KEY"},
  {"type": "MID_KEY", "fieldRefs" : ["DNS.MID"],    "alias" : "DNS_MID_KEY"},
  {"type": "MID_KEY", "fieldRefs" : ["M2DNS.MID"],  "alias" : "M2DNS_MID_KEY"},
  {"type": "MID_KEY", "fieldRefs" : ["I.MID"],      "alias" : "I_MID_KEY"},
  {"type": "MID_KEY", "fieldRefs" : ["P2IPA.MID"],  "alias" : "P2IPA_MID_KEY"}, "joins" : [
  {
    "type": "implicit",
    "keys": [
      "M2DNS_MID_KEY", "I_MID_KEY", "DNS_MID_KEY",
      "Mt2CtMachine_MID_KEY", "MtypeMachine_MID_KEY", "UserLoginMachine_MID_KEY",
      "M_MID_KEY"
    ]
  },
  {
    "type": "implicit",
    "keys": ["P_PID_KEY", "P2IPA_PID_KEY", "P2DNS_PID_KEY", "EVENT_PID_KEY"]
  },
  {
    "type" : "implicit",
    "keys" : [
      "DNS_HOSTNAME_KEY", "P2DNS_HOSTNAME_KEY"
    ]
  },
  {
    "type" : "implicit",
    "keys" : [
      "IPA_KEY", "I_IPA_KEY", "P2IPA_IPA_KEY"
    ]
  },
```

FIG. 50B

```
curl -H "Content-Type: application/json" -X POST -d '{
    "returns" : [
        {"field" : "MID"},
        {"field" : "HOSTNAME"}
    ],
    "filters" : [
        {"type" : "like", "field" : "ProcessClusterFilters.USERNAME", "value":"root"},
        {"type" : "like", "field" : "ProcessClusterFilters.EXE_PATH", "value":"bash"}
    ],
    "limit" : "5",
    "orders" : [
        {"field" : "HOSTNAME", "order" : "desc"},
        {"field" : "1"}
    ]
}' "localhost:8080/card/query/Card26?DCGUID=DEVTEST_JOE_ENV2_MDB&StartTimeRange=10/31/2015&EndTimeRange=1/10/2016"
```

FIG. 51

```
"ActiveProcessByConnection" : {
    "parameters" : [
      {"name" : "StartTimeRange"},
      {"name" : "EndTimeRange"}
    ],
    "sources" : [
      {"type" : "Table", "name" : "GRAPH_INTERNAL.NODE_T"}
    ],
    "returns" : [
      {"aggr" : "DISTINCT"},
      {"expr" : "#{KEY}:mid", "type" : "NUMBER", "alias" : "MID"},
      {"expr" : "#{KEY}:pid_hash", "type" : "NUMBER", "alias" : "PID_HASH"}
    ],
    "filters" : [
      {"type" : "eq", "field" :"TYPE", "value" : "Process"},
      {"expr" : "#{KEY}:mid > 0"},
      {"expr" : "(#{KEY}:pid_hash < 0 OR #{KEY}:pid_hash > 65535)"},
      {"type" : "ge", "field":"START_TIME", "value":"${StartTimeRange}" },
      {"type" : "le", "field":"END_TIME", "value":"${EndTimeRange}" }
    ]
},
```

FIG. 52A

```
curl -H "Content-Type: application/json" -X POST -d '{"filters" : []}'
"localhost:8080/card/query/
ActiveProcessByConnection?DCGUID=DEVTEST_CDB_DEVTEST_00_B10C8DBE1CFA89C1F
274B&StartTimeRange=3/30/2016%2010:00:00&EndTimeRange=3/30/
2016%2011:00:00"
```

FIG. 52B

```
WITH ActiveProcessByConnection AS (
  WITH NODE_T_1 AS (
    SELECT TYPE, KEY, START_TIME, END_TIME
    FROM GRAPH_INTERNAL.NODE_T
  )
  SELECT DISTINCT
  KEY:mid MID,
  KEY:pid_hash PID_HASH
  FROM NODE_T_1
  WHERE NODE_T_1.TYPE = 'Process'
  AND KEY:mid > 0
  AND (KEY:pid_hash < 0 OR KEY:pid_hash > 65535)
  AND NODE_T_1.START_TIME >= TO_TIMESTAMP('3/30/2016
10:00:00')
  AND NODE_T_1.END_TIME <= TO_TIMESTAMP('3/30/2016 11:00:00')
)
SELECT
ActiveProcessByConnection.MID MID,
ActiveProcessByConnection.PID_HASH PID_HASH
FROM ActiveProcessByConnection
LIMIT 5000
```

FIG. 52C

```
curl -H "Content-Type: application/json" -X POST -d '{"filters" :
[{"type":"in", "field":"MID", "values":["153"]}],
"returns":[{"field":"PID_HASH"}], "orders":[{"field":"1"}], "limit":"3"}'
"localhost:8080/card/query/
ActiveProcessByConnection?DCGUID=DEVTEST_CDB_DEVTEST_00_B10C8DBE1CFA89C1F274B
&StartTimeRange=3/30/2016%2010:00:00&EndTimeRange=3/30/2016%2011:00:00"
```

FIG. 52D

```
WITH ActiveProcessByConnection AS (
  WITH NODE_T_1 AS (
    SELECT TYPE, KEY, START_TIME, END_TIME
    FROM GRAPH_INTERNAL.NODE_T
  )
  SELECT DISTINCT
  KEY:mid MID, KEY:pid_hash PID_HASH
  FROM NODE_T_1
  WHERE NODE_T_1.TYPE = 'Process'
  AND KEY:mid > 0
  AND (KEY:pid_hash < 0 OR KEY:pid_hash > 65535)
  AND NODE_T_1.START_TIME >= TO_TIMESTAMP('3/30/2016 10:00:00')
  AND NODE_T_1.END_TIME <= TO_TIMESTAMP('3/30/2016 11:00:00')
)
SELECT ActiveProcessByConnection.PID_HASH PID_HASH
FROM ActiveProcessByConnection
WHERE ActiveProcessByConnection.MID IN (153)
ORDER BY 1
LIMIT 3
```

FIG. 52E

```
"Card1" : {
    "props" : {"scope" : "external"},
    "parameters" : [
        {"name": "StartTimeRange", "required" : true},
        {"name": "EndTimeRange", "required" : true}
    ],
    "sources": [
        {"name" : "ActiveProcessByConnection", "alias" : "S"},
        {"type" : "Table", "name" : "PUBLIC.PROCESS_DETAILS_T", "alias" : "P"},
        {"name" : "ProcessActivity", "alias" : "Act"},
        {"name" : "NetworkActivity", "alias" : "Net"}
    ],
    "returns" : [
        {
            "aggr" : "COUNT_DISTINCT",
            "field" : "P.USERNAME",
            "alias" : "COUNT",
            "props": {"title" : "# Of Distinct User Names"}
        }
    ],
    "fkeys" : [
        {"type" : "PID_KEY",  "fieldRefs" : ["P.MID", "P.PID_HASH"]}
    ],
    "joins": [
        {"type": "in", "left": "P.MID", "right" : "S.MID"},
        {"type": "in", "left": "P.PID_HASH", "right" : "S.PID_HASH"},
        {"type" : "implicit", "left" : "PID_KEY", "right" : "Act.P_PID_KEY"},
        {"type" : "implicit", "left" : "PID_KEY", "right" : "Net.SRC_KEY"},
        {"type" : "implicit", "left" : "PID_KEY", "right" : "Net.DST_KEY"}
    ],
    "filters" : [
        {"type" : "le", "field":"P.CREATED_TIME", "value":"${EndTimeRange}" }
    ]
},
```

FIG. 53A

```
curl -H "Content-Type: application/json" -X POST -d '{}' "localhost:8080/
card/query/
Card1?DCGUID=DEVTEST_CDB_DEVTEST_00_B10C8DBE1CFA89C1F274B&StartTimeRange=3
/30/2016%2010:00:00&EndTimeRange=3/30/2016%2011:00:00"
{"data":[{"COUNT":"3"}],"ok":true}
```

FIG. 53B

```
WITH Card1 AS (
  WITH P AS (
    SELECT MID, CREATED_TIME, PID_HASH, USERNAME
    FROM PUBLIC.PROCESS_DETAILS_T
  ),
  S AS (
    WITH NODE_T_1 AS (
      SELECT TYPE, KEY, START_TIME, END_TIME FROM GRAPH_INTERNAL.NODE_T
    )
    SELECT DISTINCT KEY:mid MID, KEY:pid_hash PID_HASH
    FROM NODE_T_1
    WHERE NODE_T_1.TYPE = 'Process'
    AND KEY:mid > 0
    AND (KEY:pid_hash < 0 OR KEY:pid_hash > 65535)
    AND NODE_T_1.START_TIME >= TO_TIMESTAMP('3/30/2016 10:00:00')
    AND NODE_T_1.END_TIME <= TO_TIMESTAMP('3/30/2016 11:00:00')
  )
  SELECT COUNT(DISTINCT P.USERNAME) COUNT
  FROM P
  WHERE P.CREATED_TIME <= TO_TIMESTAMP('3/30/2016 11:00:00')
    AND (P.MID, P.PID_HASH) IN (SELECT MID, PID_HASH FROM S)
)
SELECT Card1.COUNT COUNT
FROM Card1 LIMIT 5000
```

FIG. 53C

```
curl -H "Content-Type: application/json" -X POST -d '{"filters" :
[{"type":"eq","field":"ProcessActivity.USERNAME","value":"root"}]}' "localhost:8080/
card/query/Card1?DCGUID=DEVTEST_CDB_DEVTEST_00_B10C8DBE1CFA89C1F274B&StartTimeRange=3/
30/2016%2010:00:00&EndTimeRange=3/30/2016%2011:00:00"
```

FIG. 53D

```
WITH Card1 AS (
  WITH P AS (
    SELECT MID, CREATED_TIME, PID_HASH, USERNAME
    FROM PUBLIC.PROCESS_DETAILS_T
  ),
  S AS (
    WITH NODE_T_1 AS (
      SELECT TYPE, KEY, START_TIME, END_TIME
      FROM GRAPH_INTERNAL.NODE_T
    )
    SELECT DISTINCT
    KEY:mid MID,
    KEY:pid_hash PID_HASH
    FROM NODE_T_1
    WHERE NODE_T_1.TYPE = 'Process'
    AND KEY:mid > 0
    AND (KEY:pid_hash < 0 OR KEY:pid_hash > 65535)
    AND NODE_T_1.START_TIME >= TO_TIMESTAMP('3/30/2016 10:00:00')
    AND NODE_T_1.END_TIME <= TO_TIMESTAMP('3/30/2016 11:00:00')
  ),
  Act_P AS (
    WITH ProcessDetailsTable_7 AS (
      SELECT LSN, MID, CREATED_TIME, START_TIME,
        PID, PID_HASH, PPID, PPID_HASH, PGID,
        PGID_HASH, SID, SID_HASH, TTY,
        UID, USERNAME, EUID, CMDLINE_HASH, EXE_PATH
        FROM PUBLIC.PROCESS_DETAILS_T
        WHERE CREATED_TIME <= TO_TIMESTAMP('3/30/2016 11:00:00')
        UNION
        SELECT 0 LSN, MID, CREATED_TIME, LAST_BOOT_TIME START_TIME,
        NULL PID, 0 PID_HASH, NULL PPID, NULL PPID_HASH, NULL PGID,
        NULL PGID_HASH, NULL SID, NULL SID_HASH,
        NULL TTY, NULL UID, NULL USERNAME, NULL EUID,
        NULL CMDLINE_HASH, NULL EXE_PATH
        FROM (
          SELECT MID, CREATED_TIME, LAST_BOOT_TIME,
          RANK() OVER (PARTITION BY MID ORDER BY CREATED_TIME) RNK
          FROM MACHINE_DETAILS_T
          WHERE CREATED_TIME <= TO_TIMESTAMP('3/30/2016 11:00:00')
        )
        WHERE RNK = 1
    )
    SELECT MID, PID, PID_HASH, PPID, PPID_HASH, PGID, PGID_HASH, TTY, UID,
    USERNAME, EUID, CMDLINE_HASH, EXE_PATH
    FROM ProcessDetailsTable_7
  )
  SELECT COUNT(DISTINCT P.USERNAME) COUNT
  FROM P
  WHERE P.CREATED_TIME <= TO_TIMESTAMP('3/30/2016 11:00:00')
  AND (P.MID, P.PID_HASH) IN (SELECT MID, PID_HASH FROM S)
  AND (P.MID, P.PID_HASH) IN (
    SELECT Act_P.MID, Act_P.PID_HASH FROM Act_P WHERE Act_P.USERNAME = 'root'
  )
)
SELECT Card1.COUNT COUNT
FROM Card1 LIMIT 5000
```

FIG. 53E

5552 {
Machine Identifier: Node-1
Src IP: 10.0.10.4
Src Port: 33245
Dst IP: 10.0.9.7
Dst Port: 8080
Protocol: TCP
Owning Process PID: 11845 (process ID of the client application)
}

5554 {
Machine Identifier: Node-2
Src IP: 10.0.10.4
Src Port: 33245
Dst IP: 10.0.9.7
Dst Port: 8080
Protocol: TCP
Owning Process PID: 3412 (process ID of the server application listening on port 8080)
}

5556 {
Machine Identifier: Node-2
Src IP: 10.0.9.7
Src Port: 8080
Dst IP: 10.0.10.4
Dst Port: 33245
Owning Process PID: 3412 (process ID of the server application listening on port 8080 replying to the request received from the client)
}

5558 {
Machine Identifier: Node-1
Src IP: 10.0.9.7
Src Port: 8080
Dst IP: 10.0.10.4
Dst Port: 33245
Owning Process PID: 11845 (process ID of the client application receiving the reply to the request sent to the server)
}

FIG. 55B

| POD NAME | POD NameSpace | POD TYPE NAME |
|---|---|---|
| agentsrv-778674b4d-vjxqr | default | agentsrv |
| agentsrv-7c5c45fd58-5hxzt | default | agentsrv |
| agentsrv-7c5c45fd58-gsf9q | default | agentsrv |
| etl-history-loader-757c6dbd48-9s96r | default | etl-history-loader |
| eventgen-56fd6c49fc-h5k9x | default | eventgen |
| eventgen-6d65bc5875-b82x4 | default | eventgen |
| calico-node-28rjx | kube-system | calico-node |
| calico-node-bftk6 | kube-system | calico-node |
| calico-node-brcvl | kube-system | calico-node |
| elasticsearch-logging-0 | kube-system | elasticsearch-logging |
| elasticsearch-logging-1 | kube-system | elasticsearch-logging |
| elasticsearch-logging-2 | kube-system | elasticsearch-logging |

FIG. 58

```
POD AS (
SELECT CONTAINER_ID, POD_IP_ADDR, POD_NAME, POD_NAMESPACE, REPO
FROM (
  SELECT
    C.CONTAINER_ID,
    PROPS_LABEL:"io.kubernetes.pod.name"::VARCHAR POD_NAME,
    PROPS_LABEL:"io.kubernetes.pod.namespace"::VARCHAR POD_NAMESPACE,
    REPO,
    CASE WHEN IPV4 = '0.0.0.0' THEN NULL ELSE IPV4 END POD_IP_ADDR,
    RANK() OVER (PARTITION BY C.CONTAINER_ID ORDER BY C.CREATED_TIME
DESC) RNK
  FROM CONTAINER_T C
  WHERE C.CREATED_TIME BETWEEN DATEADD(DAY, -30,
TO_TIMESTAMP('${StartTimeRange}')) AND TO_TIMESTAMP('${EndTimeRange}')
 )
 WHERE RNK = 1
)
```

FIG. 61

```
PODTokens AS (
 SELECT MD5_HEX(POD_CONTAINERS::VARCHAR) POD_TYPE_HASH, POD_NAME,
SPLIT(POD_NAME, '-') TOKENS
 FROM (
    SELECT POD_NAME,
      ARRAY_AGG(DISTINCT REPO) WITHIN GROUP (ORDER BY REPO)
POD_CONTAINERS
    FROM POD
    GROUP BY 1
 )
)
```

FIG. 62

```
PODIndex AS (
 SELECT POD_TYPE_HASH, MAX(CASE WHEN NEXT_INDEX IS NULL THEN INDEX ELSE
INDEX+1 END) IDX
 FROM (
   SELECT POD_TYPE_HASH, INDEX,
     LEAD(INDEX) OVER (PARTITION BY POD_TYPE_HASH ORDER BY INDEX)
NEXT_INDEX,
     LAG(INDEX) OVER (PARTITION BY POD_TYPE_HASH ORDER BY INDEX)
PREV_INDEX
   FROM (
     SELECT POD_TYPE_HASH, T.INDEX, COUNT(DISTINCT T.VALUE::VARCHAR)
NDV_VALUE
     FROM PODTokens, LATERAL FLATTEN(INPUT=>TOKENS) T
     GROUP BY POD_TYPE_HASH, INDEX
   )
   WHERE NDV_VALUE = 1
 )
 WHERE (NEXT_INDEX IS NULL OR NEXT_INDEX = INDEX+1)
   AND (PREV_INDEX IS NULL OR NEXT_INDEX-PREV_INDEX=2)
 GROUP BY 1
),
PODTypeName AS (
 SELECT POD.*, POD_TYPE_HASH,
   SPLIT(POD.POD_NAME, '-') POD_NAME_TOKENS,
   CASE
     WHEN POD.POD_NAMESPACE NOT IN ('kube-system', 'etcd') THEN
ARRAY_TO_STRING(ARRAY_SLICE(POD_NAME_TOKENS, 0,
ARRAY_SIZE(POD_NAME_TOKENS)-2), '-')
     ELSE TOK.POD_TYPE
   END POD_TYPE
 FROM POD
 LEFT OUTER JOIN (
   SELECT DISTINCT T.POD_TYPE_HASH, T.POD_NAME,
     ARRAY_TO_STRING(ARRAY_SLICE(T.TOKENS, 0, I.IDX+1), '-') POD_TYPE
   FROM PODTokens T, PODIndex I
   WHERE T.POD_TYPE_HASH = I.POD_TYPE_HASH
 ) TOK
 ON POD.POD_NAME = TOK.POD_NAME
)
```

FIG. 63

```
AllNodes AS (
 SELECT START_TIME, END_TIME, ID, TYPE, KEY, PROPS
 FROM GRAPH_INTERNAL.NODE_T
 WHERE START_TIME >= TO_TIMESTAMP('${StartTimeRange}')
 AND END_TIME <= TO_TIMESTAMP('${EndTimeRange}')
),
Nodes AS (
 SELECT DISTINCT N.START_TIME, N.END_TIME, N.ID, N.TYPE, N.KEY,
N.PROPS:container_id::VARCHAR CONTAINER_ID,
 COALESCE(N.PROPS:machine_tags, M.PROPS:tags) M_TAGS
 FROM (
    SELECT * FROM AllNodes WHERE TYPE IN ('Process', 'MachineSep',
'MachineUc', 'IpAddress', 'IpSep', 'DnsSep')
 ) N
 LEFT OUTER JOIN (
    SELECT * FROM AllNodes WHERE TYPE IN ('Machine')
 ) M
 ON (N.START_TIME, N.KEY:mid) = (M.START_TIME, M.KEY:mid)
),
```

FIG. 64

```
Members AS (
 SELECT
   N.START_TIME, N.END_TIME, N.TYPE, N.KEY, N.CONTAINER_ID,
   N.M_TAGS:"aws:autoscaling:groupName" AUTO_SCALING_GROUP,
   COALESCE(N.M_TAGS:KubernetesCluster, N.M_TAGS:"cluster-name")
K8S_CLUSTER ,
   C.KEY BASE_CLUSTER_KEY, C.PROPS BASE_CLUSTER_PROPS
 FROM GRAPH_INTERNAL.EDGE_CM_T E, GRAPH_INTERNAL.NODE_C_T C, Nodes N
 WHERE (E.START_TIME, E.SRC_TYPE, E.SRC_KEY) = (C.START_TIME, C.TYPE,
C.KEY)
   AND (E.START_TIME, E.DST_TYPE, E.DST_KEY) = (N.START_TIME, N.TYPE,
N.KEY)
   AND C.TYPE = '${BaseModel}'
   AND E.SRC_TYPE = '${BaseModel}'
   AND C.START_TIME >= TO_TIMESTAMP('${StartTimeRange}')
   AND C.END_TIME <= TO_TIMESTAMP('${EndTimeRange}')
   AND E.START_TIME >= TO_TIMESTAMP('${StartTimeRange}')
   AND E.END_TIME <= TO_TIMESTAMP('${EndTimeRange}')
)
SELECT *, MD5_HEX(AUTO_SCALING_GROUP || K8S_CLUSTER || POD_NAMESPACE ||
POD_TYPE_HASH || POD_TYPE) POD_HASH
FROM (
 SELECT
   N.START_TIME, N.END_TIME, N.TYPE, N.KEY,
   '${BaseModel}' BASE_CLUSTER_TYPE, N.BASE_CLUSTER_KEY,
N.BASE_CLUSTER_PROPS,
   N.CONTAINER_ID,
   COALESCE(N.AUTO_SCALING_GROUP::VARCHAR, '')::VARCHAR
AUTO_SCALING_GROUP,
   COALESCE(N.K8S_CLUSTER::VARCHAR, '')::VARCHAR K8S_CLUSTER,
   COALESCE(POD.POD_NAME::VARCHAR, '')::VARCHAR POD_NAME,
   COALESCE(POD.POD_NAMESPACE::VARCHAR, '')::VARCHAR POD_NAMESPACE,
   COALESCE(POD.POD_TYPE::VARCHAR, N.BASE_CLUSTER_PROPS:ctype)::VARCHAR
POD_TYPE,
   POD.POD_IP_ADDR,
   COALESCE(POD_TYPE_HASH, '')::VARCHAR POD_TYPE_HASH
 FROM Members N
 LEFT OUTER JOIN PODTypeName POD
 ON N.CONTAINER_ID = POD.CONTAINER_ID
)
```

FIG. 65

```
"WITH PodInfo AS ( ",
    "SELECT START_TIME, END_TIME, TYPE, KEY, CONTAINER_ID, BASE_CLUSTER_TYPE, BASE_CLUSTER_KEY, ",
    "POD_HASH, POD_NAME, POD_NAMESPACE, POD_TYPE, POD_IP_ADDR, POD_TYPE_HASH, K8S_CLUSTER, AUTO_SCALING_GROUP, ",
        "MAX(RANK_TIER) OVER (PARTITION BY START_TIME) MAX_TIER, ",
        "FLOOR(16*RANK_TIER/(MAX_TIER+0.5)) + 1 TIER, ",
        "HTIER, SERVER, CLIENT, EXTERNAL, MEMBERS, MEMBER_ENTITY_TYPE, frequentTerms ",
    "FROM (",
        "SELECT ",
            "START_TIME, END_TIME, TYPE, KEY, CONTAINER_ID, BASE_CLUSTER_TYPE, BASE_CLUSTER_KEY, ",
            "POD_HASH, POD_NAME, POD_NAMESPACE, POD_TYPE, POD_IP_ADDR, POD_TYPE_HASH, K8S_CLUSTER, AUTO_SCALING_GROUP, ",
            "DENSE_RANK() OVER (PARTITION BY START_TIME ORDER BY AVG_TIER, (SUM_CLIENT/2)::BIGINT, (SUM_SERVER/2)::BIGINT DESC) RANK_TIER, ",
            "DENSE_RANK() OVER (PARTITION BY START_TIME ORDER BY AVG_HTIER) HTIER, ",
            "CASE WHEN SUM_SERVER > 0 THEN 1 ELSE 0 END SERVER, ",
            "CASE WHEN SUM_CLIENT > 0 THEN 1 ELSE 0 END CLIENT, ",
            "CASE WHEN SUM_EXTERNAL > 0 THEN 1 ELSE 0 END EXTERNAL, ",
            "MEMBERS, ",
            "TYPE MEMBER_ENTITY_TYPE, ",
            "BASE_CLUSTER_PROPS:frequentTerms frequentTerms ",
        "FROM ( ",
            "SELECT ",
                "N.*, ",
                "AVG(N.BASE_CLUSTER_PROPS:tier::BIGINT) OVER (PARTITION BY START_TIME, POD_HASH) AVG_TIER, ",
                "AVG(N.BASE_CLUSTER_PROPS:htier::BIGINT) OVER (PARTITION BY START_TIME, POD_HASH) AVG_HTIER, ",
                "SUM(N.BASE_CLUSTER_PROPS:server::BIGINT) OVER (PARTITION BY START_TIME, POD_HASH) SUM_SERVER, ",
                "SUM(N.BASE_CLUSTER_PROPS:client::BIGINT) OVER (PARTITION BY START_TIME, POD_HASH) SUM_CLIENT, ",
                "SUM(N.BASE_CLUSTER_PROPS:external::BIGINT) OVER (PARTITION BY START_TIME, POD_HASH) SUM_EXTERNAL, ",
                "COUNT(*) OVER (PARTITION BY START_TIME, POD_HASH) MEMBERS ",
            "FROM ${ClusterMemberWithPodInfo} N ",
        ") ",
    ") ",
") ",
"SELECT P.START_TIME, P.END_TIME, P.TYPE, P.KEY, ",
    "BASE_CLUSTER_TYPE, P.BASE_CLUSTER_KEY, ",
    "'PodTypeConn' CLUSTER_TYPE, P.POD_NAME, P.POD_IP_ADDR, P.CONTAINER_ID, ",
    "OBJECT_CONSTRUCT(",
        "'cid', P.POD_HASH ",
    ") CLUSTER_KEY, ",
    "OBJECT_CONSTRUCT(",
        "'k8s_pod', OBJECT_CONSTRUCT(",
            "'pod_namespace', P.POD_NAMESPACE, ",
            "'pod_type', P.POD_TYPE, ",
            "'k8s_cluster', P.K8S_CLUSTER, ",
            "'vm_type', P.AUTO_SCALING_GROUP ",
        "), ",
        "'cidKey', P.POD_HASH, ",
        "'class', OBJECT_CONSTRUCT('cid', P.POD_HASH), ",
        "'ctype', P.POD_TYPE, ",
        "'frequentTerms', F.frequentTerms, ",
        "'external', P.EXTERNAL, ",
        "'client', P.CLIENT, ",
        "'server', P.SERVER, ",
        "'tier', P.TIER, ",
        "'htier', P.HTIER, ",
        "'members', P.MEMBERS, ",
        "'memberEntityType', P.MEMBER_ENTITY_TYPE, ",
        "'model', '${Model}' ",
    ") CLUSTER_PROPS ",
"FROM PodInfo P ",
"LEFT OUTER JOIN ( ",
    "SELECT START_TIME, POD_HASH, OBJECT_AGG(TERM_KEY, TERM_VALUE) frequentTerms ",
    "FROM ( ",
        "SELECT START_TIME, POD_HASH, TERM_KEY, ",
            "SUM(TERM_VALUE) OVER (PARTITION BY START_TIME, POD_HASH ORDER BY TERM_VALUE) TERM_VALUE_SUM, ",
            "CASE WHEN TERM_VALUE_SUM = 0 THEN 0 ELSE 100*TERM_VALUE/TERM_VALUE_SUM END TERM_VALUE, ",
            "RANK() OVER (PARTITION BY START_TIME, POD_HASH ORDER BY TERM_KEY) RNK ",
        "FROM ( ",
            "SELECT START_TIME, POD_HASH, TERMS.KEY TERM_KEY, AVG(TERMS.VALUE::BIGINT) TERM_VALUE ",
            "FROM PodInfo N, LATERAL FLATTEN(INPUT=>frequentTerms, RECURSIVE=>TRUE) TERMS ",
            "GROUP BY 1,2,3 ",
        ") ",
    ") ",
    "WHERE RNK <= 5 ",
    "GROUP BY 1,2 ",
") F ",
"ON (P.START_TIME, P.POD_HASH) = (F.START_TIME, F.POD_HASH)"
```

FIG. 66

```
SELECT E.START_TIME, E.END_TIME, E.TYPE,
    SRC.CLUSTER_TYPE SRC_TYPE, SRC.CLUSTER_KEY SRC_KEY,
    DST.CLUSTER_TYPE DST_TYPE, DST.CLUSTER_KEY DST_KEY,
    OBJECT_CONSTRUCT(
        'connectionProperties',
        OBJECT_CONSTRUCT(
            'dst_in_bytes', SUM(COALESCE(E.PROPS:dst_in_bytes, 0))::BIGINT,
            'dst_out_bytes', SUM(COALESCE(E.PROPS:dst_out_bytes, 0))::BIGINT,
            'local', MAX(COALESCE(E.PROPS:local, 0))::BIGINT,
            'num_conns', SUM(COALESCE(E.PROPS:num_conns, 0))::BIGINT,
            'src_in_bytes', SUM(COALESCE(E.PROPS:src_in_bytes, 0))::BIGINT,
            'src_out_bytes', SUM(COALESCE(E.PROPS:src_out_bytes, 0))::BIGINT,
            'tcp_dst_in_bytes', SUM(COALESCE(E.PROPS:tcp_dst_in_bytes, 0))::BIGINT,
            'tcp_dst_out_bytes', SUM(COALESCE(E.PROPS:tcp_dst_out_bytes, 0))::BIGINT,
            'tcp_num_conns', SUM(COALESCE(E.PROPS:tcp_num_conns, 0))::BIGINT,
            'tcp_src_in_bytes', SUM(COALESCE(E.PROPS:tcp_src_in_bytes, 0))::BIGINT,
            'tcp_src_out_bytes', SUM(COALESCE(E.PROPS:tcp_src_out_bytes, 0))::BIGINT,
            'udp_dst_in_bytes', SUM(COALESCE(E.PROPS:udp_dst_in_bytes, 0))::BIGINT,
            'udp_dst_out_bytes', SUM(COALESCE(E.PROPS:udp_dst_out_byte, 0))::BIGINT,
            'udp_num_conns', SUM(COALESCE(E.PROPS:udp_num_conns, 0))::BIGINT,
            'udp_src_in_bytes', SUM(COALESCE(E.PROPS:udp_src_in_byte, 0))::BIGINT,
            'udp_src_out_bytes', SUM(COALESCE(E.PROPS:udp_src_out_bytes, 0))::BIGINT
        ),
        'model', '${Model}'
    ) PROPS
FROM GRAPH_INTERNAL.EDGE_T E, ${PodTypeGraphNodes} SRC, ${PodTypeGraphNodes} DST
WHERE (E.START_TIME, E.SRC_TYPE, E.SRC_KEY) = (SRC.START_TIME, SRC.TYPE, SRC.KEY)
AND (E.START_TIME, E.DST_TYPE, E.DST_KEY) = (DST.START_TIME, DST.TYPE, DST.KEY)
AND E.TYPE = 'ConnectedTo'
GROUP BY 1,2,3,4,5,6,7
```

FIG. 67

AGENT NETWORKING IN A CONTAINERIZED ENVIRONMENT

BACKGROUND OF THE INVENTION

Businesses and other entities often make use of data centers to provide a variety of computing resources. Increasingly, those resources are being virtualized. Such virtualization can provide benefits, such as efficient scalability and redundancy benefits. Unfortunately, such virtualization can also make it more difficult to detect and mitigate intruders (and other nefarious individuals).

BRIEF DESCRIPTION OF THE DRAWINGS

Various embodiments of the invention are disclosed in the following detailed description and the accompanying drawings.

FIG. 3A illustrates an example of static information collected by an agent.

FIG. 3B illustrates an example of variable information collected by an agent.

FIG. 3C illustrates an example of histogram data.

FIG. 3D illustrates an example of histogram data.

FIG. 25A illustrates example records.

FIG. 25B illustrates example output from performing an ssh connection match.

FIG. 25C illustrates example records.

FIG. 25D illustrates example records.

FIG. 25E illustrates example records.

FIG. 25F illustrates example records.

FIG. 25G illustrates an adjacency relationship between two login sessions.

FIG. 25H illustrates example records.

FIG. 34 illustrates an example of a dossier for an event.

FIG. 36 illustrates an example of a card specification.

FIG. 37 illustrates an example of three user tracking data sources.

FIG. 38 depicts an example of card schema introspection.

FIG. 39 depicts an example of card schema introspection.

FIG. 41 depicts an example introspection corresponding to the card depicted in FIG. 36.

FIG. 42 depicts an example query service log for a join path search.

FIG. 43 depicts an example of dynamically generated SQL.

FIG. 44 illustrates an example introspection corresponding to FIG. 37.

FIG. 45 depicts an example query service log for a join path search.

FIG. 46 depicts an example of dynamically generated SQL.

FIG. 47A depicts a filter request.

FIG. 47B depicts an SQL translation.

FIG. 47C depicts a join.

FIG. 47D depicts an SQL translation.

FIG. 49A illustrates a portion of a query builder library.

FIG. 49B illustrates three examples of SQL entities.

FIGS. 50A and 50B illustrate portions of an embodiment of a ProcessClusterFilters definition.

FIG. 51 illustrates an example of an introspection corresponding to a ProcessClusterFilters request.

FIG. 52A illustrates an example of a base table card.

FIG. 52B illustrates an example of a filter request.

FIG. 52C illustrates an example of a dynamically generated SQL query.

FIG. 52D illustrates an example of a filter request.

FIG. 52E illustrates an example of a dynamically generated SQL query.

FIG. 53A illustrates a card.

FIG. 53B illustrates a request.

FIG. 53C illustrates a dynamically generated SQL query.

FIG. 53D illustrates a request.

FIG. 53E illustrates a dynamically generated SQL query.

FIG. 55B illustrates example data provided by two agents to a backend process.

FIG. 58 illustrates example data usable for assigning a pod type label based on pod names.

FIGS. 61-67 illustrate example SQL.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
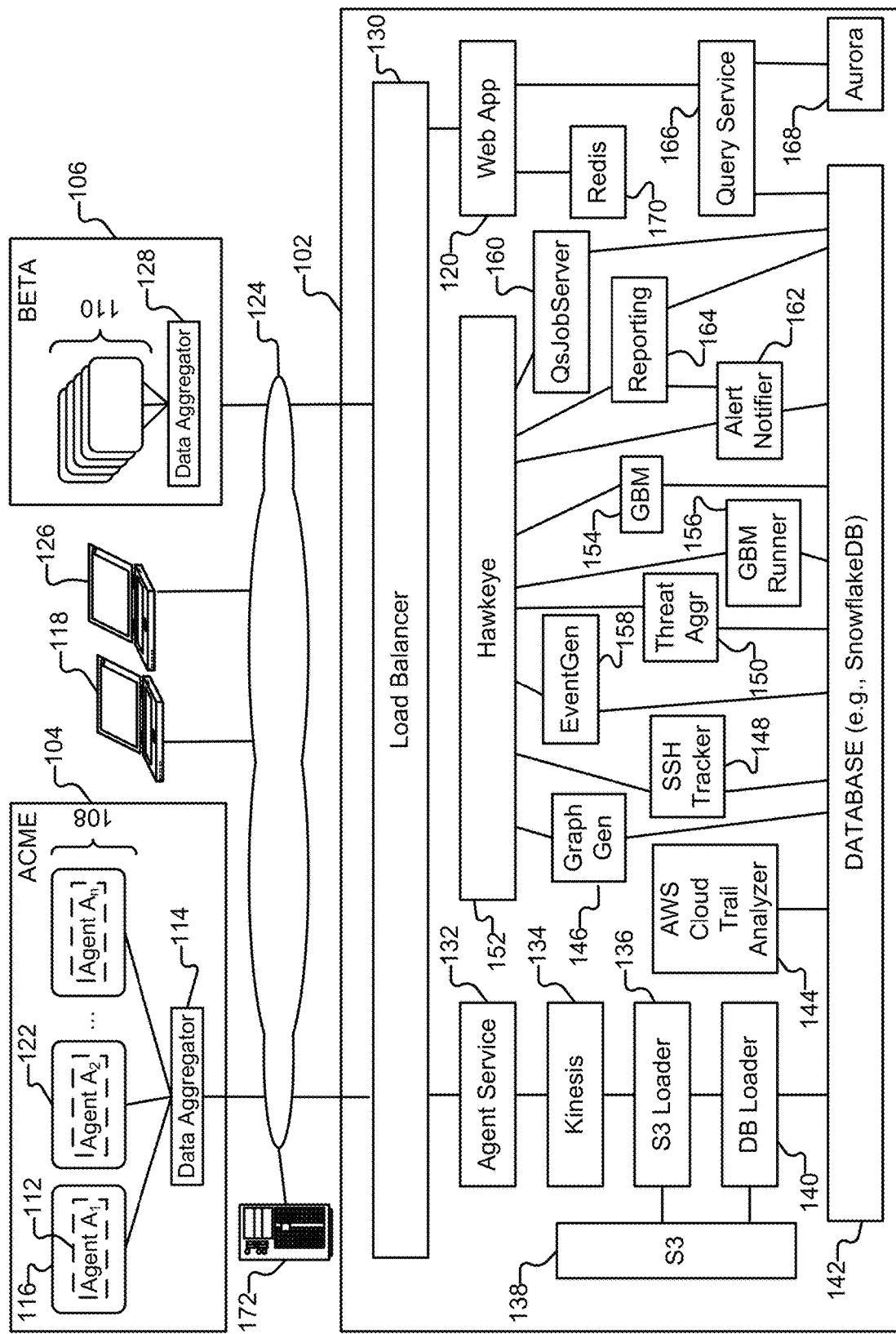
FIG. 1 illustrates an example of an environment in which activities that occur within datacenters are modeled.

FIG. 1 illustrates an example of an environment in which activities that occur within datacenters are modeled. Using techniques described herein, a baseline of datacenter activity can be modeled, and deviations from that baseline can be identified as anomalous. Anomaly detection can be beneficial in a security context, and can also be useful in other contexts, such as devops.

Two example datacenters (104 and 106) are shown in FIG. 1, and belong to fictional companies ACME and BETA, respectively. A datacenter can comprise dedicated equipment (e.g., owned and operated by ACME, or owned/leased by ACME and operated exclusively on ACME's behalf by a third party). A datacenter can also comprise cloud-based resources, such as infrastructure as a service (IaaS), platform as a service (PaaS), and/or software as a service (SaaS) elements. The techniques described herein can be used in conjunction with multiple types of datacenters, including ones wholly using dedicated equipment, ones that are entirely cloud-based, and ones that use a mixture of both dedicated equipment and cloud-based resources.

Both datacenter 104 and datacenter 106 include a plurality of nodes, depicted collectively as set of nodes 108 and set of nodes 110, respectively, in FIG. 1. Installed on each of the nodes are in-server/in-virtual machine (VM)/embedded in IoT device agents (as applicable), which are configured to collect data and report it to platform 102 for analysis. Agents are small, self-contained binaries that can be run on any appropriate platforms, including virtualized ones (and, as applicable, within containers). Agents monitor the nodes on which they execute for a variety of different activities, including: connection, process, user, machine, and file activities. Agents can be executed in user space, and can use a variety of kernel modules (e.g., auditd, iptables, netfilter, pcap, etc.) to collect data. Agents can be implemented in any appropriate programming language, such as C or Golang, using applicable kernel APIs.

As will be described in more detail below, agents can selectively report information to platform 102 in varying amounts of detail and/or with variable frequency. As will also be described in more detail below, the data collected by agents is used by platform 102 to create polygraphs, which are graphs of logical entities, connected by behaviors. In some embodiments, agents report information directly to platform 102. In other embodiments, at least some agents provide information to a data aggregator, such as data aggregator 114, which in turn provides information to platform 102. The functionality of a data aggregator can be implemented as a separate binary or other application (distinct from an agent binary), and can also be implemented by having an agent execute in an "aggregator mode" in which the designated aggregator node acts as a Layer 7 proxy for other agents that do not have access to platform 102. Further, a chain of multiple aggregators can be used, if applicable (e.g., with agent 112 providing data to data aggregator 114, which in turn provides data to another aggregator (not pictured) which provides data to platform 102). An example way to implement an aggregator is through a program written in an appropriate language, such as C or Golang.

Use of an aggregator can be beneficial in sensitive environments (e.g., involving financial or medical transactions) where various nodes are subject to regulatory or other architectural requirements (e.g., prohibiting a given node from communicating with systems outside of datacenter 104). And, use of an aggregator can help to minimize security exposure more generally. As one example, by limiting communications with platform 102 to data aggregator 114, individual nodes in group 108 need not make external network connections (e.g., via Internet 124), which can potentially expose them to compromise (e.g., by other external devices, such as device 118, operated by a criminal). Similarly, platform 102 can provide updates, configuration information, etc., to data aggregator 114 (which in turn distributes them to nodes 108), rather than requiring nodes 108 to allow incoming connections from platform 102 directly.

Another benefit of an aggregator model is that network congestion can be reduced (e.g., with a single connection being made at any given time between data aggregator 114 and platform 102, rather than potentially many different connections being open between various of nodes 108 and platform 102). Similarly, network consumption can also be reduced (e.g., with the aggregator applying compression techniques/bundling data received from multiple agents).

One example way that an agent (e.g., agent 112, installed on node 116) can provide information to data aggregator 114 is via a REST API, formatted using data serialization protocols such as Apache Avro. One example type of information sent by agent 112 to data aggregator 114 is status information. Status information is sent periodically (e.g., once an hour) and includes (in various embodiments): a. an amount of event backlog (in bytes) that has not yet been transmitted, b. configuration information, c. any data loss period for which data was dropped, d. a cumulative count of errors encountered since the agent started, e. version information for the agent binary, and f. cumulative statistics on data collection (e.g., number of network packets processed, new processes seen, etc.). A second example type of information sent by agent 112 to data aggregator 114 is event data (described in more detail below), which includes a UTC timestamp for each event. As applicable, the agent can control the amount of data that it sends to the data aggregator in each call (e.g., a maximum of 10 MB) by adjusting the amount of data sent to manage the conflicting goals of transmitting data as soon as possible, and maximizing throughput. Data can also be compressed or uncompressed by the agent (as applicable) prior to sending the data.

Each data aggregator runs within a customer environment. A data aggregator (e.g., data aggregator 114) facilitates data routing from many different agents (e.g., agents executing on nodes 108) to platform 102. In various embodiments, data aggregator 114 implements a SOCKS 5 caching proxy through which agents can connect to platform 102. As applicable, data aggregator 114 can encrypt (or otherwise obfuscate) sensitive information prior to transmitting it to platform 102, and can also distribute key material to agents which can encrypt the information (as applicable). Data aggregator 114 includes a local storage, to which agents can upload data (e.g., pcap packets). The storage has a key-value interface. The local storage can also be omitted, and agents configured to upload data to a cloud storage or other storage area, as applicable. Data aggregator 114 can also cache locally and distribute software upgrades, patches, or configuration information (e.g., as received from platform 102).

I. Agent Data Collection and Reporting

A. Initial Configuration

In the following example, suppose that a network administrator at ACME (hereinafter "Alice") has decided to begin using the services of platform 102. In some embodiments, Alice accesses a web frontend (e.g., web app 120) using her computer (126) and enrolls (on behalf of ACME) an account with platform 102. After enrollment is complete, Alice is presented with a set of installers, pre-built and customized for the ACME environment, that she can download from platform 102 and deploy on nodes 108. Examples of such installers include: a Windows executable file; an iOS app; and a Linux package (e.g., .deb or .rpm), binary, or Docker container. When a network administrator at BETA (hereinafter "Bob") also signs up for the services of platform 102, he will similarly be presented with a set of installers that are pre-built and customized for the BETA environment.

Alice deploys an appropriate installer on each of nodes 108 (e.g., with a Windows executable file deployed on a Windows-based platform, and a Linux package deployed on a Linux platform, as applicable). As applicable, the agent can be deployed in a container. Agent deployment can also be performed using one or more appropriate automation tools, such as Chef, Puppet, Salt, and Ansible. Deployment can also be performed using managed/hosted container management/orchestration frameworks such as Kubernetes, mesos, and Docker swarm.

In various embodiments, the agent is installed in the user space (i.e., is not a kernel module), and the same binary is executed on each node of the same type (e.g., all Windows-based platforms have the same Windows-based binary installed on them). The primary job of an agent, such as agent 112, is to collect data (e.g., associated with node 116) and report it (e.g., to data aggregator 114). Other tasks that can be performed by agents include data configuration and upgrading.

B. Data Collection

One approach to collecting data is to collect virtually all information available about a node (and, e.g., the processes running on it). A downside of this approach is that collecting information can be resource intensive (i.e., requiring potentially large amounts of processor, network, and storage resources). Another downside of this approach is that it can result in the collection of private or other sensitive information that can be difficult to filter/exclude from downstream reporting. An alternate approach is for the agent to monitor for network connections, and then begin collecting information about those processes associated with the network connections, using the presence of a network packet associated with a process as a trigger for collecting additional information about the process. As an example, if a user of node 116 executes an application, such as a calculator application, which does not typically interact with the network, no information about use of that application is collected by agent 112/sent to data aggregator 114. If, however, the user of node 116 executes an ssh command (e.g., to ssh from node 116 to node 122), agent 112 will collect information about the process and provide associated information to data aggregator 114. In various embodiments, the agent always collects/reports information about certain events, such as privilege escalation, irrespective of whether the event is associated with network activity.

An approach to collecting information (e.g., by an agent) is as follows, and described in conjunction with process 200 depicted in FIG. 2. An agent (e.g., agent 112) monitors its node (e.g., node 116) for network activity. One example way that agent 112 can monitor node 116 for network activity is by using a network packet capture tool (e.g., listening using libpcap). As packets are received (202), the agent obtains and maintains (e.g., in an in memory cache) connection information associated with the network activity (204). Examples of such information include DNS query/response, TCP, UDP, and IP information.

The agent also determines a process associated with the network connection (206). One example approach is for the agent to use a kernel network diagnostic API (e.g., netlink_diag) to obtain inode/process information from the kernel. Another example approach is for the agent to scan using netstat (e.g., on /proc/net/tcp, /proc/net/tcp6, /proc/net/udp, and /proc/net/udp6) to obtain sockets and relate them to processes. Information such as socket state (e.g., whether a socket is connected, listening, etc.) can also be collected by the agent.

One way an agent can obtain a mapping between a given inode and a process identifier is to scan within the /proc/pid directory. For each of the processes currently running, the agent examines each of their file descriptors. If a file descriptor is a match for the inode, the agent can determine that the process associated with the file descriptor owns the inode. Once a mapping is determined between an inode and a process identifier, the mapping is cached. As additional packets are received for the connection, the cached process information is used (rather than a new search being performed).

In some cases, exhaustively scanning for an inode match across every file descriptor may not be feasible (e.g., due to CPU limitations). In various embodiments, searching through file descriptors is accordingly optimized. User filtering is one example of such an optimization. A given socket is owned by a user. Any processes associated with the socket will be owned by the same user as the socket. When matching an inode (identified as relating to a given socket) against processes, the agent can filter through the processes and only examine the file descriptors of processes sharing the same user owner as the socket. In various embodiments, processes owned by root are always searched against (e.g., even when user filtering is employed).

Another example of an optimization is to prioritize searching the file descriptors of certain processes over others. One such prioritization is to search through the subdirectories of /proc/ starting with the youngest process. One approximation of such a sort order is to search through /proc/ in reverse order (e.g., examining highest numbered processes first). Higher numbered processes are more likely to be newer (i.e., not long-standing processes), and thus more likely to be associated with new connections (i.e., ones for which inode-process mappings are not already cached). In some cases, the most recently created process may not have the highest process identifier (e.g., due to the kernel wrapping through process identifiers).

Another example prioritization is to query the kernel for an identification of the most recently created process and to search in a backward order through the directories in /proc/ (e.g., starting at process 400 and working backwards, then wrapping to the highest value (e.g., 32768) and continuing to work backward from there). An alternate approach is for the agent to keep track of the newest process that it has reported information on (e.g., to data aggregator 114), and begin its search of /proc/ in a forward order starting from the PID of that process.

Another example prioritization is to maintain, for each user actively using node 116, a list of the five most recently active processes. Those processes are more likely than other processes (less active, or passive) on node 116 to be involved with new connections, and can thus be searched first. For many processes, lower valued file descriptors tend to correspond to non-sockets (e.g., stdin, stdout, stderr). Yet another optimization is to preferentially search higher valued file descriptors (e.g., across processes) over lower valued file descriptors (that are less likely to yield matches).

In some cases, while attempting to locate a process identifier for a given inode, an agent may encounter a socket that does not correspond to the inode being matched against and is not already cached. The identity of that socket (and its corresponding inode) can be cached, once discovered, thus removing a future need to search for that pair.

In some cases, a connection may terminate before the agent is able to determine its associated process (e.g., due to a very short-lived connection, due to a backlog in agent processing, etc.). One approach to addressing such a situation is to asynchronously collect information about the connection using the audit kernel API, which streams information to user space. The information collected from the audit API (which can include PID/inode information) can be matched by the agent against pcap/inode information. In some embodiments, the audit API is always used, for all connections. However, due to CPU utilization considerations, use of the audit API can also be reserved for short/otherwise problematic connections (and/or omitted, as applicable).

Once the agent has determined which process is associated with the network connection (206), the agent can then collect additional information associated with the process (208). As will be described in more detail below, some of the collected information comprises attributes of the process (e.g., a process parent hierarchy, and an identification of a binary associated with the process). As will also be described in more detail below, other of the collected information is derived (e.g., session summarization data and hash values).

The collected information is then transmitted (210), e.g., by an agent (e.g., agent 112) to a data aggregator (e.g., data aggregator 114), which in turn provides it to platform 102. In some embodiments, all information collected by an agent is transmitted (e.g., to a data aggregator and/or to platform 102). In other embodiments, the amount of data transmitted is minimized (e.g., for efficiency reasons), using various techniques.

One approach to minimizing the amount of data flowing from agents (such as agents installed on nodes 108) to platform 102 is to use a technique of implicit references with unique keys. The keys can be explicitly used by platform 102 to extract/derive relationships, as necessary, in a data set at a later time, without impacting performance.

Depicted in FIG. 3A is initial information collected by an agent about a process. Region 302 indicates the time at which the agent generated event 300. Region 304 indicates that event 300 pertains to a process. The type identifies a physical collection of related attributes. Other examples of event types that the agent can collect and report (and examples of the types of information included in such reports) are provided below (e.g., in Additional Agent Data Examples).

Region 306 indicates the process ID (PID) of the process, and region 310 indicates the time the process was started. In region 308 is depicted a hash, generated by the agent to uniquely identify the particular process being reported on in event 300 (e.g., among all other processes whose data is reported to platform 102). In various embodiments, such hashes (and other hashes, such as are shown at 312-316) are generated pseudo-randomly. The hashes can be reconstructed should the agent crash and restart. An example salt for the hashes is a combination of a local process identifier, start time of the process, and one or more machine attributes.

Region 318 indicates whether the process is associated with a terminal, an indicator of whether a process is interactive. Region 320 indicates a SHA-256 hash of the entire command line used to start the process, including any variable arguments, and region 322 indicates the path to the executable. Region 324 indicates the effective username of the owner of the process (which can either be the same or different from the username shown in region 328). As an example, suppose a user logs into node 116 using a first username, and then becomes a different user (e.g., using the setuid system call to inherit the permissions of a second user). Both names can be preserved in regions 324 and 328, respectively. Finally, region 326 indicates whether the process is running as a container isolation.

As previously mentioned, some data collected about a process is constant and does not change over the lifetime of the process (e.g., attributes), and some data changes (e.g., statistical information and other variable information). The data depicted in FIG. 3A is an example of constant data. It can be transmitted (210) once, when the agent first becomes aware of the process. And, if any changes to the data depicted in FIG. 3A are detected (e.g., a process changes its parent), a refreshed version of the data depicted in FIG. 3A can be transmitted (210) as applicable.

Figure 2:
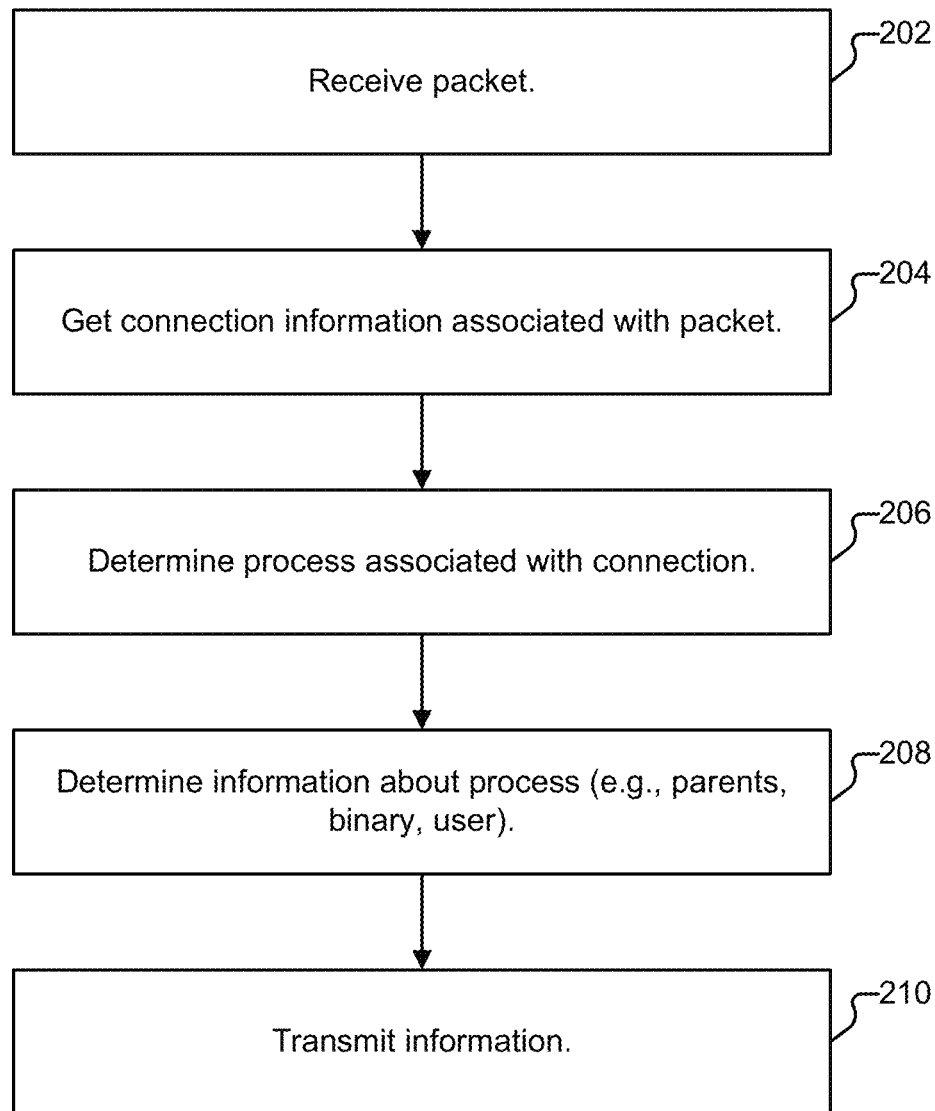
FIG. 2 illustrates an example of a process, used by an agent, to collect and report information about a client.

FIG. 3B illustrates an example of variable data that can be collected using the process shown in FIG. 2. Variable data such as is shown in FIG. 3B can be transmitted (210) at periodic (or other) intervals. Region 352 indicates a timestamp of when dataset 350 was collected by the agent. The hash depicted in region 354 is the same hash that was included in region 308, and is used within platform 102 to join process creation time attributes (e.g., shown in FIG. 3A) with runtime attributes (e.g., shown in FIG. 3B) to construct a full dataset. Region 356 indicates a thread count for the process. Region 358 indicates the total virtual memory used by the process. Region 360 indicates the total resident memory used by the process. Region 362 indicates the total time spent by the process executing in user space. Region 364 indicates the total time spent by the process executing in kernel space.

C. Additional Agent Data Examples

Below are additional examples of data that an agent, such as agent 112, can collect and provide to platform 102.

1. User Data

Core User Data: user name, UID (user ID), primary group, other groups, home directory.

Failed Login Data: IP address, hostname, username, count.

User Login Data: user name, hostname, IP address, start time, TTY (terminal), UID (user ID), GID (group ID), process, end time.

2. Machine Data

Dropped Packet Data: source IP address, destination IP address, destination port, protocol, count.

Machine Data: hostname, domain name, architecture, kernel, kernel release, kernel version, OS, OS version, OS description, CPU, memory, model number, number of cores, last boot time, last boot reason, tags (e.g., Cloud provider tags such as AWS, GCP, or Azure tags), default router, interface name, interface hardware address, interface IP address and mask, promiscuous mode.

3. Network Data

Network Connection Data: source IP address, destination IP address, source port, destination port, protocol, start time, end time, incoming and outgoing bytes, source process, destination process, direction of connection, histograms of packet length, inter packet delay, session lengths, etc.

Listening Ports in Server: source IP address, port number, protocol, process.

Dropped Packet Data: source IP address, destination IP address, destination port, protocol, count.

Arp Data: source hardware address, source IP address, destination hardware address, destination IP address.

DNS Data: source IP address, response code, response string, question (request), packet length, final answer (response).

4. Application Data

Package Data: exe path, package name, architecture, version, package path, checksums (MD5, SHA-1, SHA-256), size, owner, owner ID.

Application Data: command line, PID (process ID), start time, UID (user ID), EUID (effective UID), PPID (parent process ID), PGID (process group ID), SID (session ID), exe path, username, container ID.

5. Container Data

Container Image Data: image creation time, parent ID, author, container type, repo, (AWS) tags, size, virtual size, image version.

Container Data: container start time, container type, container name, container ID, network mode, privileged, PID mode, IP addresses, listening ports, volume map, process ID.

6. File Data

File path, file data hash, symbolic links, file creation data, file change data, file metadata, file mode.

D. Additional Information About Containers

As mentioned above, an agent, such as agent 112, can be deployed in a container (e.g., a Docker container), and can also be used to collect information about containers. Collection about a container can be performed by an agent irrespective of whether the agent is itself deployed in a container or not (as the agent can be deployed in a container running in a privileged mode that allows for monitoring).

Agents can discover containers (e.g., for monitoring) by listening for container create events (e.g., provided by Docker), and can also perform periodic ordered discovery scans to determine whether containers are running on a node. When a container is discovered, the agent can obtain attributes of the container, e.g., using standard Docker API calls (e.g., to obtain IP addresses associated with the container, whether there's a server running inside, what port it is listening on, associated PIDs, etc.). Information such as the parent process that started the container can also be collected, as can information about the image (which comes from the Docker repository).

In various embodiments, agents use namespaces to determine whether a process is associated with a container or not. Namespaces are a feature of the Linux kernel that can be used to isolate resources of a collection of processes. Examples of namespaces include process ID (PID) namespaces, network namespaces, and user namespaces. Given a process, the agent can perform a fast lookup to determine whether the process is part of the namespace the container claims to be its namespace.

E. Data Reporting

As mentioned above, agents can be configured to report certain types of information (e.g., attribute information) once, when the agent first becomes aware of a process. In various embodiments, such static information is not reported again (or is reported once a day, every twelve hours, etc.), unless it changes (e.g., a process changes its parent, changes its owner, or a SHA-1 of the binary associated with the process changes).

In contrast to static/attribute information, certain types of data change constantly (e.g., network-related data). In various embodiments, agents are configured to report a list of current connections every minute (or other appropriate time interval). In that connection list will be connections that started in that minute interval, connections that ended in that minute interval, and connections that were ongoing throughout the minute interval (e.g., a one minute slice of a one hour connection).

In various embodiments, agents are configured to collect/compute statistical information about connections (e.g., at the one minute level of granularity). Examples of such information include, for the time interval, the number of bytes transferred, and in which direction. Another example of information collected by an agent about a connection is the length of time between packets. For connections that span multiple time intervals (e.g., a seven minute connection), statistics are calculated for each minute of the connection. Such statistical information (for all connections) can be reported (e.g., to a data aggregator) once a minute.

In various embodiments, agents are also configured to maintain histogram data for a given network connection, and provide it (in the Apache Avro data exchange format) under the Connection event type data. Examples of such histograms include: 1. a packet length histogram (packet_len_hist), which characterizes network packet distribution; 2. a session length histogram (session_len_hist), which characterizes a network session length; 3. a session time histogram (session_time_hist), which characterizes a network session time; and 4. a session switch time histogram (session_switch_time_hist), which characterizes network session switch time (i.e., incoming->outgoing and vice versa). FIGS. 3C and 3D depict, side-by-side, examples of full outgoing (3C) and incoming (3D) network data sets, including each of the four histograms. Each of the histograms shown in FIGS. 3C and 3D includes the following fields: 1. count, which provides a count of the elements in the sampling; 2. sum, which provides a sum of elements in the sampling; 3. max, which provides the highest value element in the sampling; 4. std_dev, which provides the standard deviation of elements in the sampling; and 5. buckets, which provides a discrete sample bucket distribution of sampling data (if applicable).

For some protocols (e.g., HTTP), typically, a connection is opened, a string is sent, a string is received, and the connection is closed. For other protocols (e.g., NFS), both sides of the connection engage in a constant chatter. Histograms allow platform 102 to model application behavior (e.g., using machine learning techniques), for establishing baselines, and for detecting deviations. As one example, suppose that a given HTTP server typically sends/receives 1,000 bytes (in each direction) whenever a connection is made with it. If a connection generates 500 bytes of traffic, or 2,000 bytes of traffic, such connections would be considered within the typical usage pattern of the server. Suppose, however, that a connection is made that results in 10 G of traffic. Such a connection is anomalous and can be flagged accordingly.

F. Storing Data Collected by Agents

Returning to FIG. 1, as previously mentioned, data aggregator 114 is configured to provide information (e.g., collected from nodes 108 by agents) to platform 102. And, data aggregator 128 is similarly configured to provide information to platform 102. As shown in FIG. 1, both aggregator 114 and aggregator 128 connect to a load balancer 130, which accepts connections from aggregators (and/or as applicable, agents), as well as other devices, such as computer 126 (e.g., when it communicates with web app 120), and supports fair balancing. In various embodiments, load balancer 130 is a reverse proxy that load balances accepted connections internally to various microservices (described in more detail below), allowing for services provided by platform 102 to scale up as more agents are added to the environment and/or as more entities subscribe to services provided by platform 102. Example ways to implement load balancer 130 include using HaProxy, using nginx, and using elastic load balancing (ELB) services made available by Amazon.

Agent service 132 is a microservice that is responsible for accepting data collected from agents (e.g., provided by aggregator 114). In various embodiments, agent service 132 uses a standard secure protocol, such as HTTPS to communicate with aggregators (and as applicable agents), and receives data in an appropriate format such as Apache Avro. When agent service 132 receives an incoming connection, it can perform a variety of checks, such as to see whether the data is being provided by a current customer, and whether the data is being provided in an appropriate format. If the data is not appropriately formatted (and/or is not provided by a current customer), it is rejected. If the data is appropriately formatted, agent service 132 facilitates copying the received data to a streaming data stable storage (e.g., using Amazon Kinesis (134)). Once the ingesting into Kinesis is complete, service 132 sends an acknowledgement to the data provider (e.g., data aggregator 114). If the agent does not receive such an acknowledgement, it is configured to retry sending the data to platform 102. One way to implement agent service 132 is as a REST API server framework (e.g., Java DropWizard), configured to communicate with Kinesis (e.g., using a Kinesis library).

In various embodiments, platform 102 uses one or more Kinesis streams (134) for all incoming customer data (e.g., including data provided by data aggregator 114 and data aggregator 128), and the data is sharded based on the node (also referred to herein as a "machine") that originated the data (e.g., node 116 vs. node 122), with each node having a globally unique identifier within platform 102. Multiple instances of agent service 132 can write to multiple shards.

Kinesis is a streaming service with a limited period (e.g., 1-7 days). To persist data longer than a day, it is copied to long term storage (e.g., S3). S3 Loader 136 is a microservice that is responsible for picking up data from Kinesis stream 134 and persisting it in S3 (138). In one example embodiment, files collected by S3 Loader 136 from the Kinesis stream are placed into one or more buckets, and segmented using a combination of a customer identifier and time slice. Given a particular time segment, and a given customer identifier, the corresponding file (stored in S3) contains five minutes (or another appropriate time slice) of data collected at that specific customer from all of the customer's nodes. S3 Loader 136 can be implemented in any appropriate programming language, such as Java or C, and can be configured to use a Kinesis library to interface with Kinesis. In various embodiments, S3 Loader 136 uses the Amazon Simple Queue Service (SQS) (e.g., to alert DB Loader 140 that there is work for it to do).

DB Loader 140 is a microservice that is responsible for loading data into an appropriate database service (142), such as SnowflakeDB or Amazon Redshift, using individual per-customer databases. In particular, DB Loader 140 is configured to periodically load data into a set of raw tables from files created by S3 Loader 136 as per above. DB Loader 140 manages throughput, errors, etc., to make sure that data is loaded consistently and continuously. Further, DB Loader 140 can read incoming data and load into database 142 data that is not already present in database 142's tables. DB Loader 140 can be implemented in any appropriate programming language, such as Java or C, and an SQL framework such as jOOQ (e.g., to manage SQLs for insertion of data), and SQL/JDBC libraries. DB Loader 140 also uses Amazon S3 and Amazon Simple Queue Service (SQS) to manage files being transferred to and from the database (e.g., Snowflake).

Customer data included in database 142 can be augmented with data from additional data sources, such as AWS Cloud Trail Analyzer 144, which is another microservice. AWS Cloud Trail Analyzer 144 pulls data using Amazon Cloudtrail for each applicable customer account, as soon as the data is available. AWS Cloud Trail Analyzer 144 normalizes the Cloudtrail data as applicable, so that it can be inserted into database 142 for later querying/analysis. AWS Cloud Trail Analyzer 144 can be written in any appropriate programming language, such as Java or C. AWS Cloud Trail Analyzer 144 also makes use of SQL/JDBC libraries to interact with database 142 to insert/query data.

II. Polygraphs

A. Polygraph Overview

As previously mentioned, platform 102 can model activities that occur within datacenters, such as datacenters 104 and 106. The model is stable over time, and differences, even subtle ones (e.g., between a current state of the datacenter and the model) can be surfaced. The ability to surface such anomalies can be particularly important in datacenter environments where rogue employees and/or external attackers may operate slowly (e.g., over a period of months), hoping that the elastic nature of typical resource use (e.g., virtualized servers) will help conceal their nefarious activities.

Using techniques described herein, platform 102 can automatically discover entities deployed in a given datacenter. Examples of entities include workloads, applications, processes, machines, virtual machines, containers, files, IP addresses, domain names, and users. The entities are grouped together logically (into analysis groups) based on behaviors, and temporal behavior baselines can be established. In particular, using techniques described herein, periodic graphs can be constructed (also referred to herein as polygraphs), in which the nodes are applicable logical entities, and the edges represent behavioral relationships between the logical entities in the graph. Baselines can be created for every node and edge.

Communication (e.g., between applications/nodes) is one example of a behavior. A model of communications between processes is an example of a behavioral model. As another example, the launching of applications is another example of a behavior that can be modeled. The baselines are updated hourly for every entity. Deviations from the expected normal behavior can then be detected and automatically reported (e.g., as anomalies or threats detected). Such deviations may be due to a desired change, a misconfiguration, or malicious activity. As applicable, platform 102 can score the detected deviations (e.g., based on severity and threat posed). Additional examples of analysis groups include models of machine communications, models of privilege changes, and models of insider behaviors (monitoring the interactive behavior of human users as they operate within the datacenter).

Two types of information collected by agents (described in more detail above) are network level information and process level information. As previously mentioned, agents collect information about every connection involving their respective nodes. And, for each connection, information about both the server and the client is collected (e.g., using the connection-to-process identification techniques described above). DNS queries and responses are also collected. The DNS query information can be used in logical entity graphing (e.g., collapsing many different IP addresses to a single service—s3.amazon.com). Examples of process level information collected by agents include attributes (user ID, effective user ID, and command line). Information such as what user/application is responsible for launching a given process and the binary being executed (and its SHA-256 values) is also provided by agents.

The dataset collected by agents across a datacenter can be very large, and many resources (e.g., virtual machines, IP addresses, etc.) are recycled very quickly. For example, an IP address and port number used at a first point in time by a first process on a first virtual machine may very rapidly be used (e.g., an hour later) by a different process/virtual machine.

Figure 4:
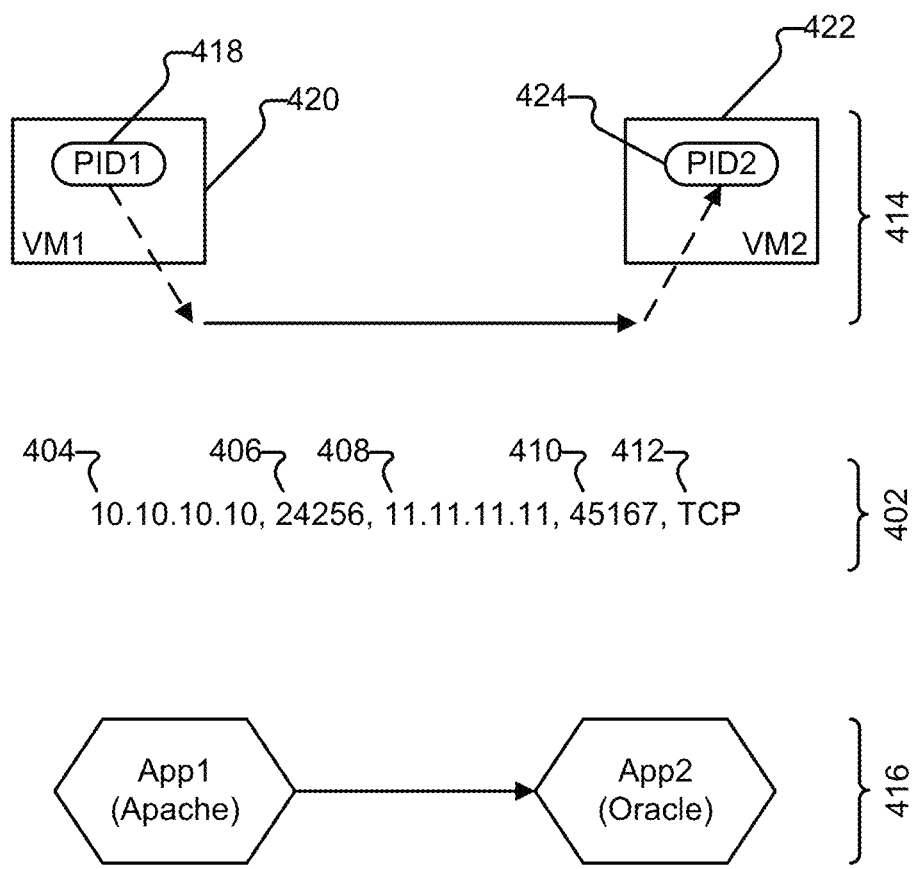
FIG. 4 illustrates a 5-tuple of data collected by an agent, physically and logically.

A dataset (and elements within it) can be considered at both a physical level, and a logical level, as illustrated in FIG. 4. In particular, FIG. 4 illustrates an example 5-tuple of data (402) collected by an agent, represented physically (414) and logically (416). The 5-tuple includes a source address (404), a source port (406), a destination address (408), a destination port (410), and a protocol (412). In some cases, port numbers (e.g., 406, 410) may be indicative of the nature of a connection (e.g., with certain port usage standardized). However, in many cases, and in particular in datacenters, port usage is ephemeral. For example, a Docker container can listen on an ephemeral port, which is unrelated to the service it will run. When another Docker container starts (for the same service), the port may well be different. Similarly, particularly in a virtualized environment, IP addresses may be recycled frequently (and are thus also potentially ephemeral) or could be NATed, which makes identification difficult.

A physical representation of the 5-tuple is depicted in region 414. A process 418 (executing on machine 420) has opened a connection to machine 422. In particular, process 418 is in communication with process 424. Information such as the number of packets exchanged between the two machines over the respective ports can be recorded.

As previously mentioned, in a datacenter environment, portions of the 5-tuple may change—potentially frequently—but still be associated with the same behavior. Namely, one application (e.g., Apache) may frequently be in communication with another application (e.g., Oracle), using ephemeral datacenter resources. Further, either/both of Apache and Oracle may be multi-homed. This can lead to potentially thousands of 5-tuples (or more) that all correspond to Apache communicating with Oracle within a datacenter. For example, Apache could be executed on a single machine, and could also be executed across fifty machines, which are variously spun up and down (with different IP addresses each time). An alternate representation of the 5-tuple shown in region 402 is depicted in region 416, and is logical. The logical representation of the 5-tuple aggregates the 5-tuple (along with other connections between Apache and Oracle having other 5-tuples) as logically representing the same connection. By aggregating data from raw physical connection information into logical connection information, using techniques described herein, a size reduction of six orders of magnitude in the data set can be achieved.

Figure 5:
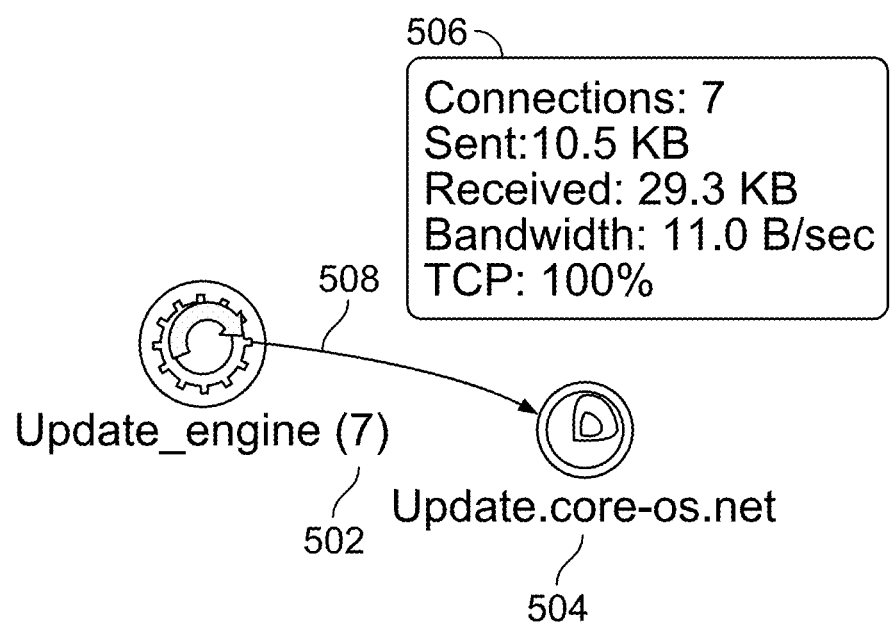
FIG. 5 illustrates a portion of a polygraph.

FIG. 5 depicts a portion of a logical polygraph. Suppose a datacenter has seven instances of the application update_engine (502), executing as seven different processes on seven different machines, having seven different IP addresses, and using seven different ports. The instances of update_engine variously communicate with update.coreos.net (504), which may have a single IP address or many IP addresses itself, over the one hour time period represented in the polygraph. In the example shown in FIG. 5, update_engine is a client, connecting to the server update.coreos.net, as indicated by arrow 508.

Behaviors of the seven processes are clustered together, into a single summary. As indicated in region 506, statistical information about the connections is also maintained (e.g., number of connections, histogram information, etc.). A polygraph such as is depicted in FIG. 5 can be used to establish a baseline of behavior (e.g., at the one-hour level), allowing for the future detection of deviations from that baseline. As one example, suppose that statistically an update_engine instance transmits data at 11 bytes per second. If an instance were instead to transmit data at 1000 bytes per second, such behavior would represent a deviation from the baseline and could be flagged accordingly. Similarly, changes that are within the baseline (e.g., an eighth instance of update_engine appears, but otherwise behaves as the other instances; or one of the seven instances disappears) are not flagged as anomalous. Further, datacenter events, such as failover, autobalancing, and A-B refresh are unlikely to trigger false alarms in a polygraph, as at the logical level, the behaviors remain the same.

Figure 6:
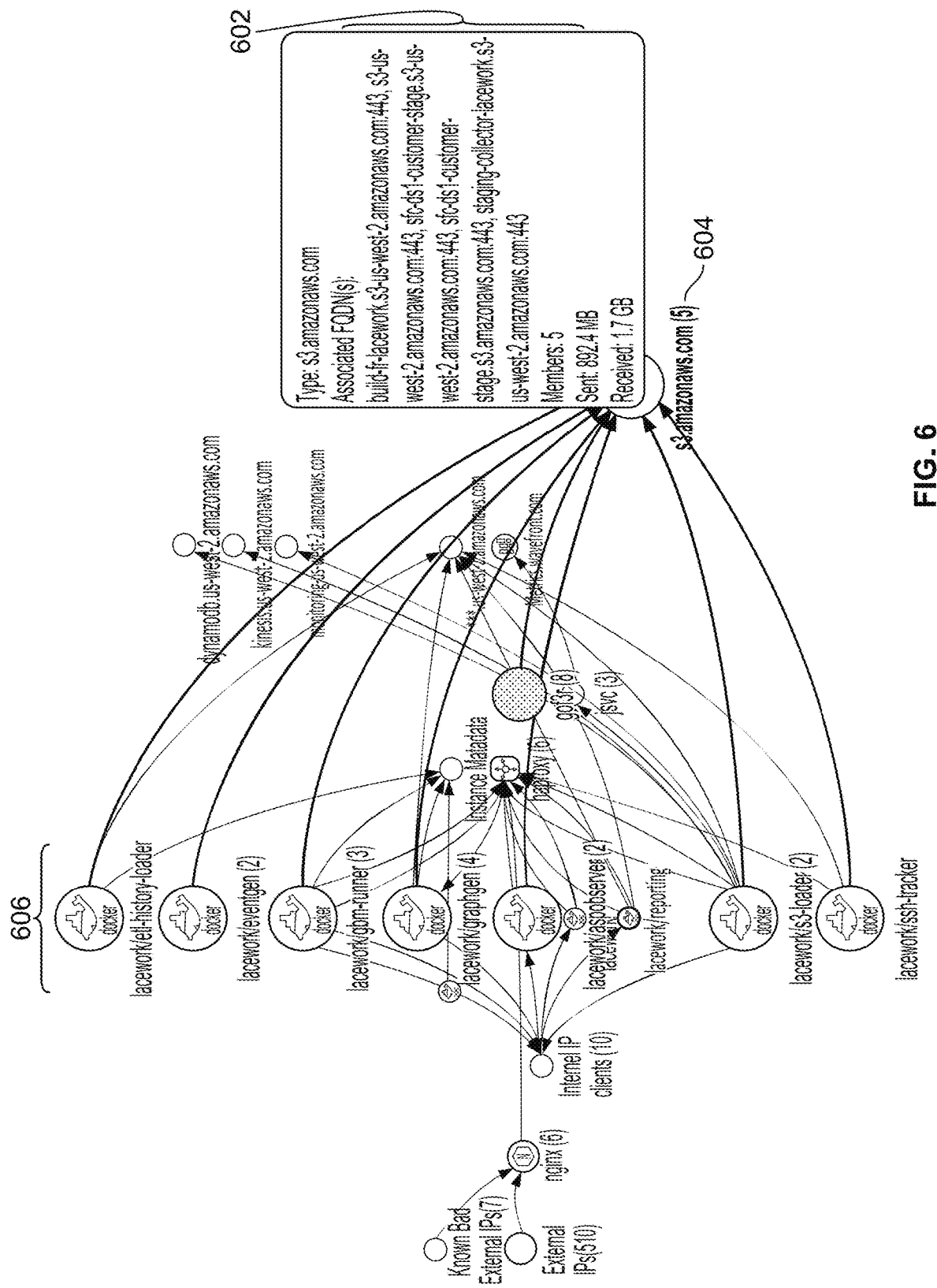
FIG. 6 illustrates a portion of a polygraph.

In various embodiments, polygraph data is maintained for every application in a datacenter, and such polygraph data can be combined to make a single datacenter view across all such applications. FIG. 6 illustrates a portion of a polygraph for a service that evidences more complex behaviors than are depicted in FIG. 5. In particular, FIG. 6 illustrates the behaviors of S3 as a service (as used by a particular customer datacenter). Clients within the datacenter variously connect to the S3 service using one of five fully qualified domains (listed in region 602). Contact with any of the domains is aggregated as contact with S3 (as indicated in region 604). Depicted in region 606 are various containers which (as clients) connect with S3. Other containers (which do not connect with S3) are not included. As with the polygraph portion depicted in FIG. 5, statistical information about the connections is known and summarized, such as the number of bytes transferred, histogram information, etc.

Figure 7:
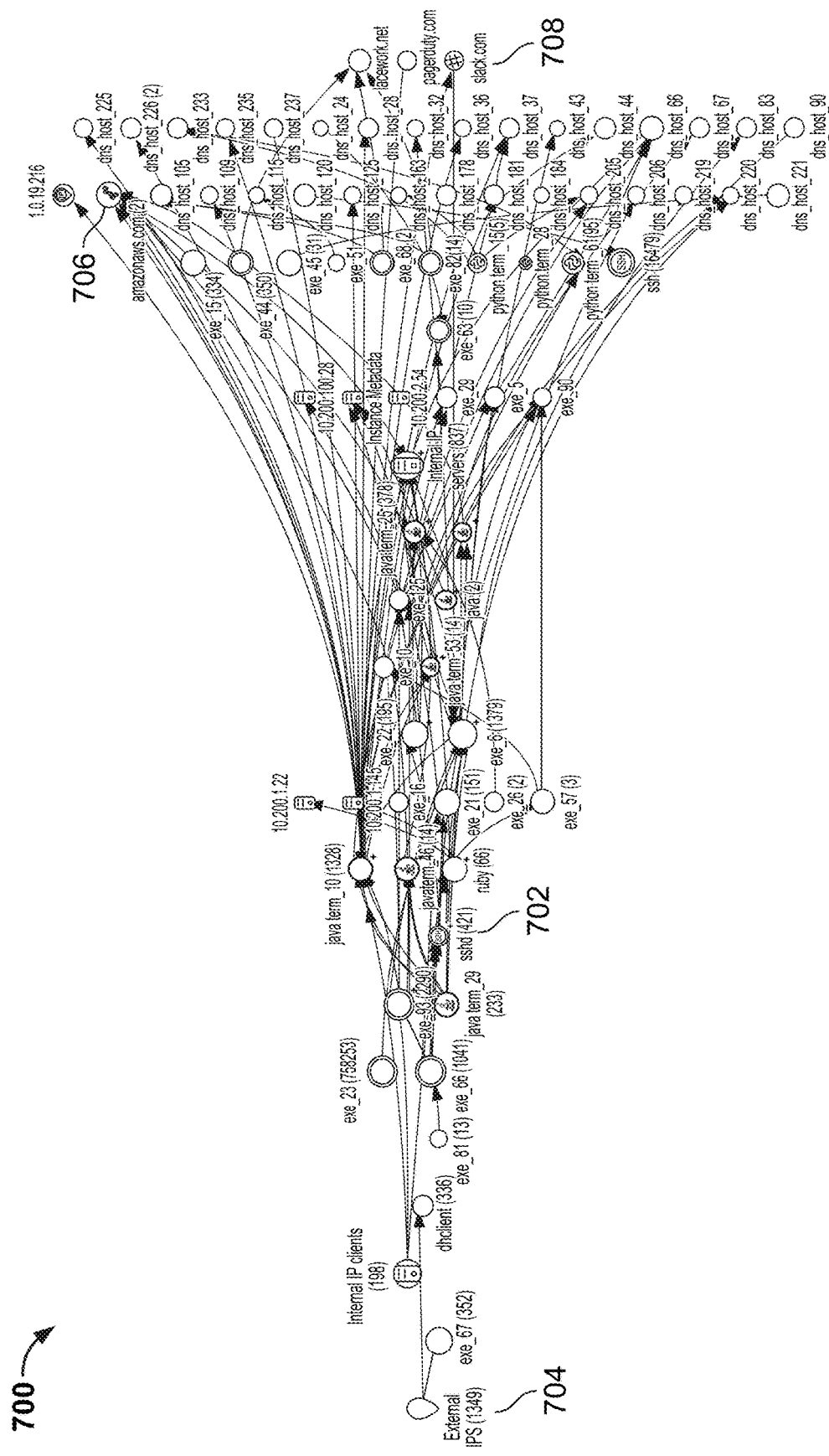
FIG. 7 illustrates an example of a communication polygraph.

FIG. 7 illustrates a communication polygraph for a datacenter. In particular, the polygraph indicates a one hour summary of approximately 500 virtual machines, which collectively run one million processes, and make 100 million connections in that hour. As illustrated in FIG. 7, a polygraph represents a drastic reduction in size (e.g., from tracking information on 100 million connections in an hour, to a few hundred nodes and a few hundred edges). Further, as a datacenter scales up (e.g., from using 10 virtual machines to 100 virtual machines as the datacenter uses more workers to support existing applications), the polygraph for the datacenter will tend to stay the same size (with the 100 virtual machines clustering into the same nodes that the 10 virtual machines previously clustered into). As new applications are added into the datacenter, the polygraph will automatically scale to include behaviors involving those applications.

In the particular polygraph shown in FIG. 7, nodes generally correspond to workers, and edges correspond to communications the workers engage in (with connection activity being the behavior modeled in polygraph 700). Another example polygraph could model other behavior, such as application launching. The communications graphed in FIG. 7 include traffic entering the datacenter, traffic exiting the datacenter, and traffic that stays wholly within the datacenter (e.g., traffic between workers). One example of a node included in polygraph 700 is the sshd application, depicted as node 702. As indicated in FIG. 7, 421 instances of sshd were executing during the one hour time period of data represented in polygraph 700. As indicated in region 704, nodes within the datacenter communicated with a total of 1349 IP addresses outside of the datacenter (and not otherwise accounted for, e.g., as belonging to a service such as Amazon AWS (706) or Slack (708)).

B. Interacting with Polygraphs

In the following examples, suppose that Bob, an administrator of datacenter 106, is interacting with platform 102 to view visualizations of polygraphs in a web browser (e.g., as served to him via web app 120). One type of polygraph Bob can view is an application-communication polygraph, which indicates, for a given one hour window, which applications communicated with which other applications. Another type of polygraph Bob can view is an application launch polygraph. Bob can also view graphs related to user behavior, such as an insider behavior graph which tracks user connections (e.g., to internal and external applications, including chains of such behavior), a privilege change graph which tracks how privileges change between processes, and a user login graph, which tracks which (logical) machines a user logs into.

Figure 8:
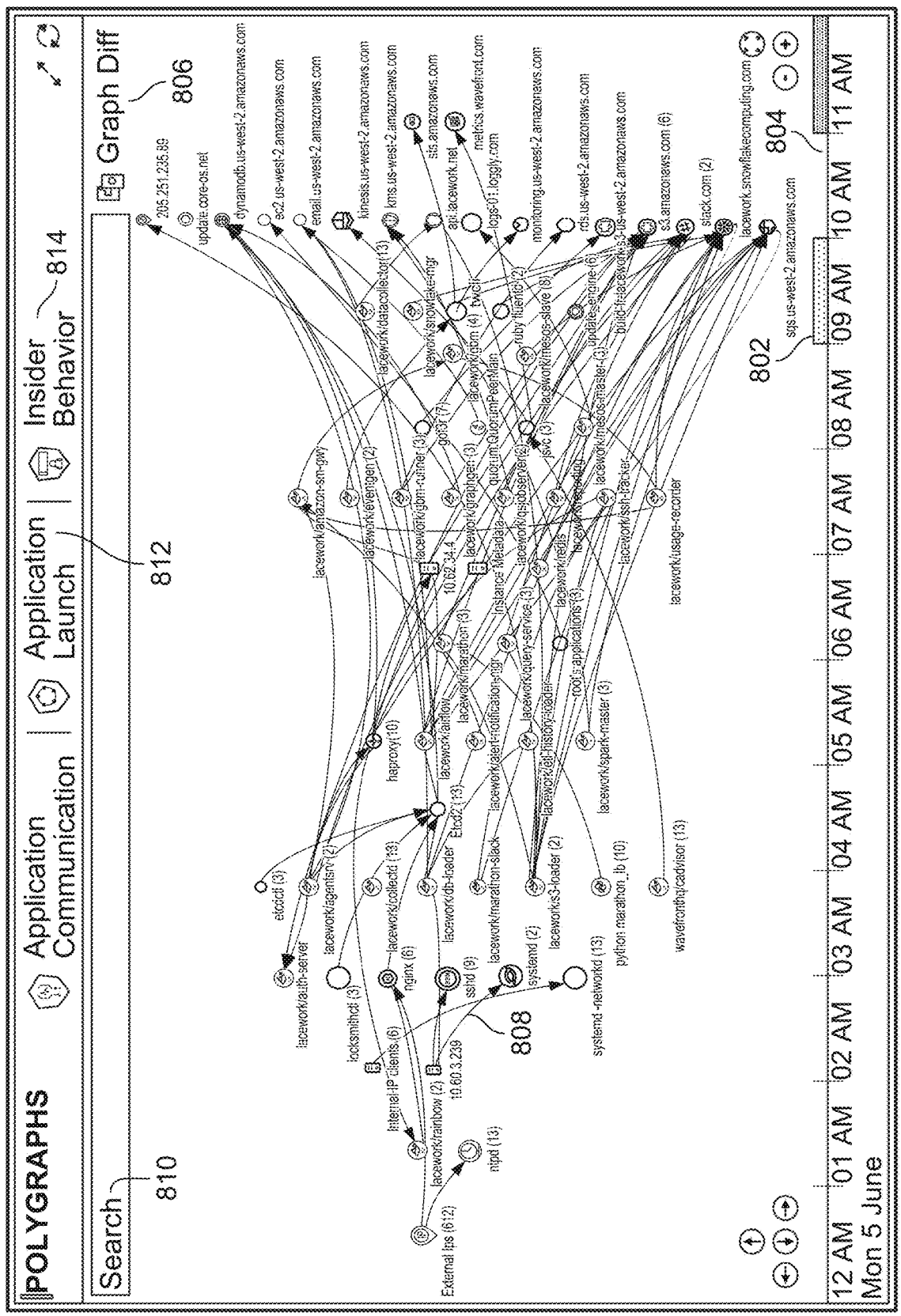
FIG. 8 illustrates an example of a polygraph.

FIG. 8 illustrates an example of an application-communication polygraph for a datacenter (e.g., datacenter 106) for the one hour period of 9 am-10 am on June 5. The time slice currently being viewed is indicated in region 802. If Bob clicks his mouse in region 804, Bob will be shown a representation of the application-communication polygraph as generated for the following hour (10 am-11 am on June 5).

Figure 9:
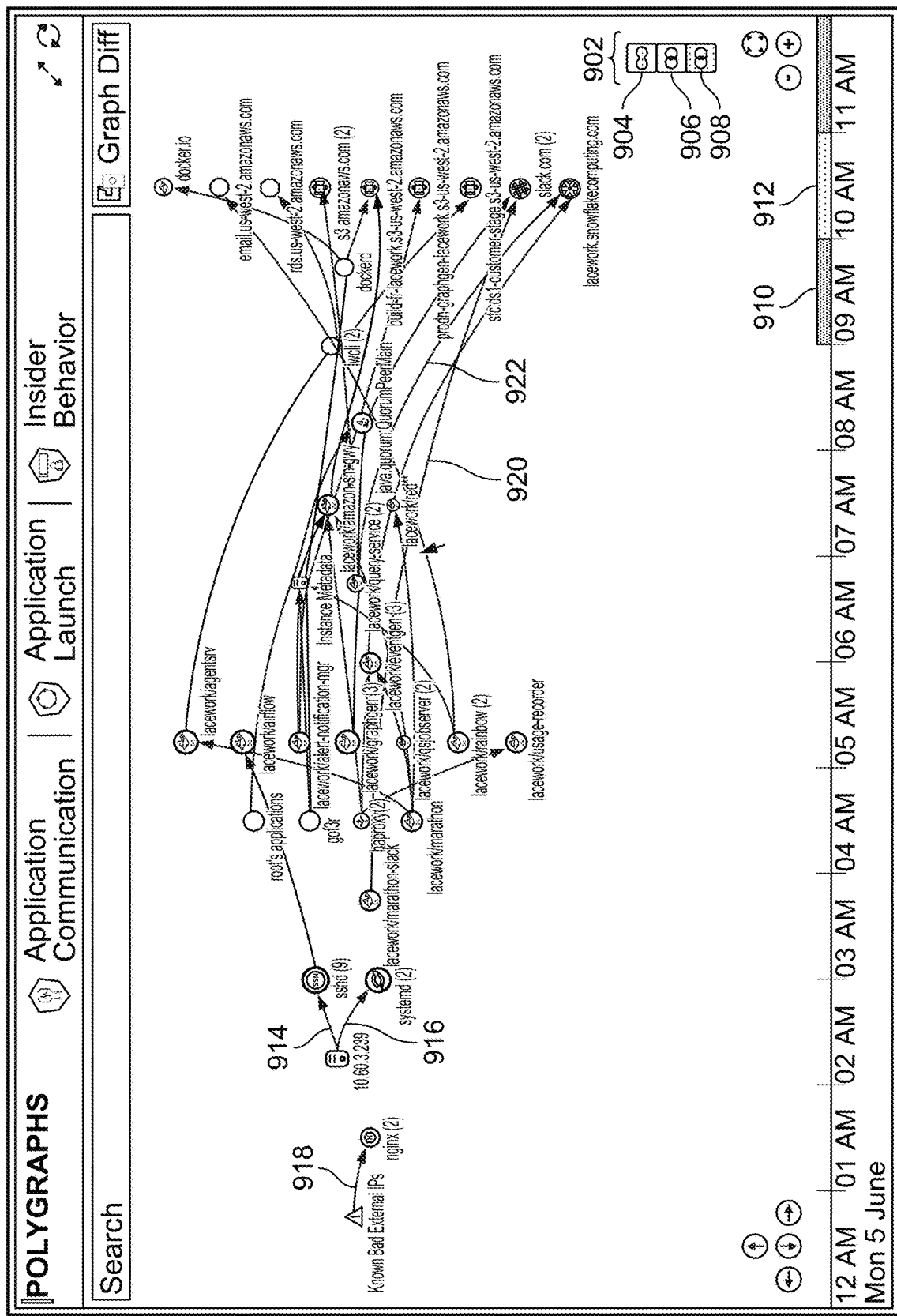
FIG. 9 illustrates an example of a polygraph as rendered in an interface.

FIG. 9 depicts what is shown in Bob's browser after he has clicked on region 804, and has further clicked on region 806. The selection in region 806 turns on and off the ability to compare two time intervals to one another. Bob can select from a variety of options when comparing the 9 am-10 am and 10 am-11 am time intervals. By clicking region 904, Bob will be shown the union of both graphs (i.e., any connections that were present in either time interval). By clicking region 906, Bob will be shown the intersection of both graphs (i.e., only those connections that were present in both time intervals).

As shown in FIG. 9, Bob has elected to click on region 908, which depicts connections that are only present in the 9 am-10 am polygraph in purple (910), and depicts connections that are only present in the 10 am-11 am polygraph in blue (912). Connections present in both polygraphs are omitted from display. As one example, in the 9 am-10 am polygraph (corresponding to connections made during the 9 am-10 am time period at datacenter 106), a connection was made by a server to sshd (914) and also to systemd (916). Both of those connections ended prior to 10 am and are thus depicted in purple. As another example, in the 10 am-11 am polygraph (corresponding to connections made during the 10 am-11 am time period at datacenter 106), a connection was made from a known bad external IP to nginx (918). The connection was not present during the 9 am-10 am time slice and thus is depicted in blue. As yet another example, two different connections were made to a Slack service between 9 am and 11 am. However, the first was made by a first client during the 9 am-10 am time slice (920) and the second was made by a different client during the 10 am-11 am slice (922), and so the two connections are depicted respectively in purple and blue.

Figure 10:
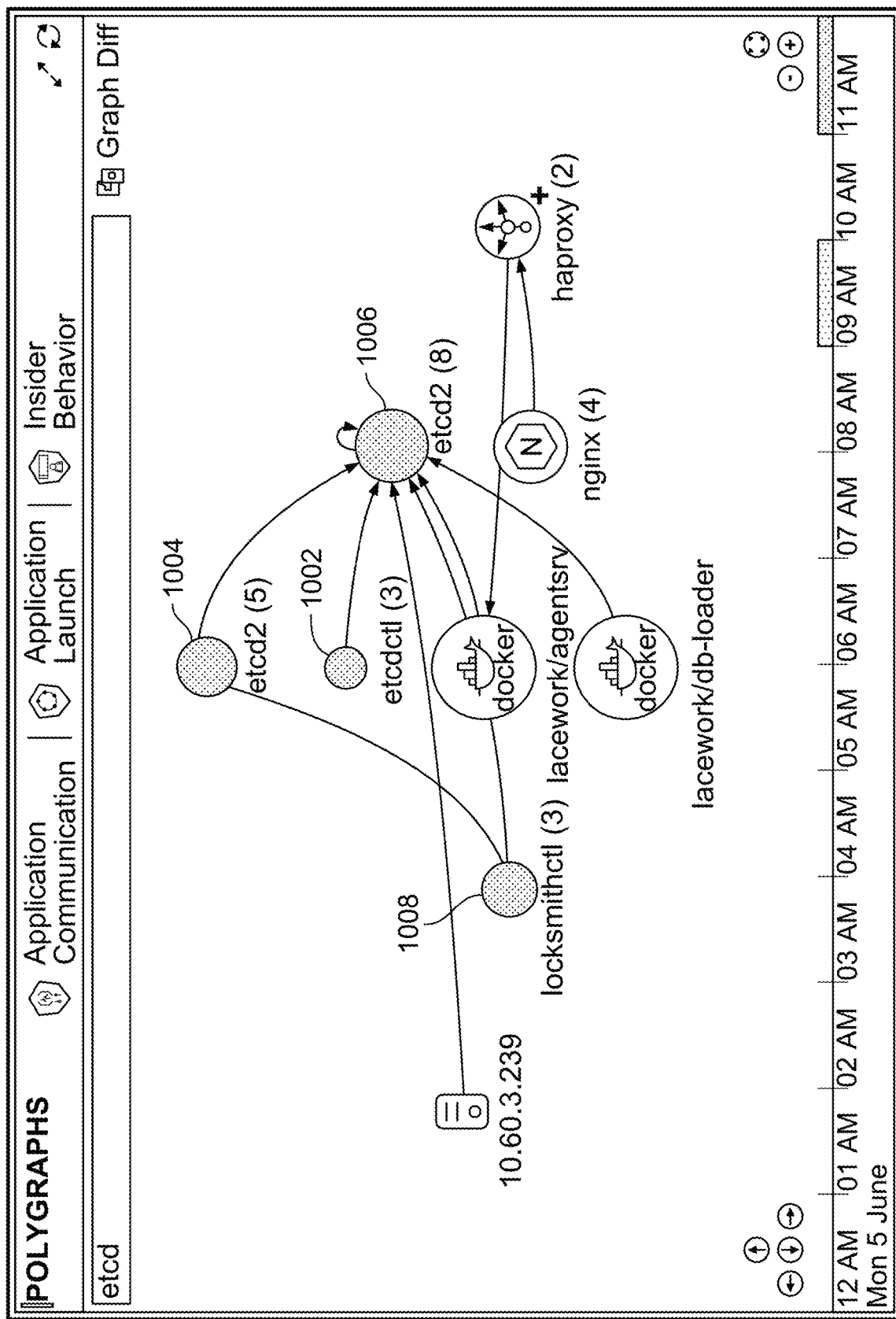
FIG. 10 illustrates an example of a portion of a polygraph as rendered in an interface.
Figure 11:
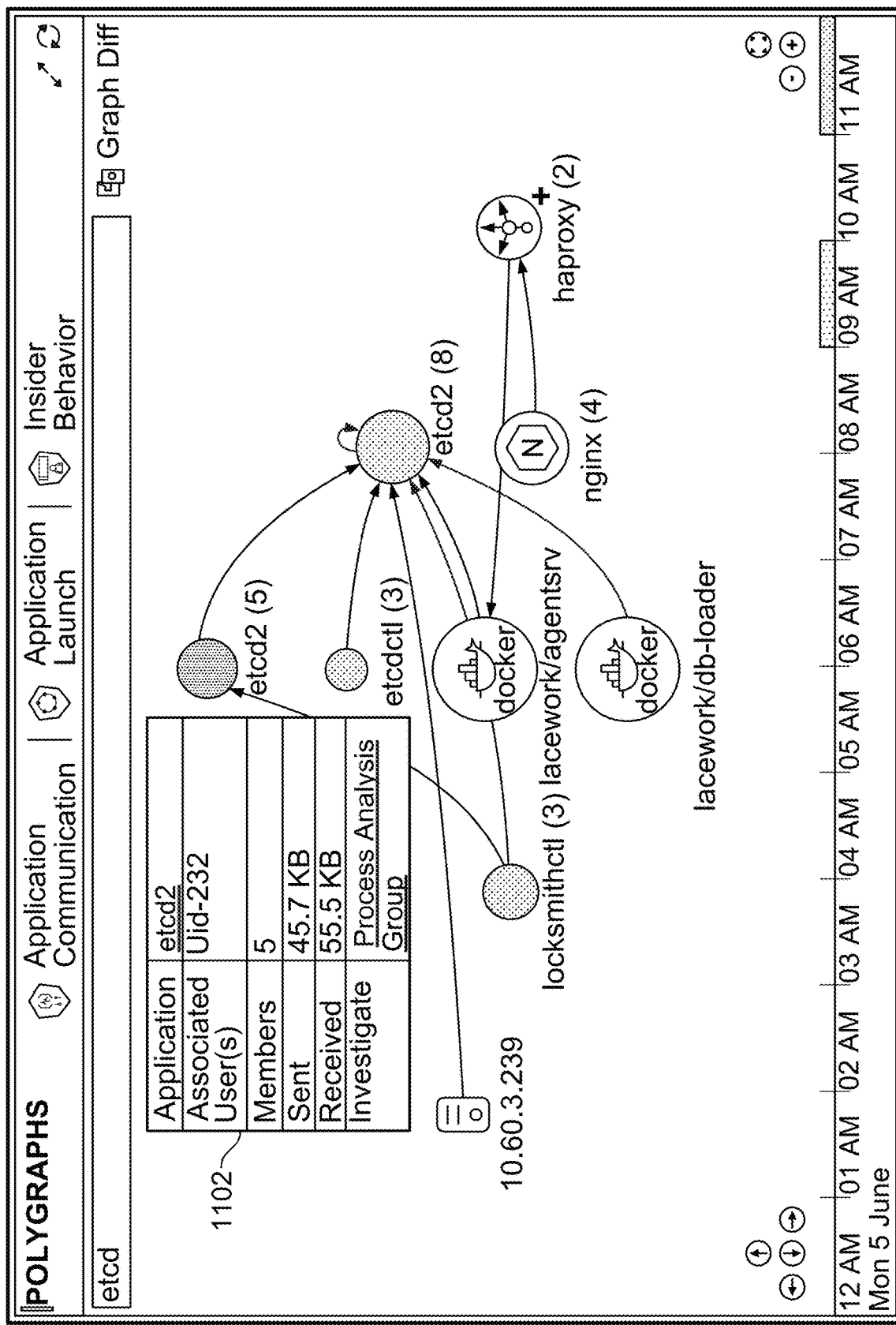
FIG. 11 illustrates an example of a portion of a polygraph as rendered in an interface.

Returning to the polygraph depicted in FIG. 8, suppose Bob enters "etcd" into the search box located in region 810. Bob will then be presented with the interface illustrated in FIG. 10. As shown in FIG. 10, three applications containing the term "etcd" were engaged in communications during the 9 am-10 am window. One application is etcdctl, a command line client for etcd. As shown in FIG. 10, a total of three different etcdctl processes were executed during the 9 am-10 am window, and were clustered together (1002). FIG. 10 also depicts two different clusters that are both named etcd2. The first cluster includes (for the 9 am-10 am window) five members (1004) and the second cluster includes (for the same window) eight members (1006). The reason for these two distinct clusters is that the two groups of applications behave differently (e.g., they exhibit two distinct sets of communication patterns). Specifically, the instances of etcd2 in cluster 1004 only communicate with locksmithctl (1008) and other etcd2 instances (in both clusters 1004 and 1006). The instances of etcd2 in cluster 1006 communicate with additional entities, such as etcdctl and Docker containers. As desired, Bob can click on one of the clusters (e.g., cluster 1004) and be presented with summary information about the applications included in the cluster, as is shown in FIG. 11 (e.g., in region 1102). He can also double click on a given cluster (e.g., cluster 1004) to see details on each of the individual members of the cluster broken out.

Figure 12:
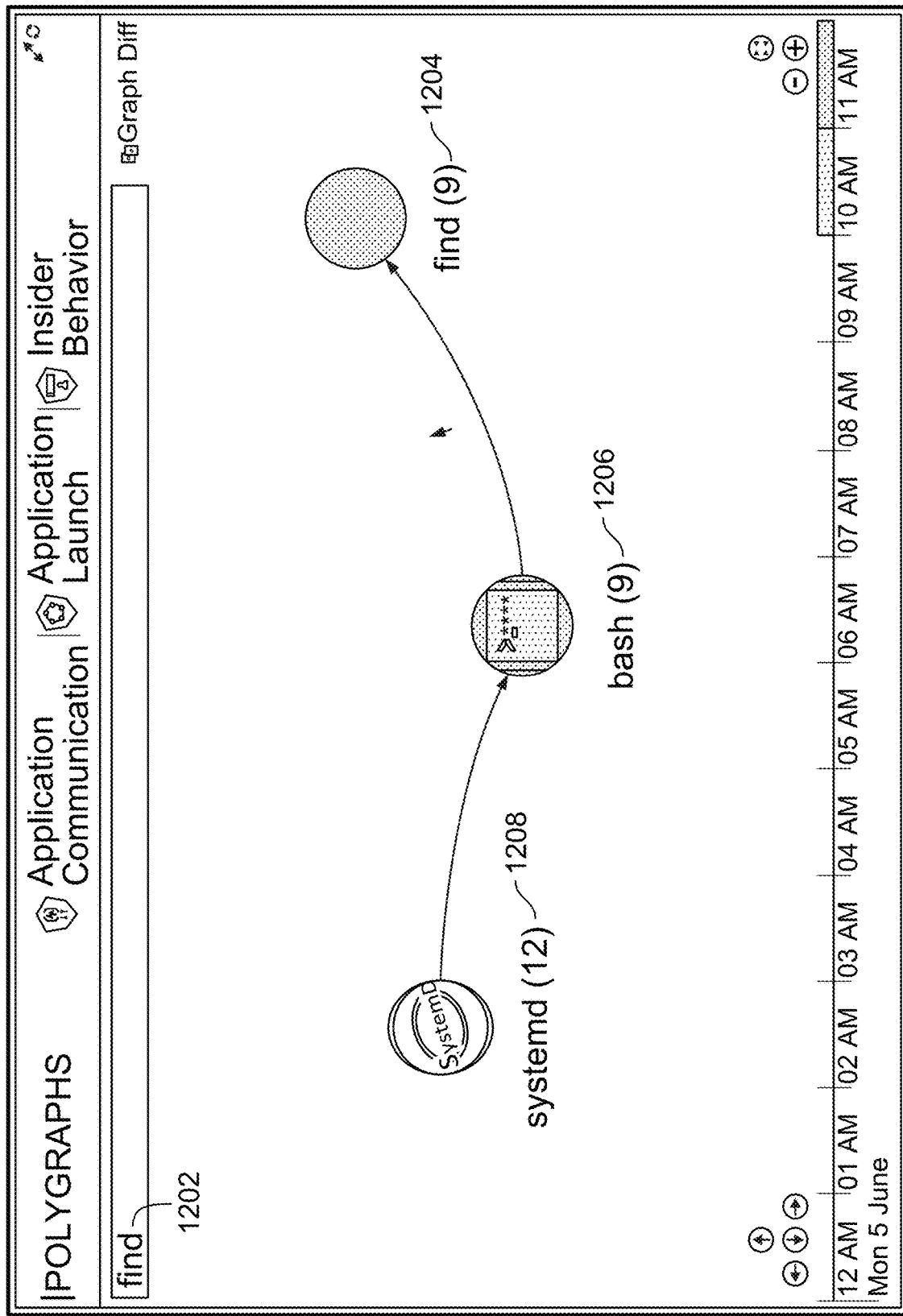
FIG. 12 illustrates an example of a portion of a polygraph as rendered in an interface.

Suppose Bob now clicks on region 812 of the interface shown in FIG. 8. Bob will then be shown an application launch polygraph. Launching an application is another example of a behavior. The launch polygraph models how applications are launched by other applications. FIG. 12 illustrates an example of a portion of a launch polygraph. In particular, Bob has typed "find" into region 1202, to see how the "find" application is being launched. As shown in FIG. 12, in the launch polygraph for the 10 am-11 am time period, find applications (1204) are always launched by bash (1206), which is in turn always launched by systemd (1208). If find is launched by a different application, this would be anomalous behavior.

Figure 13:
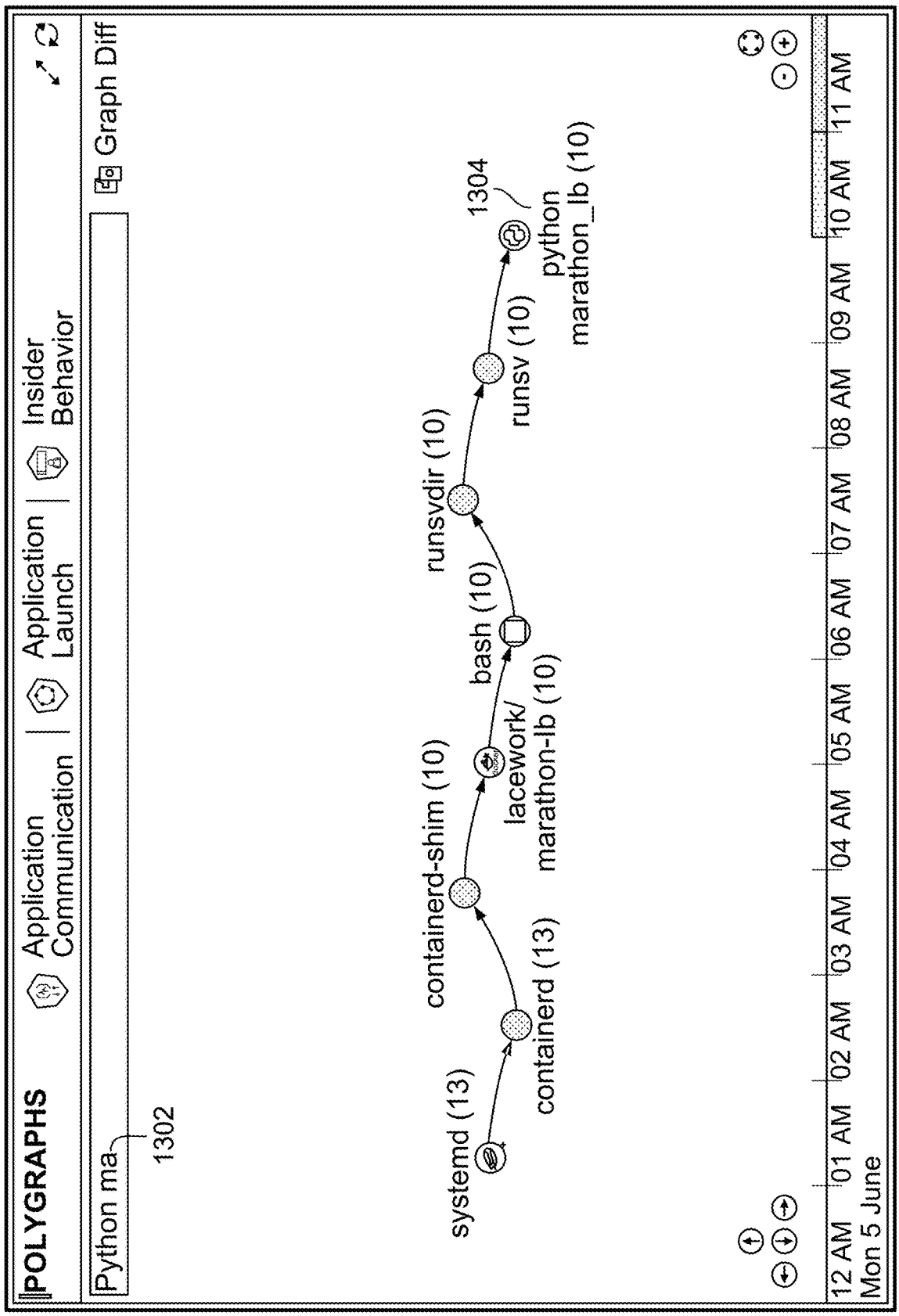
FIG. 13 illustrates an example of a portion of a polygraph as rendered in an interface.

FIG. 13 illustrates another example of a portion of an application launch polygraph. In FIG. 13, Bob has searched (1302) for "python ma" to see how "python marathon_lb" (1304) is launched. As shown in FIG. 13, in each case (during the one hour time slice of 10 am-11 am), python marathon_lb is launched as a result of a chain of the same seven applications each time. If python marathon_lb is ever launched in a different manner, this indicates anomalous behavior. The behavior could be indicative of malicious activities, but could also be due to other reasons, such as a misconfiguration, a performance-related issue, and/or a failure, etc.

Suppose Bob now clicks on region 814 of the interface shown in FIG. 8. Bob will then be shown an insider behavior graph. The insider behavior graph tracks information about behaviors such as processes started by a user interactively using protocols such as ssh or telnet, and any processes started by those processes. As one example, suppose an administrator logs into a first virtual machine in datacenter 106 (e.g., using sshd via an external connection he makes from a hotel), using a first set of credentials (e.g., charlie.smith@example.com and an appropriate password). From the first virtual machine, the administrator connects to a second virtual machine (e.g., using the same credentials), then uses the sudo command to change identities to those of another user, and then launches a program. Graphs built by platform 102 can be used to associate the administrator with each of his actions, including launching the program using the identity of another user.

Figure 14:
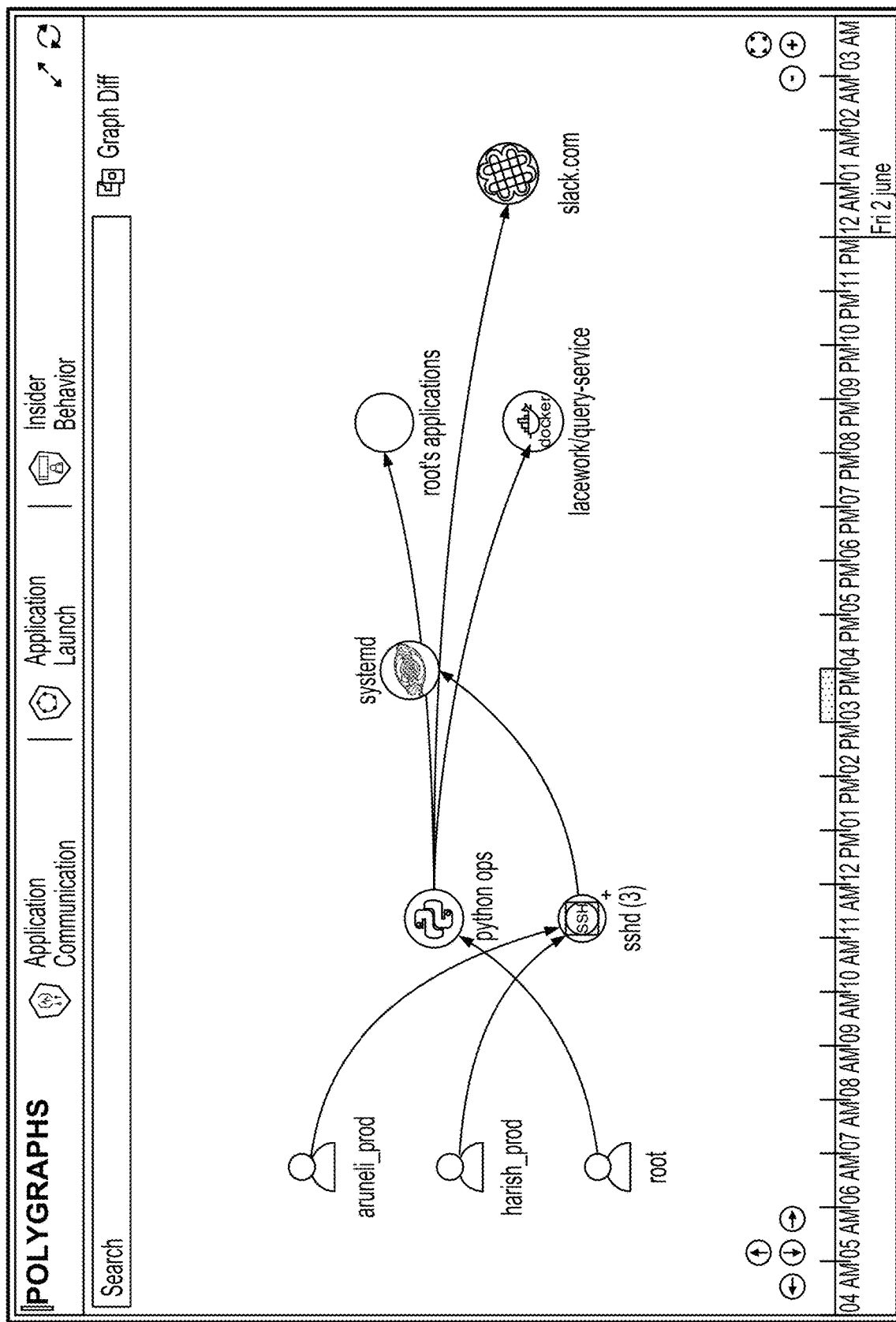
FIG. 14 illustrates an example of an insider behavior graph as rendered in an interface.

FIG. 14 illustrates an example of a portion of an insider behavior graph. In particular, in FIG. 14, Bob is viewing a graph that corresponds to the time slice of 3 pm-4 pm on June 1. FIG. 14 illustrates the internal/external applications that users connected to during the one hour time slice. If a user typically communicates with particular applications, that information will become part of a baseline. If the user deviates from his baseline behavior (e.g., using new applications, or changing privilege in anomalous ways), such anomalies can be surfaced.

Figure 15:
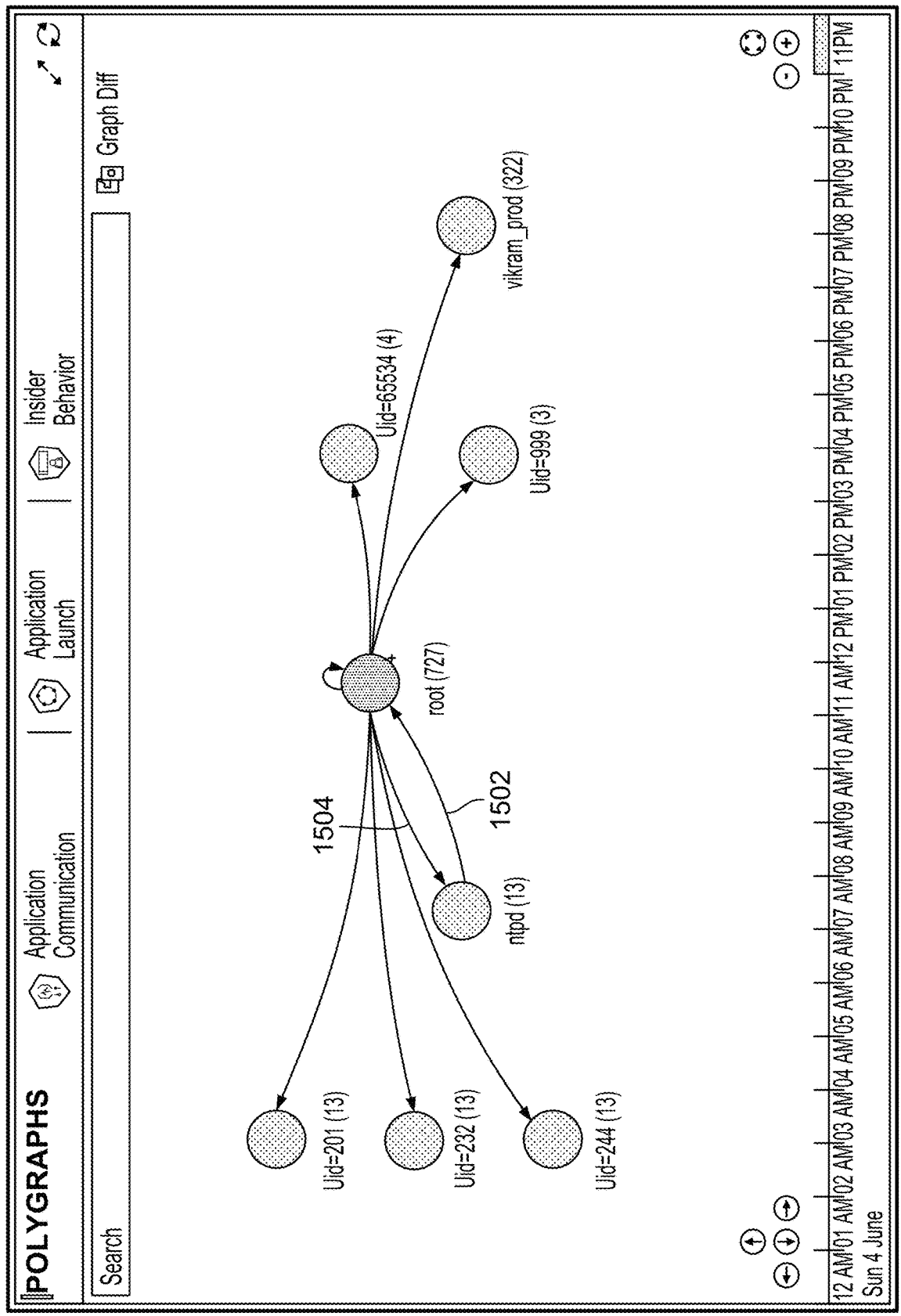
FIG. 15 illustrates an example of a privilege change graph as rendered in an interface.

FIG. 15 illustrates an example of a portion of a privilege change graph, which identifies how privileges are changed between processes. Typically, when a user launches a process (e.g., "ls"), the process inherits the same privileges that the user has. And, while a process can have fewer privileges than the user (i.e., go down in privilege), it is rare (and generally undesirable) for a user to escalate in privilege. Information included in the privilege change graph can be determined by examining the parent of each running process, and determining whether there is a match in privilege between the parent and the child. If the privileges are different, a privilege change has occurred (whether a change up or a change down). The application ntpd is one rare example of a scenario in which a process escalates (1502) to root, and then returns back (1504). The sudo command is another example (e.g., used by an administrator to temporarily have a higher privilege). As with the other examples, ntpd's privilege change actions, and the legitimate actions of various administrators (e.g., using sudo) will be incorporated into a baseline model by platform 102. When deviations occur, such as where a new application that is not ntpd escalates privilege, or where an individual that has not previously/does not routinely use sudo does so, such behaviors can be identified as anomalous.

Figure 16:
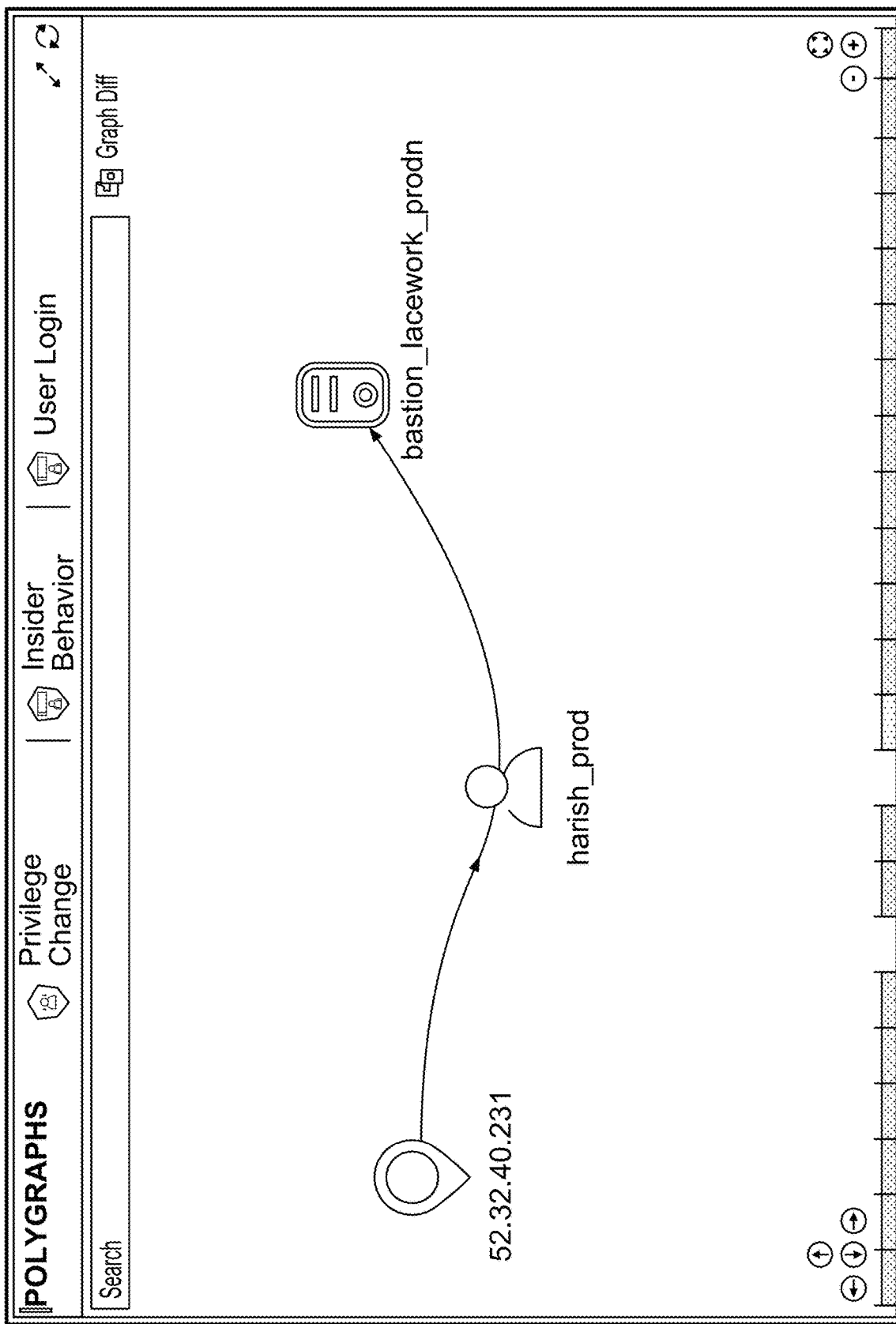
FIG. 16 illustrates an example of a user login graph as rendered in an interface.
Figure 17:
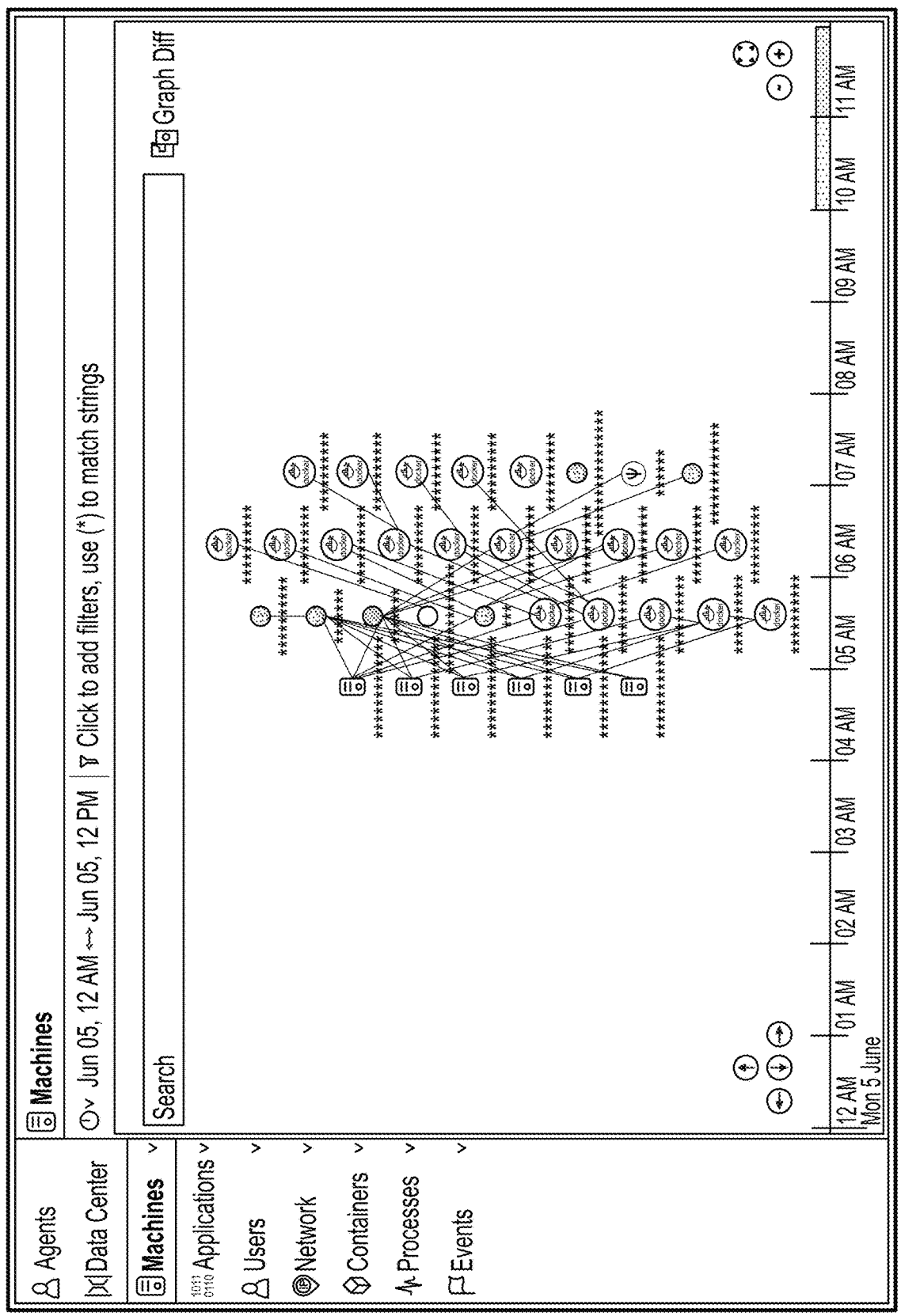
FIG. 17 illustrates an example of a machine server graph as rendered in an interface.

FIG. 16 illustrates an example of a portion of a user login graph, which identifies which users log into which logical nodes. Physical nodes (whether bare metal or virtualized) are clustered into a logical machine cluster, for example, using yet another graph, a machine-server graph, an example of which is shown in FIG. 17. For each machine, a determination is made as to what type of machine it is, based on what kind(s) of workflows it runs. As one example, some machines run as master nodes (having a typical set of workflows they run, as master nodes) and can thus be clustered as master nodes. Worker nodes are different from master nodes, for example, because they run Docker containers, and frequently change as containers move around. Worker nodes can similarly be clustered.

Additional information regarding use of graphs such as are depicted in FIGS. 14-17 is provided in Section IV below.

C. Polygraph Construction

As previously mentioned, the polygraph depicted in FIG. 7 corresponds to activities in a datacenter in which, in a given hour, approximately 500 virtual machines collectively run one million processes, and make 100 million connections in that hour. The polygraph represents a drastic reduction in size (e.g., from tracking information on 100 million connections in an hour, to a few hundred nodes and a few hundred edges). Using techniques described herein, such a polygraph can be constructed (e.g., using commercially available computing infrastructure) in less than an hour (e.g., within a few minutes). Thus, ongoing hourly snapshots of a datacenter can be created within a two hour moving window (i.e., collecting data for the time period 8 am-9 am, while also generating a snapshot for the time previous time period 7 am-8 am). The following section describes various example infrastructure that can be used in polygraph construction, and also describes various techniques that can be used to construct polygraphs.

1. Example Infrastructure

Returning to FIG. 1, embodiments of platform 102 are built using AWS infrastructure as a service (IaaS). For example, platform 102 can use Simple Storage Service (S3) for data storage, Key Management Service (KMS) for managing secrets, Simple Queue Service (SQS) for managing messaging between applications, Simple Email Service (SES) for sending emails, and Route 53 for managing DNS. Other infrastructure tools can also be used. Examples include: orchestration tools (e.g., Kubernetes or Mesos/Marathon), service discovery tools (e.g., Mesos-DNS), service load balancing tools (e.g., marathon-LB), container tools (e.g., Docker or rkt), log/metric tools (e.g., collectd, fluentd, kibana, etc.), big data processing systems (e.g., Spark, Hadoop, AWS Redshift, Snowflake etc.), and distributed key value stores (e.g., Apache Zookeeper or etcd2).

As previously mentioned, in various embodiments, platform 102 makes use of a collection of microservices. Each microservice can have multiple instances, and is configured to recover from failure, scale, and distribute work amongst various such instances, as applicable. For example, microservices are auto-balancing for new instances, and can distribute workload if new instances are started or existing instances are terminated. In various embodiments, microservices are deployed as self-contained Docker containers. A Mesos-Marathon or Spark framework can be used to deploy the microservices (e.g., with Marathon monitoring and restarting failed instances of microservices as needed). The service etcd2 can be used by microservice instances to discover how many peer instances are running, and used for calculating a hash-based scheme for workload distribution. Microservices are configured to publish various health/status metrics to either an SQS queue, or etcd2, as applicable. And, Amazon DynamoDB can be used for state management.

Additional information on various microservices used in embodiments of platform 102 is provided below.

a. GraphGen

GraphGen (146) is a microservice that is responsible for generating raw behavior graphs on a per customer basis periodically (e.g., once an hour). In particular, GraphGen 146 generates graphs of entities (as the nodes in the graph) and activities between entities (as the edges). In various embodiments, GraphGen 146 also performs other functions, such as aggregation, enrichment (e.g., geolocation and threat), reverse DNS resolution, TF-IDF based command line analysis for command type extraction, parent process tracking, etc.

GraphGen 146 performs joins on data collected by the agents, so that both sides of a behavior are linked. For example, suppose a first process on a first virtual machine (e.g., having a first IP address) communicates with a second process on a second virtual machine (e.g., having a second IP address). Respective agents on the first and second virtual machines will each report information on their view of the communication (e.g., the PID of their respective processes, the amount of data exchanged and in which direction, etc.). When GraphGen performs a join on the data provided by both agents, the graph will include a node for each of the processes, and an edge indicating communication between them (as well as other information, such as the directionality of the communication—i.e., which process acted as the server and which as the client in the communication).

In some cases, connections are process to process (e.g., from a process on one virtual machine within ACME to another process on a virtual machine within ACME). In other cases, a process may be in communication with a node (e.g., outside of ACME) which does not have an agent deployed upon it. As one example, a node within ACME might be in communication with node 172, outside of ACME. In such a scenario, communications with node 172 are modeled (e.g., by GraphGen 146) using the IP address of node 172. Similarly, where a node within ACME does not have an agent deployed upon it, the IP address of the node can be used by GraphGen in modeling.

Graphs created by GraphGen 146 are written to database 142 and cached for further processing. The graph is a summary of all activity that happened in the time interval. As each graph corresponds to a distinct period of time, different rows can be aggregated to find summary information over a larger timestamp. And, picking two different graphs from two different timestamps can be used to compare different periods. If necessary, GraphGen can parallelize its workload (e.g., where its backlog cannot otherwise be handled within an hour, or if is required to process a graph spanning a long time period).

GraphGen can be implemented in any appropriate programming language, such as Java or C, and machine learning libraries, such as Spark's MLLib. Example ways that GraphGen computations can be implemented include using SQL or Map-R, using Spark or Hadoop.

b. sshTracker

SshTracker (148) is a microservice that is responsible for following ssh connections and process parent hierarchies to determine trails of user ssh activity. Identified ssh trails are placed by the sshTracker into database 142 and cached for further processing.

SshTracker 148 can be implemented in any appropriate programming language, such as Java or C, and machine libraries, such as Spark's MLLib. Example ways that sshTracker computations can be implemented include using SQL or Map-R, using Spark or Hadoop.

c. ThreatAggr

ThreatAggr (150) is a microservice that is responsible for obtaining third party threat information from various applicable sources, and making it available to other microservices. Examples of such information include reverse DNS information, GeoTP information, lists of known bad domains/IP addresses, lists of known bad files etc. As applicable, the threat information is normalized before insertion into database 142. ThreatAggr can be implemented in any appropriate programming language, such as Java or C, using SQL/JDBC libraries to interact with database 142 (e.g., for insertions and queries).

d. Hawkeye

Hawkeye (152) is a microservice that acts as a scheduler and can run arbitrary jobs organized as a directed graph. Hawkeye ensures that all jobs for all customers are able to run every hour. It handles errors and retrying for failed jobs, tracks dependencies, manages appropriate resource levels, and scales jobs as needed. Hawkeye can be implemented in any appropriate programming language, such as Java or C. A variety of components can also be used, such as open source scheduler frameworks (e.g., Airflow), or AWS services (e.g., the AWS Data pipeline) which can be used for managing schedules.

e. GBM

Graph Behavior Modeler (GBM) (154) is a microservice that computes Polygraphs. In particular, the GBM can be used to find clusters of nodes in a graph that should be considered similar based on some set of their properties and relationships to other nodes. As will be described in more detail below, the clusters and their relationships can be used to provide visibility into a datacenter environment without requiring user specified labels. The GBM tracks such clusters over time persistently, allowing for changes to be detected and alerts to be generated.

The GBM takes as input a raw graph (e.g., as generated by GraphGen 146), nodes are actors of a behavior, and edges are the behavior relationship itself. For example, in the case of communication, example actors include processes, which communicate with other processes. The GBM clusters the raw graph based on behaviors of actors and produces a summary (the Polygraph). The Polygraph summarizes behavior at a datacenter level. The GBM also produces "observations" that represent changes detected in the datacenter. Such observations are based on differences in cumulative behavior (e.g., the baseline) of the datacenter with its current behavior. The GBM can be implemented in any appropriate programming language, such as Java, C, or Golang, using appropriate libraries (as applicable) to handle distributed graph computations (handling large amounts of data analysis in a short amount of time). Apache Spark is another example tool that can be used to compute Polygraphs. The GBM can also take feedback from users and adjust the model according to that feedback. For example, if a given user is interested in relearning behavior for a particular entity, the GBM can be instructed to "forget" the implicated part of the polygraph.

f. GBM Runner

GBM Runner (156) is a microservice that is responsible for interfacing with GBM 154 and providing GBM 154 with raw graphs (e.g., using SQL to push any computations it can to database 142). GBM Runner 156 also inserts Polygraph output from GBM 154 to database 142. GBM Runner can be implemented in any appropriate programming language, such as Java or C, using SQL/JDBC libraries to interact with database 142 to insert and query data.

g. EventGen

EventGen (158) is a microservice that is responsible for generating alerts. It examines observations (e.g., produced by GBM 154) in aggregate, deduplicates them, and scores them. Alerts are generated for observations with a score exceeding a threshold. EventGen 158 also computes (or retrieves, as applicable) data that a customer (e.g., Alice or Bob) might need when reviewing the alert. Examples of events that can be detected by platform 102 (and alerted on by EventGen 158) include:

new user: This event is created the first time a user (e.g., of node 116) is first observed by an agent within a datacenter.

user launched new binary: This event is generated when an interactive user launches an application for the first time.

new privilege escalation: This event is generated when user privileges are escalated and a new application is run.

new application or container: This event is generated when an application or container is seen for the first time.

new external connection: This event is generated when a connection to an external IP/domain is made from a new application.

new external host or IP: This event is generated when a new external host or IP is involved in a connection with a datacenter.

new internal connection: This event is generated when a connection between internal-only applications is seen for the first time.

new external client: This event is generated when a new external connection is seen for an application which typically does not have external connections.

new parent: This event is generated when an application is launched by a different parent.

connection to known bad IP/domain: Platform 102 maintains (or can otherwise access) one or more reputation feeds. If an environment makes a connection to a known bad IP or domain, an event will be generated.

login from a known bad IP/domain: An event is generated when a successful connection to a datacenter from a known bad IP is observed by platform 102.

EventGen can be implemented in any appropriate programming language, such as Java or C, using SQL/JDBC libraries to interact with database 142 to insert and query data. In various embodiments, EventGen also uses one or more machine learning libraries, such as Spark's MLLib (e.g., to compute scoring of various observations). EventGen can also take feedback from users about which kinds of events are of interest and which to suppress.

h. QsJobServer

QsJobServer (160) is a microservice that looks at all the data produced by platform 102 for an hour, and compiles a materialized view (MV) out of the data to make queries faster. The MV helps make sure that the queries customers most frequently run, and data that they search for, can be easily queried and answered. QsJobServer 160 also precomputes and caches a variety of different metrics so that they can quickly be provided as answers at query time. QsJobServer 160 can be implemented using any appropriate programming language, such as Java or C, using SQL/JDBC libraries. The QsJobServer is able to compute an MV efficiently at scale, where there could be a large number of joins. An SQL engine, such as Oracle can be used to efficiently execute the SQL, as applicable.

i. Alert Notifier

Alert notifier 162 is a microservice that takes alerts produced by EventGen 158 and sends the alerts to customers' integrated SIEM products (e.g., Splunk, Slack etc.). Alert notifier 162 can be implemented using any appropriate programming language, such as Java or C. Alert notifier 162 can be configured to use an email service (e.g., AWS SES or pagerduty) to send emails. Alert notifier 162 also provides templating support (e.g., Velocity or Moustache) to manage templates and structured notifications to SIEM products.

j. Reporting Module

Reporting module 164 is a microservice responsible for creating reports out of customer data (e.g., daily summaries of events, etc.) and providing those reports to customers (e.g., via email). Reporting module 164 can be implemented using any appropriate programming language, such as Java or C. Reporting module 164 can be configured to use an email service (e.g., AWS SES or pagerduty) to send emails. Reporting module 164 also provides templating support (e.g., Velocity or Moustache) to manage templates (e.g., for constructing HTML-based email).

k. Web Frontend

Web app 120 is a microservice that provides a user interface to data collected and processed on platform 102. Web app 120 provides login, authentication, query, data visualization, etc. features. Web app 120 includes both client and server elements. Example ways the server elements can be implemented are using Java DropWizard or Node.Js to serve business logic, and a combination of JSON/HTTP to manage the service. Example ways the client elements can be implemented are using frameworks such as React, Angular, or Backbone. JSON, jQuery, and JavaScript libraries (e.g., underscore) can also be used.

l. Query Service

Query service 166 is a microservice that manages all database access for web app 120. Query service 166 abstracts out data obtained from database 142 and provides a JSON-based REST API service to web app 120. Query service 166 generates SQL queries for the REST APIs that it receives at run time. Query service 166 can be implemented using any appropriate programming language, such as Java or C and SQL/JDBC libraries, or an SQL framework such as jOOQ. Query service 166 can internally make use of a variety of types of databases, including postgres, AWS Aurora (168) or Snowflake (142) to manage data for clients. Examples of tables that query service 166 manages are OLTP tables and data warehousing tables.

m. Redis

Redis (170) is an open source project which provides a key-value store. Platform 102 can use Redis as a cache to keep information for frontend services about users. Examples of such information include valid tokens for a customer, valid cookies of customers, the last time a customer tried to login, etc.

2. Example Processing

Figure 18:
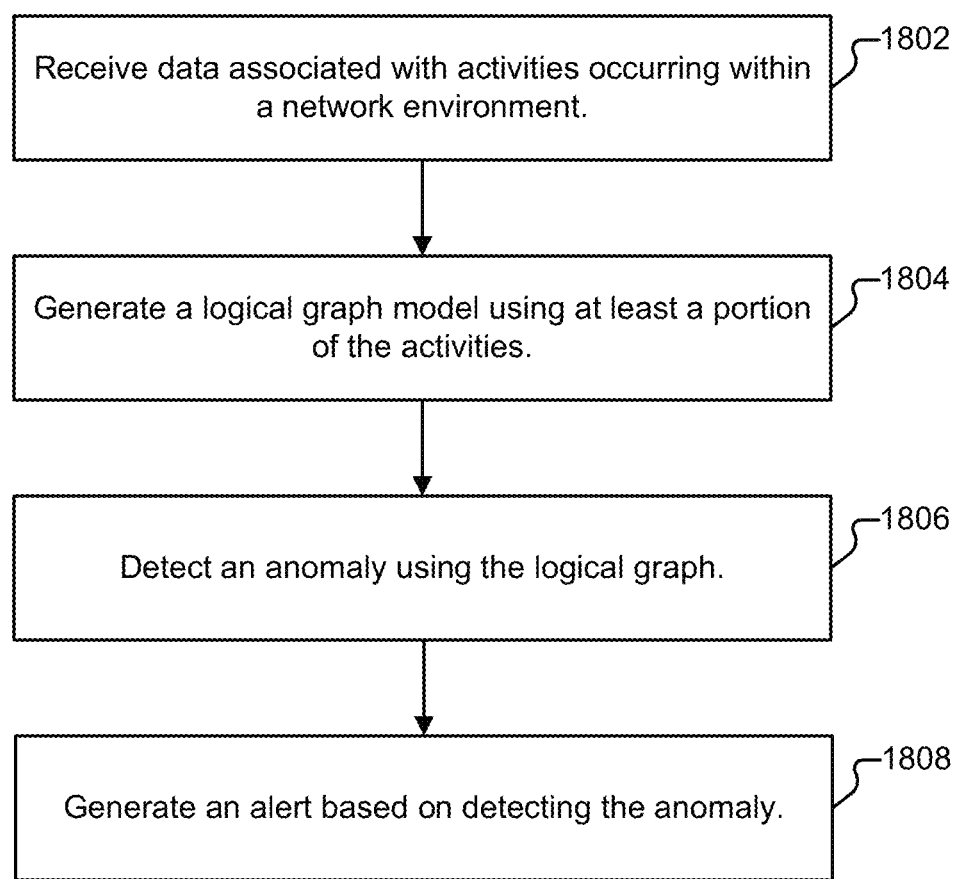
FIG. 18 illustrates an example of a process for detecting anomalies in a network environment.

FIG. 18 illustrates an example of a process for detecting anomalies in a network environment. In various embodiments, process 1800 is performed by platform 102. The process begins at 1802 when data associated with activities occurring in a network environment (such as ACME's datacenter) is received. One example of such data that can be received at 1802 is agent-collected data described above (e.g., in conjunction with process 200).

At 1804, a logical graph model is generated, using at least a portion of the monitored activities. A variety of approaches can be used to generate such logical graph models, and a variety of logical graphs can be generated (whether using the same, or different approaches). The following is one example of how data received at 1802 can be used to generate and maintain a model.

During bootstrap, platform 102 creates an aggregate graph of physical connections (also referred to herein as an aggregated physical graph) by matching connections that occurred in the first hour into communication pairs. Clustering is then performed on the communication pairs. Examples of such clustering, described in more detail below, include performing Matching Neighbor clustering and similarity (e.g., SimRank) clustering. Additional processing can also be performed (and is described in more detail below), such as by splitting clusters based on application type, and annotating nodes with DNS query information. The resulting graph (also referred to herein as a base graph or common graph) can be used to generate a variety of models, where a subset of node and edge types (described in more detail below) and their properties are considered in a given model. One example of a model is a UID to UID model (also referred to herein as a Uid2Uid model) which clusters together processes that share a username and show similar privilege change behavior. Another example of a model is a CType model, which clusters together processes that share command line similarity. Yet another example of a model is a PType model, which clusters together processes that share behaviors over time.

Each hour after bootstrap, a new snapshot is taken (i.e., data collected about a datacenter in the last hour is processed) and information from the new snapshot is merged with existing data to create and (as additional data is collected/processed) maintain a cumulative graph. The cumulative graph (also referred to herein as a cumulative PType graph and a polygraph) is a running model of how processes behave over time. Nodes in the cumulative graph are PType nodes, and provide information such as a list of all active processes and PIDs in the last hour, the number of historic total processes, the average number of active processes per hour, the application type of the process (e.g., the CType of the PType), and historic CType information/frequency. Edges in the cumulative graph can represent connectivity and provide information such as connectivity frequency. The edges can be weighted (e.g., based on number of connections, number of bytes exchanged, etc.). Edges in the cumulative graph (and snapshots) can also represent transitions.

One approach to merging a snapshot of the activity of the last hour into a cumulative graph is as follows. An aggregate graph of physical connections is made for the connections included in the snapshot (as was previously done for the original snapshot used during bootstrap). And, clustering/splitting is similarly performed on the snapshot's aggregate graph. Next, PType clusters in the snapshot's graph are compared against PType clusters in the cumulative graph to identify commonality.

One approach to determining commonality is, for any two nodes that are members of a given CmdType (described in more detail below), comparing internal neighbors and calculating a set membership Jaccard distance. The pairs of nodes are then ordered by decreasing similarity (i.e., with the most similar sets first). For nodes with a threshold amount of commonality (e.g., at least 66% members in common), any new nodes (i.e., appearing in the snapshot's graph but not the cumulative graph) are assigned the same PType identifier as is assigned to the corresponding node in the cumulative graph. For each node that is not classified (i.e., has not been assigned a PType identifier), a network signature is generated (i.e., indicative of the kinds of network connections the node makes, who the node communicates with, etc.). The following processing is then performed until convergence. If a match of the network signature is found in the cumulative graph, the unclassified node is assigned the PType identifier of the corresponding node in the cumulative graph. Any nodes which remain unclassified after convergence are new PTypes and are assigned new identifiers and added to the cumulative graph as new. As applicable, the detection of a new PType can be used to generate an alert. If the new PType has a new CmdType, a severity of the alert can be increased. If any surviving nodes (i.e., present in both the cumulative graph and the snapshot graph) change PTypes, such change is noted as a transition, and an alert can be generated. Further, if a surviving node changes PType and also changes CmdType, a severity of the alert can be increased.

Changes to the cumulative graph (e.g., a new PType or a new edge between two PTypes) can be used (e.g., at 1806) to detect anomalies (described in more detail below). Two example kinds of anomalies that can be detected by platform 102 include security anomalies (e.g., a user or process behaving in an unexpected manner) and devops/root cause anomalies (e.g., network congestion, application failure, etc.). Detected anomalies can be recorded and surfaced (e.g., to administrators, auditors, etc.), such as through alerts which are generated at 1808 based on anomaly detection.

Additional detail regarding processing performed, by various components depicted in FIG. 1 (whether performed individually or in combination), in conjunction with model/polygraph construction (e.g., as performed at 1804) are provided below.

a. Matching Neighbor Clustering

As explained above, an aggregated physical graph can be generated on a per customer basis periodically (e.g., once an hour) from raw physical graph information, by matching connections (e.g., between two processes on two virtual machines). In various embodiments, a deterministic fixed approach is used to cluster nodes in the aggregated physical graph (e.g., representing processes and their communications). As one example, Matching Neighbors Clustering (MNC) can be performed on the aggregated physical graph to determine which entities exhibit identical behavior and cluster such entities together.

Figure 19A:
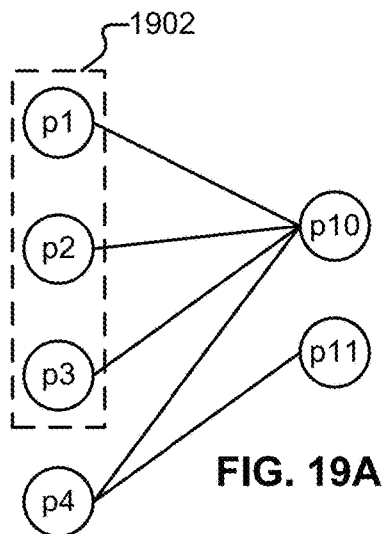
FIG. 19A depicts a set of example processes communicating with other processes.

FIG. 19A depicts a set of example processes (p1, p2, p3, and p4) communicating with other processes (p10 and p11). FIG. 19A is a graphical representation of a small portion of an aggregated physical graph showing (for a given hour) which processes in a datacenter communicate with which other processes. Using MNC, processes p1, p2, and p3 will be clustered together (1902), as they exhibit identical behavior (they communicate with p10 and only p10). Process p4, which communicates with both p10 and p11, will be clustered separately.

b. SimRank

In MNC, only those processes exhibiting identical (communication) behavior will be clustered. In various embodiments, an alternate clustering approach can also/instead be used, which uses a similarity measure (e.g., constrained by a threshold value, such as a 60% similarity) to cluster items. In some embodiments, the output of MNC is used as input to SimRank, in other embodiments, MNC is omitted.

Figure 19B:
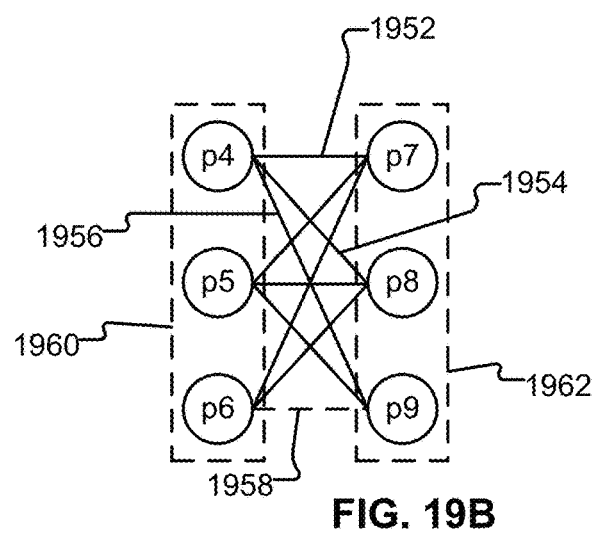
FIG. 19B depicts a set of example processes communicating with other processes.

FIG. 19B depicts a set of example processes (p4, p5, p6) communicating with other processes (p7, p8, p9). As illustrated, most of nodes p4, p5, and p6 communicate with most of nodes p7, p8, and p9 (as indicated in FIG. 19B with solid connection lines). As one example, process p4 communicates with process p7 (1952), process p8 (1954), and process p9 (1956). An exception is process p6, which communicates with processes p7 and p8, but does not communicate with process p9 (as indicated by dashed line 1958). If MNC were applied to the nodes depicted in FIG. 19B, nodes p4 and p5 would be clustered (and node p6 would not be included in their cluster).

One approach to similarity clustering is to use SimRank. In an embodiment of the SimRank approach, for a given node v in a directed graph, I(v) and O(v) denote the respective set of in-neighbors and out-neighbors of v. Individual in-neighbors are denoted as $I_i(v)$, for $1 \leq i \leq |I(v)|$, and individual out-neighbors are denoted as $O(v)$, for $1 \leq i \leq |O(v)|$. The similarity between two objects a and b can be denoted by $s(a,b) \in [1,0]$. A recursive equation (hereinafter "the SimRank equation") can be written for $s(a,b)$, where, if a=b, then $s(a,b)$ is defined as 1, otherwise, $$s(a, b) = \frac{C}{|I(a)||I(b)|} \sum_{i=1}^{|I(a)|} \sum_{j=1}^{|I(b)|} s(I_i(a), I_j(b))$$

where C is a constant between 0 and 1. One example value for the decay factor C is 0.8 (and a fixed number of iterations such as five). Another example value for the decay factor C is 0.6 (and/or a different number of iterations). In the event that a or b has no in-neighbors, similarity is set to $s(a,b)=0$, so the summation is defined to be 0 when $I(a)=\emptyset$ or $I(b)=\emptyset$.

The SimRank equations for a graph G can be solved by iteration to a fixed point. Suppose n is the number of nodes in G. For each iteration k, $n^2$ entries $s_k(*,*)$ are kept, where $s_k(a,b)$ gives the score between a and b on iteration k. Successive computations of $s_{k+1}(*,*)$ are made based on $s_k(*,*)$. Starting with $s_0(*,*)$, where each $s_0(a,b)$ is a lower bound on the actual SimRank score $$s(a, b): s_0(a, b) = \begin{cases} 1, \text{ if } a = b, \\ 0, \text{ if } a \neq b. \end{cases}$$

The SimRank equation can be used to compute $s_{k+1}(a, b)$ from $s_k(*,*)$ with $$s_{k+1}(a, b) = \frac{C}{|I(a)||I(b)|} \sum_{i=1}^{|I(a)|} \sum_{j=1}^{|I(b)|} s_k(I_i(a), I_j(b))$$

for $a \neq b$, and $s_{k+1}(a, b)=1$ for a=b. On each iteration k+1, the similarity of (a,b) is updated using the similarity scores of the neighbors of (a,b) from the previous iteration k according to the SimRank equation. The values $s_k(*,*)$ are nondecreasing as k increases.

Returning to FIG. 19B, while MNC would cluster nodes p4 and p5 together (and not include node p6 in their cluster), application of SimRank would cluster nodes p4-p6 into one cluster (1960) and also cluster nodes p7-p9 into another cluster (1962).

Figure 19C:
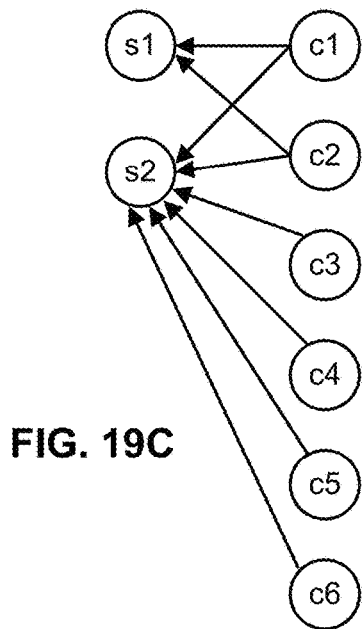
FIG. 19C depicts a set of example processes communicating with other processes.

FIG. 19C depicts a set of processes, and in particular server processes s1 and s2, and client processes c1, c2, c3, c4, c5, and c6. Suppose only nodes s1, s2, c1, and c2 are present in the graph depicted in FIG. 19C (and the other nodes depicted are omitted from consideration). Using MNC, nodes s1 and s2 would be clustered together, as would nodes c1 and c2. Performing SimRank clustering as described above would also result in those two clusters (s1 and s2, and c1 and c2). As previously mentioned, in MNC, identical behavior is required. Thus, if node c3 were now also present in the graph, MNC would not include c3 in a cluster with c2 and c1 because node c3 only communicates with node s2 and not node s1. In contrast, a SimRank clustering of a graph that includes nodes s1, s2, c1, c2, and c3 would result (based, e.g., on an applicable selected decay value and number of iterations) in a first cluster comprising nodes s1 and s2, and a second cluster of c1, c2, and c3. As an increasing number of nodes which communicate with server process s2, and do not also communicate with server process s1, are included in the graph (e.g., as c4, c5, and c6 are added), under SimRank, nodes s1 and s2 will become decreasingly similar (i.e., their intersection is reduced).

In various embodiments, SimRank is modified (from what is described above) to accommodate differences between the asymmetry of client and server connections. As one example, SimRank can be modified to use different thresholds for client communications (e.g., an 80% match among nodes c1-c6) and for server communications (e.g., a 60% match among nodes s1 and s2). Such modification can also help achieve convergence in situations such as where a server process dies on one node and restarts on another node.

c. Cluster Splitting (e.g., Based on Application)

The application of MNC/SimRank to an aggregated physical graph results in a smaller graph, in which processes which are determined to be sufficiently similar are clustered together. Typically, clusters generated as output of MNC will be underinclusive. For example, for the nodes depicted in FIG. 19B, process p6 will not be included in a cluster with processes p4 and p5, despite substantial similarity in their communication behaviors. The application of SimRank (e.g., to the output of MNC) helps mitigate the underinclusiveness of MNC, but can result in overly inclusive clusters. As one example, suppose (returning to the nodes depicted in FIG. 19A) that as a result of applying SimRank to the depicted nodes, nodes p1-p4 are all included in a single cluster. Both MNC and SimRank operate agnostically of which application a given process belongs to. Suppose processes p1-p3 each correspond to a first application (e.g., an update engine), and process p4 corresponds to a second application (e.g., sshd). Further suppose process p10 corresponds to contact with AWS. Clustering all four of the processes together (e.g., as a result of SimRank) could be problematic, particularly in a security context (e.g., where granular information useful in detecting threats would be lost).

As previously mentioned, platform 102 maintains a mapping between processes and the applications to which they belong. In various embodiments, the output of SimRank (e.g., SimRank clusters) is split based on the applications to which cluster members belong (such a split is also referred to herein as a "CmdType split"). If all cluster members share a common application, the cluster remains. If different cluster members originate from different applications, the cluster members are split along application-type (CmdType) lines. Using the nodes depicted in FIG. 19C as an example, suppose that nodes c1, c2, c3, and c5 all share "update engine" as the type of application to which they belong (sharing a CmdType). Suppose that node c4 belongs to "ssh," and suppose that node c6 belongs to "bash." As a result of SimRank, all six nodes (c1-c6) might be clustered into a single cluster. After a CmdType split is performed on the cluster, however, the single cluster will be broken into three clusters (c1, c2, c3, c5; c4; and c6). Specifically, the resulting clusters comprise processes associated with the same type of application, which exhibit similar behaviors (e.g., communication behaviors). Each of the three clusters resulting from the CmdType split represents, respectively, a node (also referred to herein as a PType) of a particular CmdType. Each PType is given a persistent identifier and stored persistently as a cumulative graph.

A variety of approaches can be used to determine a CmdType for a given process. As one example, for some applications (e.g., sshd), a one-to-one mapping exists between the CmdType and the application/binary name. Thus, processes corresponding to the execution of sshd will be classified using a CmdType of sshd. In various embodiments, a list of common application/binary names (e.g., sshd, apache, etc.) is maintained by platform 102 and manually curated as applicable. Other types of applications (e.g., Java, Python, and Ruby) are multi-homed, meaning that several very different applications may all execute using the binary name, "java." For these types of applications, information such as command line/execution path information can be used in determining a CmdType. In particular, the subapplication can be used as the CmdType of the application, and/or term frequency analysis (e.g., TF/IDF) can be used on command line information to group, for example, any marathon related applications together (e.g., as a python.marathon CmdType) and separately from other Python applications (e.g., as a python.airflow CmdType).

In various embodiments, machine learning techniques are used to determine a CmdType. The CmdType model is constrained such that the execution path for each CmdType is unique. One example approach to making a CmdType model is a random forest based approach. An initial CmdType model is bootstrapped using process parameters (e.g., available within one minute of process startup) obtained using one hour of information for a given customer (e.g., ACME). Examples of such parameters include the command line of the process, the command line of the process's parent(s) (if applicable), the uptime of the process, UID/EUID and any change information, TTY and any change information, listening ports, and children (if any). Another approach is to perform term frequency clustering over command line information to convert command lines into cluster identifiers.

The random forest model can be used (e.g., in subsequent hours) to predict a CmdType for a process (e.g., based on features of the process). If a match is found, the process can be assigned the matching CmdType. If a match is not found, a comparison between features of the process and its nearest CmdType (e.g., as determined using a Levenstein distance) can be performed. The existing CmdType can be expanded to include the process, or, as applicable, a new CmdType can be created (and other actions taken, such as generating an alert). Another approach to handling processes which do not match an existing CmdType is to designate such processes as unclassified, and once an hour, create a new random forest seeded with process information from a sampling of classified processes (e.g., 10 or 100 processes per CmdType) and the new processes. If a given new process winds up in an existing set, the process is given the corresponding CmdType. If a new cluster is created, a new CmdType can be created.

d. Graph Behavior Model (GBM)

i. GBM Overview

Concept

Conceptually, a polygraph represents the smallest possible graph of clusters that preserve a set of rules (e.g., in which nodes included in the cluster must share a CmdType and behavior). As a result of performing MNC, SimRank, and cluster splitting (e.g., CmdType splitting) many processes are clustered together based on commonality of behavior (e.g., communication behavior) and commonality of application type. Such clustering represents a significant reduction in graph size (e.g., compared to the original raw physical graph). Nonetheless, further clustering can be performed (e.g., by iterating on the graph data using the GBM to achieve such a polygraph). As more information within the graph is correlated, more nodes can be clustered together, reducing the size of the graph, until convergence is reached and no further clustering is possible.

Figure 19D:
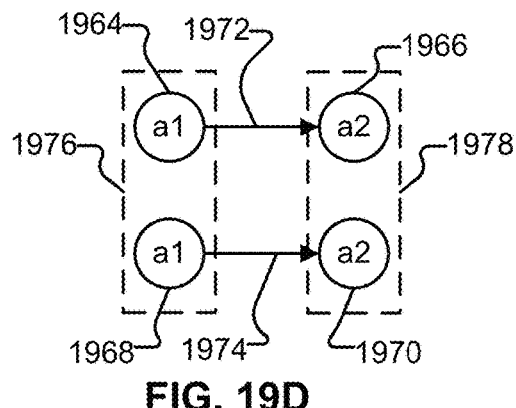
FIG. 19D depicts two pairs of clusters.

FIG. 19D depicts two pairs of clusters. In particular, cluster 1964 represents a set of client processes sharing the same CmdType ("a1"), communicating (collectively) with a server process having a CmdType ("a2"). Cluster 1968 also represents a set of client processes having a CmdType a1 communicating with a server process having a CmdType a2. The nodes in clusters 1964 and 1968 (and similarly nodes in 1966 and 1970) remain separately clustered (as depicted) after MNC/SimRank/CmdType splitting—isolated islands. One reason this could occur is where server process 1966 corresponds to processes executing on a first machine (having an IP address of 1.1.1.1). The machine fails and a new server process 1970 starts, on a second machine (having an IP address of 2.2.2.2) and takes over for process 1966.

Communications between a cluster of nodes (e.g., nodes 1964) and the first IP address can be considered different behavior from communications between the same set of nodes and the second IP address, and thus communications 1972 and 1974 will not be combined by MNC/SimRank in various embodiments. Nonetheless, it could be desirable for nodes 1964/1968 to be combined (into cluster 1976), and for nodes 1966/1970 to be combined (into cluster 1978), as representing (collectively) communications between a1 and a2. One task that can be performed by platform 102 is to use DNS query information to map IP addresses to logical entities. As will be described in more detail below, GBM 154 can make use of the DNS query information to determine that graph nodes 1964 and graph nodes 1968 both made DNS queries for "appserverabc.example.com," which first resolved to 1.1.1.1 and then to 2.2.2.2, and to combine nodes 1964/1968 and 1966/1970 together into a single pair of nodes (1976 communicating with 1978).

In various embodiments, GBM 154 operates in a batch manner in which it receives as input the nodes and edges of a graph for a particular time period along with its previous state, and generates as output clustered nodes, cluster membership edges, cluster-to-cluster edges, events, and its next state.

GBM 154 does not try to consider all types of entities and their relationships that may be available in a conceptual common graph all at once. Instead, GBM uses a concept of models where a subset of node and edge types and their properties are considered in a given model. Such an approach is helpful for scalability, and also to help preserve detailed information (of particular importance in a security context)—as clustering entities in a more complex and larger graph could result in less useful results. In particular, such an approach allows for different types of relationships between entities to be preserved/more easily analyzed.

While GBM 154 can be used with different models corresponding to different subgraphs, core abstractions remain the same across types of models:

Each node type in a GBM model is considered to belong to a class. The class can be thought of as a way for the GBM to split nodes based on the criteria it uses for the model. The class for a node is represented as a string whose value is derived from the node's key and properties depending on the GBM Model. Note that different GBM models may create different class values for the same node. For each node type in a given GBM model, GBM 154 can generate clusters of nodes for that type. A GBM generated cluster for a given member node type cannot span more than one class for that node type. GBM 154 generates edges between clusters that have the same types as the edges between source and destination cluster node types.

The processes described herein as being used for a particular model can be used (can be the same) across models, and different models can also be configured with different settings.

The node types and the edge types may correspond to existing types in the common graph node and edge tables but this is not necessary. Even when there is a correspondence, the properties provided to GBM 154 are not limited to the properties that are stored in the corresponding graph table entries. They can be enriched with additional information before being passed to GBM 154.

Graph Input

Logically, the input for a GBM model can be characterized in a manner that is similar to other graphs. Edge triplets can be expressed, for example, as an array of source node type, edge type, and destination node type. And, each node type is associated with node properties, and each edge type is associated with edge properties. Other edge triplets can also be used (and/or edge triplets can be extended) in accordance with various embodiments.

Note that the physical input to the GBM model need not (and does not, in various embodiments) conform to the logical input. For example, the edges in the PtypeConn model correspond to edges between Matching Neighbors (MN) clusters, where each process node has an MN cluster identifier property. In the User ID to User ID model (also referred to herein as the Uid2Uid model), edges are not explicitly provided separately from nodes (as the euid array in the node properties serves the same purpose). In both cases, however, the physical information provides the applicable information necessary for the logical input.

State Input

The state input for a particular GBM model can be stored in a file, a database, or other appropriate storage. The state file (from a previous run) is provided, along with graph data, except for when the first run for a given model is performed, or the model is reset. In some cases, no data may be available for a particular model in a given time period, and GBM may not be run for that time period. As data becomes available at a future time, GBM can run using the latest state file as input.

Graph Output

GBM 154 outputs cluster nodes, cluster membership edges, and inter-cluster relationship edges that are stored (in some embodiments) in the graph node tables: node_c, node_cm, and node_icr, respectively. The type names of nodes and edges conform to the following rules:

A given node type can be used in multiple different GBM models. The type names of the cluster nodes generated by two such models for that node type will be different.

For instance, process type nodes will appear in both PtypeConn and Uid2Uid models, but their cluster nodes will have different type names.

The membership edge type name is "MemberOf."

The edge type names for cluster-to-cluster edges will be the same as the edge type names in the underlying node-to-node edges in the input.

Event Types

The following are example events GBM 154 can generate:

new class
new cluster
new edge from class to class
split class (the notion that GBM 154 considers all nodes of a given type and class to be in the same cluster initially and if GBM 154 splits them into multiple clusters, it is splitting a class)
new edge from cluster and class
new edge between cluster and cluster
new edge from class to cluster One underlying node or edge in the logical input can cause multiple types of events to be generated. Conversely, one event can correspond to multiple nodes or edges in the input. Not every model generates every event type.

ii. GBMModels

Additional information regarding examples of data structures/models that can be used in conjunction with models used by platform 102 is provided in this section.

PTypeConn Model

This model clusters nodes of the same class that have similar connectivity relationships. For example, if two processes had similar incoming neighbors of the same class and outgoing neighbors of the same class, they could be clustered.

The node input to the PTypeConn model for a given time period includes non-interactive (i.e., not associated with tty) process nodes that had connections in the time period and the base graph nodes of other types (IP Service Endpoint (IPSep) comprising an IP address and a port), DNS Service Endpoint (DNSSep) and IPAddress) that have been involved in those connections. The base relationship is the connectivity relationship for the following type triplets:

Process, ConnectedTo, Process
Process, ConnectedTo, IP Service Endpoint (IPSep)
Process, ConnectedTo, DNS Service Endpoint (DNSSep)
IPAddress, ConnectedTo, ProcessProcess, DNS, ConnectedTo, Process The edge inputs to this model are the ConnectedTo edges from the MN cluster, instead of individual node-to-node ConnectedTo edges from the base graph. The membership edges created by this model refer to the base graph node type provided in the input.

Class Values:

The class values of nodes are determined as follows depending on the node type (e.g., Process nodes, IPSep nodes, DNSSep nodes, and IP Address nodes).

Process nodes:
if exe_path contains java then "java <cmdline_term_1> . . . "
else if exe_path contains python then "python <cmdline_term_1> . . . "
else "last_part_of_exe_path"

IPSep nodes:
if IP_internal then "IntIPS"
else if severity=0 then "<IP_addr>:<protocol>:<port>"
else "<IP_addr>:<port>_BadIP"

DNSSep nodes:
if IP_internal=1 then "<hostname>"
else if severity=0 then "<hostname>:<protocol>:port"
else "<hostname>:<port>_BadIP"

IPAddress nodes (will appear only on client side):
if TP internal=1 then "IPIntC"
else if severity=0 then "ExtIPC"
else "ExtBadIPC"

Events:

A new class event in this model for a process node is equivalent to seeing a new CType being involved in a connection for the first time. Note that this does not mean the CType was not seen before. It is possible that it was previously seen but did not make a connection at that time.

A new class event in this model for an IPSep node with IP_internal=0 is equivalent to seeing a connection to a new external IP address for the first time.

A new class event in this model for a DNSSep node is equivalent to seeing a connection to a new domain for the first time.

A new class event in this model for an IPAddress node with IP_internal=0 and severity=0 is equivalent to seeing a connection from any external IP address for the first time.

A new class event in this model for an IPAddress node with IP_internal=0 and severity >0 is equivalent to seeing a connection from any bad external IP address for the first time.

A new class to class to edge from a class for a process node to a class for a process node is equivalent to seeing a communication from the source CType making a connection to the destination CType for the first time.

A new class to class to edge from a class for a process node to a class for a DNSSep node is equivalent to seeing a communication from the source CType making a connection to the destination domain name for the first time.

IntPConn Model

This model is similar to the PtypeConn Model, except that connection edges between parent/child processes and connections between processes where both sides are not interactive are filtered out.

Uid2Uid Model

This model clusters processes with the same username that show similar privilege change behavior. For instance, if two processes with the same username had similar effective user values, launched processes with similar usernames, and were launched by processes with similar usernames, then they could be clustered.

An edge between a source cluster and destination cluster generated by this model means that all of the processes in the source cluster had a privilege change relationship to at least one process in the destination cluster.

The node input to this model for a given time period includes process nodes that are running in that period. The value of a class of process nodes is "<username>".

The base relationship that is used for clustering is privilege change, either by the process changing its effective user ID, or by launching a child process which runs with a different user.

The physical input for this model includes process nodes (only), with the caveat that the complete ancestor hierarchy of process nodes active (i.e., running) for a given time period is provided as input even if an ancestor is not active in that time period. Note that effective user IDs of a process are represented as an array in the process node properties, and launch relationships are available from ppid_hash fields in the properties as well.

A new class event in this model is equivalent to seeing a user for the first time.

A new class to class edge event is equivalent to seeing the source user making a privilege change to the destination user for the first time.

Ct2Ct Model

This model clusters processes with the same CType that show similar launch behavior. For instance, if two processes with the same CType have launched processes with similar CTypes, then they could be clustered.

The node input to this model for a given time period includes process nodes that are running in that period. The value class of process nodes is CType (similar to how it is created for the PtypeConn Model).

The base relationship that is used for clustering is a parent process with a given CType launching a child process with another given destination CType.

The physical input for this model includes process nodes (only) with the caveat that the complete ancestor hierarchy active process nodes (i.e., that are running) for a given time period is provided as input even if an ancestor is not active in that time period. Note that launch relationships are available from ppid_hash fields in the process node properties.

An edge between a source cluster and destination cluster generated by this model means that all of the processes in the source cluster launched at least one process in the destination cluster.

A new class event in this model is equivalent to seeing a CType for the first time. Note that the same type of event will be generated by the PtypeConn Model as well.

A new class to class edge event is equivalent to seeing the source CType launching the destination CType for the first time.

MTypeConn Model

This model clusters nodes of the same class that have similar connectivity relationships. For example, if two machines had similar incoming neighbors of the same class and outgoing neighbors of the same class, they could be clustered.

A new class event in this model will be generated for external IP addresses or (as applicable) domain names seen for the first time. Note that a new class to class to edge Machine, class to class for an IPSep or DNSName node will also be generated at the same time.

The membership edges generated by this model will refer to Machine, IPAddress, DNSName, and IPSep nodes in the base graph. Though the nodes provided to this model are IPAddress nodes instead of IPSep nodes, the membership edges it generates will refer to IPSep type nodes. Alternatively, the base graph can generate edges between Machine and IPSep node types. Note that the Machine to IPAddress edges have tcp_dst_ports/udp_dst_ports properties that can be used for this purpose.

The node input to this model for a given time period includes machine nodes that had connections in the time period and the base graph nodes of other types (IPAddress and DNSName) that were involved in those connections.

The base relationship is the connectivity relationship for the following type triplets:

Machine, ConnectedTo, Machine
Machine, ConnectedTo, IPAddress
Machine, ConnectedTo, DNSName
IPAddress, ConnectedTo, Machine, DNS, ConnectedTo, Machine The edge inputs to this model are the corresponding ConnectedTo edges in the base graph.

Class Values:

Machine:

The class value for all Machine nodes is "Machine."

The machine_terms property in the Machine nodes is used, in various embodiments, for labeling machines that are clustered together. If a majority of the machines clustered together share a term in the machine_terms, that term can be used for labeling the cluster.

IPSep:

The class value for IPSep nodes is determined as follows:
if IP_internal then "IntIPS"
else
if severity=0 then "<ip_addr>:<protocol>:<port>"
else "<IP_addr_BadIP>"

IPAddress:

The class value for IpAddress nodes is determined as follows:
if IP_internal then "IntIPC"
else
if severity=0 then "ExtIPC"
else "ExtBadIPC"

DNSName:

The class value for DNSName nodes is determined as follows:
if severity=0 then "<hostname>"
else then "<hostname>_BadIP"

iii. GBM Event Types

New Class Event

Structure:

The key field for this event type looks as follows (using the PtypeConn model as an example):

```
{
  "node": {
    "class": {
      "cid": "httpd"
    },
    "key": {
      "cid": "29654"
    },
    "type": "PtypeConn"
  }
}
```

It contains the class value and also the ID of the cluster where that class value is observed. Multiple clusters can be observed with the same value in a given time period. Accordingly, in some embodiments, GBM 154 generates multiple events of this type for the same class value.

The properties field looks as follows:

```
{
  "set_size": 5
}
```

The set_size indicates the size of the cluster referenced in the keys field.

Conditions:

For a given model and time period, multiple NewClass events can be generated if there is more than one cluster in that class. NewNode events will not be generated separately in this case.

New Class to Class Edge Event

Structure:

The key field for this event type looks as follows (using the PtypeConn model as an example):

"edge": {
  "dst_node": {
    "class": {

```
    "cid": "java war"
  },
  "key": {
    "cid": "27635"
  },
  "type": "PtypeConn"
},
"src_node": {
  "class": {
    "cid": "IntIPC"
  },
  "key": {
    "cid": "20881"
  },
  "type": "PtypeConn"
},
"type": "ConnectedTo"
}
}
```

The key field contains source and destination class values and also source and destination cluster identifiers (i.e., the src/dst_node:key.cid represents the src/dst cluster identifier).

In a given time period for a given model, an event of this type could involve multiple edges between different cluster pairs that have the same source and destination class values. GBM 154 can generate multiple events in this case with different source and destination cluster identifiers.

The props fields look as follows for this event type:

```
{
  "dst_set_size": 2,
  "src_set_size": 1
}
```

The source and destination sizes represent the sizes of the clusters given in the keys field.

Conditions:

For a given model and time period, multiple NewClassTo-Class events can be generated if there are more than one pair of clusters in that class pair. NewNodeToNode events are not generated separately in this case.

iv. Combining Events at the Class Level

For a given model and time period, the following example types of events can represent multiple changes in the underlying GBM cluster level graph in terms of multiple new clusters or multiple new edges between clusters:

NewClass
NewEdgeClassToClass
NewEdgeNodeToClass
NewEdgeClassToNode

Multiple NewClass events with the same model and class can be output if there are multiple clusters in that new class.

Multiple NewEdgeClassToClass events with the same model and class pair can be output if there are multiple new cluster edges within that class pair.

Multiple NewEdgeNodeToClass events with the same model and destination class can be output if there are multiple new edges from the source cluster to the destination clusters in that destination class (the first time seeing this class as a destination cluster class for the source cluster).

Multiple NewEdgeClassToNode events with the same model and source class can be output if there are multiple new edges from source clusters to the destination clusters in that source class (the first time seeing this class as a source cluster class for the destination cluster).

These events may be combined at the class level and treated as a single event when it is desirable to view changes at the class level, e.g., when one wants to know when there is a new CType.

Also note that different models may have partial overlap in the types of nodes they use from the base graph. Therefore, they can generate NewClass type events for the same class. NewClass events can also be combined across models when it is desirable to view changes at the class level.

III. Extended User Session Tracking

Using techniques herein, actions can be associated with processes and (e.g., by associating processes with users) actions can thus also be associated with extended user sessions. Such information can be used to track user behavior correctly, even where a malicious user attempts to hide his trail by changing user identities (e.g., through lateral movement). Extended user session tracking can also be useful in operational use cases without malicious intent, e.g., where users make original logins with distinct usernames (e.g., "charlie" or "dave") but then perform actions under a common username (e.g., "admin" or "support"). One such example is where multiple users with administrator privileges exist, and they need to gain superuser privilege to perform a particular type of maintenance. It may be desirable to know which operations are performed (as the superuser) by which original user when debugging issues. In the following examples describing extended user session tracking, reference is generally made to using the secure shell (ssh) protocol as implemented by openssh (on the server side) as the mechanism for logins. However, extended user session tracking is not limited to the ssh protocol or a particular limitation and the techniques described herein can be extended to other login mechanisms.

On any given machine, there will be a process that listens for and accepts ssh connections on a given port. This process can run the openssh server program running in daemon mode or it could be running another program (e.g., initd on a Linux system). In either case, a new process running openssh will be created for every new ssh login session and this process can be used to identify an ssh session on that machine. This process is called the "privileged" process in openssh.

After authentication of the ssh session, when an ssh client requests a shell or any other program to be run under that ssh session, a new process that runs that program will be created under (i.e., as a child of) the associated privileged process. If an ssh client requests port forwarding to be performed, the connections will be associated with the privileged process.

In modern operating systems such as Linux and Windows, each process has a parent process (except for the very first process) and when a new process is created the parent process is known. By tracking the parent-child hierarchy of processes, one can determine if a particular process is a descendant of a privileged openssh process and thus if it is associated with an ssh login session.

For user session tracking across machines (or on a single machine with multiple logins) in a distributed environment, it is established when two login sessions have a parent-child relationship. After that, the "original" login session, if any, for any given login session can be determined by following the parent relationship recursively.

Figure 20:
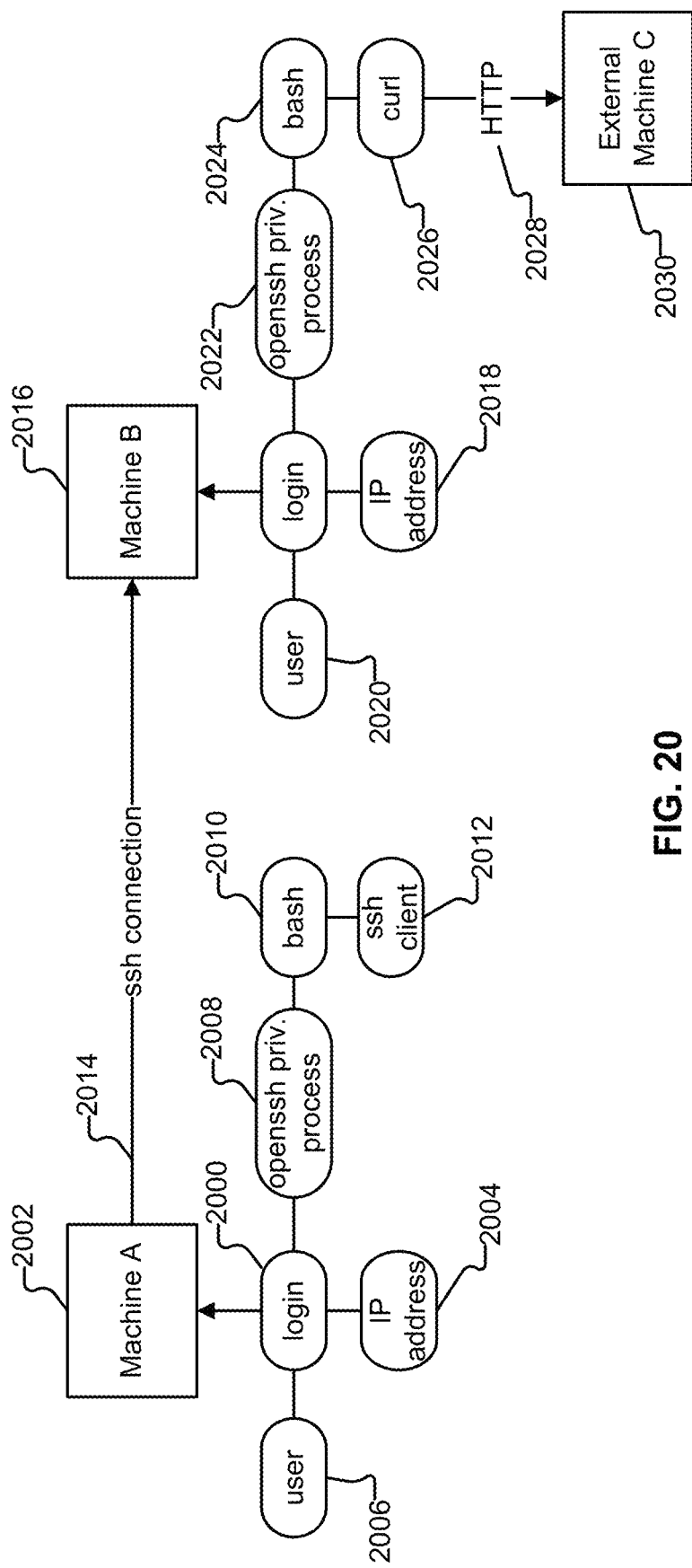
FIG. 20 is a representation of a user logging into a first machine, then into a second machine from the first machine, and then making an external connection.

FIG. 20 is a representation of a user logging into a first machine and then into a second machine from the first machine, as well as information associated with such actions. In the example of FIG. 20, a user, Charlie, logs into Machine A (2002) from a first IP address (2004). As part of the login process, he provides a username (2006). Once connected to Machine A, an openssh privileged process (2008) is created to handle the connection for the user, and a terminal session is created and a bash process (2010) is created as a child. Charlie launches an ssh client (2012) from the shell, and uses it to connect (2014) to Machine B (2016). As with the connection he makes to Machine A, Charlie's connection to Machine B will have an associated incoming IP address (2018), in this case, the IP address of Machine A. And, as part of the login process with Machine B, Charlie will provide a username (2020) which need not be the same as username 2006. An openssh privileged process (2022) is created to handle the connection, and a terminal session and child bash process (2024) will be created. From the command line of Machine B, Charlie launches a curl command (2026), which opens an HTTP connection (2028) to an external Machine C (2030).

Figure 21:
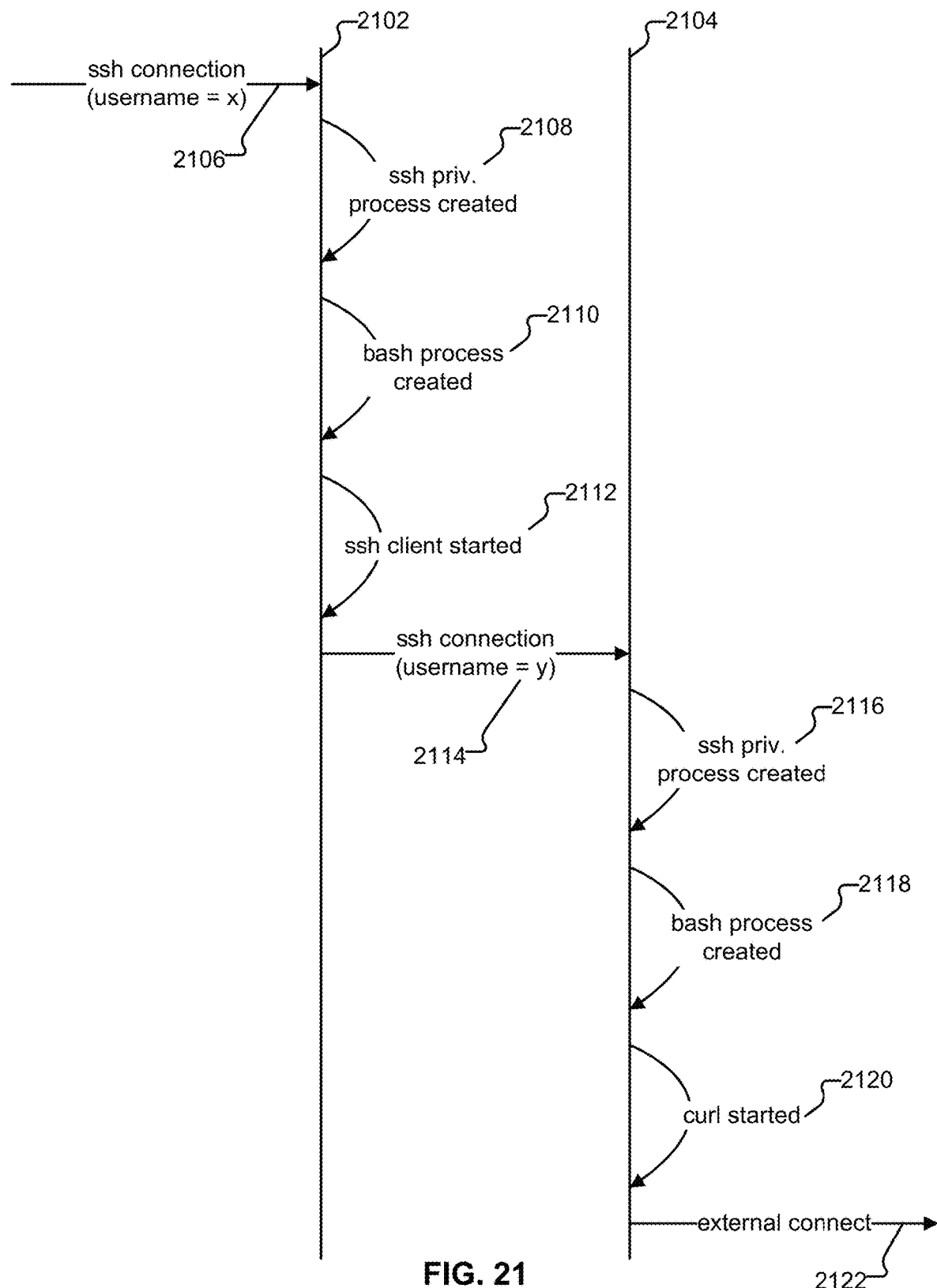
FIG. 21 is an alternate representation of actions occurring in FIG. 20.

FIG. 21 is an alternate representation of actions occurring in FIG. 20, where events occurring on Machine A are indicated along line 2102, and events occurring on Machine B are indicated along line 2104. As shown in FIG. 21, an incoming ssh connection is received at Machine A (2106). Charlie logs in (as user "x") and an ssh privileged process is created to handle Charlie's connection (2108). A terminal session is created and a bash process is created (2110) as a child of process 2108. Charlie wants to ssh to Machine B, and so executes an ssh client on Machine A (2112), providing credentials (as user "y") at 2114. Charlie logs into Machine B, and an ssh privileged process is created to handle Charlie's connection (2116). A terminal session is created and a bash process is created (2118) as a child of process 2116. Charlie then executes curl (2120) to download content from an external domain (via connection 2122).

The external domain could be a malicious domain, or it could be benign. Suppose the external domain is malicious (and, e.g., Charlie has malicious intent). It would be advantageous (e.g., for security reasons) to be able to trace the contact with the external domain back to Machine A, and then back to Charlie's IP address. Using techniques described herein (e.g., by correlating process information collected by various agents), such tracking of Charlie's activities back to his original login (2000) can be accomplished. In particular, an extended user session can be tracked that associates Charlie's ssh processes together with a single original login and thus original user.

A. Data Model

As previously explained, software agents (such as agent 112) run on machines (such as machine 116) and detect new connections, processes, and logins. As also previously explained, such agents send associated records to platform 102 which includes one or more datastores (e.g., database 142) for persistently storing such data. Such data can be modeled using logical tables, also persisted in datastores (e.g., in a relational database that provides an SQL interface), allowing for querying of the data. Other datastores such as graph oriented databases and/or hybrid schemes can also be used.

1. Common Identifiers

The following identifiers are commonly used in the tables:
MID
PID_hash

An ssh login session can be identified uniquely by an (MID, PID_hash) tuple. The MID is a machine identifier that is unique to each machine, whether physical or virtual, across time and space. Operating systems use numbers called process identifiers (PIDs) to identify processes running at a given time. Over time processes may die and new processes may be started on a machine or the machine itself may restart. The PID is not necessarily unique across time in that the same PID value can be reused for different processes at different times. In order to track process descendants across time, one should therefore account for time as well. In order to be able to identify a process on a machine uniquely across time, another number called a PID_hash is generated for the process. In various embodiments, the PID_hash is generated using a collision-resistant hash function that takes the PID, start time, and (in various embodiments, as applicable) other properties of a process.

2. Input Data Model

Input data collected by agents comprises the input data model and is represented by the following logical tables:
connections
processes
logins a. Connections Table The connections table maintains records of TCP/IP connections observed on each machine. Example columns included in a connections table are as follows:

| Column Name | Description |
| --- | --- |
| MID | Identifier of the machine that the connection was observed on. |
| start_time | Connection start time. |
| PID_hash | Identifier of the process that was associated with the connection. |
| src_IP_addr | Source IP address (the connection was initiated from this IP address). |
| src_port | Source port. |
| dst_IP_addr | Destination IP address (the connection was made to this IP address). |
| dst_port | Destination port. |
| Prot | Protocol (TCP or UDP). |
| Dir | Direction of the connection (incoming or outgoing) with respect to this machine. |

The source fields (IP address and port) correspond to the side from which the connection was initiated. On the destination side, the agent associates an ssh connection with the privileged ssh process that is created for that connection.

For each connection in the system, there will be two records in the table, assuming that the machines on both sides of the connection capture the connection. These records can be matched based on equality of the tuple (src_IP_addr, src_port, dst_IP_addr, dst_port, Prot) and proximity of the start_time fields (e.g., with a one minute upper threshold between the start_time fields).

b. Processes Table

The processes table maintains records of processes observed on each machine. It has the following columns:

| Column Name | Description |
| --- | --- |
| MID | Identifier of the machine that the process was observed on. |
| PID_hash | Identifier of the process. |
| start_time | Start time of the process. |
| exe_path | The executable path of the process. |
| PPID_hash | Identifier of the parent process. | c. Logins Table

The logins table maintains records of logins to the machines. It has the following columns:

| Column Name | Description |
| --- | --- |
| MID | Identifier of the machine that the login was observed on. |
| sshd_PID_hash | Identifier of the sshd privileged process associated with login. |
| login_time | Time of login. |
| login_username | Username used in login. |

3. Output Data Model

The output data generated by session tracking is represented with the following logical tables:

- login-local-descendant
- login-connection
- login-lineage

Using data in these tables, it is possible to determine descendant processes of a given ssh login session across the environment (i.e., spanning machines). Conversely, given a process, it is possible to determine if it is an ssh login descendant as well as the original ssh login session for it if so.

a. Login-Local-Descendant Table

The login-local-descendant table maintains the local (i.e., on the same machine) descendant processes of each ssh login session. It has the following columns:

| Column Name | Description |
| --- | --- |
| MID | Identifier of the machine that the login was observed on. |
| sshd_PID_hash | Identifier of the sshd privileged process associated with login. |
| login_time | Time of login. |
| login_username | Username used in login. | b. Login-Connections Table

The login-connections table maintains the connections associated with ssh logins. It has the following columns:

| Column Name | Description |
| --- | --- |
| MID | Identifier of the machine that the process was observed on. |
| sshd_PID_hash | Identifier of the sshd privileged process associated with login. |
| login_time | Time of login. |
| login_username | The username used in the login. |
| src_IP_addr | Source IP address (connection was initiated from this IP address). |
| src_port | Source port. |
| dst_IP_addr | Destination IP address (connection was made to this IP address). |
| dst_port | Destination port. | c. Login-Lineage Table

The login-lineage table maintains the lineage of ssh login sessions. It has the following columns:

| Column Name | Description |
| --- | --- |
| MID | Identifier of the machine that the ssh login was observed on. |
| sshd_PID_hash | Identifier of the sshd privileged process associated with the login. |
| parent_MID | Identifier of the machine that the parent ssh login was observed on. |
| parent_sshd_PID_hash | Identifier of the sshd privileged process associated with the parent login. |
| origin_MID | Identifier of the machine that the origin ssh login was observed on. |
| origin_sshd_PID_hash | Identifier of the sshd privileged process associated with the origin login. |

The parent_MID and parent_sshd_PID_hash columns can be null if there is no parent ssh login. In that case, the (MID, sshd_PID_hash) tuple will be the same as the (origin MID, origin_sshd_PID_hash) tuple.

B. Example Processing

Figure 22:
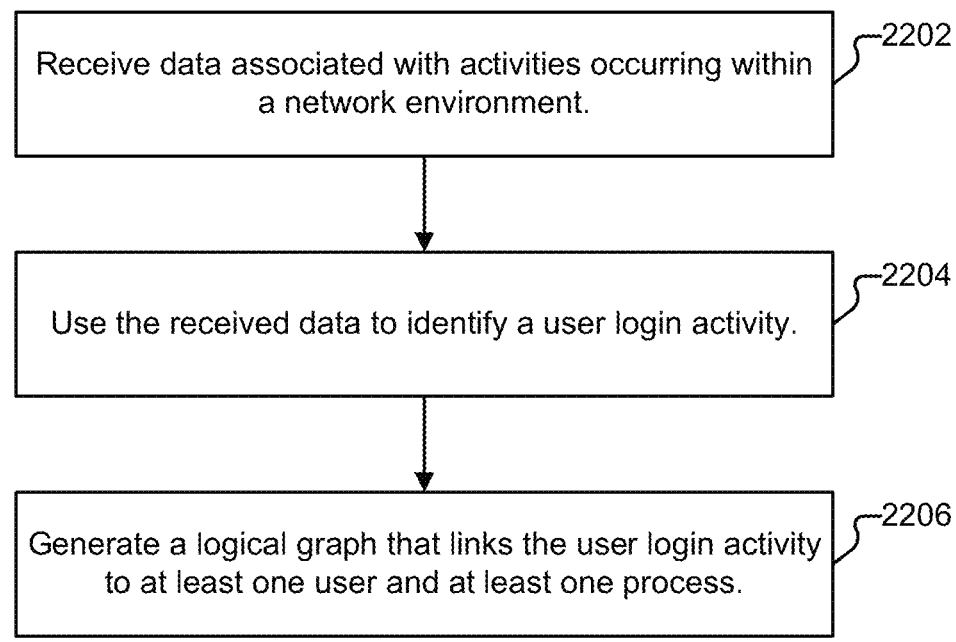
FIG. 22 illustrates an example of a process for performing extended user tracking.

FIG. 22 illustrates an example of a process for performing extended user tracking. In various embodiments, process 2200 is performed by platform 102. The process begins at 2202 when data associated with activities occurring in a network environment (such as ACME's datacenter) is received. One example of such data that can be received at 2202 is agent-collected data described above (e.g., in conjunction with process 200). At 2204, the received network activity is used to identify user login activity. And, at 2206, a logical graph that links the user login activity to at least one user and at least one process is generated (or updated, as applicable). Additional detail regarding process 2200, and in particular, portions 2204 and 2206 of process 2200 are described in more detail below (e.g., in conjunction with discussion of FIG. 24).

Figure 23:
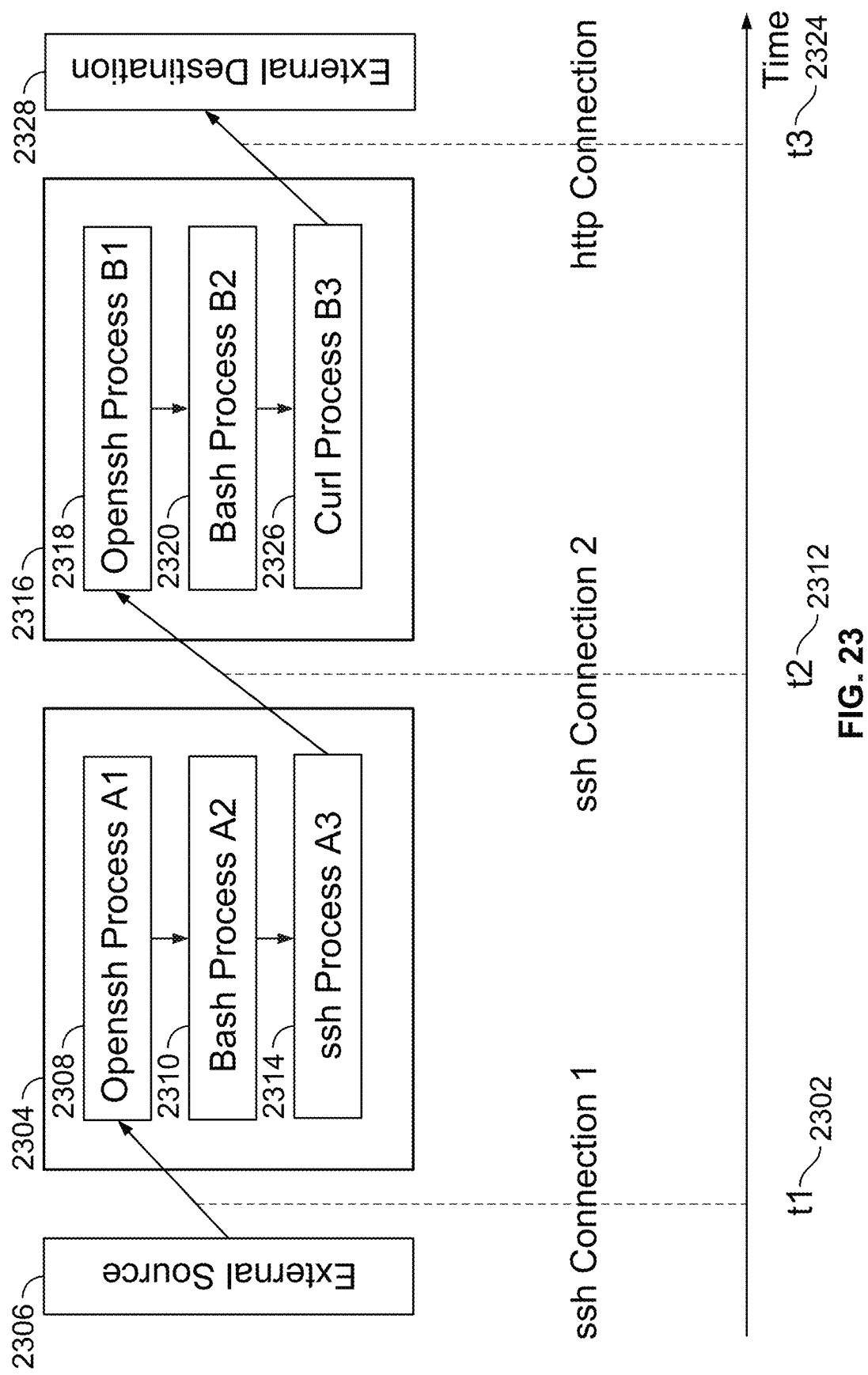
FIG. 23 is a representation of a user logging into a first machine, then into a second machine from the first machine, and then making an external connection.

FIG. 23 depicts a representation of a user logging into a first machine, then into a second machine from the first machine, and then making an external connection. The scenario depicted in FIG. 23 is used to describe an example of processing that can be performed on data collected by agents to generate extended user session tracking information. FIG. 23 is an alternate depiction of the information shown in FIGS. 20 and 21.

At time t1 (2302), a first ssh connection is made to Machine A (2304) from an external source (2306) by a user having a username of "X." In the following example, suppose the external source has an IP address of 1.1.1.10 and uses source port 10000 to connect to Machine A (which has an IP address of 2.2.2.20 and a destination port 22). External source 2306 is considered an external source because its IP address is outside of the environment being monitored (e.g., is a node outside of ACME's datacenter, connecting to a node inside of ACME's datacenter).

A first ssh login session LS1 is created on machine A for user X. The privileged openssh process for this login is A1 (2308). Under the login session LS1, the user creates a bash shell process with PID_hash A2 (2310).

At time t2 (2312), inside the bash shell process A2, the user runs an ssh program under a new process A3 (2314) to log in to machine B (2316) with a different username ("Y"). In particular, an ssh connection is made from source IP address 2.2.2.20 and source port 10001 (Machine A's source information) to destination IP address 2.2.2.21 and destination port 22 (Machine B's destination information).

A second ssh login session LS2 is created on machine B for user Y. The privileged openssh process for this login is B1 (2318). Under the login session LS2, the user creates a bash shell process with PID_hash B2 (2320).

At time t3 (2324), inside the bash shell process B2, the user runs a curl command under a new process B3 (2326) to download a file from an external destination (2328). In particular, an HTTPS connection is made from source IP address 2.2.2.21 and source port 10002 (Machine B's source information) to external destination IP address 3.3.3.30 and destination port 443 (the external destination's information).

Using techniques described herein, it is possible to determine the original user who initiated the connection to external destination 2328, which in this example is a user having the username X on machine A (where the extended user session can be determined to start with ssh login session LS1).

Based on local descendant tracking, the following determinations can be on machine A and B without yet having performed additional processing (described in more detail below):
  A3 is a descendant of A1 and thus associated with LS1.
  The connection to the external domain from machine B is initiated by B3.
  B3 is a descendant of B1 and is thus associated with LS2.
  Connection to the external domain is thus associated with LS2.

An association between A3 and LS2 can be established based on the fact that LS2 was created based on an ssh connection initiated from A3. Accordingly, it can be determined that LS2 is a child of LS1.

To determine the user responsible for making the connection to the external destination (e.g., if it were a known bad destination), first, the process that made the connection would be traced, i.e., from B3 to LS2. Then LS2 would be traced to LS1 (i.e., LS1 is the origin login session for LS2). Thus the user for this connection is the user for LS1, i.e., X. As represented in FIG. 23, one can visualize the tracing by following the links (in the reverse direction of arrows) from external source 2328 to A1 (2308).

In the example scenario, it is assumed that both ssh connections occur in the same analysis period. However, the approaches described herein will also work for connections and processes that are created in different time periods.

Figure 24:
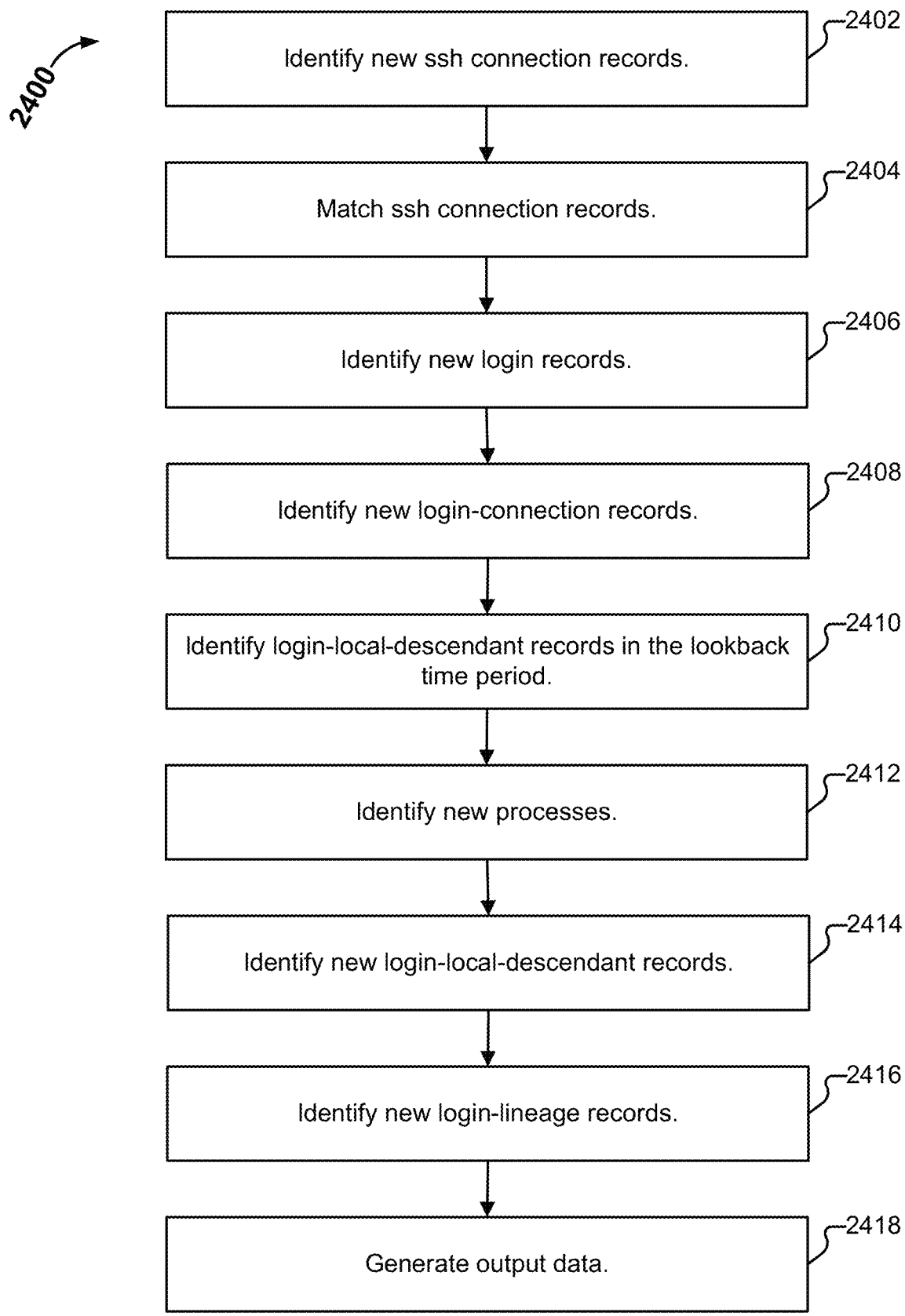
FIG. 24 illustrates an example of a process for performing extended user tracking.

FIG. 24 illustrates an example of a process for performing extended user tracking. In various embodiments, process 2400 is performed periodically (e.g., once an hour in a batch fashion) by ssh tracker 148 to generate new output data. In general, batch processing allows for efficient analysis of large volumes of data. However, the approach can be adapted, as applicable, to process input data on a record-by-record fashion while maintaining the same logical data processing flow. As applicable the results of a given portion of process 2400 are stored for use in a subsequent portion.

The process begins at 2402 when new ssh connection records are identified. In particular, new ssh connections started during the current time period are identified by querying the connections table. The query uses filters on the start_time and dst_port columns. The values of the range filter on the start_time column are based on the current time period. The dst_port column is checked against ssh listening port(s). By default, the ssh listening port number is 22. However, as this could vary across environments, the port(s) that openssh servers are listening to in the environment can be determined by data collection agents dynamically and used as the filter value for the dst_port as applicable. In the scenario depicted in FIG. 23, the query result will generate the records shown in FIG. 25A. Note that for the connection between machine A and B, the two machines are likely to report start_time values that are not exactly the same but close enough to be considered matching (e.g., within one minute or another appropriate amount of time). In the above table, they are shown to be the same for simplicity.

At 2404, ssh connection records reported from source and destination sides of the same connection are matched. The ssh connection records (e.g., returned from the query at 2402) are matched based on the following criteria:
  The five tuples (src_IP, dst_IP, IPprot, src_port, dst_port) of the connection records must match.
  The delta between the start times of the connections must be within a limit that would account for the worst case clock difference expected between two machines in the environment and typical connection setup latency.
  If there are multiple matches possible, then the match with the smallest time delta is chosen.

Note that record 2502 from machine A for the incoming connection from the external source cannot be matched with another record as there is an agent only on the destination side for this connection. Example output of portion 2404 of process 2400 is shown in FIG. 25B. The values in the dst_PID_hash column (2504) are that of the sshd privileged process associated with ssh logins.

At 2406, new logins during the current time period are identified by querying the logins table. The query uses a range filter on the login_time column with values based on the current time period. In the example depicted in FIG. 23, the query result will generate the records depicted in FIG. 25C.

At 2408, matched ssh connection records created at 2404 and new login records created at 2406 are joined to create new records that will eventually be stored in the login-connection table. The join condition is that dst_MID of the matched connection record is equal to the MID of the login record and the dst_PID_hash of the matched connection record is equal to the sshd_PID_hash of the login record. In the example depicted in FIG. 23, the processing performed at 2408 will generate the records depicted in FIG. 25D.

At 2410, login-local-descendant records in the lookback time period are identified. It is possible that a process that is created in a previous time period makes an ssh connection in the current analysis batch period. Although not depicted in the example illustrated in FIG. 23, consider a case where bash process A2 does not create ssh process A3 right away but instead that the ssh connection A3 later makes to machine B is processed in a subsequent time period than the one where A2 was processed. While processing this subsequent time period in which processes A3 and B1 are seen, knowledge of A2 would be useful in establishing that B1 is associated with A3 (via ssh connection) which is associated with A2 (via process parentage) which in turn would be useful in establishing that the parent of the second ssh login is the first ssh login. The time period for which look back is performed can be limited to reduce the amount of historical data that is considered. However, this is not a requirement (and the amount of look back can be determined, e.g., based on available processing resources). The login local descendants in the lookback time period can be identified by querying the login-local-descendant table. The query uses a range filter on the login_time column where the range is from start_time_of_current_period-lookback_time to start_time_of_current_period. (No records as a result of performing 2410 on the scenario depicted in FIG. 23 are obtained, as only a single time period is applicable in the example scenario.)

At 2412, new processes that are started in the current time period are identified by querying the processes table. The query uses a range filter on the start_time column with values based on the current time period. In the example depicted in FIG. 23, the processing performed at 2412 will generate the records depicted in FIG. 25E.

At 2414, new login-local-descendant records are identified. The purpose is to determine whether any of the new processes in the current time period are descendants of an ssh login process and if so to create records that will be stored in the login-local-descendant table for them. In order to do so, the parent-child relationships between the processes are recursively followed. Either a top down or bottom up approach can be used. In a top down approach, the ssh local descendants in the lookback period identified at 2410, along with new ssh login processes in the current period identified at 2408 are considered as possible ancestors for the new processes in the current period identified at 2412.

Conceptually, the recursive approach can be considered to include multiple sub-steps where new processes that are identified to be ssh local descendants in the current sub-step are considered as ancestors for the next step. In the example scenario depicted in FIG. 23, the following descendancy relationships will be established in two sub-steps:

Sub-Step 1:

Process A2 is a local descendant of LS1 (i.e., MID=A, sshd_PID_hash=A1) because it is a child of process A1 which is the login process for LS1.

Process B2 is a local descendant of LS2 (i.e., MID=B, sshd_PID_hash=B1) because it is a child of process B1 which is the login process for LS2.

Sub-Step 2:

Process A3 is a local descendant of LS1 because it is a child of process A2 which is associated to LS1 in sub-step 1.

Process B3 is a local descendant of LS2 because it is a child of process B1 which is associated to LS2 in sub-step 1.

Implementation portion 2414 can use a datastore that supports recursive query capabilities, or, queries can be constructed to process multiple conceptual sub-steps at once. In the example depicted in FIG. 23, the processing performed at 2414 will generate the records depicted in FIG. 25F. Note that the ssh privileged processes associated with the logins are also included as they are part of the login session.

At 2416, the lineage of new ssh logins created in the current time period is determined by associating their ssh connections to source processes that may be descendants of other ssh logins (which may have been created in the current period or previous time periods). In order to do so, first an attempt is made to join the new ssh login connections in the current period (identified at 2408) with the combination of the login local descendants in the lookback period (identified at 2410) and the login local descendants in the current time period (identified at 2412). This will create adjacency relationships between child and parent logins. In the example depicted in FIG. 23, the second ssh login connection will be associated with process A3 and an adjacency relationship between the two login sessions will be created (as illustrated in FIG. 25G).

Next, the adjacency relationships are used to find the original login sessions. While not shown in the sample scenario, there could be multiple ssh logins in a chain in the current time period, in which case a recursive approach (as in 2414) could be used. At the conclusion of portion 2416, the login lineage records depicted in FIG. 25H will be generated.

Finally, at 2418, output data is generated. In particular, the new login-connection, login-local-descendant, and login-lineage records generated at 2408, 2414, and 2416 are inserted into their respective output tables (e.g., in a transaction manner).

An alternate approach to matching TCP connections between machines running an agent is for the client to generate a connection GUID and send it in the connection request (e.g., the SYN packet) it sends and for the server to extract the GUID from the request. If two connection records from two machines have the same GUID, they are for the same connection. Both the client and server will store the GUID (if exists) in the connection records they maintain and report. On the client side, the agent can configure the network stack (e.g. using IP tables functionality on Linux) to intercept an outgoing TCP SYN packet and modify it to add the generated GUID as a TCP option. On the server side, the agent already extracts TCP SYN packets and thus can look for this option and extract the GUID if it exists.

IV. Graph-Based User Tracking and Threat Detection

Administrators and other users of network environments (e.g., ACME's datacenter 104) often change roles to perform tasks. As one example, suppose that at the start of a workday, an administrator (hereinafter "Joe Smith") logs in to a console, using an individualized account (e.g., username=joe.smith). Joe performs various tasks as himself (e.g., answering emails, generating status reports, writing code, etc.). For other tasks (e.g., performing updates), Joe may require different/additional permission than his individual account has (e.g., root privileges). One way Joe can gain access to such permissions is by using sudo, which will allow Joe to run a single command with root privileges. Another way Joe can gain access to such permissions is by su or otherwise logging into a shell as root. After gaining root privileges, another thing that Joe can do is switch identities. As one example, to perform administrative tasks, Joe may use "su help" or "su database-admin" to become (respectively) the help user or the database-admin user on a system. He may also connect from one machine to another, potentially changing identities along the way (e.g., logging in as joe.smith at a first console, and connecting to a database server as database-admin). When he's completed various administrative tasks, Joe can relinquish his root privileges by closing out of any additional shells created, reverting back to a shell created for user joe.smith.

While there are many legitimate reasons for Joe to change his identity throughout the day, such changes may also correspond to nefarious activity. Joe himself may be nefarious, or Joe's account (joe.smith) may have been compromised by a third party (whether an "outsider" outside of ACME's network, or an "insider"). Using techniques described herein, the behavior of users of the environment can be tracked (including across multiple accounts and/or multiple machines) and modeled (e.g., using various graphs described herein). Such models can be used to generate alerts (e.g., to anomalous user behavior). Such models can also be used forensically, e.g., helping an investigator visualize various aspects of a network and activities that have occurred, and to attribute particular types of actions (e.g., network connections or file accesses) to specific users.

In a typical day in a datacenter, a user (e.g., Joe Smith) will log in, run various processes, and (optionally) log out. The user will typically log in from the same set of IP addresses, from IP addresses within the same geographical area (e.g., city or country), or from historically known IP addresses/geographical areas (i.e., ones the user has previously/occasionally used). A deviation from the user's typical (or historical) behavior indicates a change in login behavior. However, it does not necessarily mean that a breach has occurred. Once logged into a datacenter, a user may take a variety of actions. As a first example, a user might execute a binary/script. Such binary/script might communicate with other nodes in the datacenter, or outside of the datacenter, and transfer data to the user (e.g., executing "curl" to obtain data from a service external to the datacenter). As a second example, the user can similarly transfer data (e.g., out of the datacenter), such as by using POST. As a third example, a user might change privilege (one or more times), at which point the user can send/receive data as per above. As a fourth example, a user might connect to a different machine within the datacenter (one or more times), at which point the user can send/receive data as per the above.

In various embodiments, the above information associated with user behavior is broken into four tiers. The tiers represent example types of information that platform 102 can use in modeling user behavior:

1. The user's entry point (e.g., domains, IP addresses, and/or geolocation information such as country/city) from which a user logs in.

2. The login user and machine class.

3. Binaries, executables, processes, etc. a user launches.

4. Internal servers with which the user (or any of the user's processes, child processes, etc.) communicates, and external contacts (e.g., domains, IP addresses, and/or geolocation information such as country/city) with which the user communicates (i.e., transfers data).

In the event of a security breach, being able to concretely answer questions about such information can be very important. And, collectively, such information is useful in providing an end-to-end path (e.g., for performing investigations).

In the following example, suppose a user ("UserA") logs into a machine ("Machine01") from a first IP address ("IP01"). Machine01 is inside a datacenter. UserA then launches a script ("runnable.sh") on Machine01. From Machine01, UserA next logs into a second machine ("Machine02") via ssh, also as UserA, also within the datacenter. On Machine02, UserA again launches a script ("new_runnable.sh"). On Machine02, UserA then changes privilege, becoming root on Machine02. From Machine02, UserA (now as root) logs into a third machine ("Machine03") in the datacenter via ssh, as root on Machine03. As root on Machine03, the user executes a script ("collect_data.sh") on Machine03. The script internally communicates (as root) to a MySQL-based service internal to the datacenter, and downloads data from the MySQL-based service. Finally, as root on Machine03, the user externally communicates with a server outside the datacenter ("External01"), using a POST command. To summarize what has occurred, in this example, the source/entry point is IP01. Data is transferred to an external server External01. The machine performing the transfer to External01 is Machine03. The user transferring the data is "root" (on Machine03), while the actual user (hiding behind root) is UserA.

In the above scenario, the "original user" (ultimately responsible for transmitting data to External01) is UserA, who logged in from IP01. Each of the processes ultimately started by UserA, whether started at the command line (tty) such as "runnable.sh" or started after an ssh connection such as "new_runnable.sh," and whether as UserA, or as a subsequent identity, are all examples of child processes which can be arranged into a process hierarchy.

As previously mentioned, machines can be clustered together logically into machine clusters. One approach to clustering is to classify machines based on information such as the types of services they provide/binaries they have installed upon them/processes they execute. Machines sharing a given machine class (as they share common binaries/services/etc.) will behave similarly to one another. Each machine in a datacenter can be assigned to a machine cluster, and each machine cluster can be assigned an identifier (also referred to herein as a machine class). One or more tags can also be assigned to a given machine class (e.g., database_servers_west or prod_web_frontend). One approach to assigning a tag to a machine class is to apply term frequency analysis (e.g., TF/IDF) to the applications run by a given machine class, selecting as tags those most unique to the class. Platform 102 can use behavioral baselines taken for a class of machines to identify deviations from the baseline (e.g., by a particular machine in the class).

Figure 26:
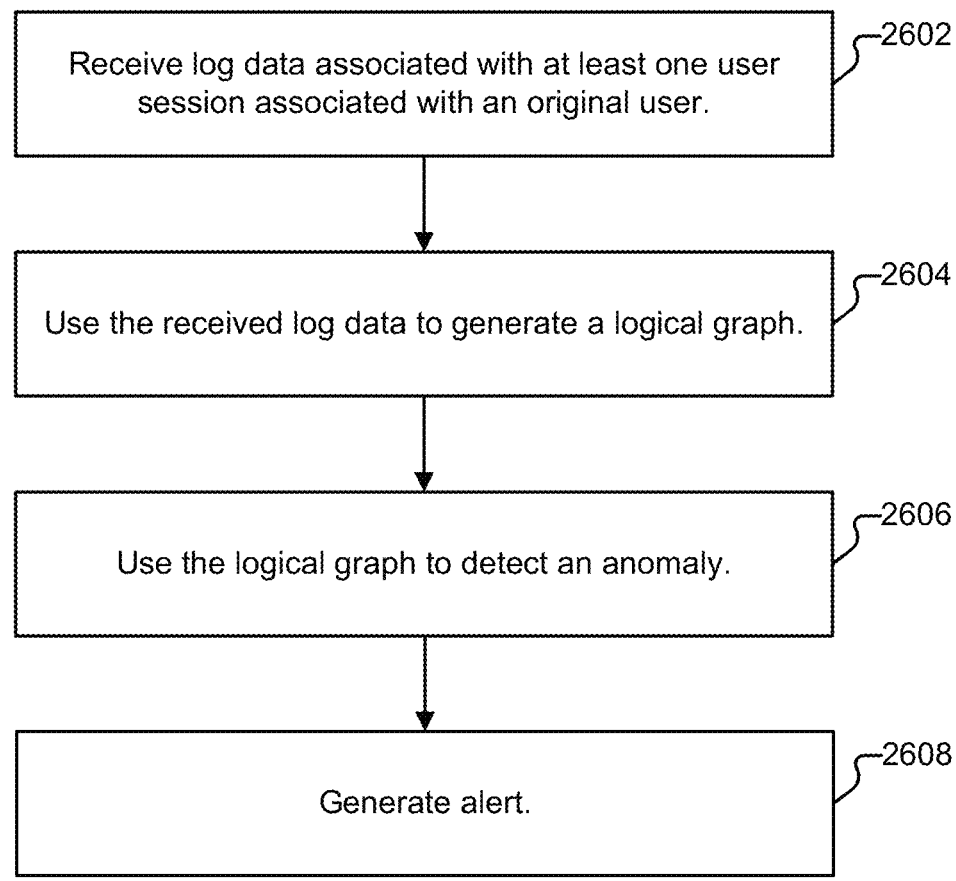
FIG. 26 illustrates an example of a process for detecting anomalies.

FIG. 26 illustrates an example of a process for detecting anomalies. In various embodiments, process 2600 is performed by platform 102. As explained above, a given session will have an original user. And, each action taken by the original user can be tied back to the original user, despite privilege changes and/or lateral movement throughout a datacenter. Process 2600 begins at 2602 when log data associated with a user session (and thus an original user) is received. At 2604, a logical graph is generated, using at least a portion of the collected data. When an anomaly is detected (2606), it can be recorded, and as applicable, an alert is generated (2608). The following are examples of graphs that can be generated (e.g., at 2604), with corresponding examples of anomalies that can be detected (e.g., at 2606) and alerted upon (e.g., at 2608).

A. Insider Behavior Graph

Figure 27A:
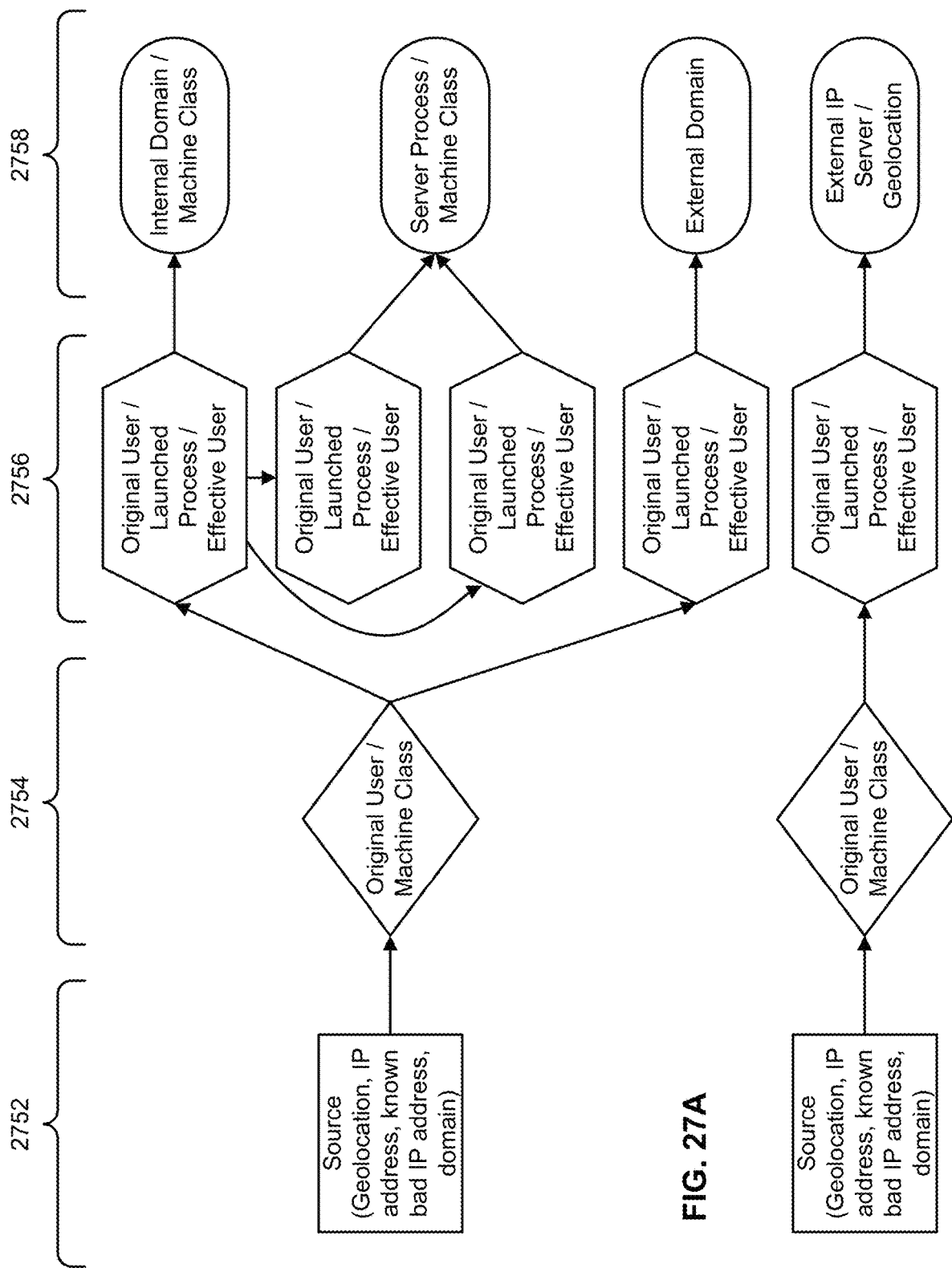
FIG. 27A illustrates a representation of an embodiment of an insider behavior graph.

FIG. 27A illustrates a representation of an embodiment of an insider behavior graph. In the example of FIG. 27A, each node in the graph can be: (1) a cluster of users; (2) a cluster of launched processes; (3) a cluster of processes/servers running on a machine class; (4) a cluster of external IP addresses (of incoming clients); or (5) a cluster of external servers based on DNS/IP/etc. As depicted in FIG. 27A, graph data is vertically tiered into four tiers. Tier 0 (2752) corresponds to entry point information (e.g., domains, IP addresses, and/or geolocation information) associated with a client entering the datacenter from an external entry point. Entry points are clustered together based on such information. Tier 1 (2754) corresponds to a user on a machine class, with a given user on a given machine class represented as a node. Tier 2 (2756) corresponds to launched processes, child processes, and/or interactive processes. Processes for a given user and having similar connectivity (e.g., sharing the processes they launch and the machines with which they communicate) are grouped into nodes. Finally, Tier 3 (2758) corresponds to the services/servers/domains/IP addresses with which processes communicate. A relationship between the tiers can be stated as follows: Tier 0 nodes log in to tier 1 nodes. Tier 1 nodes launch tier 2 nodes. Tier 2 nodes connect to tier 3 nodes.

The inclusion of an original user in both Tier 1 and Tier 2 allows for horizontal tiering. Such horizontal tiering ensures that there is no overlap between any two users in Tier 1 and Tier 2. Such lack of overlap provides for faster searching of an end-to-end path (e.g., one starting with a Tier 0 node and terminating at a Tier 3 node). Horizontal tiering also helps in establishing baseline insider behavior. For example, by building an hourly insider behavior graph, new edges/changes in edges between nodes in Tier 1 and Tier 2 can be identified. Any such changes correspond to a change associated with the original user. And, any such changes can be surfaced as anomalous and alerts can be generated.

As explained above, Tier 1 corresponds to a user (e.g., user "U") logging into a machine having a particular machine class (e.g., machine class "M"). Tier 2 is a cluster of processes having command line similarity (e.g., CType "C"), having an original user "U," and running as a particular effective user (e.g., user "U1"). The value of U1 may be the same as U (e.g., joe.smith in both cases), or the value of U1 may be different (e.g., U=joe.smith and U1=root). Thus, while an edge may be present from a Tier 1 node to a Tier 2 node, the effective user in the Tier 2 node may or may not match the original user (while the original user in the Tier 2 node will match the original user in the Tier 1 node).

As a reminder, a change from a user U into a user U1 can take place in a variety of ways. Examples include where U becomes U1 on the same machine (e.g., via su), and also where U sshes to other machine(s). In both situations, U can perform multiple changes, and can combine approaches. For example, U can become U1 on a first machine, ssh to a second machine (as U1), become U2 on the second machine, and ssh to a third machine (whether as user U2 or user U3). In various embodiments, the complexity of how user U ultimately becomes U3 (or U5, etc.) is hidden from a viewer of an insider behavior graph, and only an original user (e.g., U) and the effective user of a given node (e.g., U5) are depicted. As applicable (e.g., if desired by a viewer of the insider behavior graph), additional detail about the path (e.g., an end-to-end path of edges from user U to user U5) can be surfaced (e.g., via user interactions with nodes).

Figure 27B:
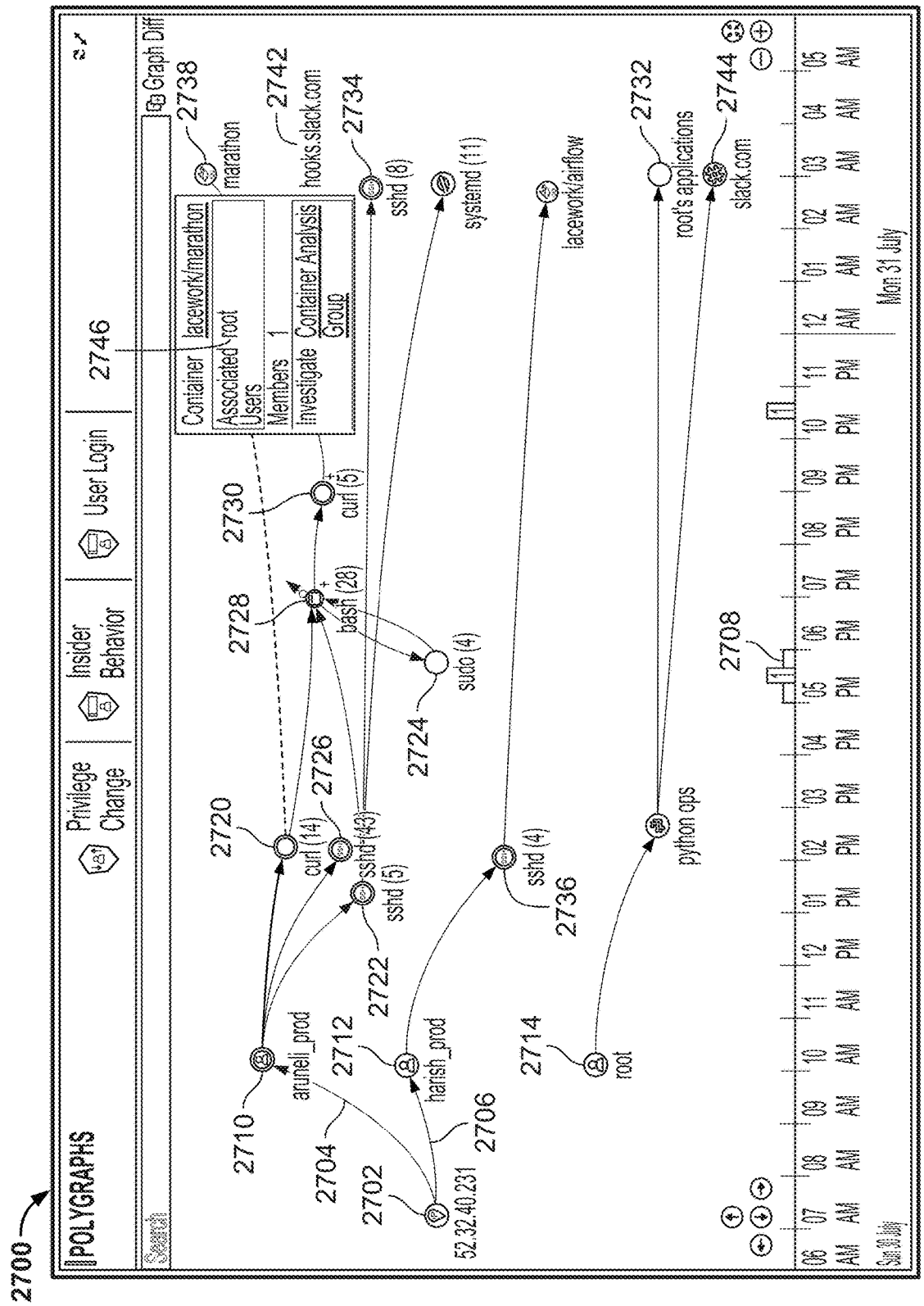
FIG. 27B illustrates an embodiment of a portion of an insider behavior graph.

FIG. 27B illustrates an example of a portion of an insider behavior graph (e.g., as rendered in a web browser). In the example shown, node 2702 (the external IP address, 52.32.40.231) is an example of a Tier 0 node, and represents an entry point into a datacenter. As indicated by directional arrows 2704 and 2706, two users, "aruneli_prod" and "harish_prod," both made use of the source IP 52.32.40.231 when logging in between 5 pm and 6 pm on Sunday July 30 (2708). Nodes 2710 and 2712 are examples of Tier 1 nodes, having aruneli_prod and harish_prod as associated respective original users. As previously mentioned, Tier 1 nodes correspond to a combination of a user and a machine class. In the example depicted in FIG. 27B, the machine class associated with nodes 2710 and 2712 is hidden from view to simplify visualization, but can be surfaced to a viewer of interface 2700 (e.g., when the user clicks on node 2710 or 2712).

Nodes 2720-2738 are examples of Tier 2 nodes—processes that are launched by users in Tier 1 and their child, grandchild, etc. processes. Note that also depicted in FIG. 27B is a Tier 1 node 2714 that corresponds to a user, "root," that logged in to a machine cluster from within the datacenter (i.e., has an entry point within the datacenter). Nodes 2742-2744 are examples of Tier 3 nodes—internal/external IP addresses, servers, etc., with which Tier 2 nodes communicate.

In the example shown in FIG. 27B, a viewer of interface 2700 has clicked on node 2738. As indicated in region 2746, the user running the marathon container is "root." However, by following the directional arrows in the graph backwards from node 2738 (i.e. from right to left), the viewer can determine that the original user, responsible for node 2738, is "aruneli_prod," who logged into the datacenter from IP 52.32.40.231.

The following are examples of changes that can be tracked using an insider behavior graph model:

A user logs in from a new IP address.
A user logs in from a geolocation not previously used by that user.
A user logs into a new machine class.
A user launches a process not previously used by that user.
A user connects to an internal server to which the user has not previously connected.
An original user communicates with an external server (or external server known to be malicious) with which that user has not previously communicated.
A user communicates with an external server which has a geolocation not previously used by that user.

Such changes can be surfaced as alerts, e.g., to help an administrator determine when/what anomalous behavior occurs within a datacenter. Further, the behavior graph model can be used (e.g., during forensic analysis) to answer questions helpful during an investigation. Examples of such questions include:

Was there any new login activity (Tier 0) in the timeframe being investigated? As one example, has a user logged in from an IP address with unknown geolocation information?Similarly, has a user started communicating externally with a new Tier 3 node (e.g., one with unknown geolocation information).
Has there been any suspicious login activity (Tier 0) in the timeframe being investigated? As one example, has a user logged in from an IP address that corresponds to a known bad IP address as maintained by ThreatAggr 150? Similarly, has there been any suspicious Tier 3 activity?
Were any anomalous connections made within the datacenter during the timeframe being investigated? As one example, suppose a given user ("Frank") typically enters a datacenter from a particular IP address (or range of IP addresses), and then connects to a first machine type (e.g., bastion), and then to a second machine type (e.g., database_prod). If Frank has directly connected to database_prod (instead of first going through bastion) during the timeframe, this can be surfaced using the insider graph.
Who is (the original user) responsible for running a particular process?

Example—Data Exfiltration

Figure 28A:
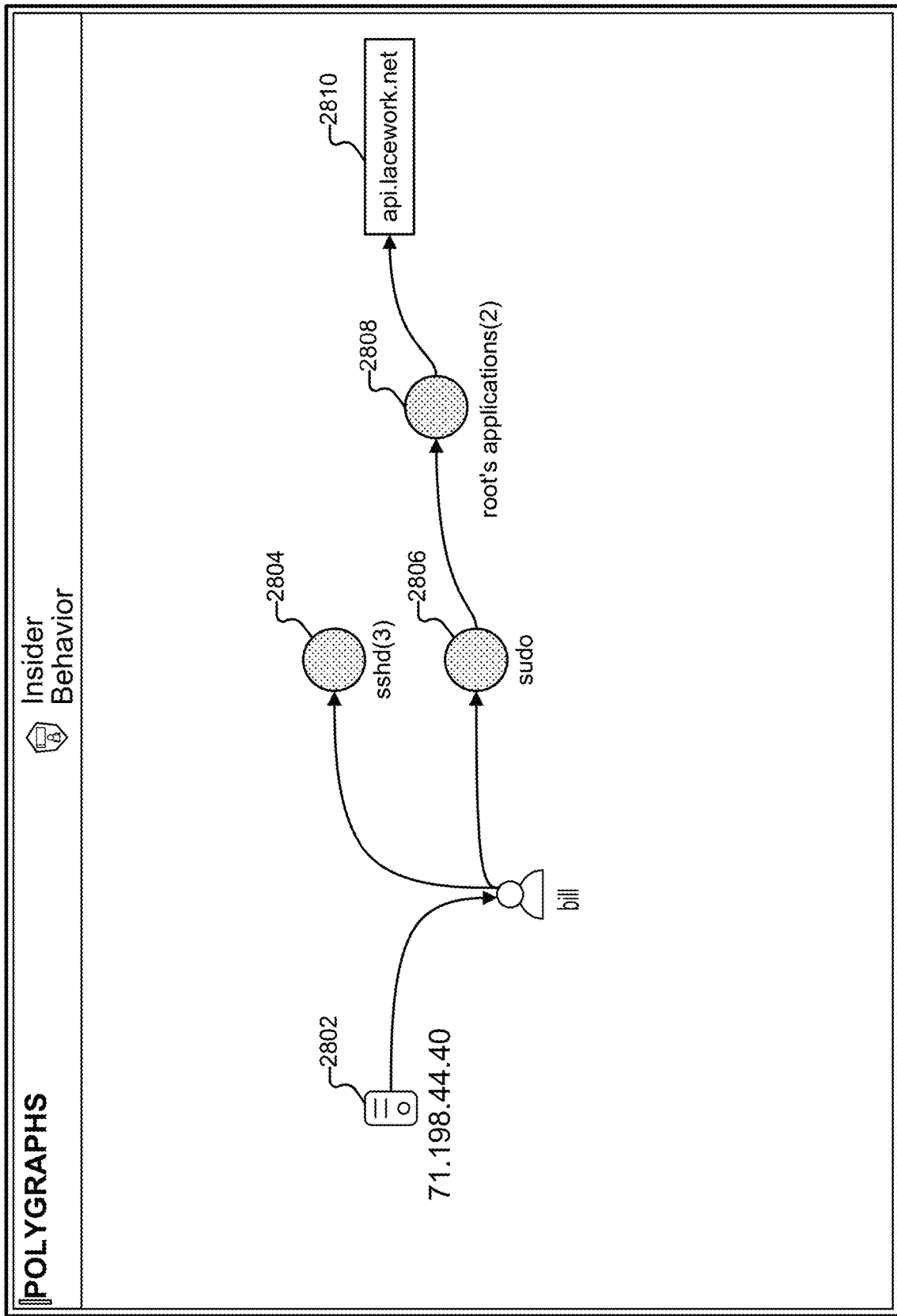
FIG. 28A illustrates an embodiment of a portion of an insider behavior graph.
Figure 28B:
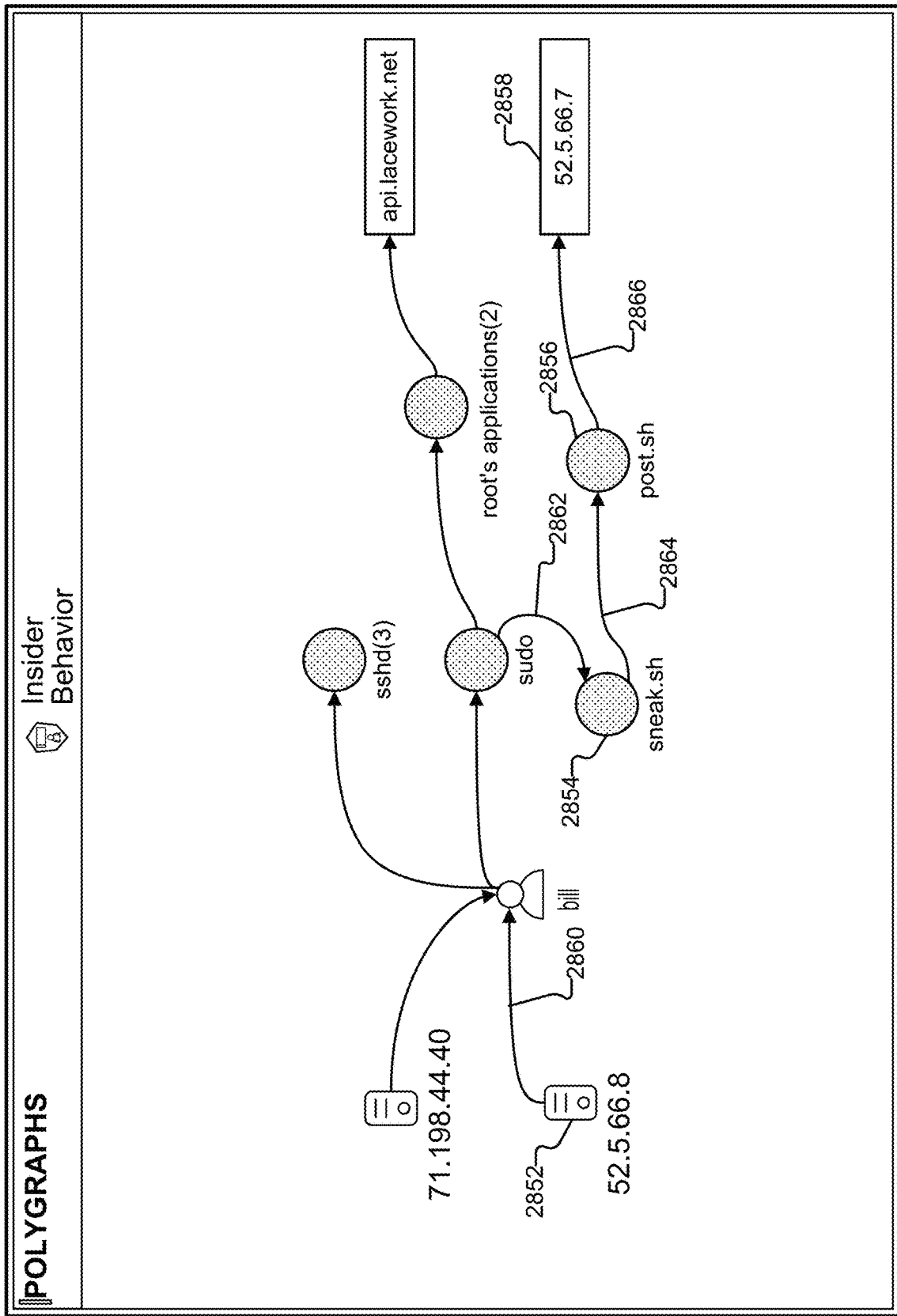
FIG. 28B illustrates an embodiment of a portion of an insider behavior graph.

An example of an insider behavior graph being used in an investigation is depicted in FIGS. 28A and 28B. FIG. 28A depicts a baseline of behavior for a user, "Bill." As shown in FIG. 28A, Bill typically logs into a datacenter from the IP address, 71.198.44.40 (2802). He typically makes use of ssh (2804), and sudo (2806), makes use of a set of typical applications (2808) and connects (as root) with the external service, api.lacework.net (2810).

Suppose Bill's credentials are compromised by a nefarious outsider ("Eve"). FIG. 28B depicts an embodiment of how the graph depicted in FIG. 28A would appear once Eve begins exfiltrating data from the datacenter. Eve logs into the datacenter (using Bill's credentials) from 52.5.66.8 (2852). As Bill, Eve escalates her privilege to root (e.g., via su), and then becomes a different user, Alex (e.g., via su alex). As Alex, Eve executes a script, "sneak.sh" (2854), which launches another script, "post.sh" (2856), which contacts external server 2858 which has an IP address of 52.5.66.7, and transmits data to it. Edges 2860-2866 each represent changes in Bill's behavior. As previously mentioned, such changes can be detected as anomalies and associated alerts can be generated. As a first example, Bill logging in from an IP address he has not previously logged in from (2860) can generate an alert. As a second example, while Bill does typically make use of sudo (2806), he has not previously executed sneak.sh (2854) or post.sh (2856) and the execution of those scripts can generate alerts as well. As a third example, Bill has not previously communicated with server 2858, and an alert can be generated when he does so (2866). Considered individually, each of edges 2860-2866 may indicate nefarious behavior, or may be benign. As an example of a benign edge, suppose Bill begins working from a home office two days a week. The first time he logs in from his home office (i.e., from an IP address that is not 71.198.44.40), an alert can be generated that he has logged in from a new location. Over time, however, as Bill continues to log in from his home office but otherwise engages in typical activities, Bill's graph will evolve to include logins from both 71.198.44.40 and his home office as baseline behavior. Similarly, if Bill begins using a new tool in his job, an alert can be generated the first time he executes the tool, but over time will become part of his baseline.

In some cases, a single edge can indicate a serious threat. For example, if server 2852 (or 2858) is included in a known bad IP listing, edge 2860 (or 2866) indicates compromise. An alert that includes an appropriate severity level (e.g., "threat level high") can be generated. In other cases, a combination of edges could indicate a threat (where a single edge might otherwise result in a lesser warning). In the example shown in FIG. 28B, the presence of multiple new edges is indicative of a serious threat. Of note, even though "sneak.sh" and "post.sh" were executed by Alex, because platform 102 also keeps track of an original user, the compromise of Bob's account will be discovered.

B. User Login Graph

Figure 29:
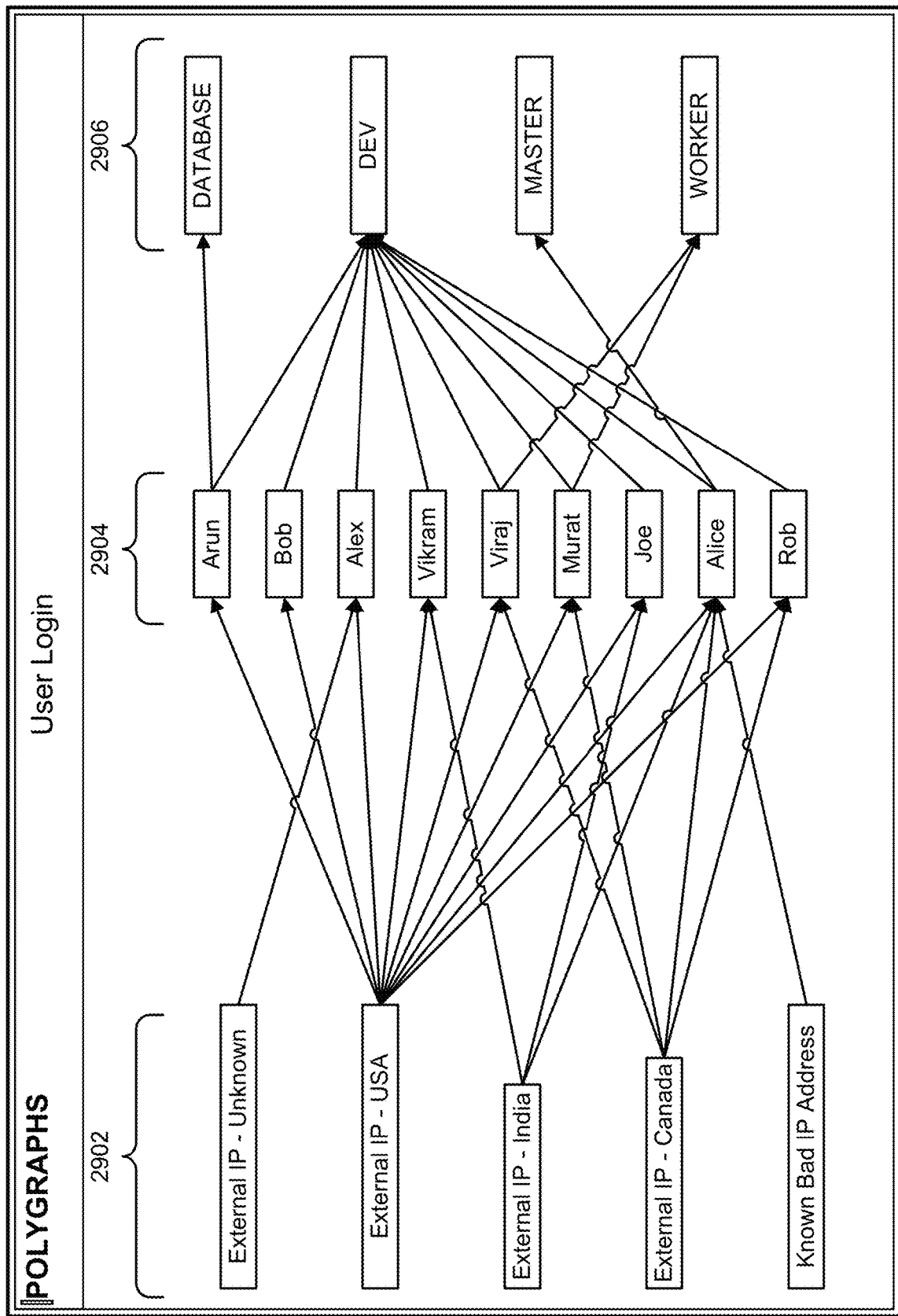
FIG. 29 illustrates a representation of an embodiment of a user login graph.

FIG. 29 illustrates a representation of an embodiment of a user login graph. In the example of FIG. 29, tier 0 (2902) clusters source IP addresses as belonging to a particular country (including an "unknown" country) or as a known bad IP. Tier 1 (2904) clusters user logins, and tier 2 (2906) clusters type of machine class into which a user is logging in. The user login graph tracks the typical login behavior of users. By interacting with a representation of the graph, answers to questions such as the following can be obtained:

Where is a user logging in from?
Have any users logged in from a known bad address?
Have any non-developer users accessed development machines?
Which machines does a particular user access?

Examples of alerts that can be generated using the user login graph include:

A user logs in from a known bad IP address.
A user logs in from a new country for the first time.
A new user logs into the datacenter for the first time.
A user accesses a machine class that the user has not previously accessed.

C. Privilege Change Graph

One way to track privilege changes in a datacenter is by monitoring a process hierarchy of processes. To help filter out noisy commands/processes such as "su -u," the hierarchy of processes can be constrained to those associated with network activity. In a *nix system, each process has two identifiers assigned to it, a process identifier (PID) and a parent process identifier (PPID). When such a system starts, the initial process is assigned a PID 0. Each user process has a corresponding parent process.

Figure 30:
FIG. 30 illustrates a representation of a process tree.

FIG. 30 illustrates a representation of a process tree. In the example shown in FIG. 30, PIDs have been replaced with an effective user running a given process. Thus, a designation of "root" (3002) indicates the user running the process is root, and a designation of "avahi" (3004) indicates the user running the process is avahi. Further, in the example shown in FIG. 30, processes depicted to the right of other processes are child processes. In line 3006, the user avahi became root and ran the process "padae_run," whose parent is "avahi-daemon." This represents a privilege change (from avahi to root).

Using techniques described herein, a graph can be constructed (also referred to herein as a privilege change graph) which models privilege changes. In particular, a graph can be constructed which identifies where a process P1 launches a process P2, where P1 and P2 each have an associated user U1 and U2, with U1 being an original user, and U2 being an effective user. In the graph, each node is a cluster of processes (sharing a CType) executed by a particular (original) user. As all the processes in the cluster belong to the same user, a label that can be used for the cluster is the user's username. An edge in the graph, from a first node to a second node, indicates that a user of the first node changed its privilege to the user of the second node.

Figure 31:
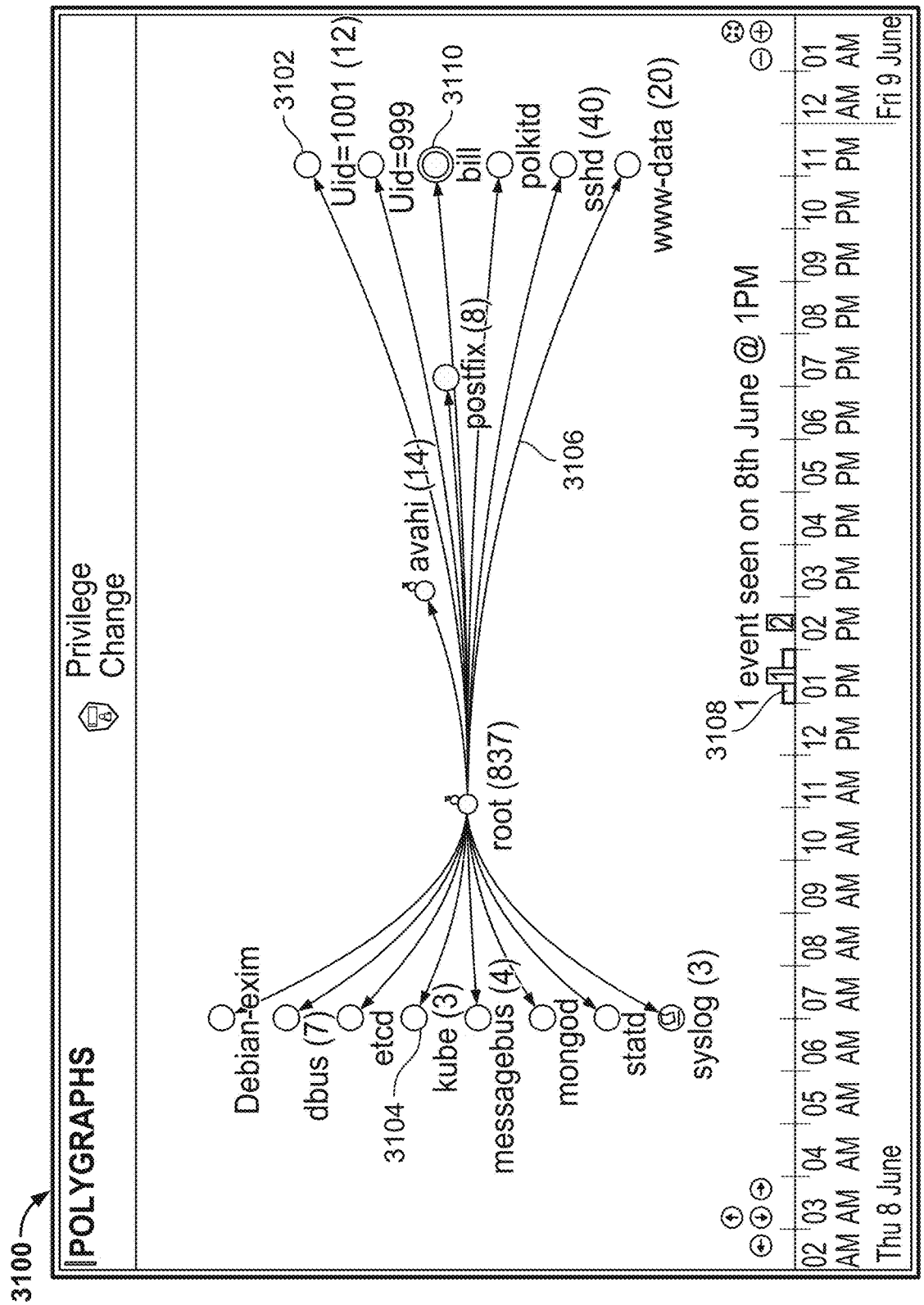
FIG. 31 illustrates an example of a privilege change graph.

FIG. 31 illustrates an example of a privilege change graph. In the example shown in FIG. 31, each node (e.g., nodes 3102 and 3104) represents a user. Privilege changes are indicated by edges, such as edge 3106.

As with other graphs, anomalies in graph 3100 can be used to generate alerts. Three examples of such alerts are as follows:

New user entering the datacenter. Any time a new user enters the datacenter and runs a process, the graph will show a new node, with a new CType. This indicates a new user has been detected within the datacenter. FIG. 31 is a representation of an example of an interface that depicts such an alert. Specifically, as indicated in region 3108, an alert for the time period 1 pm-2 pm on June 8 was generated. The alert identifies that a new user, Bill (3110) executed a process.

Privilege change. As explained above, a new edge, from a first node (user A) to a second node (user B) indicates that user A has changed privilege to user B.

Privilege escalation. Privilege escalation is a particular case of privilege change, in which the first user becomes root.

Figure 32:
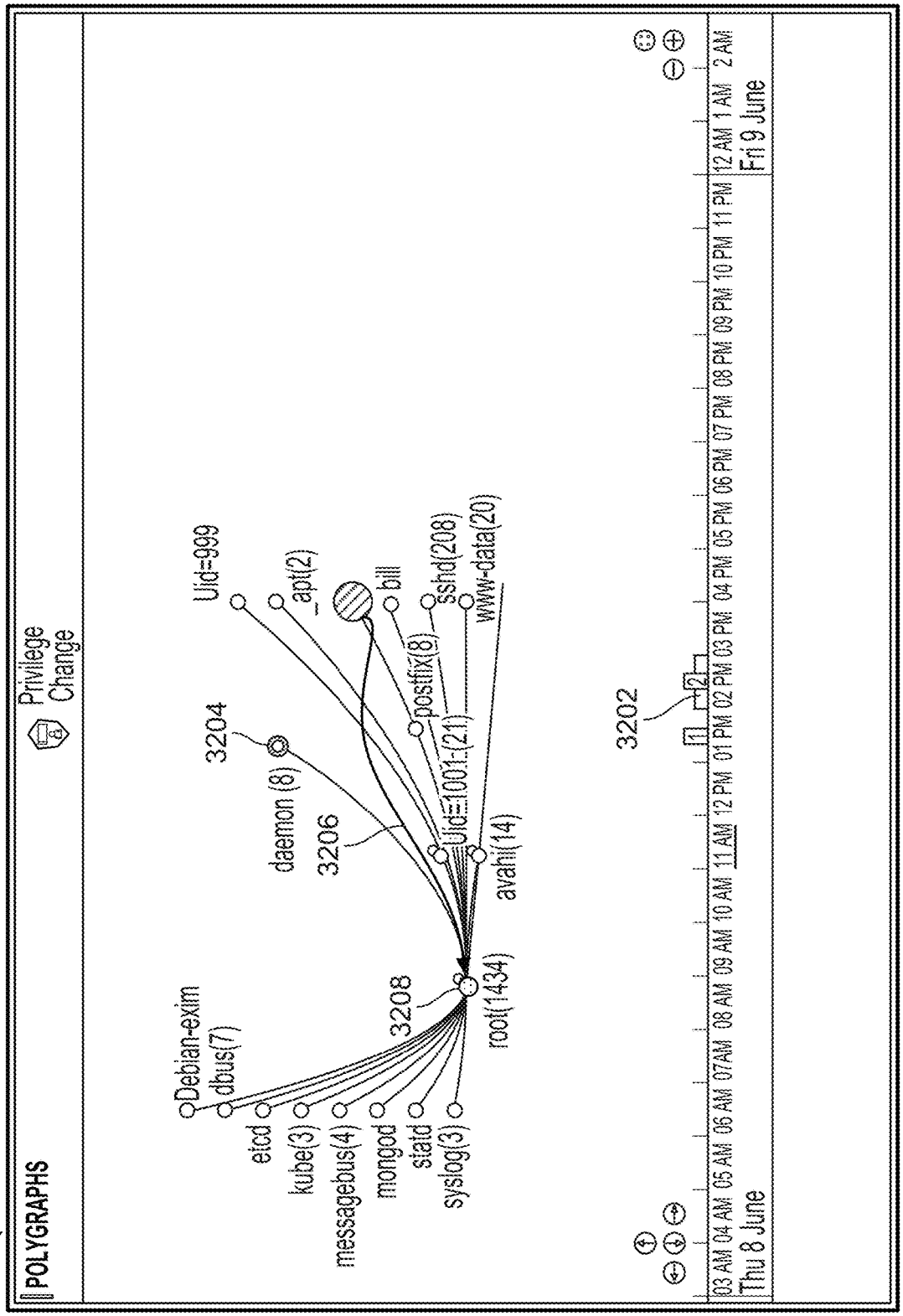
FIG. 32 illustrates an example of a privilege change graph.

An example of an anomalous privilege change and an example of an anomalous privilege escalation are each depicted in graph 3200 of FIG. 32. In particular, as indicated in region 3202, two alerts for the time period 2 pm-3 pm on June 8 were generated (corresponding to the detection of the two anomalous events). In region 3204, root has changed privilege to the user "daemon," which root has not previously done. This anomaly is indicated to the user by highlighting the daemon node (e.g., outlining it in the color red). As indicated by edge 3206, Bill has escalated his privilege to the user root (which can similarly be highlighted in region 3208). This action by Bill represents a privilege escalation.

V. Extensible Query Interface for Dynamic Data Compositions and Filter Applications As described throughout this Specification, datacenters are highly dynamic environments. And, different customers of platform 102 (e.g., ACME vs. BETA) may have different/disparate needs/requirements of platform 102, e.g., due to having different types of assets, different applications, etc.

Further, as time progresses, new software tools will be developed, new types of anomalous behavior will be possible (and should be detectable), etc. In various embodiments, platform 102 makes use of predefined relational schema (including by having different predefined relational schema for different customers). However, the complexity and cost of maintaining/updating such predefined relational schema can rapidly become problematic—particularly where the schema includes a mix of relational, nested, and hierarchical (graph) datasets. In other embodiments, the data models and filtering applications used by platform 102 are extensible. As will be described in more detail below, in various embodiments, platform 102 supports dynamic query generation by automatic discovery of join relations via static or dynamic filtering key specifications among composable data sets. This allows a user of platform 102 to be agnostic to modifications made to existing data sets as well as creation of new data sets. The extensible query interface also provides a declarative and configurable specification for optimizing internal data generation and derivations.

As will also be described in more detail below, platform 102 is configured to dynamically translate user interactions (e.g., received via web 120) into SQL queries (and without the user needing to know how to write queries). Such queries can then be performed (e.g., by query service 166) against any compatible backend (e.g., database 142).

A. Visualization Examples

Figure 33:
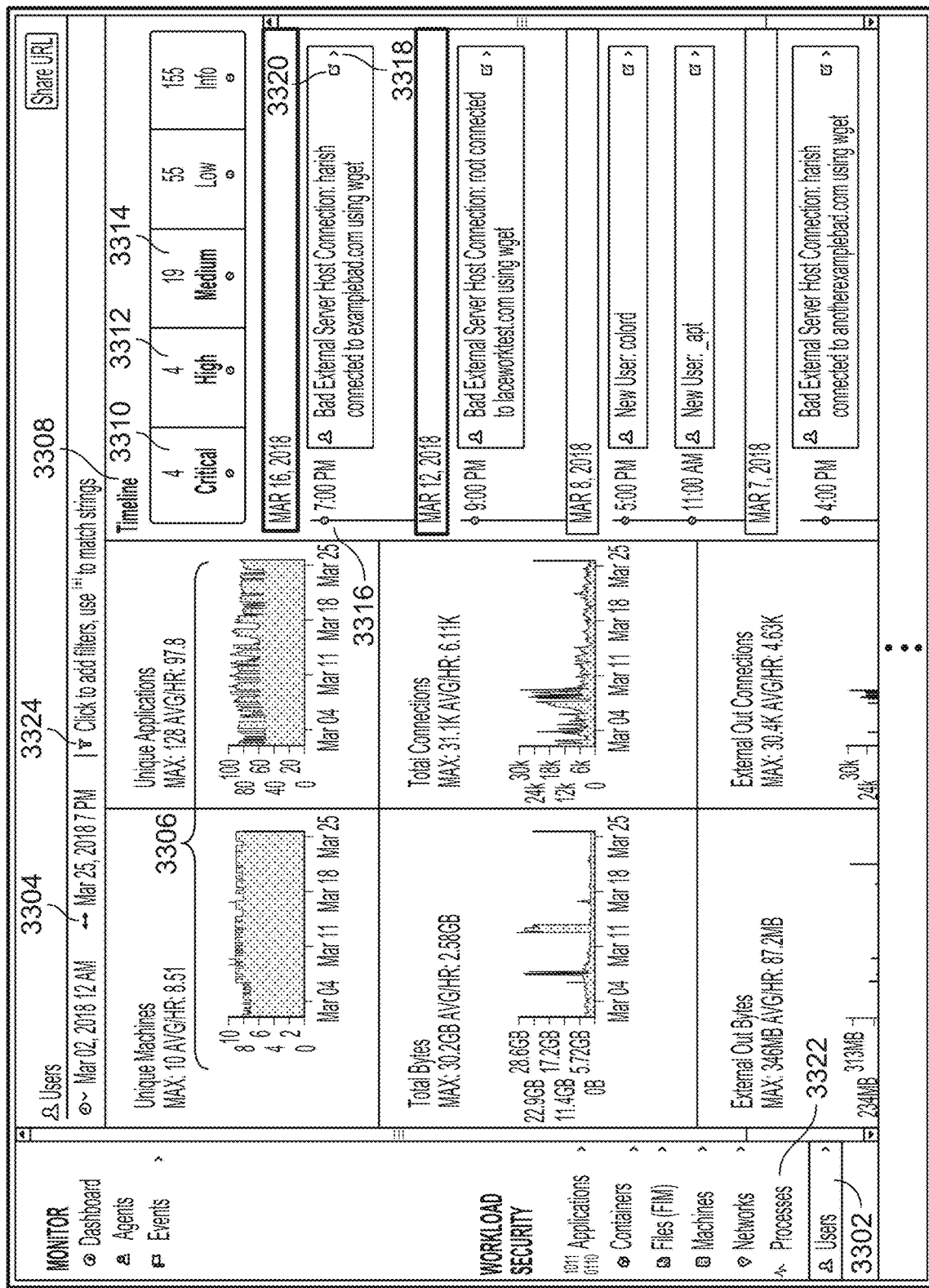
FIG. 33 illustrates an example of a user interacting with a portion of an interface.

FIG. 33 illustrates an example of a user interacting with a portion of an interface. When a user visits platform 102 (e.g., via web app 120 using a browser), data is extracted from database 142 as needed (e.g., by query service 166), to provide the user with information, such as the visualizations depicted variously throughout the Specification (e.g., in FIGS. 9 and 33). As the user continues to interact with such visualizations (e.g., clicking on graph nodes, entering text into search boxes, navigating between tabs (e.g., tab 3302 vs. 3322)), such interactions act as triggers that cause query service 166 to continue to obtain information from database 142 as needed (and as described in more detail below).

In the example shown in FIG. 33, ACME administrator Alice is viewing a dashboard that provides various information about ACME users (3302), during the time period March 2 at midnight-March 25 at 7 pm (which she selected by interacting with region 3304). Various statistical information is presented to Alice in region 3306. Region 3308 presents a timeline of events that occurred during the selected time period. Alice has opted to list only the critical, high, and medium events during the time period by clicking on the associated boxes (3310-3314). A total of 55 low severity, and 155 info-only events also occurred during the time period. Each time Alice interacts with an element in FIG. 33 (e.g., clicks on box 3314, clicks on link 3320, or clicks on tab 3322), her actions are translated/formalized into filters on the data set and used to dynamically generate SQL queries. The SQL queries are generated transparently to Alice (and also to a designer of the user interface shown in FIG. 33).

Figure 34:
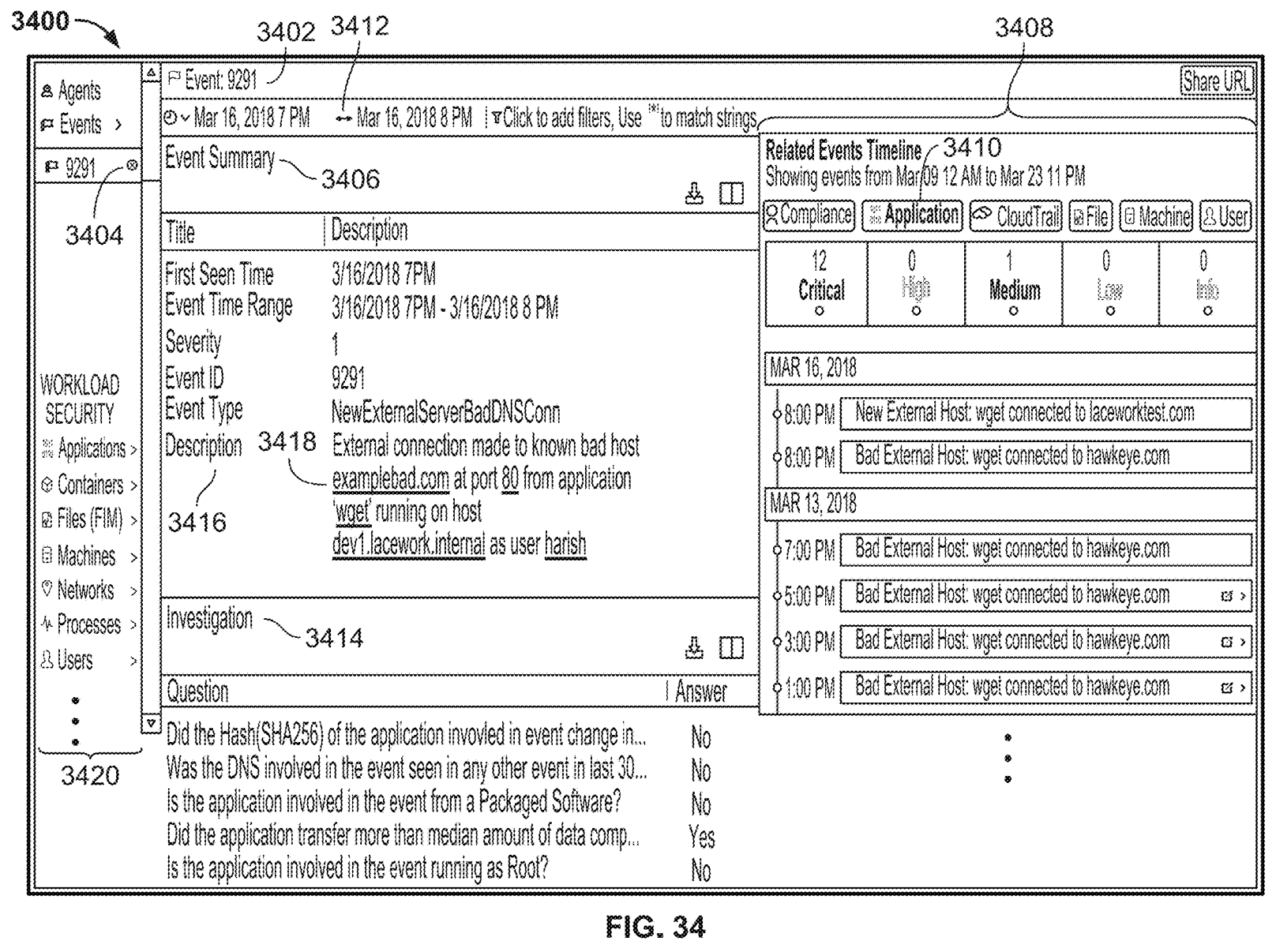

Alice notes in the timeline (3316) that a user, Harish, connected to a known bad server (examplebad.com) using wget, an event that has a critical severity level. Alice can click on region 3318 to expand details about the event inline (which will display, for example, the text "External connection made to known bad host examplebad.com at port 80 from application 'wget' running on host dev1.lacework.internal as user harish") directly below line 3316. Alice can also click on region 3320, which will take her to a dossier for the event (depicted in FIG. 34). As will be described in more detail below, a dossier is a template for a collection of visualizations.

As shown in interface 3400, the event of Harish using wget to contact examplebad.com on March 16 was assigned an event ID of 9291 by platform 102 (3402). For convenience to Alice, the event is also added to her dashboard in region 3420 as a bookmark (3404). A summary of the event is depicted in region 3406. By interacting with boxes shown in region 3408, Alice can see a timeline of related events. In this case, Alice has indicated that she would like to see other events involving the wget application (by clicking box 3410). Events of critical and medium security involving wget occurred during the one hour window selected in region 3412.

Figure 35:
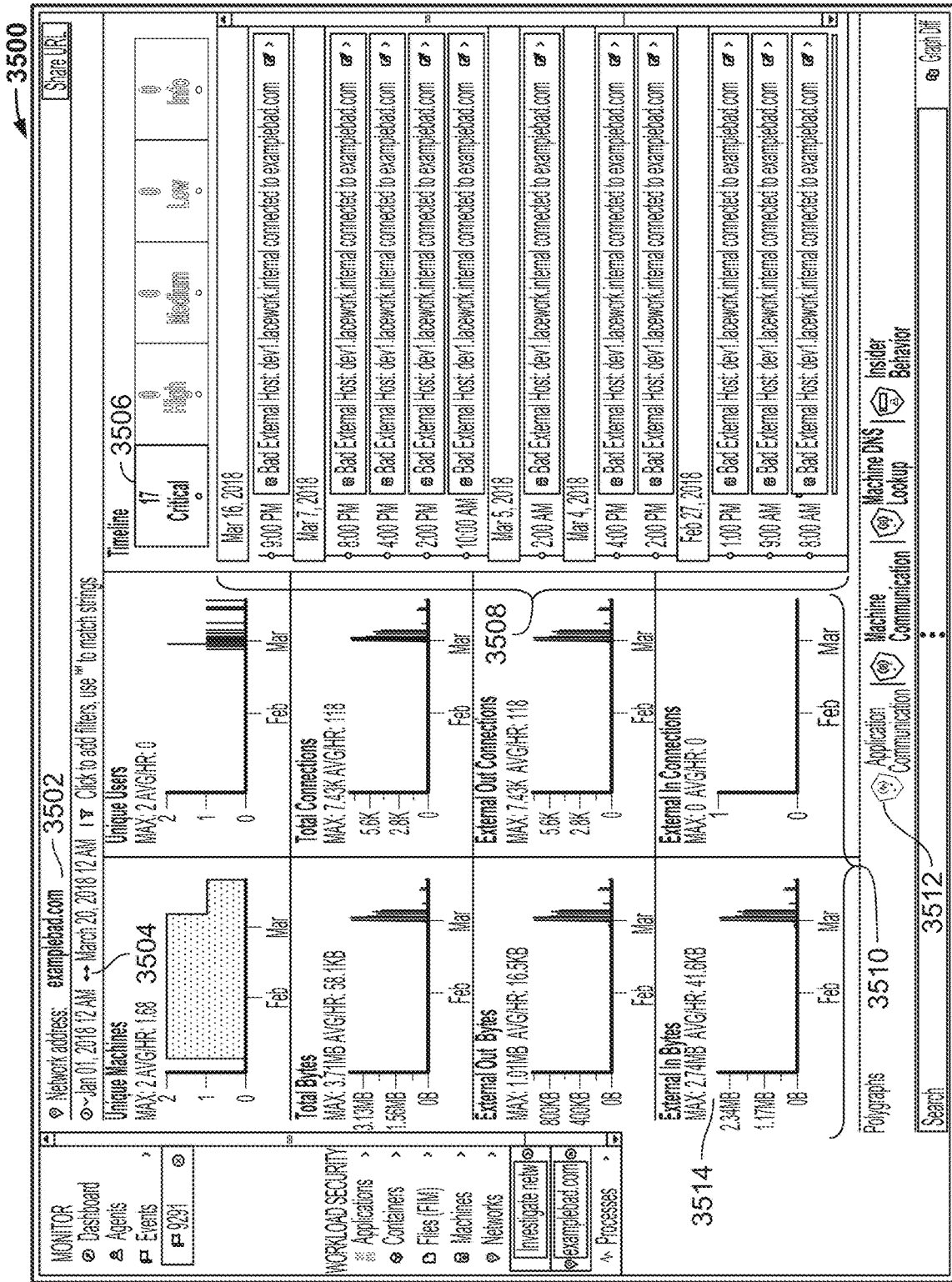
FIG. 35 illustrates an example of a dossier for a domain.

Region 3414 automatically provides Alice with answers to questions that may be helpful to have answers to while investigating event 9291. If Alice clicks on any of the links in the event description (3416), she will be taken to a corresponding dossier for the link. As one example, suppose Alice clicks on link 3418. She will then be presented with interface 3500 shown in FIG. 35.

Interface 3500 is an embodiment of a dossier for a domain. In this example, the domain is "examplebad.com," as shown in region 3502. Suppose Alice would like to track down more information about interactions ACME resources have made with examplebad.com between January 1 and March 20. She selects the appropriate time period in region 3504 and information in the other portions of interface 3500 automatically update to provide various information corresponding to the selected time frame. As one example, Alice can see that contact was made with examplebad.com a total of 17 times during the time period (3506), as well as a list of each contact (3508). Various statistical information is also included in the dossier for the time period (3510). If she scrolls down in interface 3500, Alice will be able to view various polygraphs associated with examplebad.com, such as an application-communication polygraph (3512).

B. Query Service Data Model

Data stored in database 142 can be internally organized as an activity graph. In the activity graph, nodes are also referred to as Entities. Activities generated by Entities are modeled as directional edges between nodes. Thus, each edge is an activity between two Entities. One example of an Activity is a "login" Activity, in which a user Entity logs into a machine Entity (with a directed edge from the user to the machine). A second example of an Activity is a "launch" Activity, in which a parent process launches a child process (with a directed edge from the parent to the child). A third example of an Activity is a "DNS query" Activity, in which either a process or a machine performs a query (with a directed edge from the requestor to the answer, e.g., an edge from a process to www.example.com). A fourth example of an Activity is a network "connected to" Activity, in which processes, IP addresses, and listen ports can connect to each other (with a directed edge from the initiator to the server).

As will be described in more detail below, query service 166 provides either relational views or graph views on top of data stored in database 142. Typically, a user will to see want to see data filtered using the activity graph. For example, if an entity was not involved in an activity in a given time period, that entity should be filtered out of query results. Thus, a request to show "all machines" in a given time frame will be interpreted as "show distinct machines that were active" during the time frame.

Query service 166 relies on three main data model elements: fields, entities, and filters. As used herein, a field is a collection of values with the same type (logical and physical). A field can be represented in a variety of ways, including: 1. a column of relations (table/view), 2. a return field from another entity, 3. an SQL aggregation (e.g., COUNT, SUM, etc.), 4. an SQL expression with the references of other fields specified, and 5. a nested field of a JSON object. As viewed by query service 166, an entity is a collection of fields that describe a data set. The data set can be composed in a variety of ways, including: 1. a relational table, 2. a parameterized SQL statement, 3. DynamicSQL created by a Java function, and 4. join/project/aggregate/subclass of other entities. Some fields are common for all entities. One example of such a field is a "first observed" timestamp (when first use of the entity was detected). A second example of such a field is the entity classification type (e.g., one of: 1. Machine (on which an agent is installed), 2. Process, 3. Binary, 4. UID, 5. IP, 6. DNS Information, 7. ListenPort, and 8. PType). A third example of such a field is a "last observed" timestamp.

A filter is an operator that: 1. takes an entity and field values as inputs, 2. a valid SQL expression with specific reference(s) of entity fields, or 3. is a conjunct/disjunct of filters. As will be described in more detail below, filters can be used to filter data in various ways, and limit data returned by query service 166 without changing the associated data set.

1. Cards

As mentioned above, a dossier is a template for a collection of visualizations. Each visualization (e.g., the box including chart 3514) has a corresponding card, which identifies particular target information needed (e.g., from database 142) to generate the visualization. In various embodiments, platform 102 maintains a global set of dossiers/cards. Users of platform 102 such as Alice can build their own dashboard interfaces using preexisting dossiers/cards as components, and/or they can make use of a default dashboard (which incorporates various of such dossiers/cards).

a. Card Specification

A JSON file can be used to store multiple cards (e.g., as part of a query service catalog). A particular card is represented by a single JSON object with a unique name as a field name. For example:

{
"Card1": {
 . . .
},
"Card2": {
}
}

Each card is described by the following named fields:
TYPE: the type of the card. Example values include:
Entity (the default type)
SQL
Filters
DynamicSQL
GraphFilter
Graph
Function
Template PARAMETERS: a JSON array object that contains an array of parameter objects with the following fields:
  name (the name of the parameter)
  required (a Boolean flag indicating whether the parameter is required or not)
  default (a default value of the parameter)
  props (a generic JSON object for properties of the parameter. Possible values are: "utype" (a user defined type), and "scope" (an optional property to configure a namespace of the parameter))
  value (a value for the parameter—non-null to override the default value defined in nested source entities)
SOURCES: a JSON array object explicitly specifying references of input entities. Each source reference has the following attributes:
  name (the card/entity name or fully-qualified Table name)
  type (required for base Table entity)
  alias (an alias to access this source entity in other fields (e.g., returns, filters, groups, etc))
RETURNS: a required JSON array object of a return field object. A return field object can be described by the following attributes:
  field (a valid field name from a source entity)
  expr (a valid SQL scalar expression. References to input fields of source entities are specified in the format of #{Entity.Field}. Parameters can also be used in the expression in the format of ${ParameterName})
  type (the type of field, which is required for return fields specified by expr. It is also required for all return fields of an Entity with an SQL type)
  alias (the unique alias for return field)
  aggr (possible aggregations are: COUNT, COUNT_DISTINCT, DISTINCT, MAX, MIN, AVG, SUM, FIRST_VALUE, LAST_VALUE)
  case (JSON array object represents conditional expressions "when" and "expr")
  fieldsFrom, and, except (specification for projections from a source entity with excluded fields)
  props (general JSON object for properties of the return field. Possible properties include: "filterGroup," "title," "format," and "utype")
PROPS: generic JSON objects for other entity properties
SQL: a JSON array of string literals for SQL statements. Each string literal can contain parameterized expressions ${ParameterName} and/or composable entity by #{EntityName}
GRAPH: required for Graph entity. Has the following required fields:
  source (including "type," "props," and "keys")
  target (including "type," "props," and "keys")
  edge (including "type" and "props")
JOINS: a JSON array of join operators. Possible fields for a join operator include:
  type (possible join types include: "loj"—Left Outer Join, "join"—Inner Join, "in"—Semi Join, "implicit"—Implicit Join)
  left (a left hand side field of join)
  right (a right hand side field of join)
  keys (key columns for multi-way joins)
  order (a join order of multi-way joins)
FKEYS: a JSON array of FilterKey(s). The fields for a FilterKey are:
  type (type of FilterKey)
  fieldRefs (reference(s) to return fields of an entity defined in the sources field)
  alias (an alias of the FilterKey, used in implicit join specification)

FILTERS: a JSON array of filters (conjunct). Possible fields for a filter include:
  type (types of filters, including: "eq"—equivalent to SQL=, "ne"—equivalent to SQL <>, "ge"—equivalent to SQL >=, "gt"—equivalent to SQL >, "le"—equivalent to SQL <=, "lt"-equivalent to SQL <, "like"—equivalent to SQL LIKE, "not_like"—equivalent to SQL NOT LIKE, "rlike"—equivalent to SQL RLIKE (Snowflake specific), "not_rlike"—equivalent to SQL NOT RLIKE (Snowflake specific), "in"—equivalent to SQL IN, "not in"—equivalent to SQL NOT IN)
  expr (generic SQL expression)
  field (field name)
  value (single value)
  values (for both IN and NOT IN)
ORDERS: a JSON array of ORDER BY for returning fields. Possible attributes for the ORDER BY clause include:
  field (field ordinal index (1 based) or field alias)
  order (asc/desc, default is ascending order)
GROUPS: a JSON array of GROUP BY for returning fields. Field attributes are:
  field (ordinal index (1 based) or alias from the return fields)
LIMIT: a limit for the number of records to be returned
OFFSET: an offset of starting position of returned data. Used in combination with limit for pagination.

b. Extensibility Examples

Suppose customers of platform 102 (e.g., ACME and BETA) request new data transformations or a new aggregation of data from an existing data set (as well as a corresponding visualization for the newly defined data set). As mentioned above, the data models and filtering applications used by platform 102 are extensible. Thus, two example scenarios of extensibility are (1) extending the filter data set, and (2) extending a FilterKey in the filter data set.

Platform 102 includes a query service catalog that enumerates cards available to users of platform 102. New cards can be included for use in platform 102 by being added to the query service catalog (e.g., by an operator of platform 102). For reusability and maintainability, a single external-facing card (e.g., available for use in a dossier) can be composed of multiple (nested) internal cards. Each newly added card (whether external or internal) will also have associated FilterKey(s) defined. A user interface (UI) developer can then develop a visualization for the new data set in one or more dossier templates. The same external card can be used in multiple dossier templates, and a given external card can be used multiple times in the same dossier (e.g., after customization). Examples of external card customization include customization via parameters, ordering, and/or various mappings of external data fields (columns).

FIG. 36 illustrates an example of a card specification. The data set associated with the card shows a list of binary information running by users within the period of [StartTimeRange (3602), EndTimeRange (3604)]. The card depicted in FIG. 36 is implemented by extending an existing (base) card, MVIEW_INTERNAL.ENTITY_VIEW_T (as shown in sources field 3606) with explicit filters on ENTITY_TYPE (as shown in filters field 3608). It also adds dynamic filters via fkeys PID_KEY (3610) and implicit join.

The ProcessClusterFilters Entity is a global external filter data set comprising composable internal data sets (which use the same syntax as cards such as the card depicted in FIG. 36). The ProcessClusterFilters Entity defines a logical group of entities, the primary purpose of which is to form the scope of filters. Physical grouping will be determined at runtime by filters provided by users. The filters and grouping are referred to herein as implicit filters and joins, respectively. Similar to other derived entities, ProcessClusterFilters has the following standard JSON fields, with extended definitions:
  sources: an array of references to entities. A given reference can be either a base or a derived entity.
  returns: an array of external filter names that represent the schema of ProcessClusterFilters.
  fkeys: an array of FilterKey(s).
  joins: an array of implicit joins. Each implicit join defines a group of FilterKey(s) with the same key type. The same FilterKey may be used in different join groups.

Returning to FIG. 36, the dynamic application of filters via implicit join illustrates that the definition of the card (referred to as "Card189" in the query service catalog) is transparent to future changes in ProcessClusterFilters.

As mentioned above, a second extensibility scenario is one in which a FilterKey in the filter data set is extended (i.e., existing template functions are used to define a new data set). As also mentioned above, data sets used by platform 102 are composable/reusable/extensible, irrespective of whether the data sets are relational or graph data sets. One example data set is the User Tracking polygraph, which is generated as a graph data set (comprising nodes and edges). Like other polygraphs, User Tracking is an external data set that can be visualized both as a graph (via the nodes and edges) and can also be used as a filter data set for other cards, via the cluster identifier (CID) field.

An example of this scenario is depicted in FIG. 37, in which three new user tracking data sets are added as new data sources for the ProcessClusterFilters Entity. Corresponding CID fields (UserTrackingIPAddress_CID, UserTrackingUser_CID, and UserTrackingDNSSep_CID) are also added as external filters to ProcessClusterFilters. Note that while changes will be made to ProcessClusterFilters, due to the extensibility techniques used herein, such changes will not impact card 3600.

2. Generating SQL Queries

As mentioned above, as users such as Alice navigate through/interact with interfaces provided by platform 102 (e.g., as shown in FIG. 33), such interactions trigger query service 166 to generate and perform queries against database 142. Dynamic composition of filter datasets can be implemented using FilterKeys and FilterKey Types. A FilterKey can be defined as a list of columns and/or fields in a nested structure (e.g., JSON). Instances of the same FilterKey Type can be formed as an Implicit Join Group. The same instance of a FilterKey can participate in different Implicit Join Groups. A list of relationships among all possible Implicit Join Groups is represented as a Join Graph for the entire search space to create a final data filter set by traversing edges and producing Join Path(s).

a. Introspection

Each card (e.g., as stored in the query service catalog and used in a dossier) can be introspected by a/card/describe/CardID REST request. FIGS. 38 and 39 both depict examples of card schema introspection. In particular, FIG. 38 depicts introspection of a non-graph schema, while FIG. 39 depicts introspection of a graph schema. In both cases, a request is made (via the REST API) for information pertinent to a particular card, in accordance with the specified schema, and subject to the specified filters.

b. Join

Figure 40:
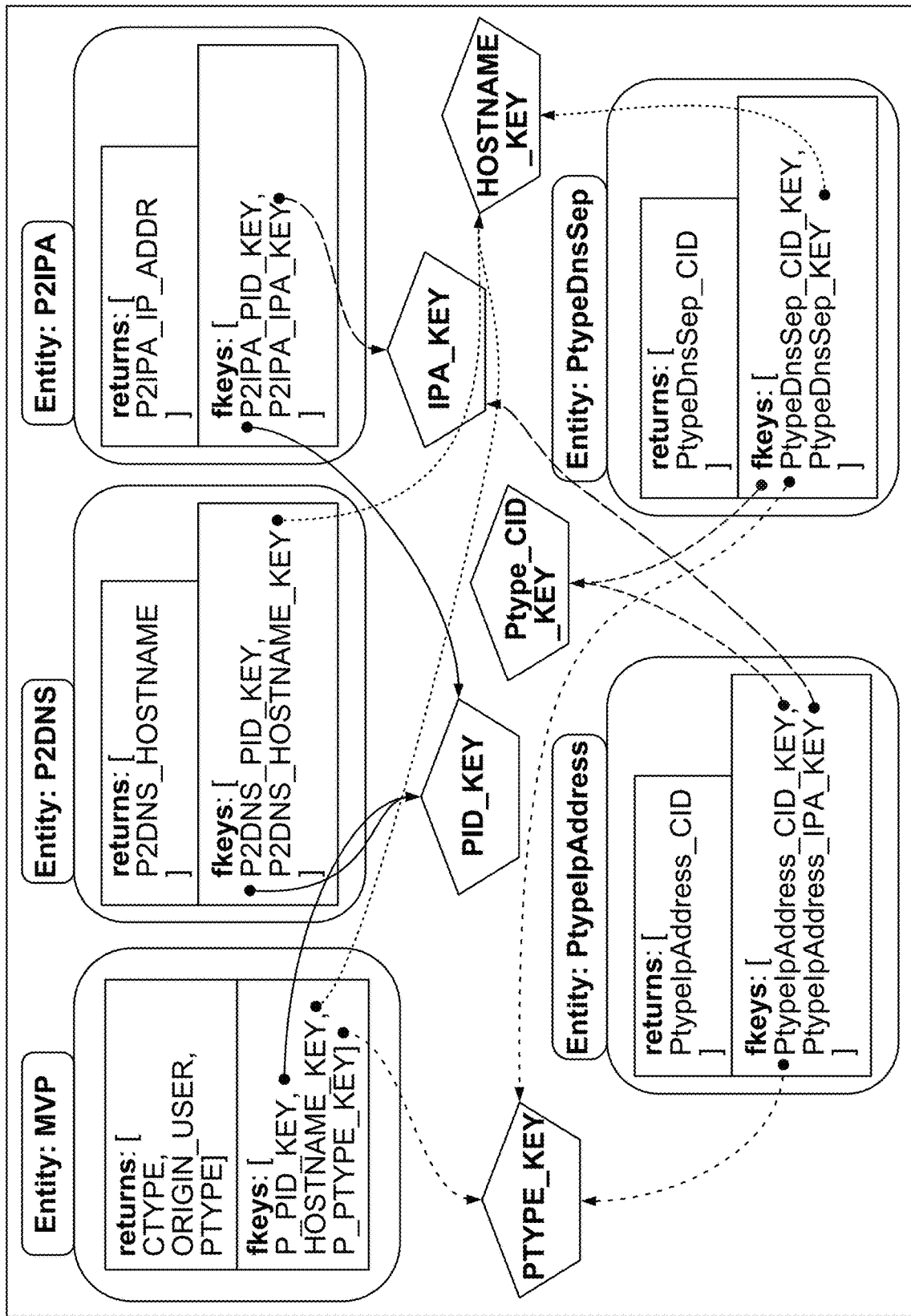
FIG. 40 depicts an example of an Entity Join Graph by FilterKey and FilterKey Group (implicit join).

At runtime (e.g., whenever it receives a request from web frontend 120), query service 166 parses the list of implicit joins and creates a Join Graph to manifest relationships of FilterKeys among Entities. A Join Graph (an example of which is depicted in FIG. 40) comprises a list of Join Link(s). A Join Link represents each implicit join group by the same FilterKey type. A Join Link maintains a reverse map (Entity-to-FilterKey) of FilterKeys and their Entities. As previously mentioned, Entities can have more than one FilterKey defined. The reverse map guarantees one FilterKey per Entity can be used for each JoinLink. Each JoinLink also maintains a list of entities for the priority order of joins. Each JoinLink is also responsible for creating and adding directional edge(s) to graphs. An edge represents a possible join between two Entities.

At runtime, each Implicit Join uses the Join Graph to find all possible join paths. The search of possible join paths starts with the outer FilterKey of an implicit join. One approach is to use a shortest path approach, with breadth first traversal and subject to the following criteria:

Use the priority order list of Join Links for all entities in the same implicit join group.
Stop when a node (Entity) is reached which has local filter(s).
Include all join paths at the same level (depth).
Exclude join paths based on the predefined rules (path of edges).

c. Examples

FIG. 41 depicts an example introspection corresponding to the card depicted in FIG. 36. In particular, in FIG. 41, the card is filtered by an external DNS name. FIG. 42 depicts an example query service log for a Join Path search (in accordance with the breadth first approach described above) corresponding to FIG. 41. The shortest path is indicated at line 4202. Finally, the SQL generated by query service 166, using the result of the Join Path search, is depicted in FIG. 43. FIG. 44 depicts an example introspection corresponding to FIG. 37. In particular, in FIG. 44, filtering on Card 189 is performed by the User Tracking cluster. FIG. 45 depicts an example query service log for a Join Path search corresponding to FIG. 44. Finally, the SQL generated by query service 166, using the result of the Join Path search, is depicted in FIG. 46. Examples of translating a filter and a join, respectively, to an SQL predicate are depicted in FIGS. 47A and 47B, and in FIGS. 47C and 47D.

Figure 48:
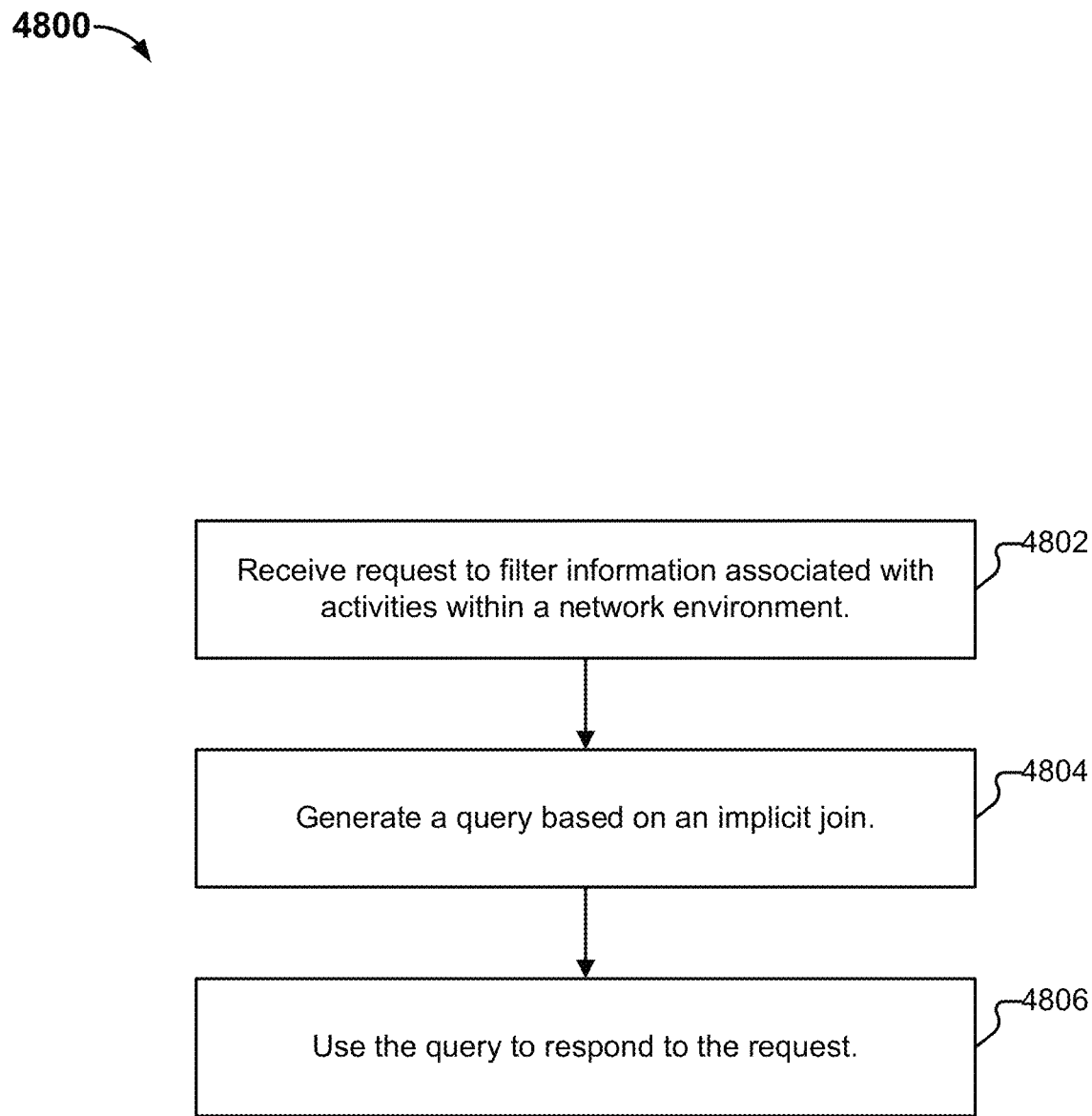
FIG. 48 illustrates an example of a process for dynamically generating and executing a query.

FIG. 48 illustrates an example of a process for dynamically generating and executing a query. In various embodiments, process 4800 is performed by platform 102. The process begins at 4802 when a request is received to filter information associated with activities within a network environment. One example of such a request occurs in response to Alice clicking on tab 3322. Another example of such a request occurs in response to Alice clicking on icon 3320. Yet another example of such a request occurs in response to Alice clicking on icon 3324 and selecting (e.g., from a dropdown) an option to filter (e.g., include, exclude) based on specific criteria that she provides (e.g., an IP address, a username, a range of criteria, etc.).

At 4804, a query is generated based on an implicit join. One example of processing that can be performed at 4804 is as follows. As explained above, one way dynamic composition of filter datasets can be implemented is by using FilterKeys and FilterKey Types. And, instances of the same FilterKey Type can be formed as an Implicit Join Group. A Join Graph for the entire search space can be constructed from a list of all relationships among all possible Join Groups. And, a final data filter set can be created by traversing edges and producing one or more Join Paths. Finally, the shortest path in the join paths is used to generate an SQL query string.

One approach to generating an SQL query string is to use a query building library (authored in an appropriate language such as Java). FIG. 49A illustrates a code excerpt of a common interface "sqlGen" (included in various embodiments in the query building library used by query service 166). An example way that sqlGen can be used in conjunction with process 4800 is as follows. First, a card/entity is composed by a list of input cards/entities, where each input card recursively is composed by its own list of input cards. This nested structure can be visualized as a tree of query blocks(SELECT) in standard SQL constructs. SQL generation can be performed as the traversal of the tree from root to leaf entities (top-down), calling the sqlGen of each entity. Each entity can be treated as a subclass of the Java class (Entity). An implicit join filter (EntityFilter) is implemented as a subclass of Entity, similar to the right hand side of a SQL semi-join operator. Unlike the static SQL semi-join construct, it is conditionally and recursively generated even if it is specified in the input sources of the JSON specification. Another recursive interface can also be used in conjunction with process 4800, preSQLGen, which is primarily the entry point for EntityFilter to run a search and generate nested implicit join filters. During preSQLGen recursive invocations, the applicability of implicit join filters is examined and pushed down to its input subquery list. Another top-down traversal, pullUpCachable, can be used to pull up common sub-query blocks, including those dynamically generated by preSQLGen, such that SELECT statements of those cacheable blocks are generated only once at top-level WITH clauses. A recursive interface, sqlWith, is used to generate nested subqueries inside WITH clauses. The recursive calls of a sqlWith function can generate nested WITH clauses as well. An sqlFrom function can be used to generate SQL FROM clauses by referencing those subquery blocks in the WITH clauses. It also produces INNER/OUTER join operators based on the joins in the specification. Another recursive interface, sqlWhere, can be used to generate conjuncts and disjuncts of local predicates and semi-join predicates based on implicit join transformations. Further, sqlProject, sqlGroupBy, sqlOrderBy, and sqlLimitOffset can respectively be used to translate the corresponding directives in JSON spec to SQL SELECT list, GROUP BY, ORDER BY, and LIMIT/OFFSET clauses.

Returning to process 4800, at 4806, the query (generated at 4804) is used to respond to the request. As one example of the processing performed at 4806, the generated query is used to query database 142 and provide (e.g., to web app 120) fact data formatted in accordance with a schema (e.g., as associated with a card associated with the request received at 4802).

d. Additional Examples

FIG. 49B illustrates three examples of SQL entities. An SQL entity is composable using other entities in its statement, as well as input to other entities.

FIGS. 50A and 50B illustrate, collectively, example portions of an embodiment of a ProcessClusterFilters definition.

FIG. 51 illustrates an example of an introspection corresponding to a ProcessClusterFilters request. As mentioned above, introspection can be performed by a /card/describe/CardID REST request—a dynamic card parsed and created by query service 166. The sources of the request are a target card (e.g., Card26) and other filter activity cards (e.g., ProcessActivity) referenced by the fields (ProcessClusterFilters.USERNAME and ProcessClusterFilters.EXE_PATH) in the filters.

FIG. 52A illustrates an example of a base table card. FIG. 52B illustrates an example of a filter request, and FIG. 52C illustrates an example of an SQL query (e.g., generated by query service 166 in response to the request). FIG. 52D illustrates an additional example of a filter request, and FIG. 52E illustrates a corresponding dynamically generated SQL query.

FIGS. 53A, 53B, and 53C illustrate, respectively, a card, a request, and a generated SQL query corresponding to a join. FIGS. 53D and 53E illustrate, respectively, a request and a generated SQL query corresponding to an explicit filter join.

VI. Agent Networking in a Containerized Environment

Figure 54A:
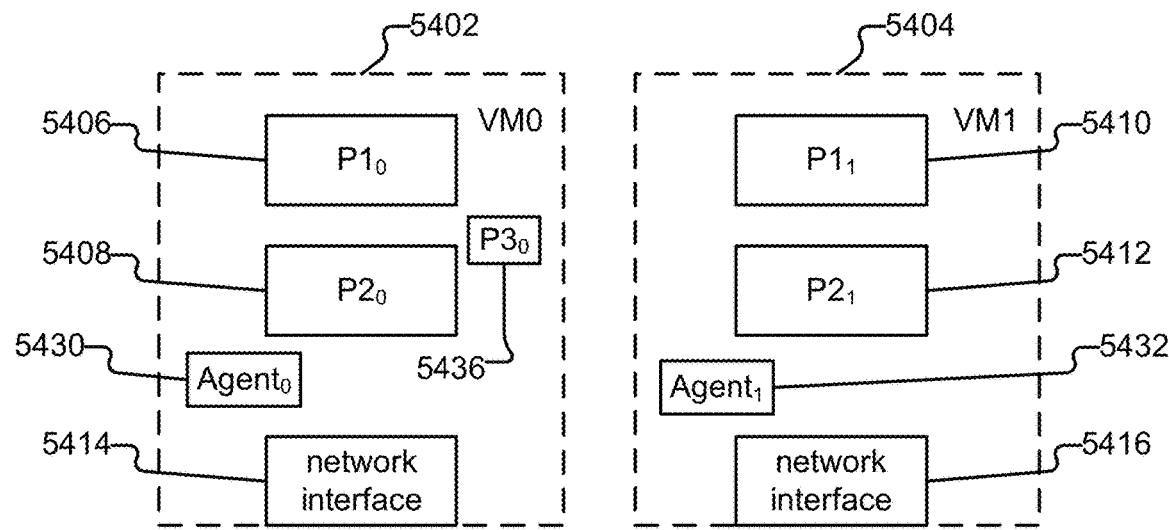
FIG. 54A illustrates a pair of virtual machines.

FIG. 54A illustrates a pair of virtual machines: VM0 (5402) and VM1 (5404). In the example shown, the virtual machines are Linux-based and use the Kubernetes platform for managing containerized workloads and services. Other types of systems (including ones using other containerization techniques) can also be used in conjunction with techniques described herein.

Included in virtual machines VM0 and VM1 are respective pods (with pods 5406 and 5408 on VM0 and pods 5410 and 5412 on VM1). A pod is an abstraction of a set of one or more containers deployed together on the same host. In multi-container pods, a data sharing model is typically used so that containers can exchange information with each other. Pods are managed by a master node (also referred to as an orchestrator), which is responsible for tasks such as vertical and horizontal scaling, and handling failover. The orchestrator is also responsible for managing communications between pods, including pods on the same virtual machine (e.g., communications between the pods 5406 and 5436) and pods on different virtual machines (e.g., communications between pods 5406 and 5410). Different types of orchestration infrastructure use different approaches to handling such communications. As one example, in a Kubernetes environment, an overlay network is often used (e.g., Calico for Kubernetes or other appropriate overlay networking technology).

One example of a pod is an app server pod that includes three different containers: the app server, a monitoring adapter, and a logging adapter. Another example of a pod includes an nginx webserver, a MySQL database server. In this example, the nginx container needs information to respond to requests. The data is provided to nginx by the Java application container, which obtains data from the MySQL container. Pods 5408 and 5412 are also referred to as "router pods." Router pods are a system service and one router pod runs on each virtual machine. Also shown in FIG. 54A are two respective agent pods (5430 and 5432) responsible for executing embodiments of agent 112.

Kubernetes makes use of a flat networking model. In this model, when one pod (e.g., pod 5406) needs to communicate with another pod, it does so by requesting access to a destination port (e.g., port 1031) without supplying a destination IP address. The orchestrator determines which particular pod on which particular virtual machine should be contacted and facilitates the connection. The orchestrator may select a pod collocated on the same virtual machine as the requesting pod or may select one on an entirely different machine. As mentioned above, various networking approaches may be used in different containerized environments. In various embodiments, for flexibility in deployment, agent pods are configured to dynamically determine (e.g., at startup) in which type of environment they are executing (e.g., subnet-based routing or black hole IP-based routing) and adjust their networking assumptions as applicable (e.g., to expose frames that would otherwise be hidden from the agent due to the network overlay).

Figure 54B:
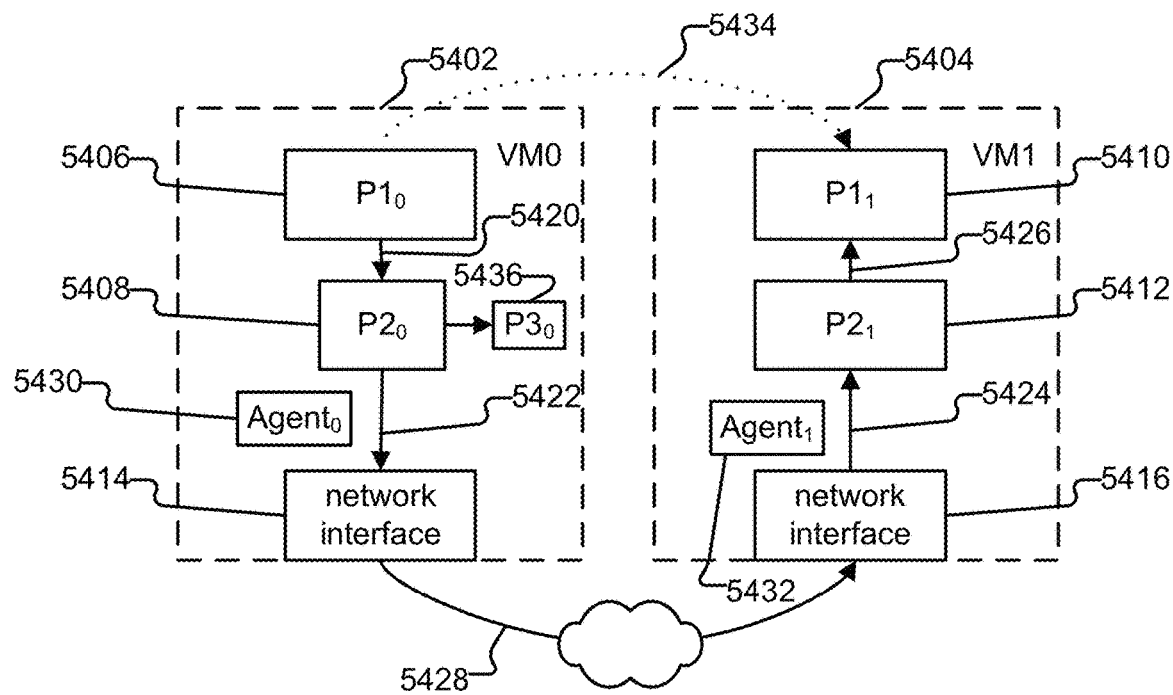
FIG. 54B illustrates an example of one pod communicating with another.

FIG. 54B illustrates an example one pod communicating with another. When pod 5406 needs to communicate with another pod, it sends a frame (5420) to router pod 5408 that includes a destination port. The orchestrator provides router pod 5408 with routing information (e.g., as a routing table that indicates how to route packets to particular service endpoints), and router pod 5408 determines whether the frame should be sent locally (e.g., to pod 5436) or remotely (e.g., to pod 5410). When the frame is to be sent locally, agent pod 5430 (listening to connections, e.g., via pcap as discussed above) can determine that, for example, pod 5406 is communicating with pod 5436, and provide the information as telemetry or other data to platform 102. In particular, and similar to techniques described above, agent pod 5430 is able to extract the source port, destination port, source IP, destination IP, and protocol out of the frame destined for pod 5436 from pod 5406.

When a frame is to be sent remotely (5428), router pod 5408 encapsulates the frame (e.g., using the IP in IP tunneling protocol) and provides the encapsulated frame to interface 5414. The outer header of the encapsulated frame will include an IP address of virtual machine 5404. Router pod 5412 will extract the inner frame and provide it to pod 5410 (5426) based on the inner header of the encapsulated frame, which includes information usable by router pod 5412 to deliver the traffic to pod 5410.

Unfortunately, the additional encapsulation can pose a challenge to agent pod 5430's ability to extract information about the communication. The inner header information will include a foreign IP address that is unknown to agent pod 5430, abstracting out information such as that pod 5406 is communicating with pod 5410 (5434) difficult (e.g., using techniques described in Section III. Above). Similarly, when router pod 5412 de-encapsulates the packet, the originating address in the inner header information will include a foreign IP address that is unknown to agent pod 5432. As a result, containerization can make alerting and/or other security enforcement techniques described herein difficult. One approach to addressing the situation is for agent pod 5430 to attempt to obtain routing information from the orchestrator master node. However, this may not be practical, or possible. Even were such information made available, it could be out of date and lead to false attribution or misattributions of which pods are communicating with which pods. In an alternate approach, agents 5430 and 5432 can be configured to track each hop of every frame (e.g., from pod 5406 to pod 5408 to interface 5414 to interface 5416 (5428) to pod 5412 to pod 5410) and provide the information to platform 102 to match up the connections. This approach may also not be practical or possible. As one example, significant resource overhead may be needlessly expended. Accordingly, in various embodiments, agent pods 5430 and 5432, working in cooperation with platform 102, use yet another alternate approach (using techniques described herein) that can efficiently determine and thus abstract out when pods communicate with remote pods.

Figure 55A:
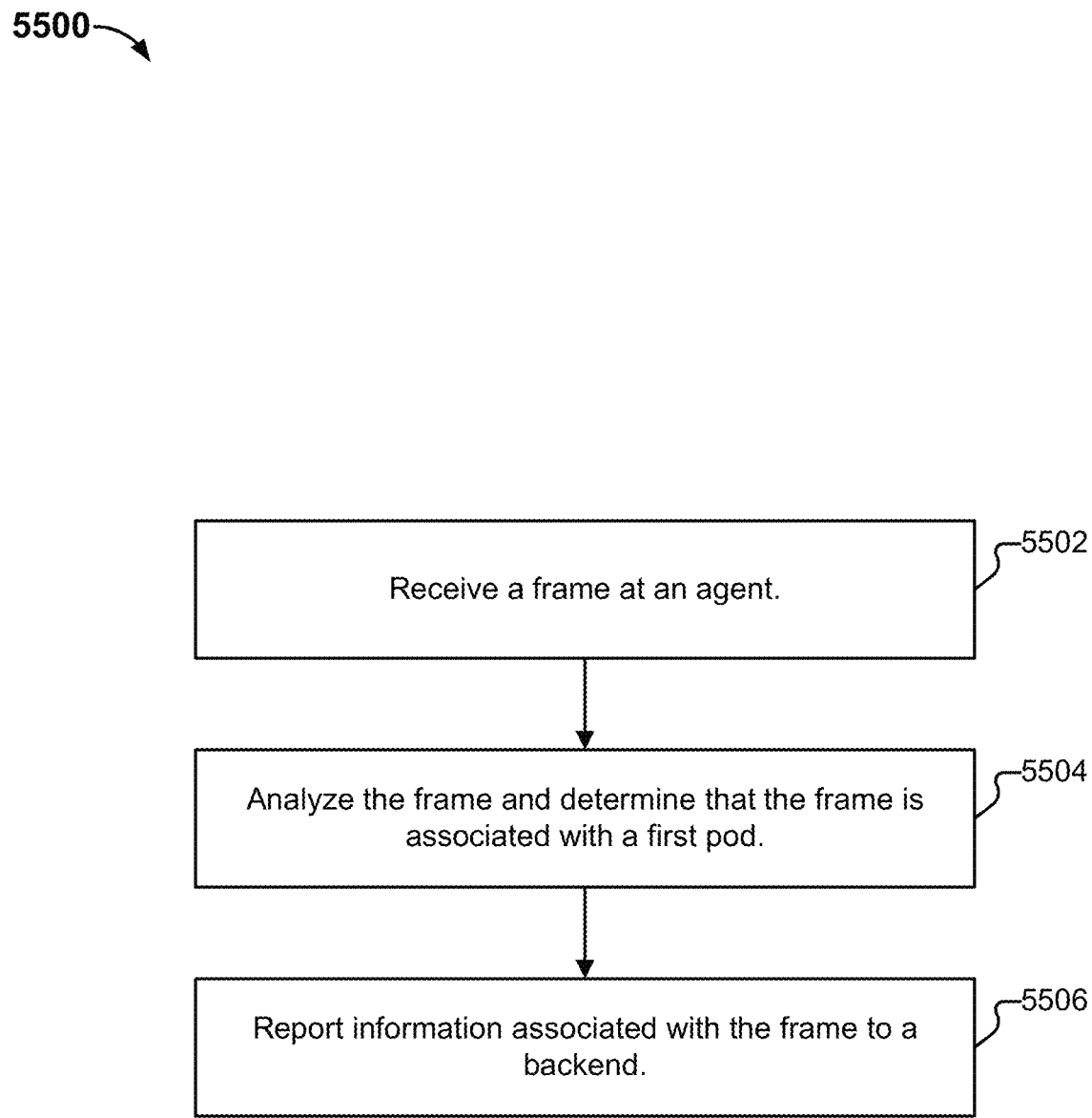
FIG. 55A illustrates an example of a process for facilitating the identification of a pod to pod communication.

FIG. 55A illustrates an example of a process for facilitating the identification of a pod to pod communication. In various embodiments, process 5500 is performed by agent pod 5430 (e.g., executing an embodiment of agent 112 in a pod). In various embodiments, during its startup, agent pod 5430 builds a routing table map (e.g., using the Linux programmatic interface of Netlink socket). The map can also be built using other approaches, such as by reading the route file in the proc filesystem. The map can be used by the agent pod to identify whether given packets are locally routed or externally routed. The map can also be used to find routing rules needing special handling (e.g., packet rewrite using Linux iptables). Another task performed by agent pod 5430 at startup is registering itself with the Docker daemon and requesting notification whenever a container starts or stops. When a container starts, agent pod 5430 probes the Docker daemon using its inspect API to obtain details of the newly started container. In particular, agent pod 5430 obtains the container's associated process ID and network mode. For containers that use a bridge/container networking mode, agent pod 5430 is configured to use the container's process ID as a key to join the namespace of the process using the setns system call. By joining the namespace, the agent is able to collect information such as the container's IP address, MAC address, routing table, open server ports, any existing client connections, etc.

The process begins at 5502 when a frame is received. As one example, a frame is received at 5502 when agent pod 5430, which is registered on all network interfaces of virtual machine 5402, receives a set of packets from the kernel (e.g., in batch mode). At 5504, the agent analyzes the frame and determines that the frame is associated with a first pod. As mentioned above, in some cases, a pod's identity may be readily apparent. For example, when pod 5406 attempts to connect to pod 5436 (via pod 5436's port), the frame sent by router pod 5408 will contain full source, destination, and protocol information that can be provided by agent pod 5430 to system 102 as a five tuple (or other appropriate data structure) identifying that the two pods are in communication (e.g., using techniques described in Section III. above). However, as also described above, when pod 5406 attempts to connect to pod 5410, the frame sent by router pod 5408 is encapsulated. When agent pod 5430's pcap handler receives a buffer containing one or more packets, agent pod 5430 parses each to extract metadata. Using the IP header's protocol, the agent pod is able to detect the type of packet (e.g., TCP, UDP, VLAN tagged, or IP in IP). If agent pod 5430 encounters an encapsulated IP frame, in various embodiments, it recursively scans the packet to extract the (nested) inner header(s) until a TCP or UDP header is encountered. Agent pod 5430 then examines the innermost header and determines whether the source is included in a set of IP addresses programmed on any of the interfaces in any of the containers currently executing on virtual machine 5402. One approach to making such a determination is to query the PROC interface and/or kernel and discover which interfaces exist on virtual machine 5402 and enumerate any associated networking information (e.g., IP address information, MAC address information, etc.) associated with those interfaces If the source is not included in the set of IP addresses, the packet is likely stale (e.g., belonging to a no longer executing container) or otherwise not useful to process 5500 and dropped from further processing by the agent.

At 5506, agent pod 5430 reports connection information associated with the frame (e.g., pod source IP, pod service port, and pod destination port) to platform 102. Agent pod 5432 also performs process 5500 (de-encapsulating frame 5424 when it is received by interface 5416, and determining that the pod destination information corresponds to a local pod), and similarly reports connection information with the frame from its viewpoint. As with to the connection matching described in Section III. above, platform 102 can match the information provided by agent pod 5430 with the corresponding information provided by agent pod 5432 about its half of the connection into a single connection (between pod 5406 and pod 5410) and take any appropriate additional actions in response. As one example, the first time a connection is made between pod 5406 and pod 5410, an edge can be added to a pod communication graph having those two pods as nodes, indicating that the pods have communicated. Statistical information can be incremented for any subsequent connections between the two pods. Agent pod 5430 can also take other actions, such as maintaining an in-memory state associated with each of the pods executing on virtual machine 5402 (e.g., which ports it has open, what connections it makes, amount of bytes transferred, etc.).

FIG. 55B illustrates example data provided by two agents to a backend process. Region 5552 depicts connection data provided by an agent running on a first node where a client application is executing in a Docker container that needs to request data from a second node running an application server. Region 5554 depicts connection data provided by the application server running on the second node. Platform 102 can take the data depicted in regions 5552 and 5554 and associate both sets of connection data into a single connection bundle, with the client application running on the first node communicating with the application server listening on the second node. When the response comes back from the server pod, the IPs are reversed (source becomes destination and vice versa) (5556, 5558), but the owning process remains the same. From a correlation standpoint, the five tuple (source IP, source port, destination IP, destination port, protocol) and the ability of agents to associate the connection bundle between a client pod and a server pod running on different virtual machines in a Kubernetes (or other appropriate) environment provide visibility and deeper insight into pod application behavior.

VII. Pod Communication Graph

A. Data Model

Figure 56:
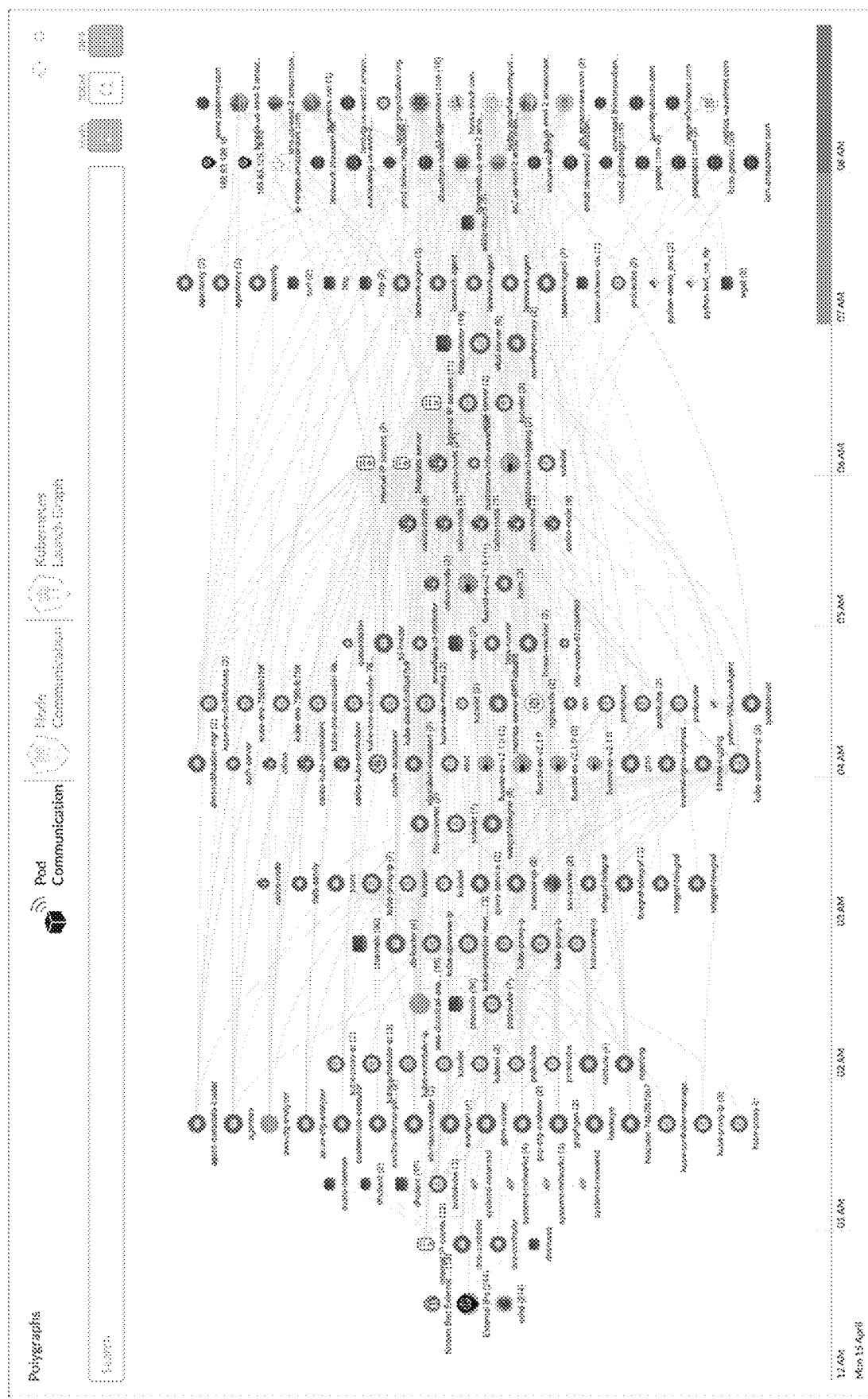
FIG. 56 illustrates an example of a pod communication graph.

FIG. 56 illustrates an example of a pod communication graph. In various embodiments, a pod is a group of one or more containers (e.g., Docker containers) with shared storage/network, and a specification of how to run the containers. Two pod instances (e.g., pod 5406 and pod 5410) can be classified in the same cluster based on particular criteria. One example of such criteria is where the pods have the same list of unique Kubernetes container names. The list of unique container names associated with a given pod instance can be collected (e.g., by agent pod 5430) over a period of time (e.g., 30 days), and augmented with additional information. Examples of fields and sample data include:

K8S_CLUSTER: a value from the machine tag KubernetesCluster from MACHINE_DETAILS_T.TAGS. An example value is: "qa7.k8s.local."

VM_TYPE (also referred to as a node type): a value from the machine tag aws.autoscaling:groupNameCluster from MACHINE_DETAILS_T.TAGS. Example values are: "nodes-worker-spot.qa7.k8s.local," "nodes-pub-spot.qa7.k8s.local," "nodes-dmz-spot.qa7.k8s.local," and "nodes-gbm-spot.qa7.k8s.local."

POD_NAME: a value from the machine tag io.kubernetes.pod.name from CONTAINER_T.PROPS_LABEL.

POD_NAMESPACE: a value from the machine tag io.kubernetes.pod.namespace from CONTAINER_T.PROPS_LABEL.

Figure 57:
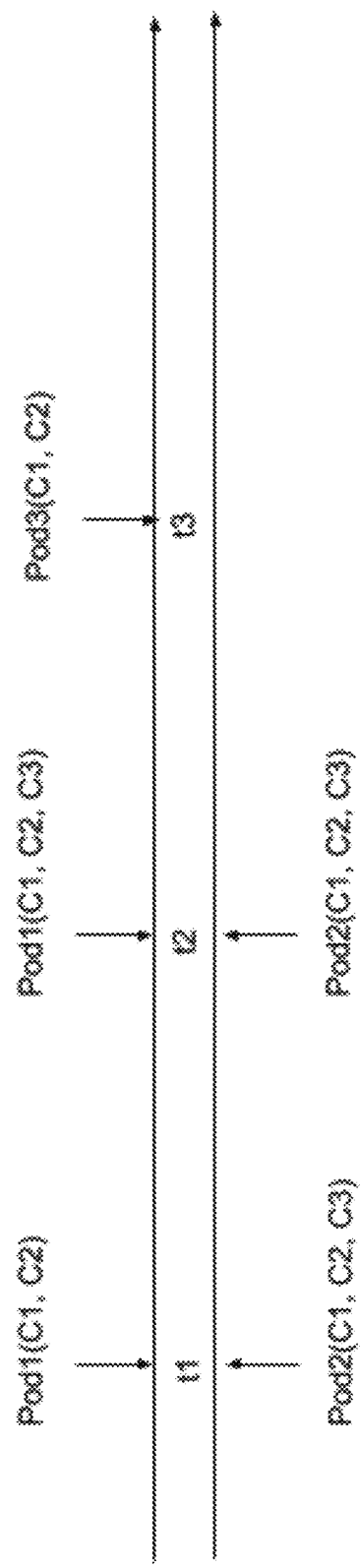
FIG. 57 illustrates a set of pod types over time.

Since the list of container names is collected over moving windows, it is possible for two different lists of containers to be detected for the same pod at two different hours. This is illustrated in FIG. 57, where there are two pod types (C1, C2) and (C1, C2, C3) between times t1 and t3. Pod1 at time t1 has the same pod cluster type as pod3 at time t3, assuming that pod1 and pod3 have the same K8S_CLUSTER, VM_TYPE, and POD_NAMESPACE. Pod2 at times t1 and t2 has the same pod type as pod1 at time t2. As an example way to maintain a persistent pod type identification, a pod cluster identifier (also referred to as a POD_TYPE_HASH) can be composed as follows:

Cluster ID=
MD5(
  CONCAT(
    K8S_CLUSTER,
    VM_TYPE,
    POD_NAMESPACE,
    MD5(List of Unique Container REPO names in ascending order)
  )
)

FIG. 58 illustrates example data usable for assigning a pod type label (POD_TYPE_NAME) based on pod names. As illustrated in FIG. 58, for "kube-system" namespaces, the cluster name is the common prefix from all pod names in the same cluster. For non "kube-system" namespaces, the cluster name is generated by stripping out the last two tokens using "-" as delimiters.

Figure 59A:
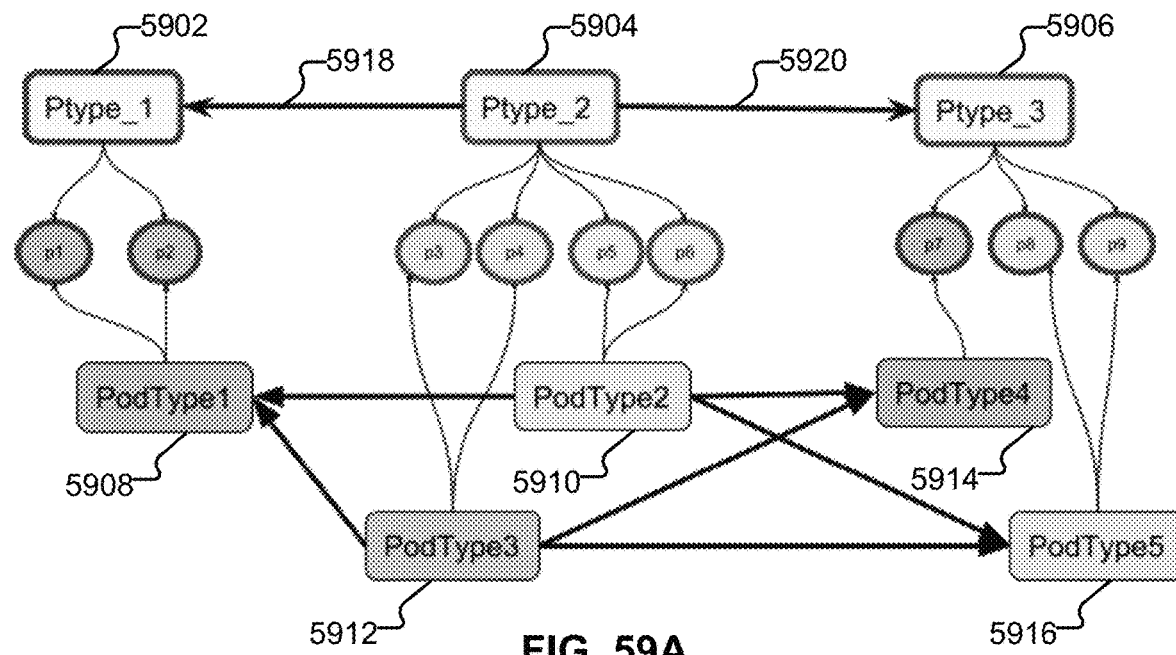
FIG. 59A illustrates a node cluster split.
Figure 59B:
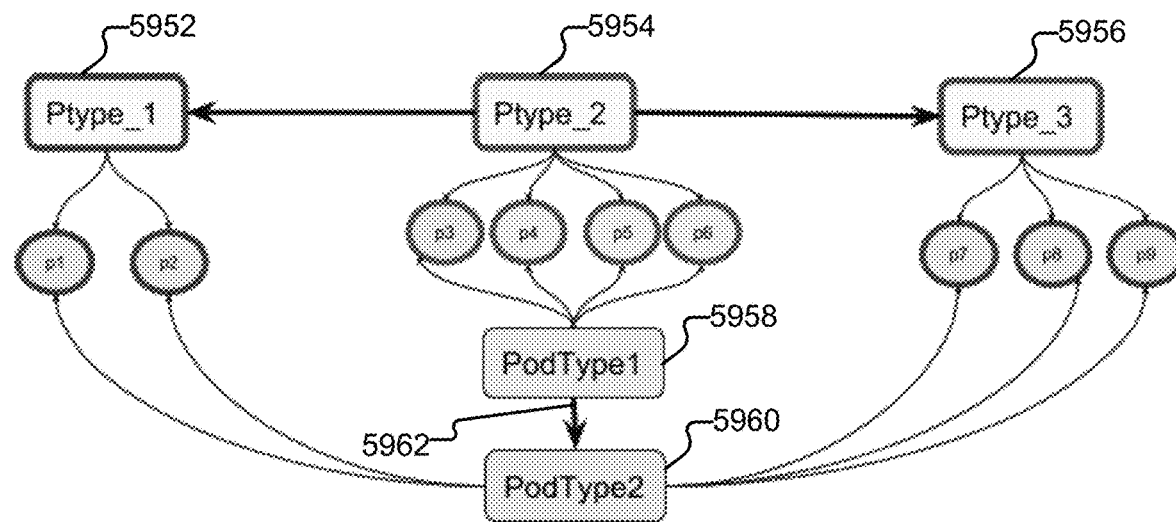
FIG. 59B illustrates a node cluster merge.

Returning to FIG. 56, one approach to generating a pod communication graph (also referred to herein as a PodTypeConn graph) is to regroup the application communication (PtypeConn) process cluster graph described above. In an example scenario, suppose a pod type cluster comprises four fields (K8S_CLUSTER, VM_TYPE, POD_NAMESPACE, and POD_TYPE_HASH). As illustrated in the top portions of FIGS. 59A and 59B, processes p1 through p9 are initially clustered into Ptype_1 (p1, p2), Ptype_2 (p3, p4, p5, p6), and Ptype_3 (p7, p8, p9). Arrows between the different Ptypes indicate client server communications. So, for example, line 5918 indicates that all processes in the Ptype_1 cluster are server processes which accept connections from processes clustered into Ptype_2. Similarly, line 5920 indicates that all processes in the Ptype_3 cluster are server processes which accept connections from processes clustered into Ptype_2. In a Ptype communication model, nodes in Ptype_1 and Ptype_3 are clustered separately because of one or more distinguishing process attributes (e.g., region). When regrouping by PodType name (or other appropriate attribute), two possible outcomes exist (e.g., for regrouping from PTypeConn graphs to PodTypeConn graph). As illustrated in FIG. 59A, one outcome is that the set of nodes originally clustered into three process types (5902-5906) will be regrouped (in this case, split) into five pod types (5908-5916). As illustrated in FIG. 59B, another outcome is that the set of nodes clustered into three process types (5952-5956) will be regrouped (in this case, merged) into two pod types (5958-5960). In this example, line 5962 indicates that processes clustered in PodType2 accept connections from processes in the PodType1 cluster.

B. Example Data Flow

Figure 60:
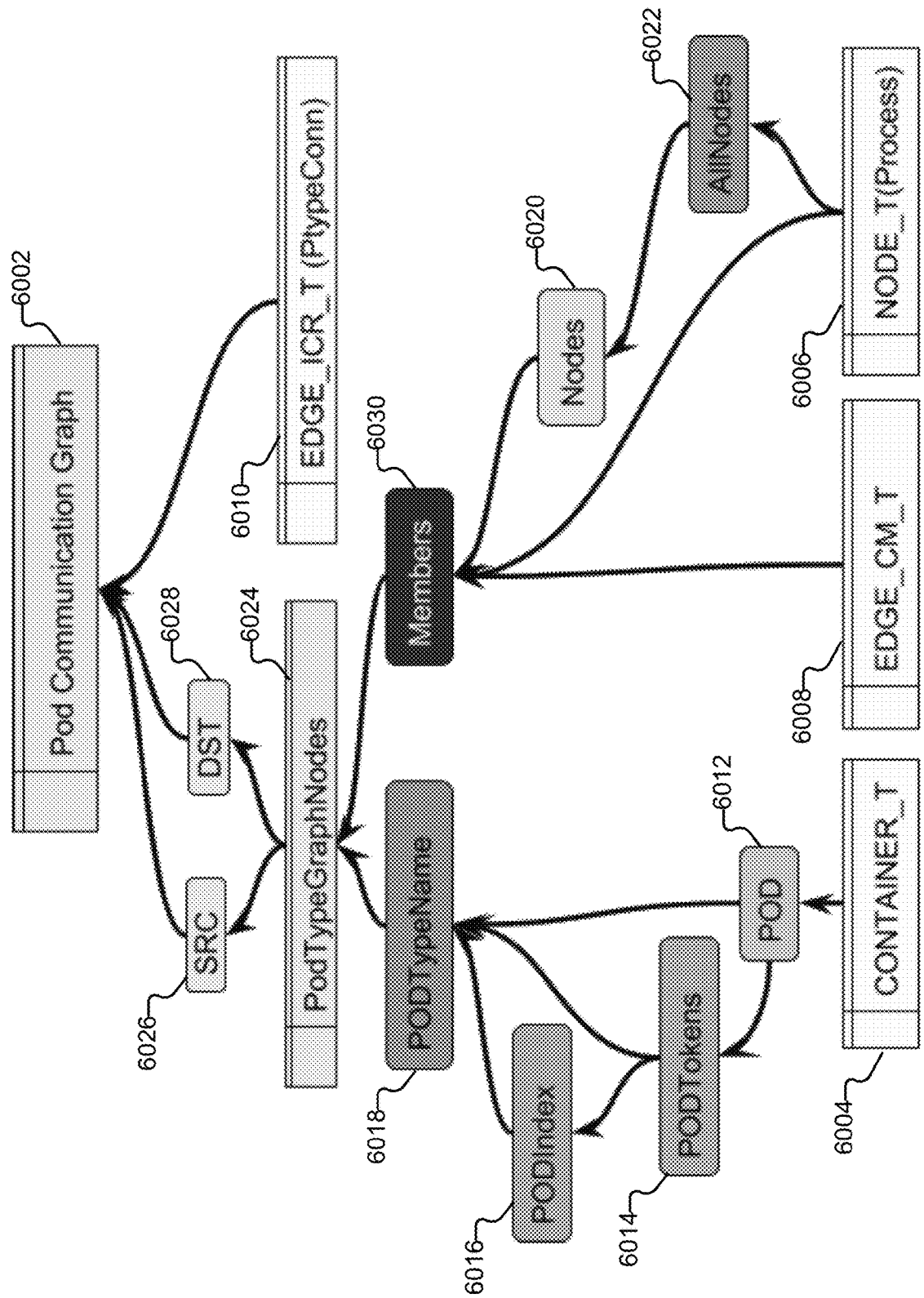
FIG. 60 illustrates a data flow for constructing a pod cluster communication graph.

FIG. 60 illustrates an example data flow for building a pod communication graph. In various embodiments, graph 6002 is built by QsJobServer 160.

1. Base Tables

CONTAINER_T (6004): This table comprises container and pod information received from agent pods (e.g., agent pod 5430) and processed by DB Loader 140.

GRAPH_INTERNAL.NODE_T (6006): This table comprises active entity instances as members of clusters, created hourly by GraphGen 146.

GRAPH_INTERNAL.EDGE_CM_T (6008): This table comprises cluster and member relationship information of process connections, created hourly by GraphGen 146. The cluster type and cluster key are represented as (SRC_TYPE, SRC KEY), which is a foreign key (FK) to the primary key (PK) of the GRAPH_INTERNAL.NODE_C_T table. The FK-PK relationship is used such that there is no need to join with GRAPH_INTERNAL.NODE_C_T for the pod cluster communication graph.

GRAPH_INTERNAL.EDGE_ICR_T (6010): This table comprises pod communications and is derived from the application (PType) communication graph.

2. Example SQL Annotation by Sections

The following section (and accompanying figures) reflect an annotated breakdown of original SQL by WITH clauses. The WITH clauses have references numbers inserted such that readers can match each section with the data flow diagram shown in FIG. 60. In addition to standard SQL syntax, parameter expression is used for dynamic input values, such as ${StartTimeRange} and ${EndTimeRange}. The intent of the SQL implementation is to calculate multiple graphs (one per hour) in parallel by one request.

POD (6012). FIG. 61 illustrates SQL that returns container instances with POD information in the last 30 days. The Rank( ) function is to make sure that unique container information per instance (CONTAINER_ID) is provided.

PODTokens (6014). FIG. 62 illustrates SQL that returns a preliminary POD_TYPE_HASH and tokenized POD name per POD instance.

PODIndex (6016) and PODTypeName (6018). FIG. 63 illustrates SQL that determines the name of each POD cluster type by the most common prefix POD names shared with the same list of containers.

Nodes (6020) and AllNodes (6022). FIG. 64 illustrates SQL that returns entities with CONTAINER_ID and machine tags, if available.

ClusterMemberWithPodInfo (6030). FIG. 65 illustrates SQL that enriches PTypeConn cluster members with POD information (e.g., PODTypeName) by a JOIN of the same CONTAINER_ID with Members.

POD Communication Node (PodTypeGraphNodes) (6024). As shown in FIG. 66, PodInfo uses customer membership relationships to calculate additional information such as tiers and frequent terms. There are two types of tiers: horizontal and vertical, which are input to UI layout to maintain consistent visual orientation for comparison between two POD communication graphs at different hours. Frequent terms are used for user to search and identify nodes in POD communication graph (e.g., to represent the final title/name for a cluster).

POD Communication Graph (6002). As shown in FIG. 67, the final pod type communication graph is a result of a JOIN of the PTypeConn graph, source POD type cluster nodes (6026), and destination type cluster nodes (6028).

Figure 68:
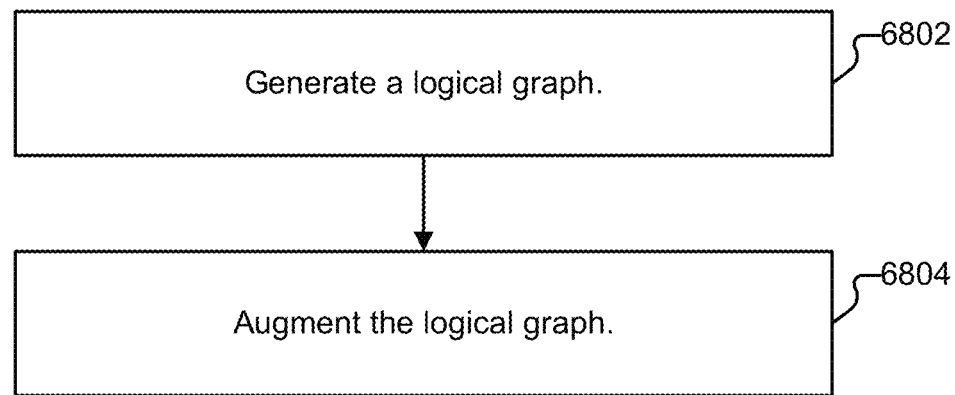
FIG. 68 illustrates an example of a process for generating a pod cluster communication graph.

FIG. 68 illustrates an example of a process for generating a pod cluster communication graph. In various embodiments, process 6800 is performed by platform 102. The process begins at 6802 when a logical graph is generated. One example of processing performed at 6802 is the creation of one or more polygraphs (e.g., as described above). At 6804, the logical graph is augmented. One approach to augmenting the logical graph is for QsJobServer to periodically (e.g., once an hour) execute an augmentation job, and in particular, to execute the job illustrated in FIG. 60 (using information provided by DB Loader 140 into database 142 from agents).

The resulting pod cluster communication graph can be used for a variety of purposes. As one example, alerts can be surfaced whenever changes occur within the graph (e.g., new nodes representing new pod clusters are added, and/or new edges representing communications between pod clusters are added), using techniques described above. Similarly, the pod cluster communication graph can be used in visualizations, such as the one shown in FIG. 56. Such visualizations can help administrators troubleshoot problems, gain understanding of network topology, etc. through the ability to abstract out and surface various attributes and behaviors within a datacenter.

VIII. Hierarchical Graph Analysis

Returning to FIGS. 59A and 59B, the regrouping depicted in those figures involved regrouping Ptype (process communication) clusters using pod communication enrichment information. Such regrouping can more generally be performed with respect to other kinds of clusters and using other kinds of attributes as well, including arbitrary/user supplied tags. As applicable, inter-node relationships can be relaxed or required to be maintained, resulting in graph hierarchies (e.g., where merges occur such as is shown in FIG. 59B).

Figure 69:
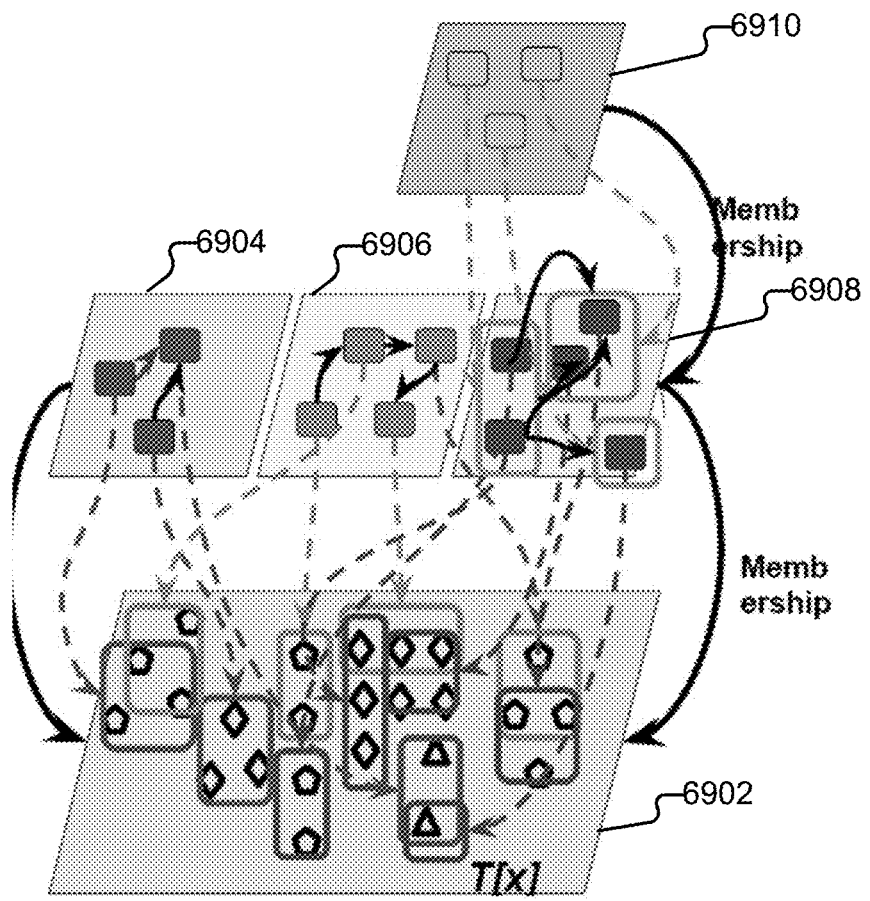
FIG. 69 illustrates node clustering.

FIG. 69 illustrates, in region 6902, an abstraction of raw information associated with nodes in a data center (e.g., as collected by agents, assembled by QsJobServer, etc.). The various shapes depicted are abstractions of entities (e.g., users, processes, machines, etc.). Regions 6904-6908, respectively, correspond to various models discussed above (e.g., machine to machine connections; process to process connections; UID to UID model; etc.), which connect entities via edges based on behavioral relationships. Region 6910 depicts an abstracted example of how additional clustering can be performed on already clustered data. Returning to the example of FIG. 59A, processes p1-p9 are examples of entities that would appear in region 6902. The processes could be initially clustered using a Ptype model into clusters 5902-5906. An example of data corresponding to the abstraction is shown in region 6908. When reclustering is performed using pod type information, this is an example of what is depicted in region 6910. In the example shown in FIG. 69, a merge has occurred (similar to what occurred in FIG. 59B). Specifically, five clusters have been merged into three clusters based on an additional clustering criteria, while maintaining the relationship requirements of the underlying model.

Hierarchical reclustering can be particularly useful for improving visibility and thus also security. As an example, suppose a corporate network environment has 1,000 web servers (examples of entities that could be depicted in region 6902). The web servers all behave similarly and are clustered together into a single cluster (e.g., by one of the models shown in region 6904-6908). While all 1,000 web servers may behave the same way, logically, it might be desirable to further segment them. As an example, of the 1,000 web servers, 900 might be frontend servers and the other 100 backend servers; 800 might be in production and the other 200 in testing, etc. Information such as whether a given webserver is a backend or frontend server, or whether it is in production or testing, etc., can be used to enrich the initial clustering and make it more meaningful, by serving as a reclustering criteria. Additional examples of enrichment data include AWS region, AWS server type, and availability zone. More generally, administrators can supply arbitrary name value pairs to platform 102 and select which names to use for clustering. Such segmentation can also be multilayered, for example, with a first clustering of all web servers (as determined by GBM 154), then clustered by region, then clustered by frontend/backend or other attributes. As explained above, the underlying attributes between nodes (e.g., MType connections) are maintained in the reclusterings, with the reclusterings serving as aggregations/summarizations of particular attributes.

Enrichment information can be provided to platform 102 in a variety of ways, including by configuring each agent with appropriate information, an administrator separately providing it (e.g., as a flat file in an administrative console, etc.). In various embodiments, QsJobServer is responsible for incorporating applicable enrichment information after GBM 154 is created (e.g., by performing a join with enrichment information). In other embodiments, GBM Runner 156 is responsible for performing an SQL query for applicable attributes prior to the creation of GBM 154. As one example, ACME might maintain an LDAP or other authentication server which can be queried to provide information (e.g., department, job role, geolocation, etc.) about users which can be incorporated into GBM construction.

Similar to where clusters of processes can be reclustered using pod communication information, machines (e.g., sharing a single machine type) can be reclustered using departmental, organizational, or other attributes that are likely to be useful when aggregating information about a network environment. A benefit of this approach is that it allows for alerting to be performed based on a cluster's attribute(s). As an example, and as previously described, alerts can be generated when new edges are added to graphs. It might be the case that an organization would like to receive alerts about new edges involving production systems but would not like alerts (or would like different kinds of alerts) about new edges involving testing systems. As another example, different alerting rules (e.g., different severity levels) can be used when graph changes involve network administrators vs. those involving end users.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive, at an agent pod registered on one or more network interfaces of a first virtual machine and configured to collect information associated with the first virtual machine and report it to an external server, a frame;
analyze the received frame, by the agent pod, to determine that the frame is associated with a first known pod, wherein the first known pod is an abstraction of a set of one or more containers deployed together on the same host; and report a first set of IP information to a backend process executing on the external server, wherein the backend process is configured to stitch the reported first set of IP information received from the agent pod with other IP information reported by one or more additional agent pods registered on one or more network interfaces of a second virtual machine to identify a second pod, wherein the reported first set of IP information comprises information that includes either one of:

(1) a source IP address of the second pod, or (2) a destination IP address of the second pod, but does not include both of the source IP address of the second pod and the destination IP address of the second pod; and wherein stitching the IP information includes matching a client connection with a server connection; and a memory coupled to the processor and configured to provide the processor with instructions.

2. The system of claim 1 wherein the frame is encapsulated and wherein analyzing the frame includes de-encapsulating the frame.

3. The system of claim 1 wherein analyzing the frame includes determining whether an IP address included in the frame corresponds to an executing container.

4. The system of claim 1 wherein the agent is configured to determine an overlay network type at runtime.

5. The system of claim 1 wherein the agent is configured to join a namespace.

6. The system of claim 5 wherein the agent is further configured to collect network interface information associated with a container.

7. The system of claim 1 wherein the first pod and the second pod communicate with one another at an application level.

8. The system of claim 1 wherein statistical information associated with the connected client and server connections is associated with the connections.

9. The system of claim 1 wherein stitching the IP information includes determining a process identifier.

10. A method, comprising:

receiving, at an agent pod registered on one or more network interfaces of a first virtual machine and configured to collect information associated with the first virtual machine and report it to an external server, a frame;

analyzing the received frame, by the agent pod, to determine that the frame is associated with a first known pod, wherein the first known pod is an abstraction of a set of one or more containers deployed together on the same host; and reporting a first set of IP information to a backend process executing on the external server, wherein the backend process is configured to stitch the reported first set of IP information received from the agent pod with other IP information reported by one or more additional agent pods registered on one or more network interfaces of a second virtual machine to identify a second pod, wherein the reported first set of IP information comprises information that includes either one of:

(1) a source IP address of the second pod, or (2) a destination IP address of the second pod, but does not include both of the source IP address of the second pod and the destination IP address of the second pod; and wherein stitching the IP information includes matching a client connection with a server connection.

11. The method of claim 10 wherein the frame is encapsulated and wherein analyzing the frame includes de-encapsulating the frame.

12. The method of claim 10 wherein analyzing the frame includes determining whether an IP address included in the frame corresponds to an executing container.

13. The method of claim 10 wherein the agent is configured to determine an overlay network type at runtime.

14. The method of claim 10 wherein the agent is configured to join a namespace.

15. The method of claim 14 wherein the agent is further configured to collect network interface information associated with a container.

16. The method of claim 10 wherein the first pod and the second pod communicate with one another at an application level.

17. The method of claim 10 wherein statistical information associated with the connected client and server connections is associated with the connections.

18. The method of claim 10 wherein stitching the IP information includes determining a process identifier.

19. A computer program product embodied in a non-transitory computer readable storage medium and comprising computer instructions for:

receiving, at an agent pod registered on one or more network interfaces of a first virtual machine and configured to collect information associated with the first virtual machine and report it to an external server, a frame;

analyzing the received frame, by the agent pod, to determine that the frame is associated with a first known pod, wherein the first known pod is an abstraction of a set of one or more containers deployed together on the same host; and reporting a first set of IP information to a backend process executing on the external server, wherein the backend process is configured to stitch the reported first set of IP information received from the agent pod with other IP information reported by one or more additional agent pods registered on one or more network interfaces of a second virtual machine to identify a second pod, wherein the reported first set of IP information comprises information that includes either one of:

(1) a source IP address of the second pod, or (2) a destination IP address of the second pod, but does not include both of the source IP address of the second pod and the destination IP address of the second pod; and wherein stitching the IP information includes matching a client connection with a server connection.

20. The system of claim 1 wherein the IP information reported by the agent pod to the backend process comprises a source port of the first known pod, a destination port of the second pod, and a source IP address of the first known pod; and wherein the IP information reported by the agent pod to the backend process does include a destination IP address of the second pod.

21. The system of claim 1 wherein the IP information reported by the agent pod to the backend process comprises a source port of the second pod, a destination port of the first known pod, and a destination IP address of the first known pod; and wherein the IP information reported by the agent pod to the backend process does not include a source IP address of the second pod.

22. The system of claim 1 wherein the frame is received from a router pod.

\* \* \* \* \*